US012668893B2

(12) United States Patent
Diehn et al.

(10) Patent No.: US 12,668,893 B2
(45) Date of Patent: Jun. 30, 2026

(54) METHODS OF ANALYZING CELL FREE NUCLEIC ACIDS AND APPLICATIONS THEREOF

(71) Applicant: The Board of Trustees of the Leland Stanford Junior University, Stanford, CA (US)

(72) Inventors: Maximilian Diehn, San Carlos, CA (US); Arash Ash Alizadeh, San Mateo, CA (US); Jacob J. Chabon, Arvada, CO (US); David M. Kurtz, San Carlos, CA (US); Mohammad Shahrokh Esfahani, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 891 days.

(21) Appl. No.: 17/822,016

(22) Filed: Aug. 24, 2022

(65) Prior Publication Data

US 2025/0263789 A1 Aug. 21, 2025

Related U.S. Application Data

(63) Continuation of application No. PCT/US2021/019478, filed on Feb. 24, 2021.

(60) Provisional application No. 62/980,972, filed on Feb. 24, 2020.

(51) Int. Cl.
*C40B 50/06* (2006.01)

(52) U.S. Cl.
CPC .................................... *C40B 50/06* (2013.01)

(58) Field of Classification Search
None
See application file for complete search history.

(56) References Cited

U.S. PATENT DOCUMENTS

| | | | |
|---|---|---|---|
| 5,804,396 | A | 9/1998 | Plowman |
| 8,105,769 | B2 | 1/2012 | Bell et al. |
| 8,318,433 | B2 | 11/2012 | Brenner |
| 8,580,497 | B2 | 11/2013 | Stratton et al. |
| 8,722,368 | B2 | 5/2014 | Casbon et al. |
| 8,741,606 | B2 | 6/2014 | Casbon et al. |
| 8,835,358 | B2 | 9/2014 | Fodor et al. |
| 9,035,036 | B2 | 5/2015 | Bell et al. |

(Continued)

FOREIGN PATENT DOCUMENTS

| | | | |
|---|---|---|---|
| EP | 3561075 | A1 | 10/2019 |
| WO | WO-2014151117 | A1 | 9/2014 |

(Continued)

OTHER PUBLICATIONS

EP21759938.0 Extended European Search Report dated Feb. 7, 2024.

(Continued)

*Primary Examiner* — Christian C Boesen
(74) *Attorney, Agent, or Firm* — KPPB LLP

(57) ABSTRACT

Processes and materials to detect neoplasms from a biopsy are described. Processes and materials to build a sequencing library are described. Processes and material to perform targeted sequencing are described. Processes and materials to mitigate confounding sources are described. Cell-free nucleic acids can be sequenced and the sequencing result can be utilized to detect sequences derived from a neoplasm.

17 Claims, 88 Drawing Sheets

(56) References Cited

U.S. PATENT DOCUMENTS

| | | | |
|---|---|---|---|
| 9,340,830 B2 | 5/2016 | Lipson et al. | |
| 9,598,731 B2 | 3/2017 | Talasaz | |
| 9,752,188 B2 | 9/2017 | Schmitt et al. | |
| 9,834,822 B2 | 12/2017 | Talasaz | |
| 9,840,743 B2 | 12/2017 | Talasaz | |
| 9,850,523 B1 | 12/2017 | Chudova et al. | |
| 9,902,992 B2 | 2/2018 | Talasaz et al. | |
| 9,920,366 B2 | 3/2018 | Eltoukhy et al. | |
| 10,041,127 B2 | 8/2018 | Talasaz | |
| 10,457,955 B2 | 10/2019 | Kumar et al. | |
| 10,494,678 B2 | 12/2019 | Talasaz | |
| 10,501,808 B2 | 12/2019 | Talasaz | |
| 10,501,810 B2 | 12/2019 | Talasaz | |
| 10,704,085 B2 | 7/2020 | Talasaz et al. | |
| 10,704,086 B2 | 7/2020 | Talasaz et al. | |
| 10,738,364 B2 | 8/2020 | Talasaz | |
| 2014/0227705 A1 | 8/2014 | Vogelstein et al. | |
| 2014/0296081 A1 | 10/2014 | Diehn et al. | |
| 2015/0024950 A1 | 1/2015 | Bielas et al. | |
| 2016/0032396 A1 | 2/2016 | Diehn et al. | |
| 2017/0107576 A1 | 4/2017 | Babiarz et al. | |
| 2018/0251848 A1 | 9/2018 | Diehn et al. | |
| 2019/0085384 A1* | 3/2019 | Zhao | C12Q 1/6876 |
| 2021/0172022 A1 | 6/2021 | Kurtz et al. | |

FOREIGN PATENT DOCUMENTS

| | | |
|---|---|---|
| WO | WO-2016040901 A1 | 3/2016 |
| WO | WO-2017100441 A1 | 6/2017 |
| WO | WO-2017161175 A1 | 9/2017 |
| WO | WO-2018175997 A1 | 9/2018 |
| WO | WO-2018183942 A1 | 10/2018 |
| WO | WO-2019055715 A1 | 3/2019 |
| WO | 2019236599 A2 | 12/2019 |
| WO | WO-2021003485 A1 | 1/2021 |
| WO | WO-2021173722 A2 | 9/2021 |

OTHER PUBLICATIONS

MacConaill, et al. Unique, dual-indexed sequencing adapters with UMIs effectively eliminate index cross-talk and significantly improve sensitivity of massively parallel sequencing. BMC Genomics 19, 30, doi:10.1186/s12864-017-4428-5 (2018).

Abbosh et al. Abstract CT023: Phylogenetic tracking and minimal residual disease detection using ctDNA in early-stage NSCLC: A lung TRACERx study. Cancer Research, Proceedings: AACR Annual Meeting 2020; Apr. 27-28, 2020 and Jun. 22-24, 2020; Philadelphia, PA. Published Aug. 2020. Accessed Sep. 14, 2021 at: https://cancerres.aacrjournals.org/content/80/16_Supplement/CT023. 4 pages.

Bailey, et al. Comprehensive characterization of cancer driver genes and mutations. Cell 173.2 (2018): 371-385.

Bentley et al. "Accurate whole human genome sequencing using reversible terminator chemistry," (2008) Nature 456:53-59.

Carter, et al. Absolute quantification of somatic DNA alterations in human cancer. Nat Biotechnol. May 2012;30(5):413-21. doi: 10.1038/nbt.2203.

Chabon, et al. Circulating tumour DNA profiling reveals heterogeneity of EGFR inhibitor resistance mechanisms in lung cancer patients. Nat Commun. Jun. 10, 2016;7:11815. doi: 10.1038/ncomms11815.

Chabon et al. Integrating genomic features for non-invasive early lung cancer detection. Nature. https://doi.org/10.1038/s41586-020-2140-0. Published online Mar. 25, 2020. 7 pages. With Methods (24 pages) and Reporting Summary (3 pages).

Chaudhuri et al. Early Detection of Molecular Residual Disease in Localized Lung Cancer by Circulating Tumor DnA Profiling. Cancer Discov; 7(12); 1394-403 (2017). With Supplemental Tables Table of Contents and Table S6.

Cibulskis et al. Sensitive detection of somatic point mutations in impure and heterogenous cancer samples. Nat Biotechnol 31:213-219 (2013).

Costello, et al. Discovery and characterization of artifactual mutations in deep coverage targeted capture sequencing data due to oxidative DNA damage during sample preparation. Nucleic Acids Res. Apr. 1, 2013;41(6):e67. doi: 10.1093/nar/gks1443. Epub Jan. 8, 2013.

Dai et al. Identification of risk loci and a polygenic risk score for lung cancer: a large-scale prospective cohort study in Chinese populations. The Lancet, vol. 7, Issue 10, pp. 881-891 (Oct. 2019).

De Vlaminck, et al. Noninvasive monitoring of infection and rejection after lung transplantation. Proc Natl Acad Sci USA. Oct. 27, 2015;112(43):13336-13341. doi: 10.1073/pnas.1517494112. Epub Oct. 12, 2015.

Deng et al., "TNER: a novel background error suppression method for mutation detection in circulating tumor DNA", BMC Bioinformatics, vol. 19, No. 387, Oct. 20, 2018, 7 pgs.

Diehl et al. Circulating mutant DNA to assess tumor dynamics. Nat Med 14(9):985-990 (2008).

Gregory et al. Targeted single molecule mutation detection with massively parallel sequencing. Nucleic Acids Research, 2016, vol. 44, No. 3 e22. Published online Sep. 17, 2015. 11 pages.

Han, et al. The Biology of Cell-free DNA Fragmentation and the Roles of DNASE1, DNASE1L3, and DFFB. Am J Hum Genet. Feb. 6, 2020;106(2):202-214. doi: 10.1016/j.ajhg.2020.01.008. Epub Jan. 30, 2020.

Hawkins et al. Indel-correcting DNA barcodes for high-throughput sequencing. PNAS, vol. 115, No. 27 (E6217-E6226) (Published online Jun. 20, 2018).

International Preliminary Report on Patentability for International Application PCT/US2021/019478, Report issued Aug. 30, 2022, Mailed on Sep. 9, 2022, 10 Pgs.

Karczewski et al. Variation across 141,456 human exomes and genomes reveals the spectrum of loss-of-function intolerance across human protein-coding genes. bioRxiv preprint. doi: https://doi.org/10.1101/531210. Version posted Jan. 30, 2019. 39 pages.

Kinde et al. Detection and quantification of rare mutations with massively parallel sequencing. PNAS, vol. 108, No. 23, pp. 9530-9535 (Jun. 7, 2011). With Supporting Information (10 pages).

Koboldt, et al. VarScan 2: somatic mutation and copy number alteration discovery in cancer by exome sequencing. Genome Res. Mar. 2012;22(3):568-76. doi: 10.1101/gr.129684.111. Epub Feb. 2, 2012.

Martincorena et al. Universal Patterns of Selection in Cancer and Somatic Tissues. Cell 171, 1029-1041 (Nov. 16, 2017). With Erratum.

Mermel et al., GISTIC2.0 facilitates sensitive and confident localization of the targets of focal somatic copy-number alteration in human cancers, Genome Biol, 12:R41 (2011).

Newman et al. An ultrasensitive method for quantitating circulating tumor DNA with broad patient coverage. Nat Med. May 2014 ; 20(5): 548-554. With Supplementary Text and Figures (Supplementary Figures 1-8 and Supplementary Methods) and Supplementary Table 1 (NSCLC selector design and coordinates).

Newman, et al. Integrated digital error suppression for improved detection of circulating tumor DNA. Nat Biotechnol. May 2016;34(5):547-555. doi: 10.1038/nbt.3520. Epub Mar. 28, 2016.

PCT/US2021/019478 International Search Report and Written Opinion dated Aug. 25, 2021.

Qian et al. A novel pathway-based approach improves lung cancer risk prediction using germline genetic variations. Cancer Epidemiol Biomarkers Prev. Aug. 2016 ; 25(8): 1208-1215.

Rosenthal, et al. DeconstructSigs: delineating mutational processes in single tumors distinguishes DNA repair deficiencies and patterns of carcinoma evolution. Genome Biol. Feb. 22, 2016;17:31. doi: 10.1186/s13059-016-0893-4.

Saunders et al. Strelka: accurate somatic small-variant calling from sequenced tumor-normal sample pairs. Bioinformatic, 28(14):1811-1817 (2012).

Schmitt et al., "Detection of ultra-rare mutations by next-generation sequencing", Proceedings of the National Academy of Sciences, vol. 109, No. 36, Sep. 4, 2012, pp. 14508-14513.

Serpas et al. Dnase1l3 deletion causes aberrations in length and end-motif frequencies in plasma DNA. PNAS, vol. 116, No. 2, pp. 641-649 (Jan. 8, 2019). Published online Dec. 28, 2018.

(56) References Cited

OTHER PUBLICATIONS

Supplementary Information for CHABON et al. Integrating genomic features for non-invasive early lung cancer detection. Nature. https://doi.org/10.1038/s41586-020-2140-0. Published online Mar. 25, 2020. 27 pages.
Supplementary Note for CHABON et al. Integrating genomic features for non-invasive early lung cancer detection. Nature. https://doi.org/10.1038/s41586-020-2140-0. Published online Mar. 25, 2020. 4 pages.
Vendrell et al. Circulating Cell Free Tumor DNA Detection as a Routine Tool for Lung Cancer Patient Management. Int. J. Mol. Sci. 2017, 18, 264. 19 pages.
Weissfeld et al. Lung cancer risk prediction using common SNPs located in GWAS-identified susceptibility regions. J Thorac Oncol. Nov. 2015 ; 10(11): 1538-1545.

* cited by examiner

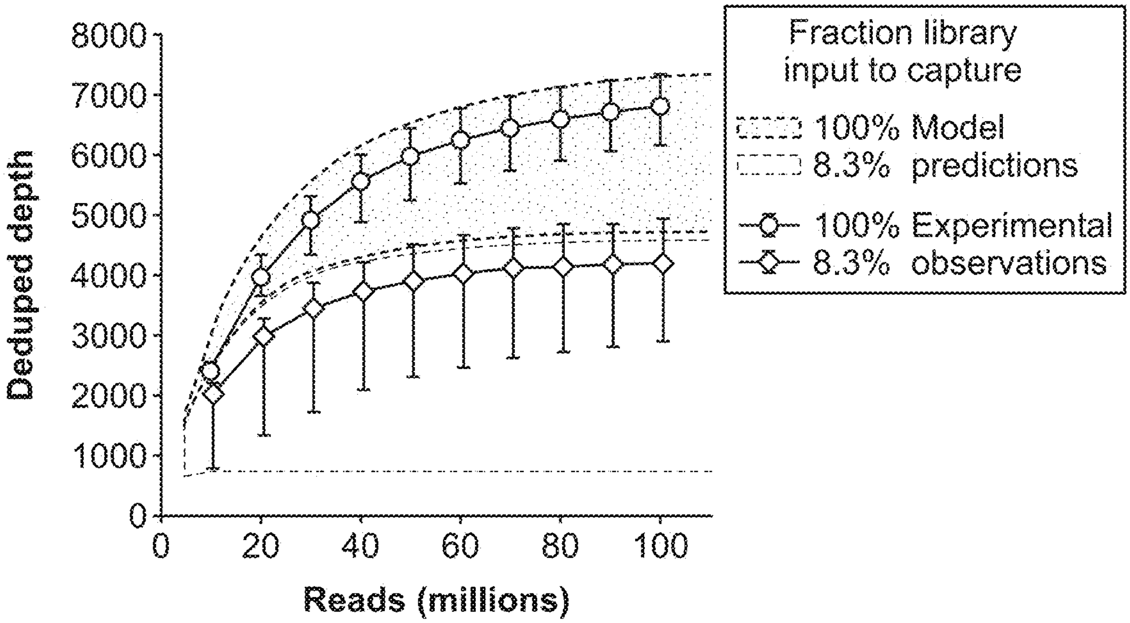
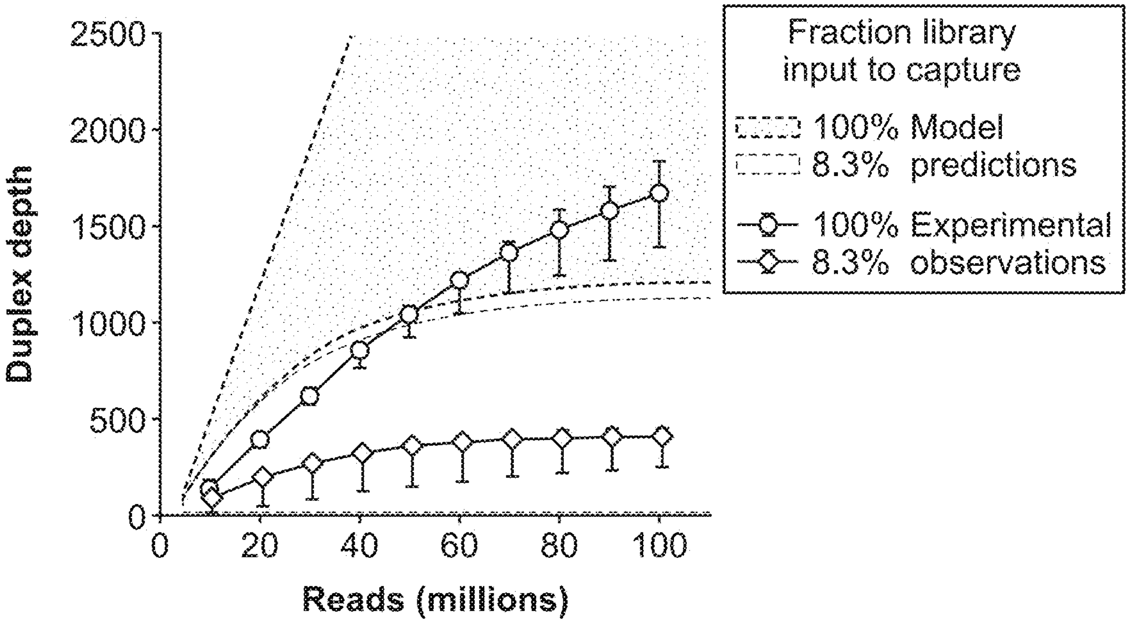
FIG. 11

Lung-CLiP discovery cohort

| Parameter | Tumor-informed NSCLC patients n = 85 | CliP training NSCLC patients n = 104 | Risk-matched controls n =56 | Low-risk controls[b] n = 42 | *P*-value[cd] |
|---|---|---|---|---|---|
| **Gender** | | | | | 0.87 |
| Male | 50 (59%) | 63 (61%) | 35 (62%) | 22 (52%) | |
| Female | 35 (41%) | 41 (39%) | 21 (38%) | 20 (48%) | |
| **Age** (years) | 70 (42-87) | 70 (42-87) | 69 (54-83) | 45 (22-70) | 0.76 |
| **Smoking** | | | | | |
| Yes | 64 (75%) | 83 (80%) | 56 (100%) | 1 (2%) | |
| No | 21 (25%) | 21 (20%) | | 41 (98%) | |
| Pack Years | 30 (0-135) | 30 (0-135) | 40 (20-136) | - | 0.09 |
| **Stage[a]** | | | | | |
| IA | 15 (18%) | 21 (20%) | - | - | |
| IB | 33 (39%) | 28 (27%) | - | - | |
| IIA | 9 (11 %) | 12 (12%) | - | - | |
| IIB | 12 (14%) | 16 (15%) | - | - | |
| IIIA | 12 (14%) | 17 (16%) | - | - | |
| IIIB | 4 (5%) | 10 (10%) | - | - | |
| **Histology** | | | | | |
| Adenocarcinoma | 63 (74%) | 71 (68%) | - | - | |
| Squamous | 18(21%) | 23 (22%) | - | - | |
| NOS | 2 (2%) | 7 (7%) | - | - | |
| Large Cell | 2 (2%) | 3 (3%) | - | - | |
| **Institution** | | | | | |
| Stanford | 53 (62%) | 76 (73%) | 56 (100%) | 42 (100%) | |
| Vanderbilt | 18 (21%) | 21 (20%) | | | |
| Mayo Clinic | 14 (16%) | - | | | |
| MD Anderson | - | 7 (7%) | - | | |

Lung-CLiP validation cohort

| Parameter | NSCLC patients n = 46 | Risk-matched controls n = 48 | *P*-value[c] |
|---|---|---|---|
| **Sex** | | | 0.31 |
| Male | 21 (46%) | 28 (56%) | |
| Female | 25 (54%) | 20 (44%) | |
| **Age** (years) | 69 (52-83) | 66 (55-78) | 0.30 |
| **Smoking** | | | |
| Yes | 46 (100%) | 48 (100%) | |
| No | - | - | |
| Pack Years | 40 (20-165) | 39 (23-132) | 0.81 |
| **Stage[a]** | | | |
| IA | 22 (48%) | - | |
| IB | 10 (22%) | - | |
| IIA | - | - | |
| IIB | 9 (20%) | - | |
| IIIA | 2 (4%) | - | |
| IIIB | 3 (7%) | - | |
| **Histology** | | | |
| Adenocarcinoma | 36 (78%) | - | |
| Squamous | 10 (22%) | - | |
| **Institution** | | | |
| Harvard | 46 (100%) | 48 (100%) | |

NOS = not otherwise specified.

a = AJCC v7 staging.

b = Low-risk controls were considered for feature discovery and CH analysis only and were not used for Lung-CLiP model training.

c = Sex was compared with a two-sided Fisher's Exact Test and continuous variables (age and pack-years) were compared with an un-paired two-sided t-test.

d = Lung CLiP NSCLC patients and risk-matched controls were compared.

FIG. 16

Predictors of ctDNA levels

| Factor | Multivariable *P*-value |
|---|---|
| **Tumor Volume** | $< 1x10^{-4}$ |
| Median MTV (mL) | |
| **Histology** | $< 1x10^{-6}$ |
| Adeno | |
| Non-Adeno | |
| **Stage** | 0.004 |
| I | |
| II | |
| III | |

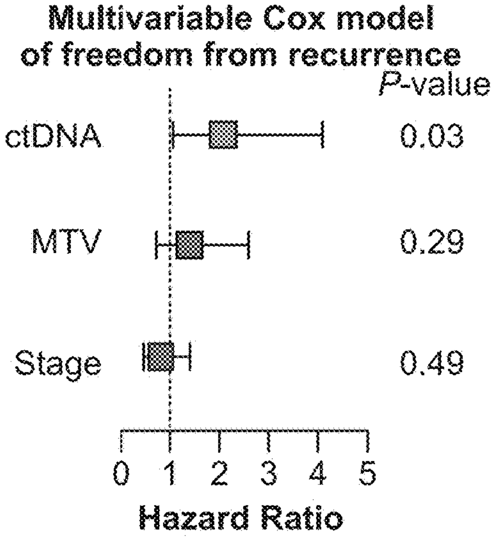

| Parameter | Univariable HR (95% CI) | Univariable P-value | Multivariable HR (95% CI) | Multivariable P-value |
|---|---|---|---|---|
| **Freedom from recurrence** | | | | |
| ctDNA - log10(VAF) | 2.14 (1.38 to 3.30) | **0.0006** | 2.08 (1.06 to 4.08) | **0.032** |
| Metabolic tumor volume - log10(mL) | 1.88 (1.16 to 3.06) | **0.011** | 1.40 (0.75 to 2.59) | 0.288 |
| Stage (I-III) | 1.42 (0.96 to 2.12) | 0.082 | 0.82 (0.47 to 1.43) | 0.488 |
| **Freedom from metastasis** | | | | |
| ctDNA - log10(VAF) | 2.29 (1.37 to 3.83) | **0.0015** | 2.24 (1.05 to 4.79) | **0.036** |
| Metabolic tumor volume - log10(mL) | 1.91 (1.11 to 3.28) | **0.019** | 1.33 (0.68 to 2.61) | 0.402 |
| Stage (I-III) | 1.48 (0.94 to 2.33) | 0.093 | 0.85 (0.46 to 1.55) | 0.591 |
| **Recurrence free survival** | | | | |
| ctDNA - log10(VAF) | 2.00 (1.32 to 3.02) | **0.0011** | 1.80 (0.97 to 3.35) | 0.063 |
| Metabolic tumor volume - log10(mL) | 1.89 (1.19 to 3.01) | **0.0073** | 1.51 (0.84 to 2.72) | 0.173 |
| Stage (I-III) | 1.40 (0.95 to 2.06) | 0.085 | 0.84 (0.50 to 1.43) | 0.529 |
| **Metastasis free survival** | | | | |
| ctDNA - log10(VAF) | 2.06 (1.27 to 3.32) | **0.0033** | 1.84 (0.93 to 3.64) | 0.081 |
| Metabolic tumor volume - log10(mL) | 1.91 (1.14 to3.18) | **0.0134** | 1.47 (0.78 to 2.79) | 0.237 |
| Stage (I-III) | 1.43 (0.93 to 2.21) | 0.106 | 0.88 (0.50 to 1.55) | 0.647 |
| **Overall survival** | | | | |
| ctDNA - log10(VAF) | 1.50 (0.93 to 2.42) | 0.095 | 1.70 (0.75 to 3.83) | 0.201 |
| Metabolic tumor volume - log10(mL) | 1.86 (1.06 to 3.24) | **0.029** | 1.75 (0.75 to 4.08) | 0.191 |
| Stage (I-III) | 0.95 (0.53 to 1.72) | 0.875 | 0.58 (0.27 to 1.25) | 0.164 |

Cox Proportional-Hazards models

FIG. 35

| | High ctDNA | | Low ctDNA | |
|---|---|---|---|---|
| **Stage** | IB | IB | IB | IA |
| **Histology** | Adenocarcinoma | Squamous | Adenocarcinoma | Adenocarcinoma |
| **Tumor diameter** | 3.4 cm | 3.5 cm | 5.0 cm | 2.9 cm |
| **Pre-tx ctDNA** | 0.04% | 0.014% | ctDNA not detected | ctDNA not detected |
| **Follow up** | Skeletal metastasis at 207 days | Peritoneal carcinomatosis at 547 days | Alive without disease at 1,461 days | Alive without disease at 1,160 days |

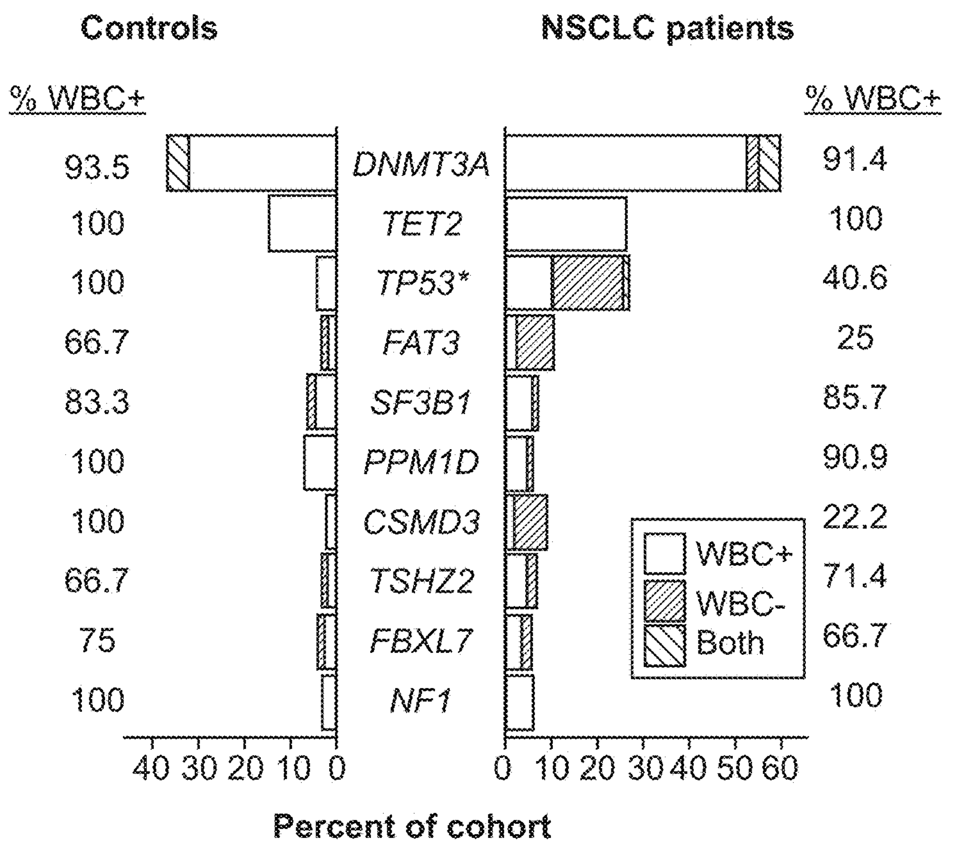
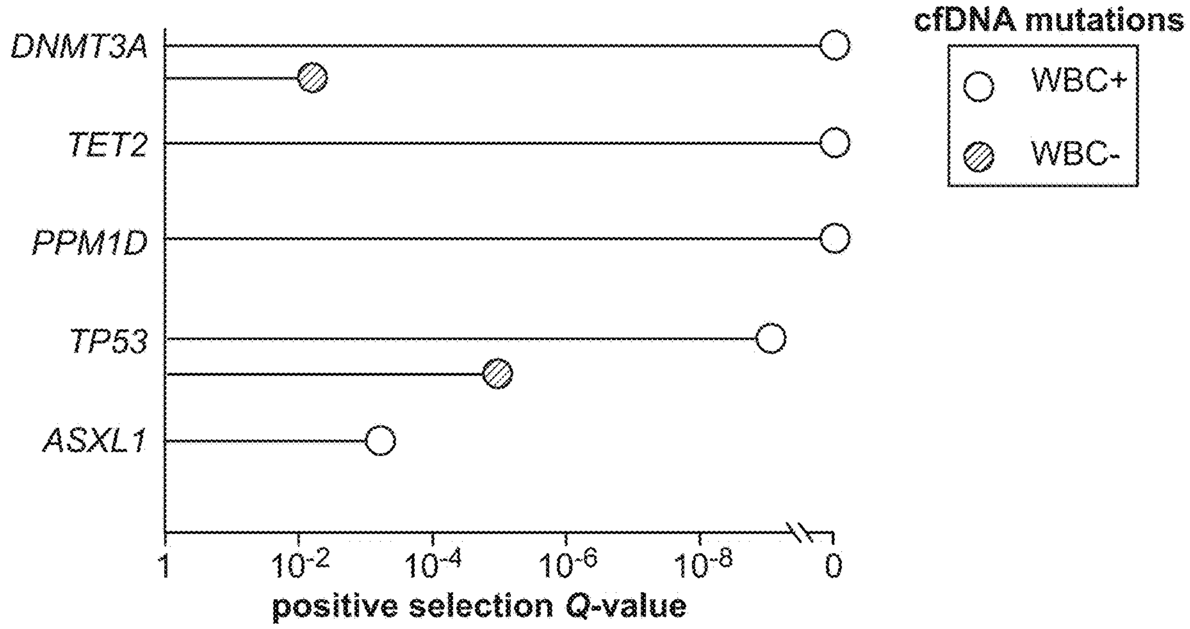
FIG. 46

Fig. 68
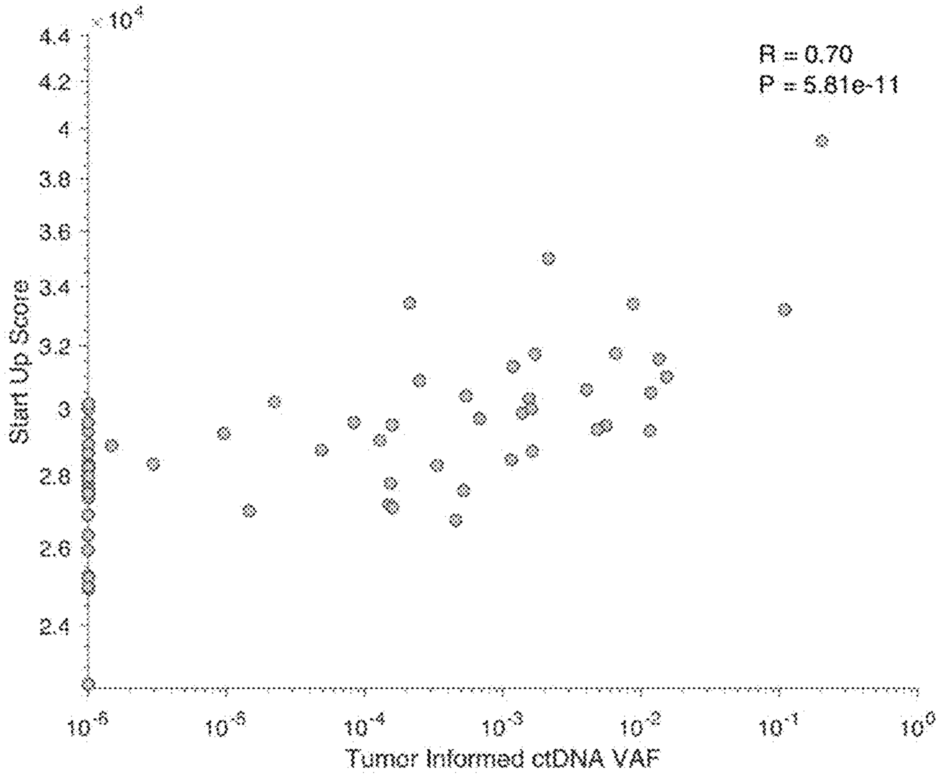
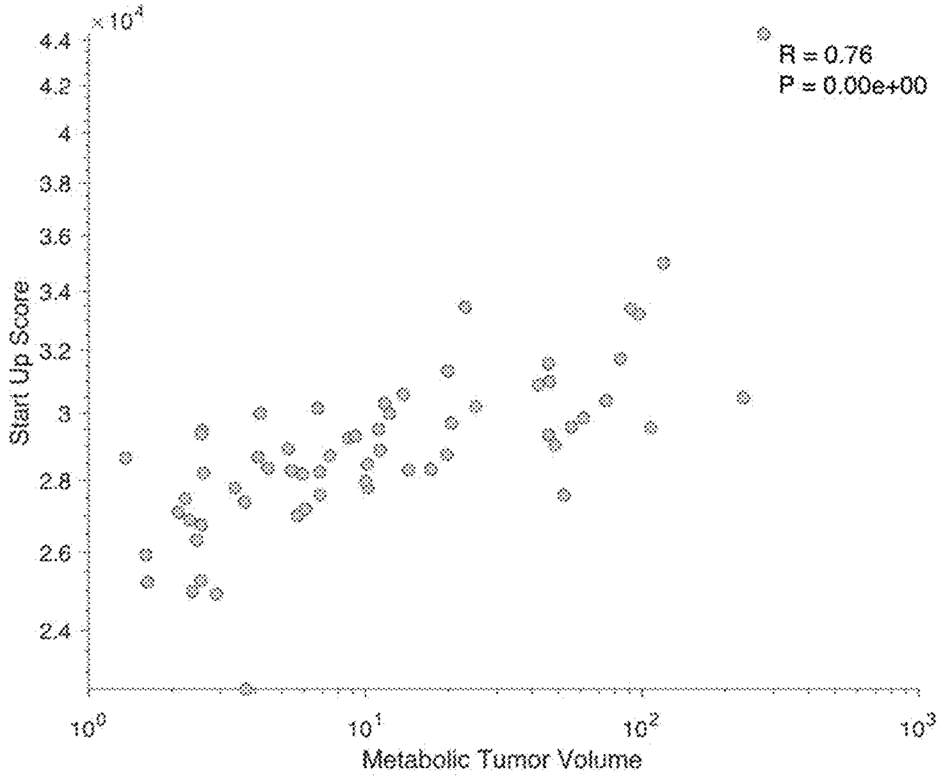

Fig. 69
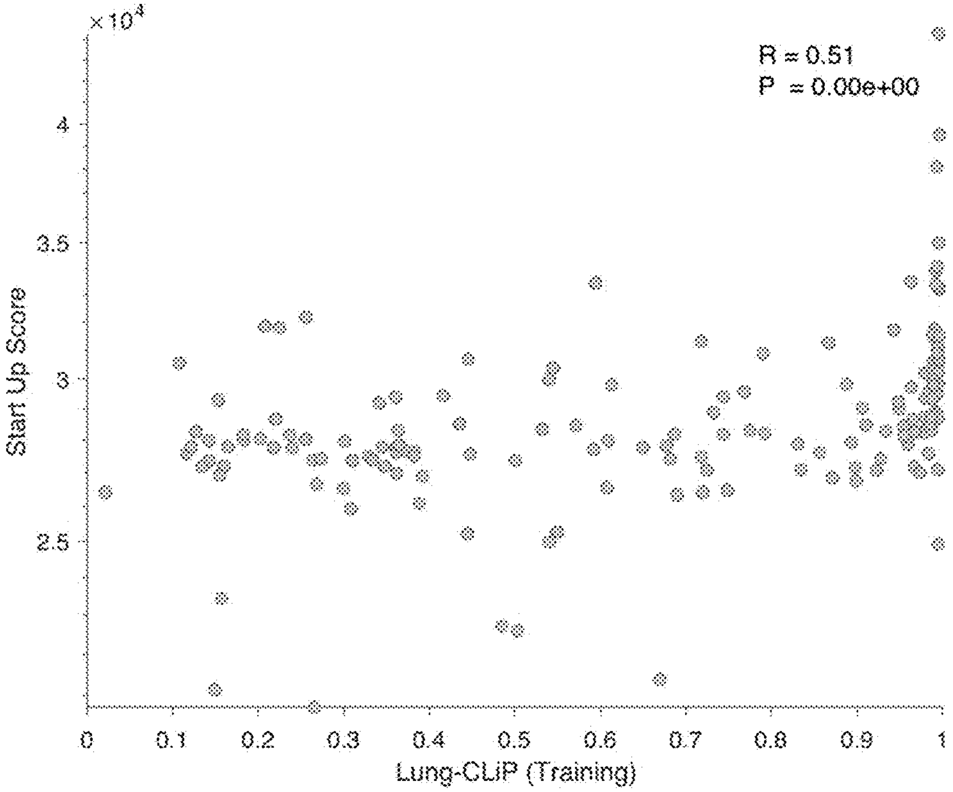
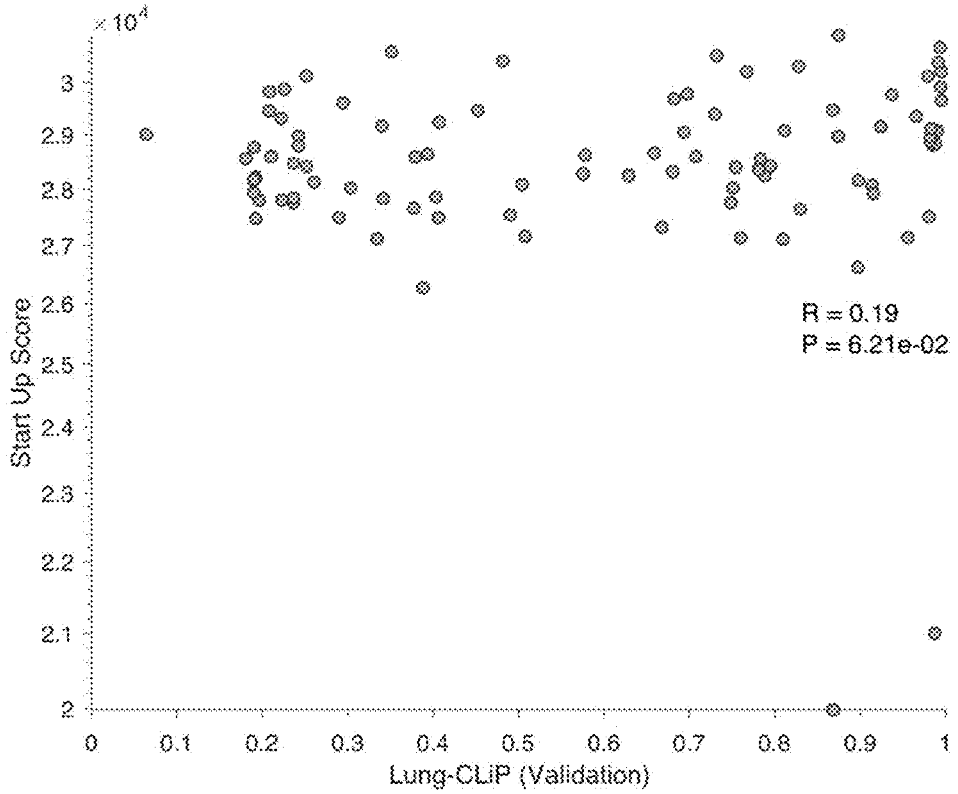

N = 24 NSCLC patients and 52 controls

METHODS OF ANALYZING CELL FREE NUCLEIC ACIDS AND APPLICATIONS THEREOF

CROSS-REFERENCE TO RELATED APPLICATIONS

This application is a continuation of PCT Patent Application No. PCT/US2021/019478 entitled "Methods of Analyzing Cell Free Nucleic Acids and Applications Thereof" filed Feb. 24, 2021, which claims the benefit of U.S. Provisional Patent Application No. 62/980,972 entitled "Methods of Analyzing Cell Free Nucleic Acids and Applications Thereof" filed Feb. 24, 2020, which is incorporated by reference herein in its entirety.

STATEMENT AS TO FEDERALLY SPONSORED RESEARCH

This invention was made with government support under contracts CA186569 and CA188298 awarded by the National Institutes of Health. The government has certain rights in the invention.

FIELD OF THE INVENTION

The present disclosure is generally directed toward methods of analyzing cell free nucleic acids, and more specifically directed toward methods of removing confounding variables.

BACKGROUND

Noninvasive blood tests that can detect somatic alterations (e.g., mutated nucleic acids) based on the analysis of cell-free nucleic acids (e.g., cfDNA and cfRNA) may be attractive candidates for cancer screening applications due to the relative ease of obtaining biological specimens (e.g., biological fluids).

SUMMARY

Cell-free nucleic acid assays currently in clinical use may be intended for noninvasive genotyping of patients with advanced disease where circulating tumor DNA (ctDNA) levels are significantly higher than in patients with early stage tumors. In addition, cell free nucleic acid samples may contain cell free nucleic acid fragments with somatic alterations and/or unique epigenetics features that are derived from tissues other than tumors. These non-tumor derived cell-free nucleic acid fragments may confound the use of circulating tumor nucleic acids for cancer detection.

In an aspect, the present disclosure provides a DNA molecule, comprising: a nucleic acid segment obtained or derived from a biological sample, wherein the nucleic acid segment is DNA; a pair of error-correcting unique identifiers ligated to the nucleic acid segment to produce a ligation product, wherein the pair of error-correcting unique identifiers flanks the nucleic acid segment, wherein each of the pair of error-correcting unique identifiers is a DNA segment, wherein the pair of error-correcting unique identifiers collectively provides a unique identification of the nucleic acid segment against other nucleic acid segments represented in a set of sequencing reads; and a pair of error-correcting dual index sample barcodes attached to the ligation product, wherein each of the pair of error-correcting dual index sample barcodes is a DNA segment, and wherein the pair of error-correcting dual index sample barcodes collectively provides a unique identification of the biological sample against other biological samples represented in a set of sequencing reads.

In some embodiments, the nucleic acid segment is complementary DNA (cDNA). In some embodiments, the nucleic acid segment is obtained or derived from a cell-free DNA sample. In some embodiments, the pair of error-correcting dual index sample barcodes flank the ligation product.

In another aspect, the present disclosure provides a collection comprising a plurality of the DNA molecules.

In another aspect, the present disclosure provides a method to prepare a DNA library for sequencing, the method comprising: ligating onto a plurality of nucleic acid segments pairs of partial Y-adapters to flank each of the plurality of nucleic acid segments by a pair of partial Y-adapters, thereby producing a plurality of ligation products, wherein each of the plurality of nucleic acid segments is DNA, and wherein the plurality of nucleic acid segments is obtained or derived from a biological sample, wherein each of the pair of partial Y-adapters comprises an error-correcting unique identifier and sequences for a primer to anneal in a grafting polymerase chain reaction, and wherein the pair of error-correcting unique identifiers on each of the plurality of nucleic acid segments collectively provides a unique identification of the nucleic acid segments against other nucleic acid segments in the plurality of nucleic acid segments; and grafting onto each of the plurality of ligation products a pair of error-correcting dual index sample barcodes to flank the ligation product by the error-correcting dual index sample barcodes, wherein the error-correcting dual index sample barcodes collectively provide a unique identification of the biological sample.

In some embodiments, the nucleic acid segment is complementary DNA (cDNA). In some embodiments, the biological sample comprises a cell-free DNA sample. In some embodiments, the error-correcting dual index sample barcodes collectively provide the unique identification of the biological sample against other biological samples represented in the DNA library.

In another aspect, the present disclosure provides a method to detect a neoplasm in an individual, the method comprising: obtaining or having obtained cell-free nucleic acid sequencing reads of a plurality of cell-free nucleic acid molecules, wherein the plurality of cell-free nucleic acid molecules is obtained or derived from a first bodily sample of the individual; obtaining or having obtained cell-derived nucleic acid sequencing reads of a plurality of cell-derived nucleic acid molecules, wherein the plurality of cell-derived nucleic acid molecules is obtained or derived from a second bodily sample of the individual; identifying or having identified single nucleotide variants present in both the cell-free nucleic acid sequencing reads and the cell-derived nucleic acid sequencing reads; determining or having determined, based at least in part on applying a first computational model to the identified single nucleotide variants, whether the cell-free nucleic acid sequencing reads contain nucleotides indicative of cell-free nucleic acid molecules derived from a neoplasm, wherein the first computational model is constructed utilizing cell-free nucleic acid sequencing data and cell-derived nucleic acid sequencing data from a first set of individuals having a neoplasm and a second set of control individuals not having a neoplasm, and wherein the first computational model integrates one or more of the following features: cell-derived DNA Bayesian background, cell-free DNA Bayesian background, germline depth, short fragment score 1, short fragment score 2, genomic start position and end position of the cell-free DNA molecule, and any combination thereof; and detecting the neoplasm in the individual based at least in part on the determination that the cell-free nucleic acid sequencing reads contain the nucleotides indicative of cell-free nucleic acid molecules derived from a neoplasm.

In some embodiments, the first computational model further integrates one or more of the following features: transition/transversion, duplex support, pass outlier, mapping quality, cancer hotspot, UMI error corrected, Phred quality score, variant allele frequency (VAF %), mean barcode family size, variant position in a cell-free DNA molecule, polygenic risk score, nuclease motif, and any combination thereof. In some embodiments, the first bodily sample and the second bodily sample are obtained or derived from a same blood sample, wherein the blood biopsy is separated into a cell-free fraction and cellular fraction, wherein the cell-free nucleic acid molecules are obtained or derived from the cell-free fraction, and wherein the cell-derived nucleic acid molecules are obtained or derived from the cellular fraction. In some embodiments, one or more of the identified single nucleotide variants are removed from analysis, and wherein the removed single nucleotide variants include variants from clonal hematopoiesis genes. In some embodiments, one or more of the identified single nucleotide variants are removed from analysis, and wherein the removed single nucleotide variants include variants present in the cell-derived nucleic acid sequencing reads.

In some embodiments, the method further comprises: identifying or having identified copy number variations present in both the cell-free nucleic acid sequencing reads and the cell-derived nucleic acid sequencing reads; and determining or having determined, based at least in part on applying a second computational model to the identified copy number variations, whether the cell-free nucleic acid sequencing reads contain nucleotides indicative of cell-free nucleic acid molecules derived from a neoplasm, wherein the second computational model is constructed utilizing cell-free nucleic acid sequencing data and cell-derived nucleic acid sequencing data from a third set of individuals having a neoplasm and a fourth set of control individuals not having a neoplasm, and wherein the second computational model integrates one or more of the following features: a number of uniformly distributed genomic window regions, a number of GISTIC "hotspot" regions, the enrichment of GISTIC "hotspot" regions as compared to the uniform windows, and any combination thereof.

In some embodiments, the method further comprises: identifying or having identified genomic positions of a first nucleotide and a last nucleotide of each of a plurality of unique sequenced cell-free nucleic acid molecules within the cell-free nucleic acid sequencing reads; determining or having determined a frequency of the identified genomic positions of the first nucleotide and the last nucleotide of each of the plurality of unique sequenced cell-free nucleic acid molecules; and determining or having determined, based at least in part on applying a third computational model to the frequencies of the identified genomic positions of the first nucleotide and the last nucleotide of each of the plurality of unique sequenced cell-free nucleic acid molecules, that the cell-free nucleic acid sequencing reads contain nucleotides indicative of cell-free nucleic acid molecules derived from a neoplasm, wherein the third computational model is constructed utilizing cell-free nucleic acid sequencing data and cell-derived nucleic acid sequencing data from a fifth set of individuals having a neoplasm and a sixth set of control individuals not having a neoplasm.

In some embodiments, the method further comprises: generating a confidence score from each of the first computational model, the second computational model, and the third computational model; and integrating the confidence scores to generate a summarized score indicative of whether the individual has a neoplasm. In some embodiments, the method further comprises performing a clinical procedure on the individual based at least in part on the detected neoplasm. In some embodiments, the method further comprises treating the individual based at least in part on the detected neoplasm.

In another aspect, the present disclosure provides a method to detect a neoplasm in an individual, the method comprising: obtaining or having obtained cell-free nucleic acid sequencing reads of a plurality of cell-free nucleic acid molecules, wherein the plurality of cell-free nucleic acid molecules is obtained or derived from a first bodily sample of the individual; obtaining or having obtained cell-derived nucleic acid sequencing reads of a plurality of cell-derived nucleic acid molecules, wherein the plurality of cell-derived nucleic acid molecules is obtained or derived from a second bodily sample of the individual; identifying or having identified copy number variations present in both the cell-free nucleic acid sequencing reads and the cell-derived nucleic acid sequencing reads; and determining or having determined, based at least in part on applying a computational model to the identified copy number variations, whether the cell-free nucleic acid sequencing reads contain nucleotides indicative of cell-free nucleic acid molecules derived from a neoplasm, wherein the computational model is constructed utilizing cell-free nucleic acid sequencing data and cell-derived nucleic acid sequencing data from a first set of individuals having a neoplasm and a second set of control individuals not having a neoplasm, and wherein the computational model integrates one or more of the following features: a number of uniformly distributed genomic window regions, a number of GISTIC "hotspot" regions, the enrichment of GISTIC "hotspot" regions as compared to the uniform windows, and any combination thereof; and detecting the neoplasm in the individual based at least in part on the determination that the cell-free nucleic acid sequencing data contains the nucleotides indicative of cell-free nucleic acid molecules derived from a neoplasm.

In another aspect, the present disclosure provides a method for detecting a neoplasm in an individual, the method comprising: obtaining or having obtained cell-free nucleic acid sequencing reads of a plurality of cell-free nucleic acid molecules, wherein the plurality of cell-free nucleic acid molecules is obtained or derived from a bodily sample of the individual; identifying or having identified genomic positions of a first nucleotide and a last nucleotide of each of a plurality of unique sequenced cell-free nucleic acid molecules within the sequencing reads; determining or having determined a frequency of the identified genomic positions of the first nucleotide and the last nucleotide of each of the plurality of unique sequenced cell-free nucleic acid molecules; and determining or having determined, based at least in part on applying a computational model to the frequencies of the identified genomic positions of the first nucleotide and the last nucleotide of each of the plurality of unique sequenced cell-free nucleic acid molecules, whether the cell-free nucleic acid sequencing reads contain nucleotides indicative of cell-free nucleic acid molecules derived from a neoplasm, wherein the computational model is constructed utilizing cell-free nucleic acid sequencing data and cell-derived nucleic acid sequencing data from a first set of individuals having a neoplasm and a second set of control individuals not having a neoplasm; and detecting the neoplasm in the individual based at least in part on the determination that the cell-free nucleic acid sequencing data contains the nucleotides indicative of cell-free nucleic acid molecules derived from a neoplasm.

In some embodiments, the method further comprises determining at least one of a first set of quantitative measures of cfDNA molecules starting at each of a plurality of genomic positions and a second set of quantitative measures of cfDNA molecules ending at each of a plurality of genomic positions; and analyzing the at least one of the first set of quantitative measures or the second set of quantitative measures to detect the neoplasm. In some embodiments, the method further comprises analyzing the at least one of the first set of quantitative measures and the second set of quantitative measures using a trained machine learning classifier to detect the neoplasm. In some embodiments, the method further comprises analyzing the at least one of the first set of quantitative measures and the second set of quantitative measures to determine a tumor variant allele frequency of the neoplasm. In some embodiments, the method further comprises analyzing the at least one of the first set of quantitative measures and the second set of quantitative measures to determine a metabolic tumor volume of the neoplasm. In some embodiments, the method further comprises detecting the neoplasm with an AUC of at least about 0.80.

In another aspect, the present disclosure provides a method for detecting a neoplasm in an individual, the method comprising: obtaining or having obtained cell-free nucleic acid sequencing reads of a plurality of cell-free nucleic acid molecules, wherein the plurality of cell-free nucleic acid molecules is obtained or derived from a bodily sample of the individual; identifying or having identified a fragment length of each of a plurality of unique sequenced cell-free nucleic acid molecules within the sequencing reads; selecting a subset of the sequencing reads corresponding to cell-free nucleic acid molecules of the plurality of unique sequenced cell-free nucleic acid molecules having a fragment length indicative of a sub-mononucleosomal fragment or a sub-disomal fragment; analyzing the subset of the sequencing reads to determine a frequency of the identified fragment lengths indicative of the sub-mononucleosomal fragments or the sub-disomal fragments; and determining or having determined, based at least in part on applying a computational model to the identified fragment lengths indicative of the sub-mononucleosomal fragments or the sub-disomal fragments, whether the cell-free nucleic acid sequencing reads contain nucleotides indicative of cell-free nucleic acid molecules derived from a neoplasm, wherein the computational model is constructed utilizing cell-free nucleic acid sequencing data and cell-derived nucleic acid sequencing data from a first set of individuals having a neoplasm and a second set of control individuals not having a neoplasm; and detecting the neoplasm in the individual based at least in part on the determination that the cell-free nucleic acid sequencing data contains the nucleotides indicative of cell-free nucleic acid molecules derived from a neoplasm.

In some embodiments, a fragment length of less than 160 base pairs (bp) is indicative of the sub-mononucleosomal fragments. In some embodiments, a fragment length of between 230 bp and 310 bp is indicative of the sub-disomal fragments. In some embodiments, the plurality of cell-free nucleic acid molecules are obtained at least in part by performing a size selection of nucleic acid molecules of the bodily sample of the individual to enrich for at least one of the sub-mononucleosomal fragments and the sub-disomal fragments.

In another aspect, the present disclosure provides a method for detecting a neoplasm in an individual, the method comprising: obtaining or having obtained cell-free nucleic acid sequencing reads of a plurality of cell-free nucleic acid molecules, wherein the plurality of cell-free nucleic acid molecules is obtained or derived from a bodily sample of the individual; analyzing the sequencing reads to determine a variant allele frequency (VAF) of a plurality of single nucleotide variants (SNVs); and determining or having determined, based at least in part on applying a computational model to the determined VAFs of the plurality of SNVs, whether the cell-free nucleic acid sequencing reads contain nucleotides indicative of cell-free nucleic acid molecules derived from a neoplasm, wherein the computational model is constructed utilizing cell-free nucleic acid sequencing data and cell-derived nucleic acid sequencing data from a first set of individuals having a neoplasm and a second set of control individuals not having a neoplasm; and detecting the neoplasm in the individual based at least in part on the determination that the cell-free nucleic acid sequencing data contains the nucleotides indicative of cell-free nucleic acid molecules derived from a neoplasm.

In some embodiments, the method further comprises determining a mean value of the determined VAFs across the plurality of SNVs; and determining or having determined, based at least in part on applying the computational model to the determined mean value, whether the cell-free nucleic acid sequencing reads contain nucleotides indicative of cell-free nucleic acid molecules derived from a neoplasm. In some embodiments, the method further comprises comparing the determined mean value of the determined VAFs across the plurality of SNVs to a reference value, to determine whether the cell-free nucleic acid sequencing reads contain nucleotides indicative of cell-free nucleic acid molecules derived from a neoplasm. In some embodiments, the method further comprises determining a metabolic tumor volume of the detected neoplasm. In some embodiments, the method further comprises determining a stage of the detected neoplasm. In some embodiments, the method further comprises determining a likelihood of recurrence of the detected neoplasm. In some embodiments, the plurality of cell-free nucleic acid molecules is enriched from the bodily sample of the individual using a set of capture bait molecules, wherein the set of capture bait molecules are configured to selectively hybridize to sequences that are at least partially complementary to at least one sequence of the set of capture bait molecules, wherein the set of capture bait molecules are configured to selectively hybridize to sequences that are at least partially complementary to at least one genomic locus selected from the group of genomic loci in Table 1. In some embodiments, the neoplasm comprises lung cancer.

In another aspect, the present disclosure provides a bait set for hybridization capture, the bait set comprising at least 1, 2, 3, 4, 5, 6, 7, 8, 9, 10, 20, 30, 40, 50, 60, 70, 80, 90, 100, 200, 300, 400, 500, 600, 700, 800, 900, 1000, 1200, 1400, 1600, 1800, 2000, 2200, 2400, 2600, 2800, 3000, 3200, 3400, 3600, 3800, 4000, 4200, 4400, 4600, 4800, or 5000 different polynucleotide-containing probes, wherein the polynucleotide-containing probes are, collectively, configured to hybridize to cfDNA derived from at least 5% of the genomic regions set forth in Table 1.

In some embodiments, each of the polynucleotide-containing probes has a nucleic acid sequence that is at least 1, 2, 3, 4, 5, 6, 7, 8, 9, 10, 20, 30, 40, 50, 60, 70, 80, 90, 100, 120, 140, 160, 180, 200, 220, 240, 260, 280, or 300 nucleotides in length. In some embodiments, each of the polynucleotide-containing probes has a nucleic acid sequence of no more than 300, 280, 260, 240, 220, 200, 180, 160, 140, 120, 100, 90, 80, 70, 60, 50, 40, 30, 20, 10, 9, 8, 7, 6, 5, 4, 3, or 2 nucleotides in length. In some embodiments, each of the polynucleotide-containing probes is conjugated to an affinity moiety. In some embodiments, the affinity moiety comprises biotin. In some embodiments, the polynucleotides probes are, collectively, configured to hybridize to cfDNA derived from at least 10%, at least 20%, at least 30%, at least 40%, at least 50%, at least 60%, at least 70%, at least 80%, at least 90%, at least 95%, at least 98%, at least 99%, or 100% of the genomic regions set forth in Table 1. In some embodiments, an entirety of polynucleotide probes in the bait set are configured to hybridize to cfDNA molecules derived from at least 10%, at least 20%, at least 30%, at least 40%, at least 50%, at least 60%, at least 70%, at least 80%, at least 90%, at least 95%, at least 98%, at least 99%, or 100% of the genomic regions set forth in Table 1.

In another aspect, the present disclosure provides a mixture comprising: DNA from a biological sample; and a bait set of the present disclosure.

In another aspect, the present disclosure provides a method of performing capture hybridization, the method comprising: obtaining a plurality of DNA molecules derived from a cell-free DNA source; and mixing a fraction of the plurality of DNA molecules with a set of capture bait molecules, wherein the set of capture bait molecules are configured to selectively hybridize to DNA molecules that are at least partially complementary to at least one sequence of the set of capture bait molecules, wherein the set of capture bait molecules are configured to selectively hybridize to DNA molecules comprising sequences that comprise at least a portion of a genomic locus selected from the group of genomic loci in Table 1.

In some embodiments, the portion of the genomic locus comprises at least 1, 2, 3, 4, 5, 6, 7, 8, 9, 10, 20, 30, 40, 50, 60, 70, 80, 90, 100, 120, 140, 160, 180, 200, 220, 240, 260, 280, or 300 consecutive nucleotides of the genomic locus. In some embodiments, the fraction is at least about 5%, 10%, 15%, 20%, 25%, 30%, 35%, 40%, 45%, 50%, 55%, 60%, 65%, 70%, 75%, 80%, 85%, 90%, 95%, or 100% of the plurality of DNA molecules. In some embodiments, the method further comprises optimizing a molar ratio of the fraction of the plurality of DNA molecules and the set of capture bait molecules to yield an optimal recovery of a total number of unique molecules or to yield an optimal recovery of a total number of duplexed cell-free DNA molecules in which both strands of the sourced cell-free DNA duplex are sequenced, wherein the molar ratio is at least about 5%, 10%, 15%, 20%, 25%, 30%, 35%, 40%, 45%, 50%, 55%, 60%, 65%, 70%, 75%, 80%, 85%, 90%, 95%, or 100%. In some embodiments, the method further comprises using an in silico simulation of the capture hybridization to determine the fraction of the plurality of DNA molecules that is mixed with the set of capture bait molecules, wherein the fraction is no more than about 100%, 95%, 90%, 85%, 80%, 75%, 70%, 65%, 60%, 55%, 50%, 45%, 40%, 35%, 30%, 25%, 20%, 15%, 10%, or 5%. In some embodiments, the set of capture bait molecules comprises a bait set of the present disclosure.

In another aspect, the present disclosure provides a DNA molecule, comprising: a nucleic acid molecule sourced from a biological sample, wherein the nucleic acid molecule is DNA or cDNA; a pair of error-correcting unique identifiers that flank the nucleic acid molecule, wherein the error-correcting unique identifiers are each DNA molecules and the combination of the error-correcting unique identifiers provides an identification of the nucleic acid molecule in a sequencing result; and a pair of error-correcting dual index sample barcodes, wherein the error-correcting unique identifiers are each DNA molecules and the combination of the error-correcting unique identifiers provides an identification of the biological sample in a sequencing result.

In another aspect, the present disclosure provides a method to prepare DNA library for sequencing, comprising: ligating onto a collection of nucleic acid molecules pairs of partial Y-adapters such that each nucleic acid molecule is flanked by a pair of partial Y-adapters, wherein each nucleic acid molecule is DNA or cDNA and the collection of nucleic acid molecules is sourced from a biological sample, wherein each partial Y-adapter includes an error-correcting unique identifier and sequences for a primer to anneal in a grafting polymerase chain reaction, and wherein each flanking combination of the two error-correcting unique identifiers on each nucleic acid molecule identifies the ligation of the pair of partial Y-adapters to that nucleic acid molecule; and grafting onto each ligation product a pair of error-correcting dual index sample barcodes and the sequence of a universal primer such that the ligation product is flanked by the error-correcting dual index sample barcodes and the sequence of the universal primer, wherein the combination of error-correcting dual index sample barcodes identifies the collection of nucleic acid molecules.

In another aspect, the present disclosure provides a method to mitigate nucleotide transversions that arise during sequencing library preparation, comprising: performing sequence library preparation with an reactive oxygen species scavenger or enzyme in the reaction mixture.

In some embodiments, the sequence capture reaction is performed with the reactive oxygen species scavenger hypotaurine in the reaction mixture. In some embodiments, the reactive oxygen species scavenger is glutathione, hypotaurine, or sodium sulfite; and wherein the enzyme is uracil-DNA glycosylase (UDG), Formamidopyrimidine [fapy]-DNA glycosylase (FPG), or catalase enzyme.

In another aspect, the present disclosure provides a method to perform a clinical procedure on an individual, the method comprising: obtaining or having obtained a sequencing result of a collection of cell-free nucleic acid molecules, wherein the collection of cell-free nucleic acid molecules are sourced from a first biopsy of an individual; obtaining or having obtained a sequencing result of a collection of cell-derived nucleic acid molecules, wherein the collection of cell-derived nucleic acid molecules are sourced from a second biopsy of the individual; identifying or having identified single nucleotide variants within both the cell-free nucleic acid sequencing result and the cell-derived nucleic acid sequencing result; determining or having determined, utilizing a first computational model and the identified single nucleotide variants, that the cell-free nucleic acid sequencing result contains nucleotides derived from a neoplasm, wherein the first computational model is built utilizing cell-free nucleic acid sequencing data and cell-derived nucleic acid sequencing data from a cohort of individuals having a neoplasm and a cohort of control individuals not having a neoplasm, and wherein the first computational model integrates one or more of the following features: cell-derived DNA Bayesian background, cfDNA Bayesian background, germline depth, short fragment score 1, short fragment score 2, or genomic start and end position of the cfDNA molecule; and performing a clinical procedure on the individual based upon determining that the cell-free nucleic acid sequencing result contains nucleic acid sequences derived from a neoplasm.

In some embodiments, the first computational model further integrates one or more of the following features: transition/transversion, duplex support, pass outlier, mapping quality, cancer hotspot, UMI error corrected, Phred quality score, variant allele frequency (VAF %), mean barcode family size, variant position in a cfDNA molecule, polygenic risk score, or nuclease motif. In some embodiments, the first biopsy and the second biopsy are the same blood biopsy and the blood biopsy is separated into a cell-free fraction and cellular fraction, and wherein the cell-free fraction is used to source cell-free nucleic acid molecules and the cellular fraction is used to source cell-derived nucleic acid molecules. In some embodiments, a number of identified variants are removed from analysis, and wherein the removed variants include variants from clonal hematopoiesis genes or somatic mutations in other non-malignant tissue types. In some embodiments, a number of identified variants are removed from analysis, and wherein the removed variants include variants present in the cell-derived nucleic acid sequencing result.

In some embodiments, the method further comprises: identifying or having identified copy number variations within both the cell-free nucleic acid sequencing result and the cell-derived nucleic acid sequencing result; and determining or having determined, utilizing a second computational model and the identified copy number variations, that the cell-free nucleic acid sequencing result contains nucleotides derived from a neoplasm, wherein the second computational model is built utilizing cell-free nucleic acid sequencing data and cell-derived nucleic acid sequencing data from a cohort of individuals having a neoplasm and a cohort of control individuals not having a neoplasm, and wherein the second computational model integrates one or more of the following features: the number of uniformly distributed genomic window regions, the number of GISTIC "hotspot" regions, and the enrichment of GISTIC "hotspot" regions as compared to the uniform windows; wherein the performing the clinical procedure on the individual is based upon determining that the cell-free nucleic acid sequencing result contains nucleic acid sequences derived from a neoplasm.

In some embodiments, the method further comprises: identifying or having identified the genomic position of the first and last nucleotide of each unique sequenced cell-free nucleic acid molecule within both the cell-free nucleic acid sequencing result; determining or having determined, the frequency of identified genomic positions of the first and last nucleotide of each unique sequenced cell-free nucleic acid; and determining or having determined, utilizing a third computational model and the frequency of the identified genomic positions of the first and last nucleotide of each unique sequenced cell-free nucleic acid molecule, that the cell-free nucleic acid sequencing result contains nucleotides derived from a neoplasm, wherein the third computational model is built utilizing cell-free nucleic acid sequencing data and cell-derived nucleic acid sequencing data from a cohort of individuals having a neoplasm and a cohort of control individuals not having a neoplasm; wherein the performing the clinical procedure on the individual is based upon determining that the cell-free nucleic acid sequencing result contains nucleic acid sequences derived from a neoplasm. In some embodiments, the method further comprises: generating a confidence score from each the first computational model, the second computational model, and the third computational model; and integrating the confidence scores to generate a summarized score indicating that the individual has a neoplasm; wherein the performing the clinical procedure on the individual is based upon the summarized score indicating that the individual has a neoplasm.

In another aspect, the present disclosure provides a method to treat an individual for a neoplasm, the method comprising: obtaining or having obtained a sequencing result of a collection of cell-free nucleic acid molecules, wherein the collection of cell-free nucleic acid molecules are sourced from a first biopsy of an individual; obtaining or having obtained a sequencing result of a collection of cell-derived nucleic acid molecules, wherein the collection of cell-derived nucleic acid molecules are sourced from a second biopsy of the individual; identifying or having identified single nucleotide variants within both the cell-free nucleic acid sequencing result and the cell-derived nucleic acid sequencing result; determining or having determined, utilizing a first computational model and the identified single nucleotide variants, that the cell-free nucleic acid sequencing result contains nucleotides derived from a neoplasm, wherein the first computational model is built utilizing cell-free nucleic acid sequencing data and cell-derived nucleic acid sequencing data from a cohort of individuals having a neoplasm and a cohort of control individuals not having a neoplasm, and wherein the first computational model integrates one or more of the following features: cell-derived DNA Bayesian background, cfDNA Bayesian background, germline depth, short fragment score 1, short fragment score 2, or genomic start and end position of the cfDNA molecule; and treating the individual based upon determining that the cell-free nucleic acid sequencing result contains nucleic acid sequences derived from a neoplasm.

In some embodiments, the first computational model further integrates one or more of the following features: transition/transversion, duplex support, pass outlier, mapping quality, cancer hotspot, UMI error corrected, Phred quality score, variant allele frequency (VAF %), mean barcode family size, variant position in a cfDNA molecule, polygenic risk score, or nuclease motif. In some embodiments, the first biopsy and the second biopsy are the same blood biopsy and the blood biopsy is separated into a cell-free fraction and cellular fraction, and wherein the cell-free fraction is used to source cell-free nucleic acid molecules and the cellular fraction is used to source cell-derived nucleic acid molecules. In some embodiments, a number of identified variants are removed from analysis, and wherein the removed variants include variants from clonal hematopoiesis genes. In some embodiments, a number of identified variants are removed from analysis, and wherein the removed variants include variants present in the cell-derived nucleic acid sequencing result.

In some embodiments, the method further comprises: identifying or having identified copy number variations within both the cell-free nucleic acid sequencing result and the cell-derived nucleic acid sequencing result; determining or having determined, utilizing a second computational model and the identified copy number variations, that the cell-free nucleic acid sequencing result contains nucleotides derived from a neoplasm, wherein the second computational model is built utilizing cell-free nucleic acid sequencing data and cell-derived nucleic acid sequencing data from a cohort of individuals having a neoplasm and a cohort of control individuals not having a neoplasm, and wherein the second computational model integrates one or more of the following features: the number of uniformly distributed genomic window regions, the number of GISTIC "hotspot" regions, and the enrichment of GISTIC "hotspot" regions as compared to the uniform windows; wherein the treating the individual is based upon determining that the cell-free nucleic acid sequencing result contains nucleic acid sequences derived from a neoplasm.

In some embodiments, the method further comprises: identifying or having identified the genomic position of the first and last nucleotide of each unique sequenced cell-free nucleic acid molecule within both the cell-free nucleic acid sequencing result; determining or having determined, the frequency of identified genomic positions of the first and last nucleotide of each unique sequenced cell-free nucleic acid; and determining or having determined, utilizing a third computational model and the frequency of the identified genomic positions of the first and last nucleotide of each unique sequenced cell-free nucleic acid molecule, that the cell-free nucleic acid sequencing result contains nucleotides derived from a neoplasm, wherein the third computational model is built utilizing cell-free nucleic acid sequencing data and cell-derived nucleic acid sequencing data from a cohort of individuals having a neoplasm and a cohort of control individuals not having a neoplasm; wherein the treating the individual is based upon determining that the cell-free nucleic acid sequencing result contains nucleic acid sequences derived from a neoplasm.

In some embodiments, the method further comprises: generating a confidence score from each the first computational model, the second computational model, and the third computational model; and integrating the confidence scores to generate a summarized score that indicates that the individual has a neoplasm; wherein the treating the individual is based upon the summarized score indicating that the individual has a neoplasm.

In another aspect, the present disclosure provides a method of performing capture hybridization on a sequencing library, the method comprising: obtaining a sequencing library comprising a plurality of unique sequencing molecules derived from cell-free DNA source; mixing a fraction of the sequencing library with capture baits molecules to hybridize and pull down particular sequences recognized by the capture baits, wherein the fraction of sequencing library is at least 10%, 25%, or 50%.

In some embodiments, the molar ratio of the fraction of the sequencing library and the capture baits is optimized to yield an optimal recovery of total unique molecules or to yield an optimal recovery of the total duplexed cell-free DNA molecules in which both strands of the sourced cell-free DNA duplex are sequenced. In some embodiments, an in silico simulation of the capture hybridization is utilized to determine the fraction of sequencing library that is mixed with capture baits.

In another aspect, the present disclosure provides a method to treat an individual for a neoplasm, the method comprising: obtaining or having obtained a sequencing result of a collection of cell-free nucleic acid molecules, wherein the collection of cell-free nucleic acid molecules are sourced from a first biopsy of an individual; obtaining or having obtained a sequencing result of a collection of cell-derived nucleic acid molecules, wherein the collection of cell-derived nucleic acid molecules are sourced from a second biopsy of the individual; identifying or having identified copy number variations within both the cell-free nucleic acid sequencing result and the cell-derived nucleic acid sequencing result; determining or having determined, utilizing a computational model and the identified copy number variations, that the cell-free nucleic acid sequencing result contains nucleotides derived from a neoplasm, wherein the second computational model is built utilizing cell-free nucleic acid sequencing data and cell-derived nucleic acid sequencing data from a cohort of individuals having a neoplasm and a cohort of control individuals not having a neoplasm, and wherein the second computational model integrates one or more of the following features: the number of uniformly distributed genomic window regions, the number of GISTIC "hotspot" regions, and the enrichment of GISTIC "hotspot" regions as compared to the uniform windows; and treating the individual based upon determining that the cell-free nucleic acid sequencing result contains nucleic acid sequences derived from a neoplasm.

In another aspect, the present disclosure provides a method to treat an individual for a neoplasm, the method comprising: obtaining or having obtained a sequencing result of a collection of cell-free nucleic acid molecules, wherein the collection of cell-free nucleic acid molecules are sourced from a biopsy of an individual; identifying or having identified the genomic position of the first and last nucleotide of each unique sequenced cell-free nucleic acid molecule within both the cell-free nucleic acid sequencing result; determining or having determined, the frequency of identified genomic positions of the first and last nucleotide of each unique sequenced cell-free nucleic acid; and determining or having determined, utilizing a computational model and the frequency of the identified genomic positions of the first and last nucleotide of each unique sequenced cell-free nucleic acid molecule, that the cell-free nucleic acid sequencing result contains nucleotides derived from a neoplasm, wherein the third computational model is built utilizing cell-free nucleic acid sequencing data and cell-derived nucleic acid sequencing data from a cohort of individuals having a neoplasm and a cohort of control individuals not having a neoplasm; and treating the individual based upon determining that the cell-free nucleic acid sequencing result contains nucleic acid sequences derived from a neoplasm.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

Figure 2A:
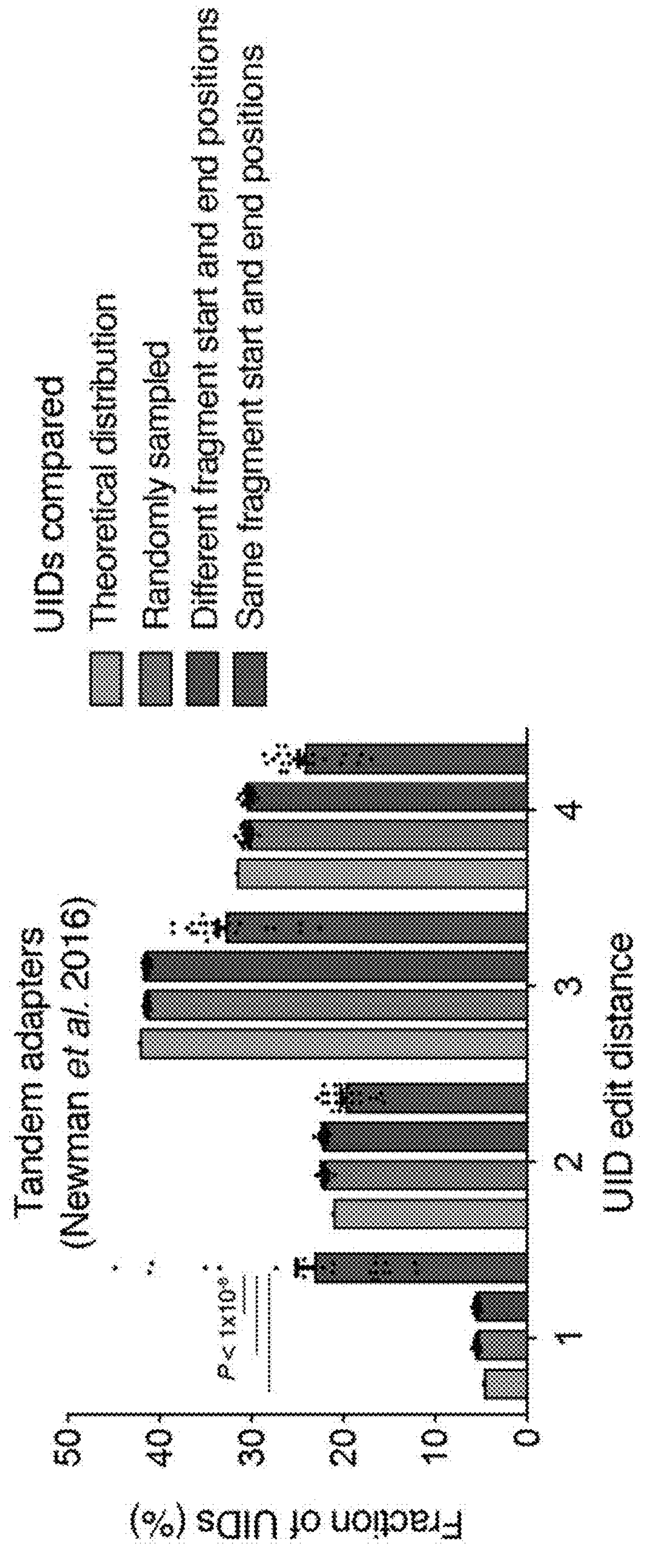
FIG. 2A shows that an excess of molecular barcodes (that is, unique identifier or UIDs) differing by 1 bp in cfDNA molecules with the same start and end positions indicates that sequencing errors in UIDs can create erroneous UID families. Depicted are the expected and observed distributions of barcode Hamming edit distances (UID edit distance) when comparing UIDs from different groups of barcode-deduped (that is, unique) cfDNA molecules sequenced using a set of tandem adaptors. Tandem adaptors utilize random 4-mer UIDs, resulting in 256 distinct UIDs that cannot be error corrected. The theoretical distribution of UID edit distances across all 256 UIDs (that is, the fraction of UIDs that differ from one another by 1, 2, 3, and 4 bp) is shown by the 1st, 5th, 9th, and 13th bars (e.g., the 1st bar within each group of four bars). The other bars represent the distribution of UID edit distances observed in healthy control cfDNA samples sequenced with tandem adaptors (n=24 individuals). Randomly sampled UIDs are shown by the 2nd, 6th, 10th, and 14th bars (e.g., the 2nd bar within each group of four bars). UIDs from cfDNA molecules with different genomic start and end positions are shown by the 3rd, 7th, 11th, and 15th bars (e.g., the 3rd bar within each group of four bars). cfDNA molecules that share the same start and end positions are shown by the 4th, 8th, 12th, and 16th bars (e.g., the 4th bar within each group of four bars). UIDs differing by only one base are significantly overrepresented when comparing cfDNA molecules with the same start and end position (the 4th bar within each group of four bars) to each of the other UID distributions, suggesting that 1-bp errors are erroneously creating new UID families. Group comparisons were performed with a paired two-sided t-test, except when comparing to the theoretical distribution, for which an unpaired two-sided t-test was used ($P<1\times10^{-8}$). Bars denote the mean and error bars denote the standard error of the mean.
Figure 2B:
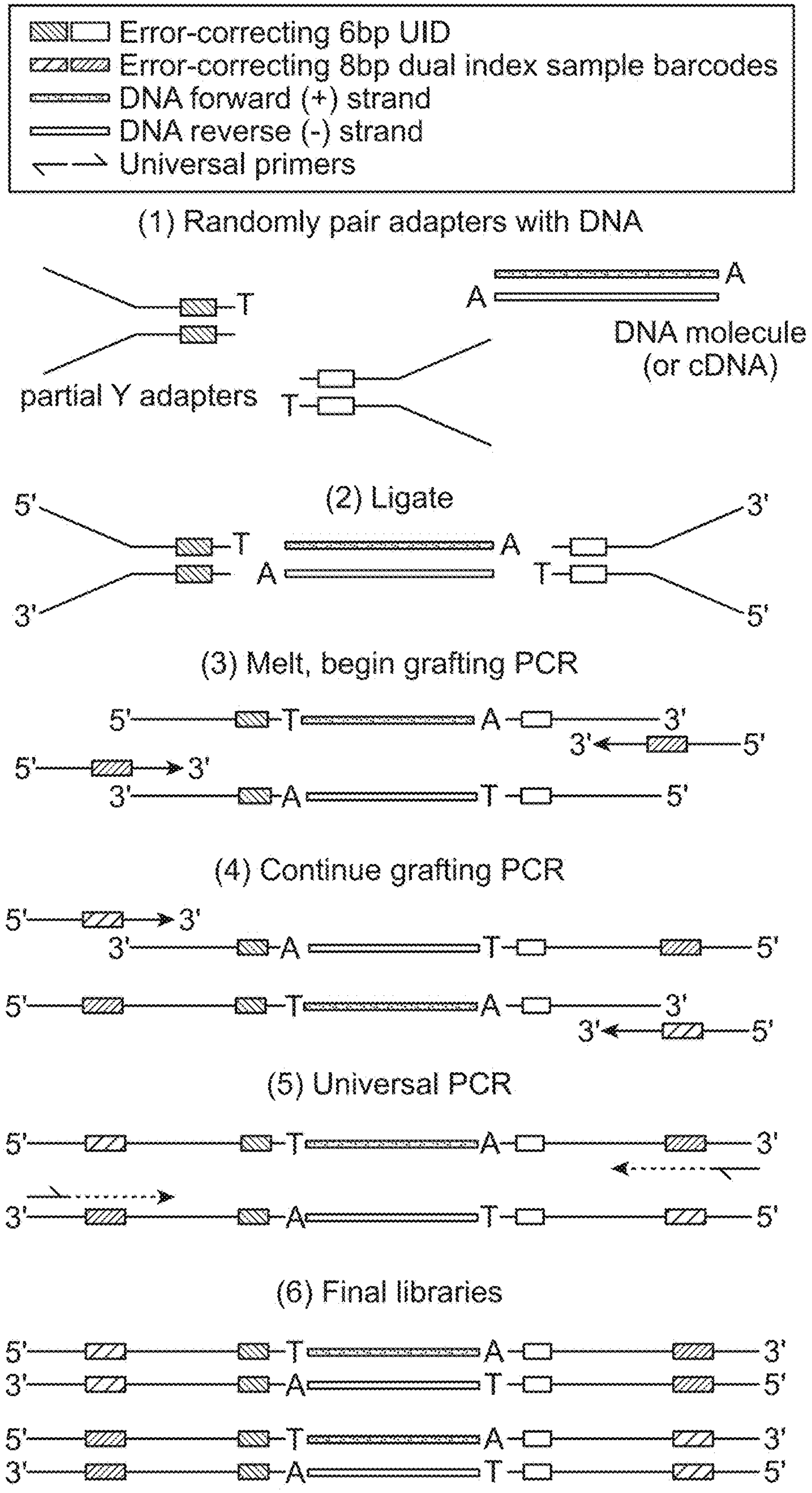

FIG. 2B provides a schematic diagram of a process to build a sequencing library.

Figure 3:
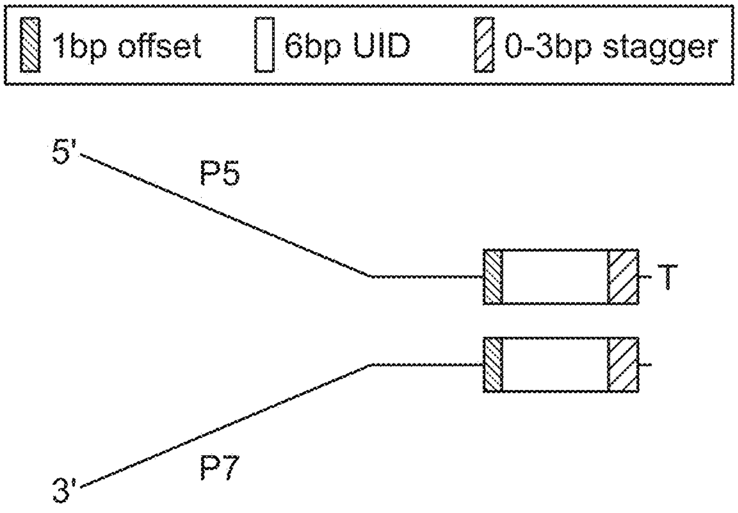

FIG. 3 provides a schematic diagram of a sequencing adapter.

Figure 4A:
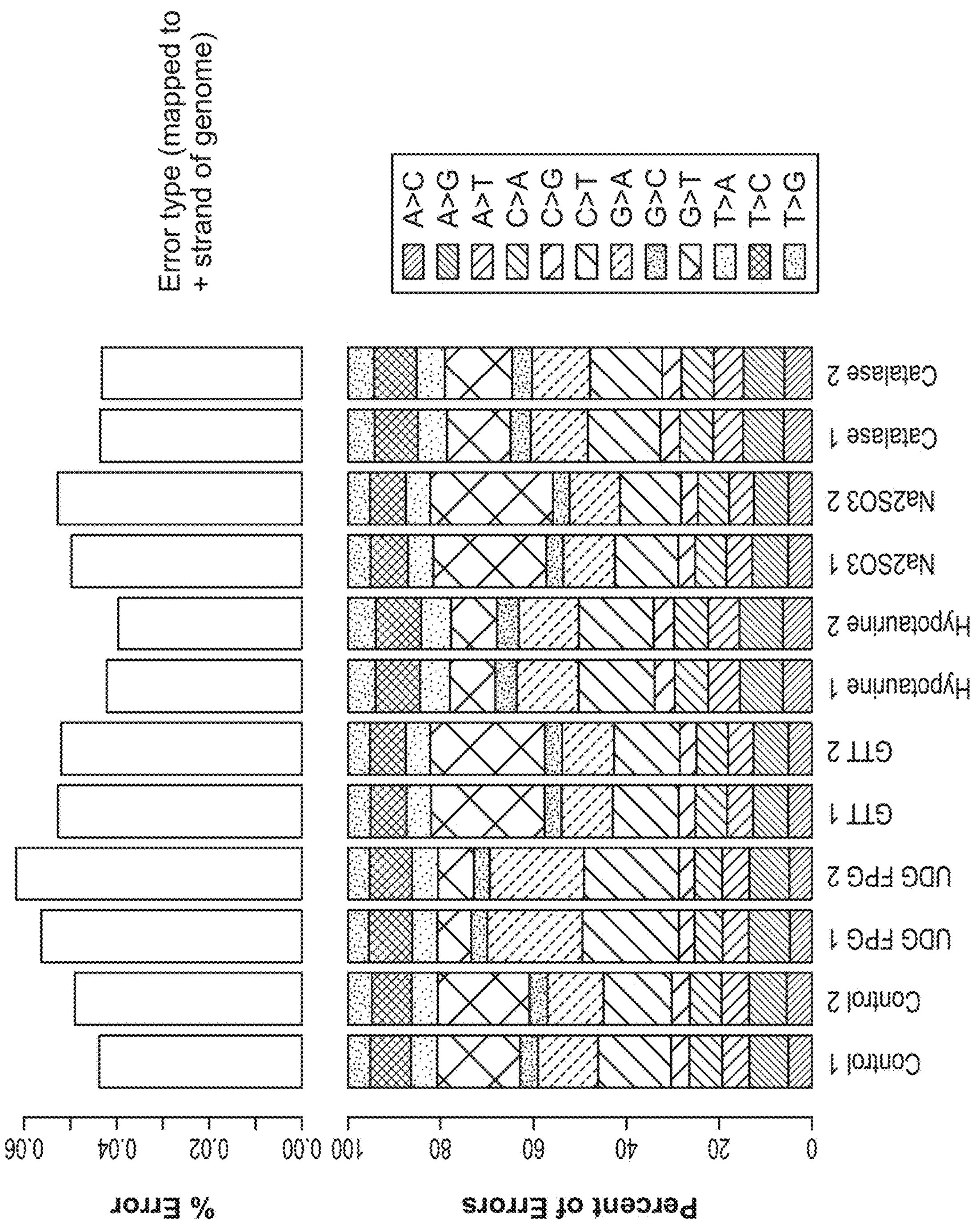

FIG. 4A provides a chart that identifies the error rates (and corresponding types of errors that arise) in samples that are treated with various chemical or enzymatic products.

Figure 4B:
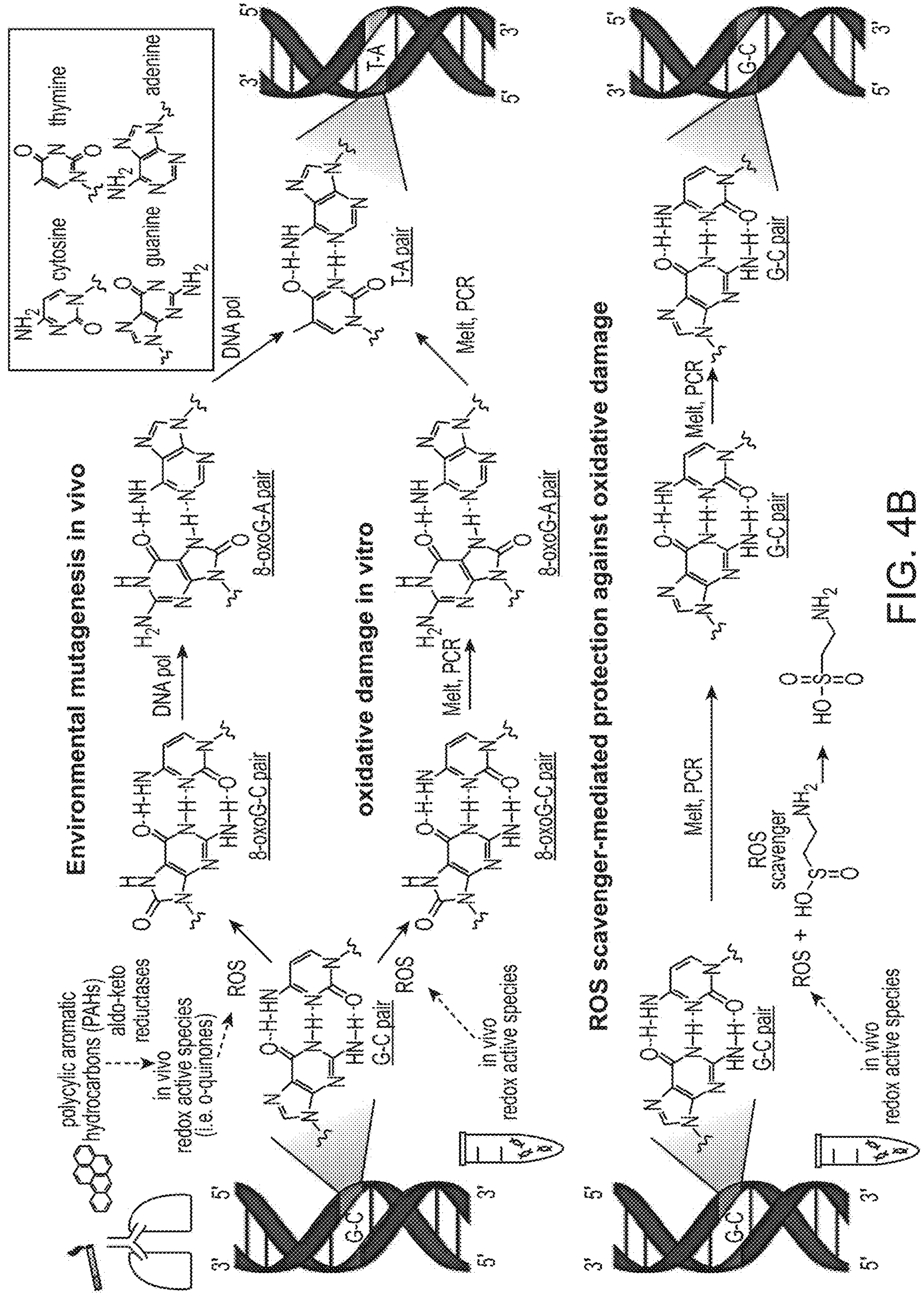

FIG. 4B provides a schematic diagram showing how a reactive oxygen species can result in a transversion, and how a reactive oxygen species scavenger can prevent such transversion.

Figure 5:
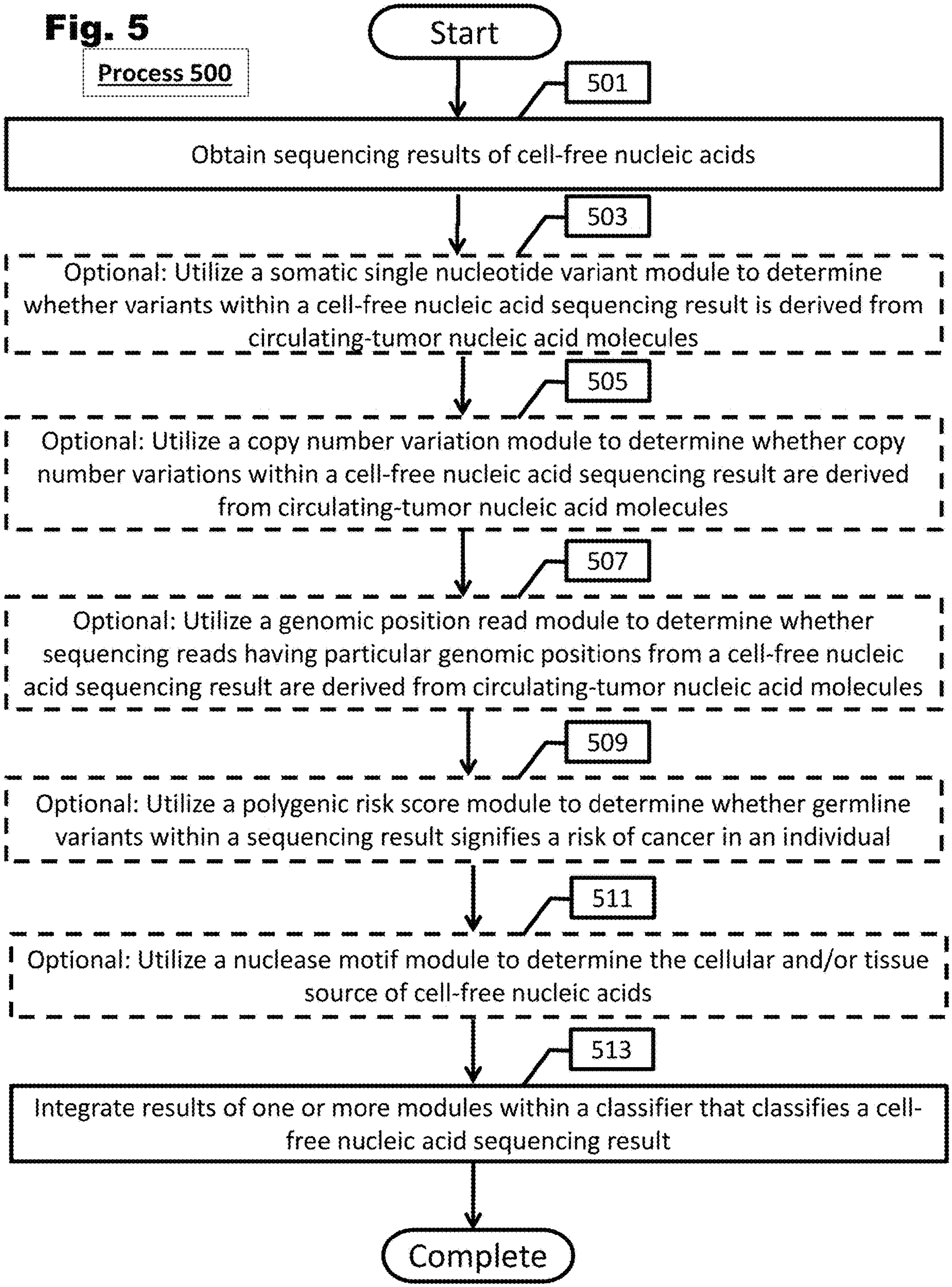

FIG. 5 provides a schematic flow diagram for detecting circulating tumor nucleic acid sequences in a sequencing result.

Figure 6:
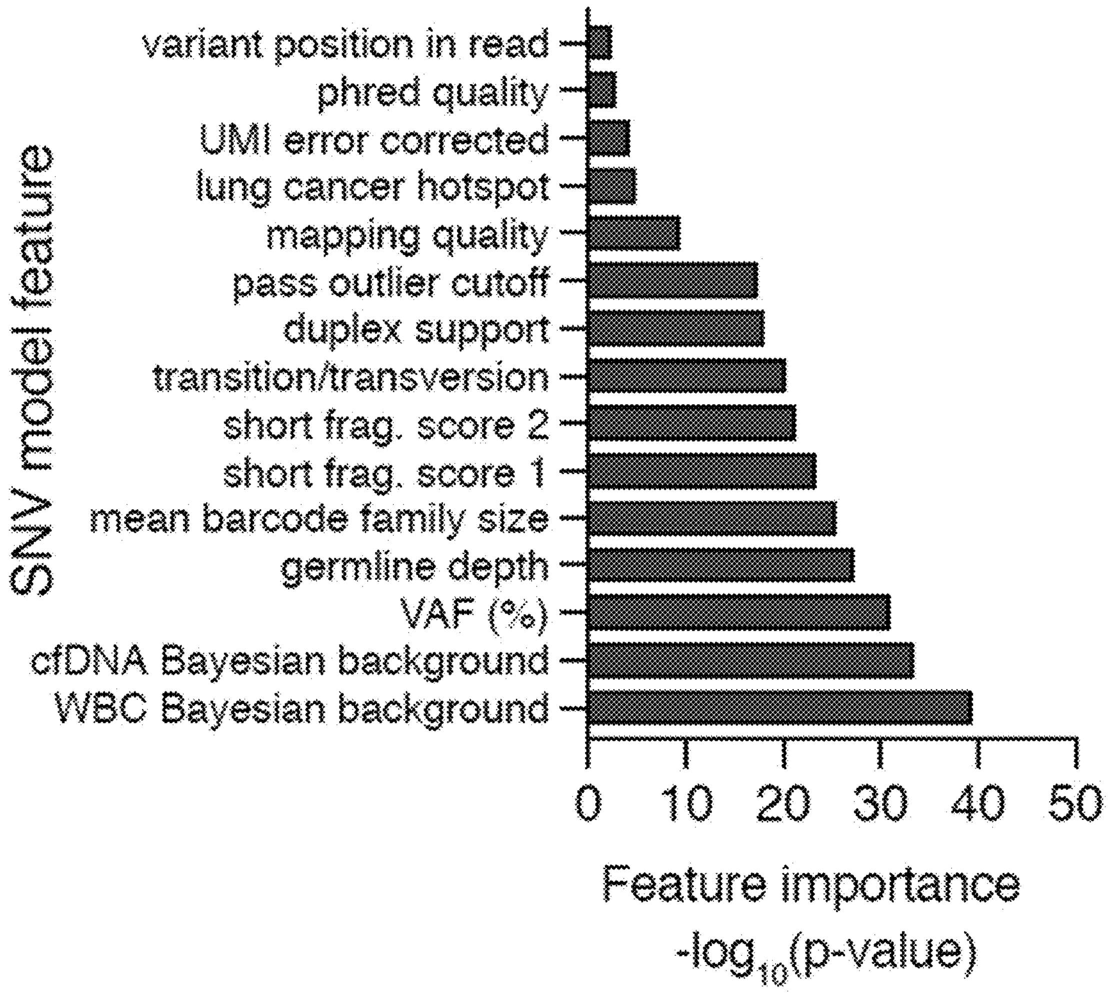

FIG. 6 provides a chart depicting features and their importance that are utilized in a model to detect circulating tumor nucleic acid sequences in a sequencing result.

Figure 7:
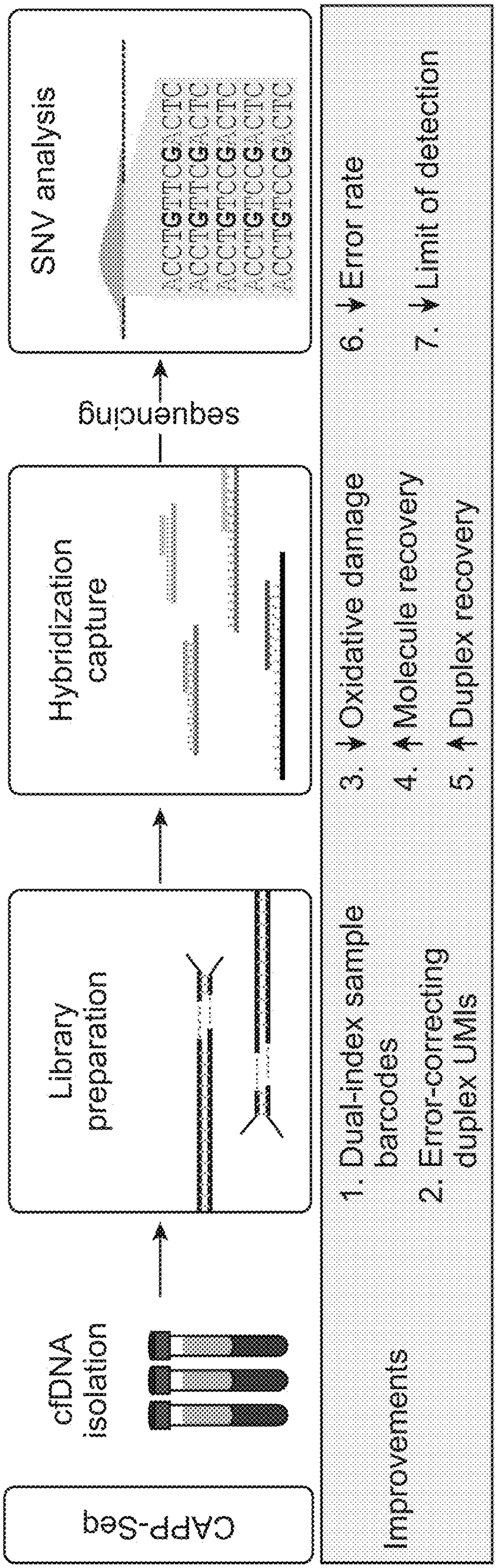

FIG. 7 shows that to improve sensitivity for detection of allelic levels, a few methodologies were developed and tested for maximizing the yield of unique, successfully sequenced cfDNA molecules while simultaneously minimizing their associated sequencing error profile.

Figure 8:
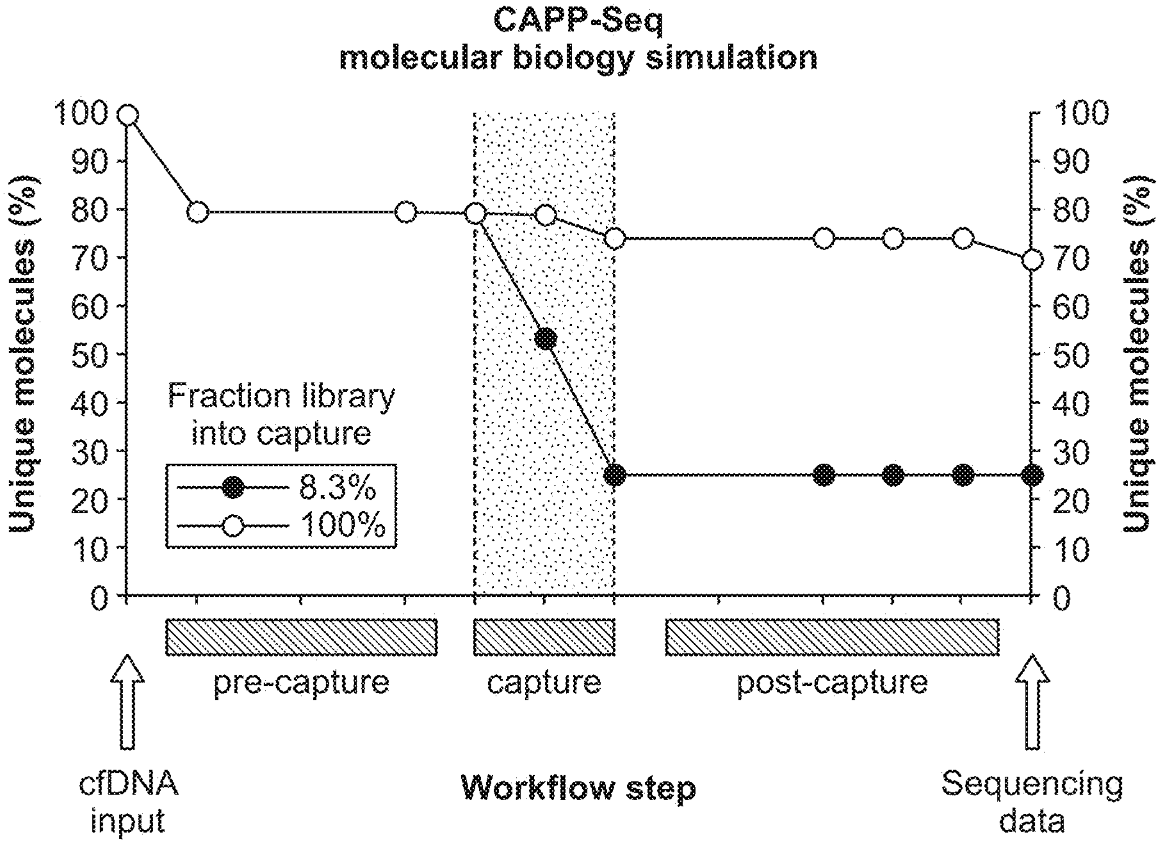

FIG. 8 shows a molecular biology simulation of a CAPP-Seq method, which includes workflow steps of cfDNA input, pre-capture, capture, and post-capture to produce sequencing data and a percent (%) of unique molecules at each of the workflow steps.

Figure 9:
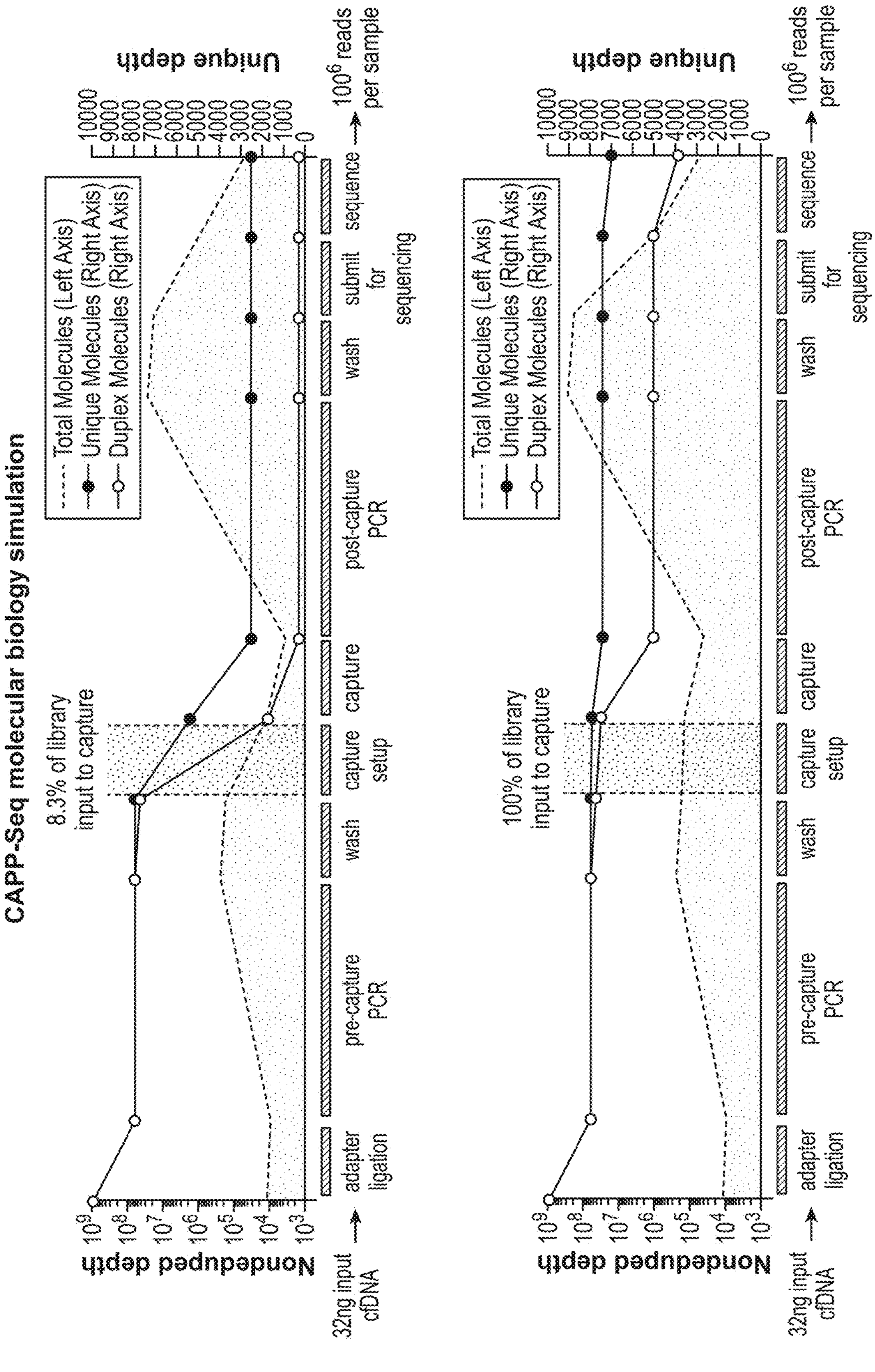

FIG. 9 shows the fraction of original unique (top solid line with circles) and duplex (bottom solid line with circles) cfDNA molecules (unique depth; right axis) and total molecules including PCR duplicates (nondeduped depth; left axis) at each step in the CAPP-Seq molecular biology workflow were tracked using an in silico model based on random binomial sampling. In this model only on-target molecules are considered, with both individual DNA strands from original DNA duplexes tracked. Two simulations are shown, with 8.3% (top) and 100% (bottom) of amplified sequencing library input into the hybridization reaction for target enrichment.

Figure 10:
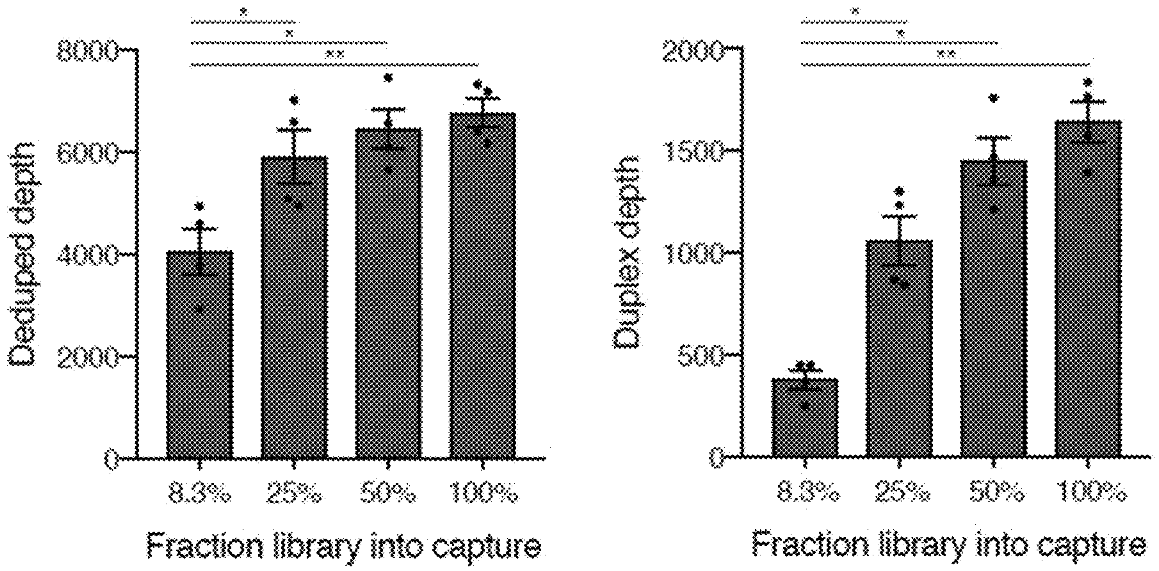

FIG. 10 shows an empirical validation of simulation models; including a comparison of median unique deduplicated (that is, 'deduped') (left) and duplex (right) depths recovered by sequencing following the input of different fractions of sequencing library into the hybrid capture reaction. A total of 32 ng of cfDNA from each of four healthy adults was used as the input in each condition and each sample was downsampled to 100 million sequencing reads before barcode-deduplication to facilitate comparison. Comparisons were performed with a paired two-sided t-test.

FIG. 11 shows a comparison of deduped (top) and duplex (bottom) sequencing depths predicted by the model to that observed experimentally when 8.3% or 100% of a sequencing library is input into the hybrid capture reaction. A range of capture efficiencies (7.5-75% hybrid capture efficiency) were considered in the simulation, in which the confidence envelope denotes the resultant range of model predictions. The experimental data depicted in FIG. 10 (n=4 cfDNA samples per capture condition) was downsampled before barcode deduplication to enable comparisons across different sequencing read yields (x axis). Dots denote the median, and error bars denote the minimum and maximum.

Figure 12:
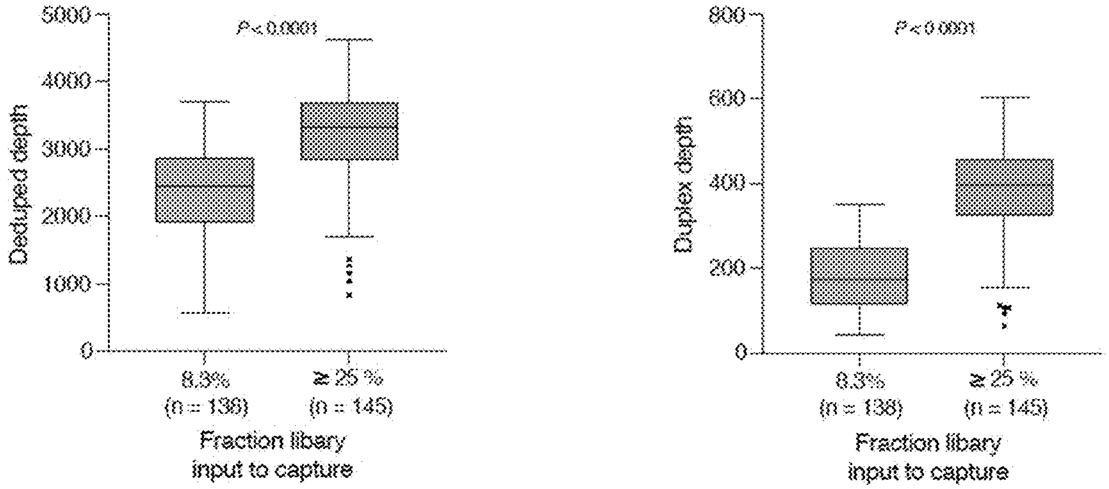

FIG. 12 shows a comparison of deduped (left) and duplex (right) sequencing depths achieved following the input of 8.3% (n=138 cfDNA samples) compared to ≥25% (n=145 cfDNA samples) of each sequencing library into the hybrid capture reaction. All samples had 32 ng of cfDNA as the input to the library preparation and were downsampled to 25 million reads before barcode-deduplication to facilitate comparison. In box plots, the center line denotes the median, the box contains the interquartile range, and the whiskers denote the extrema that are no more than 1.5×IQR from the edge of the box (Tukey style).

Figure 13:
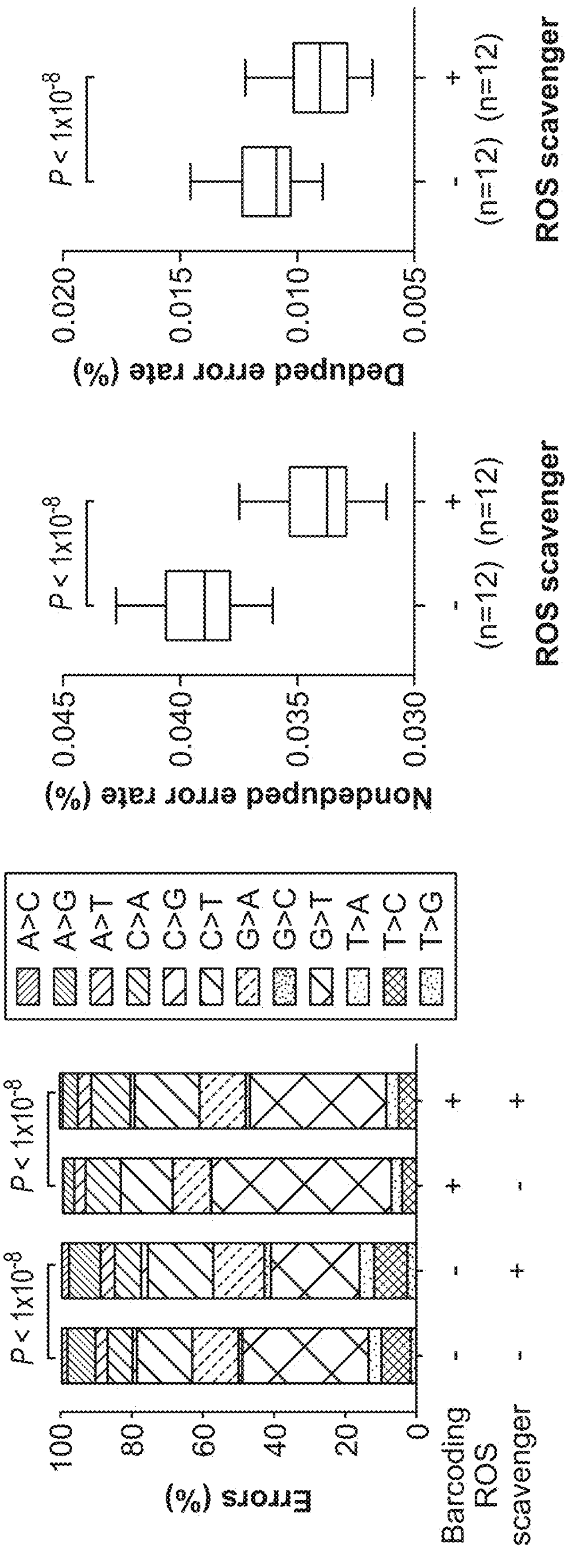

FIG. 13 shows that when the error profiles of cfDNA samples from 12 healthy adults captured with and without hypotaurine were compared, it was found that samples captured with the ROS scavenger had significantly lower background error-rates and fewer G>T errors.

Figure 14:
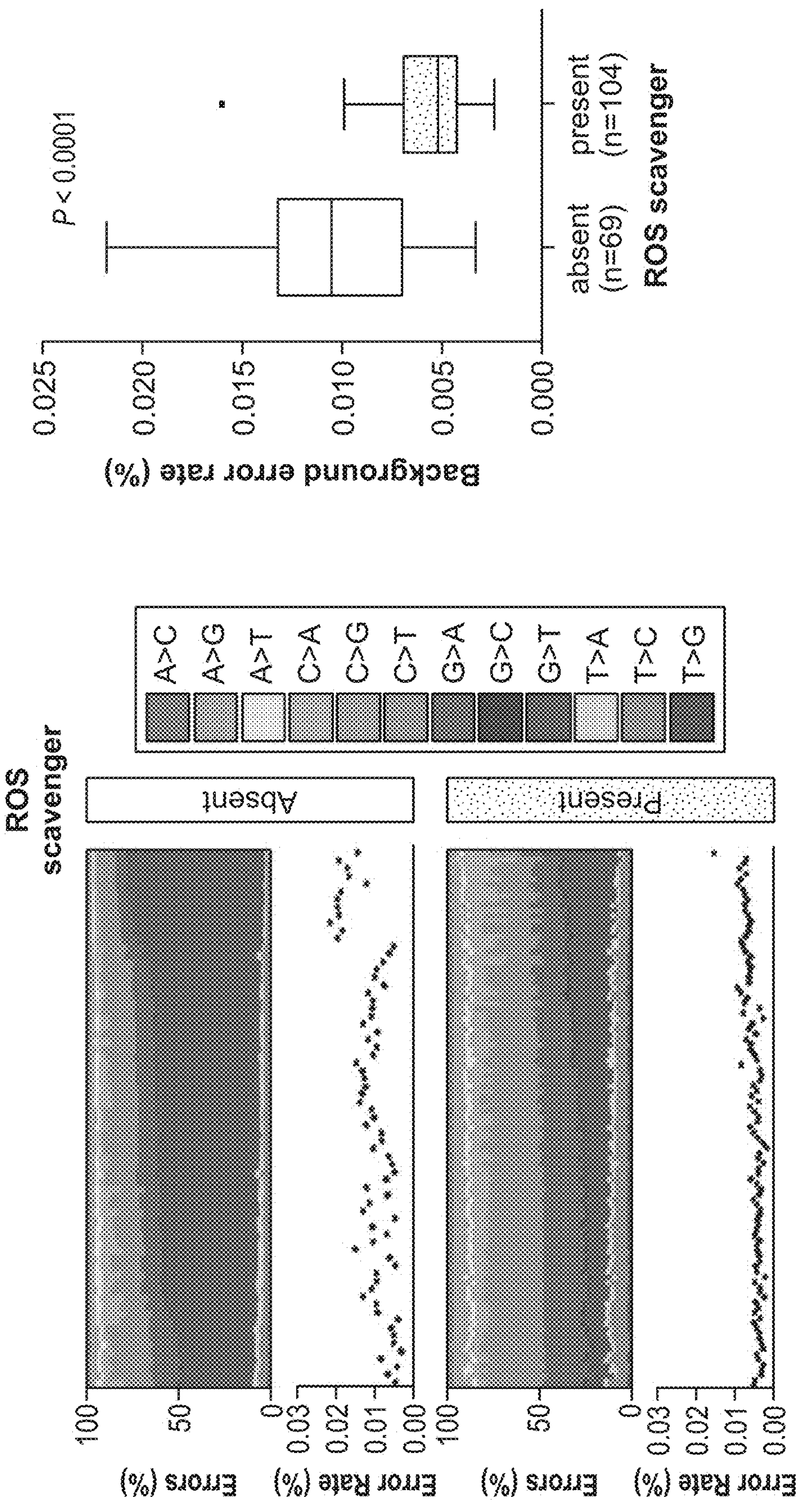

FIG. 14 shows that a relative reduction of G>T errors (16% vs 57% of all errors, Wilcoxon rank-sum test, $P<1\times10^{-8}$) and background error rate (about 50% reduction, Wilcoxon rank-sum test, P<0.0001) was observed in 104 healthy control cfDNA samples captured with the ROS scavenger compared to 69 control cfDNA samples captured without hypotaurine.

Figure 15:
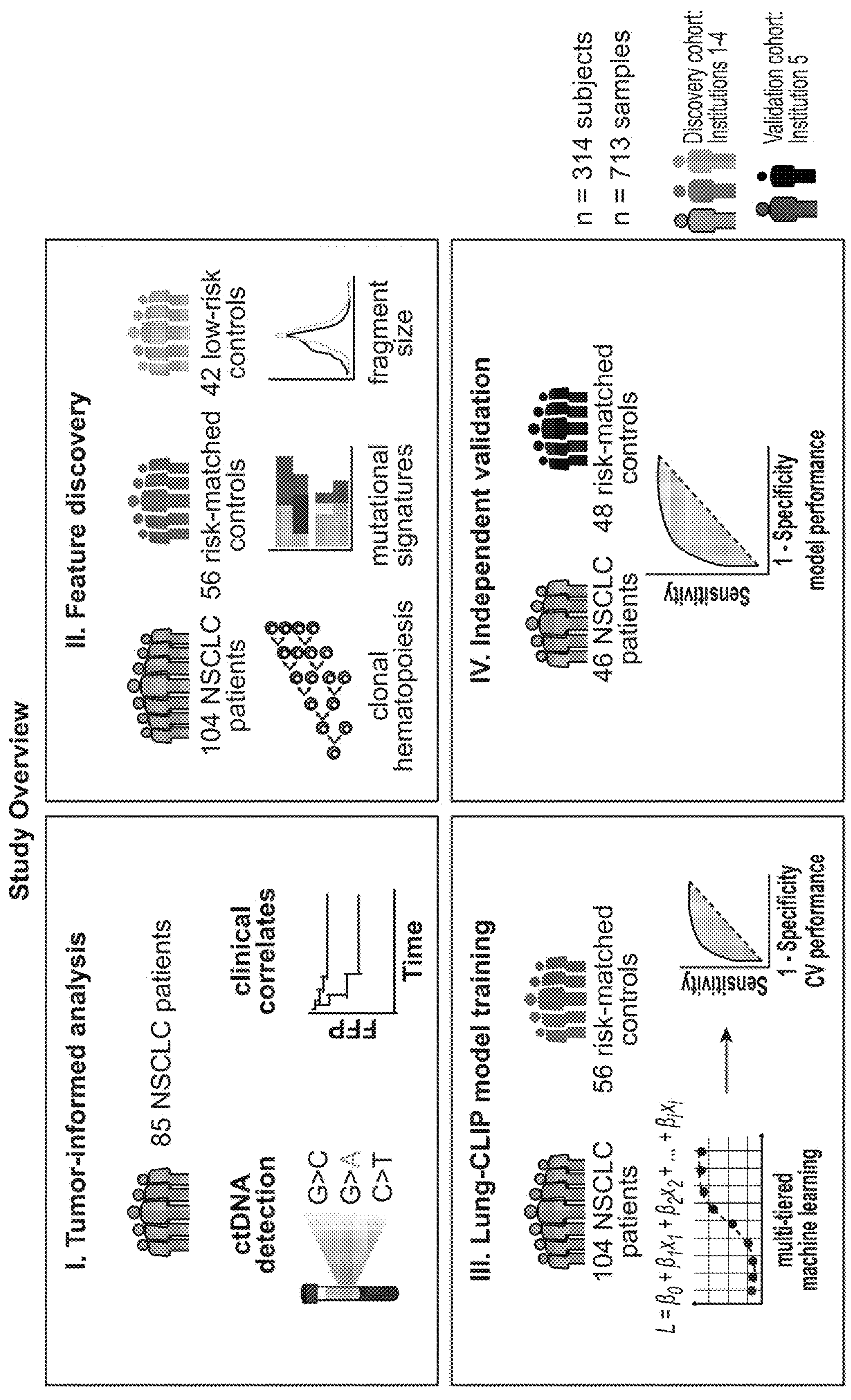

FIG. 15 shows that ctDNA detection rates were determined in patients with early stage tumors using a tumor-informed approach. This strategy establishes the maximal sensitivity for a CAPP-Seq-based tumor-naïve screening approach.

FIG. 16 shows that tumor tissue, pre-treatment plasma cfDNA, and leukocyte DNA were genotyped from 85 patients with stage I-III NSCLC through targeted deep sequencing of 255 genes recurrently mutated in lung cancer using a 355 kilobase (kb) CAPP-Seq panel.

Figure 17:
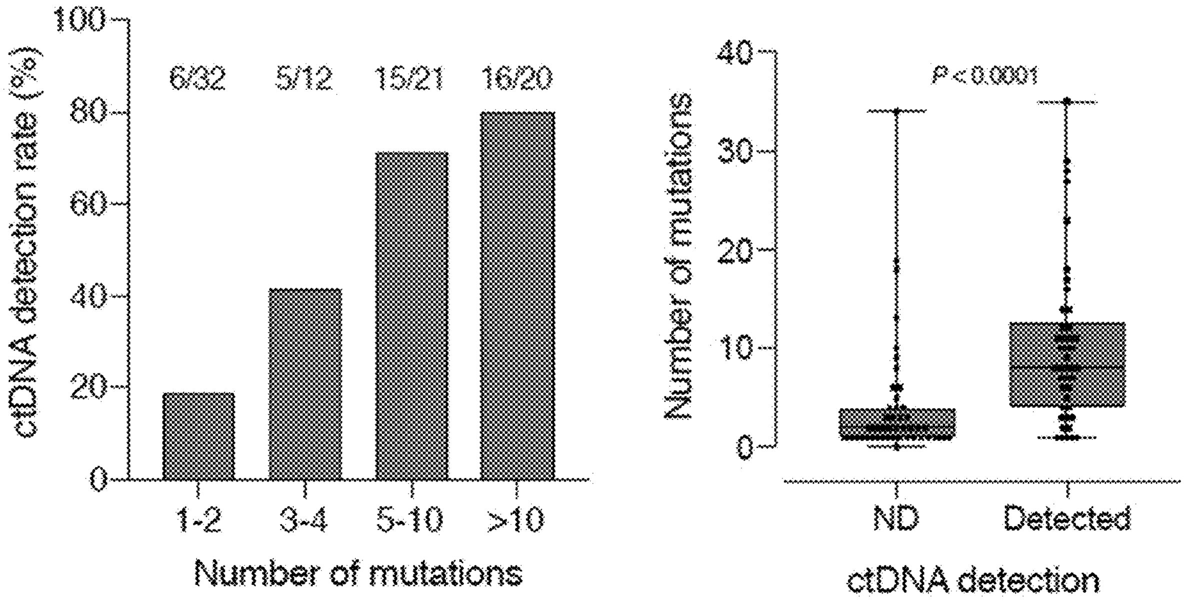

FIG. 17 shows that using the panel of FIG. 16, which is a 'population-based' approach (e.g., does not require patient-specific molecular biology customization), a median of 4 mutations were identified per patient in tumor specimens (range 0-35), and ctDNA was detected in 49% (42/85) of NSCLC patients at 95% specificity. Sensitivity of detection was significantly higher as the number of monitored tumor mutations increased.

Figure 18:
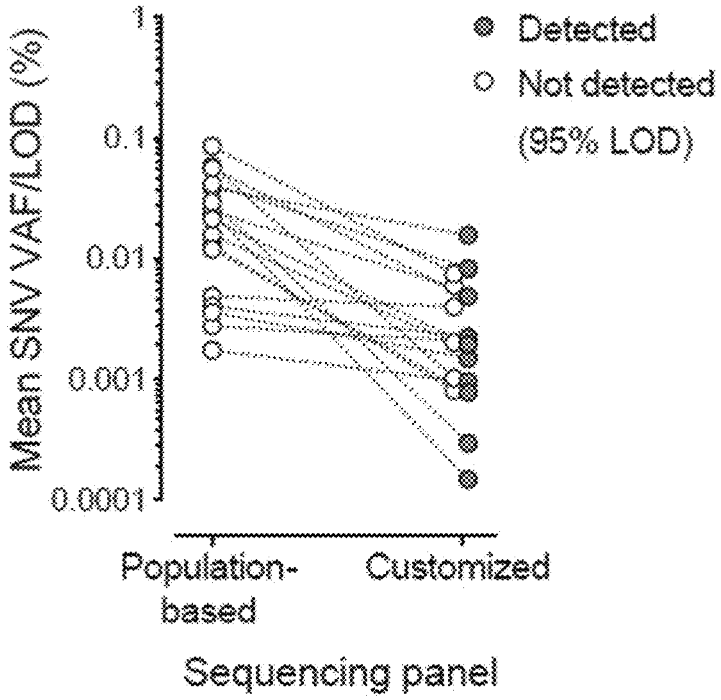

FIG. 18 shows that to empirically test the observation that tracking more mutations improves overall ctDNA detection rates, customized capture panels were designed based on tumor exome sequencing data for 17 patients in whom ctDNA was not initially detectable using the population-based lung cancer panel. This customized approach increased the number of mutations available for monitoring from a median of 4 to 68 (paired two-sided t-test, P<0.01). Using these customized assays, ctDNA was detected in 11/17 (65%) patients at a median VAF of 0.0019% and at levels as low as 1.5 in $10^6$ molecules.

Figure 19:
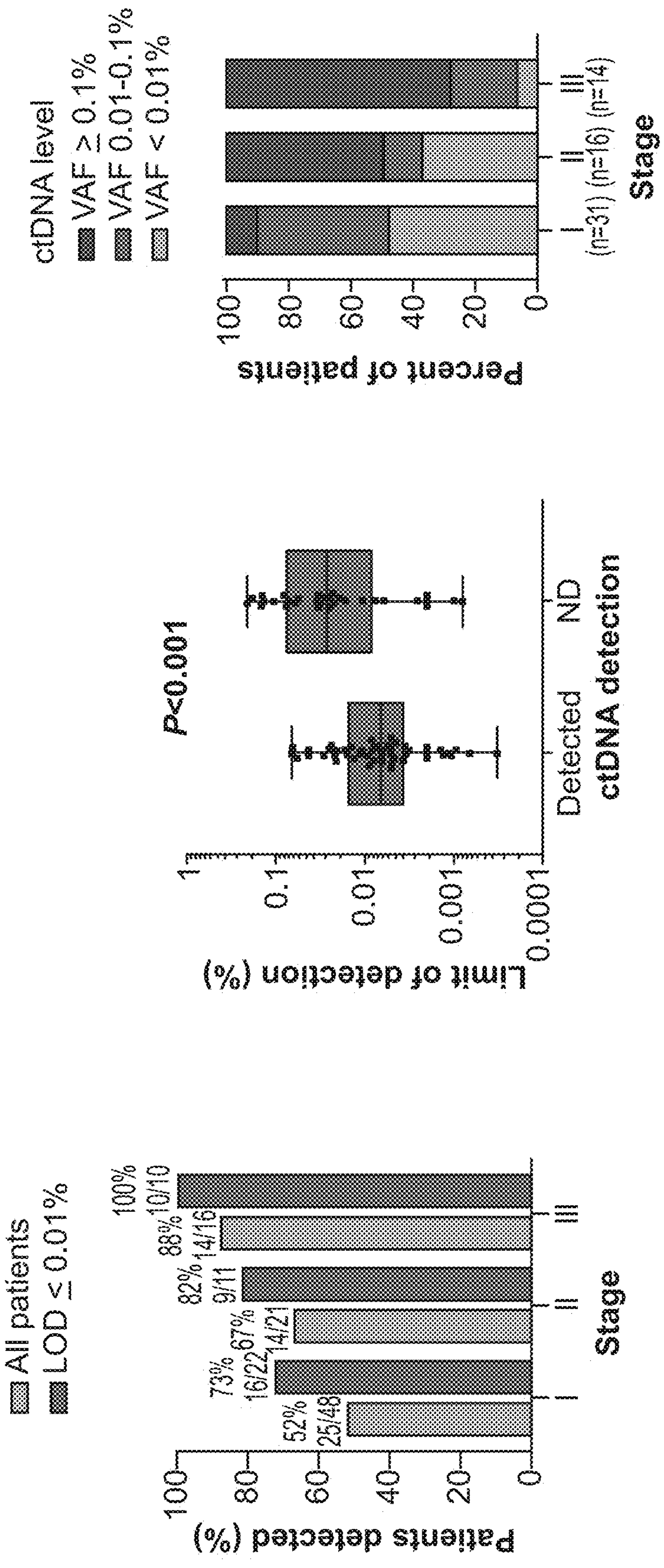

FIG. 19 shows that combining the results of population-based (n=68) and customized (n=17) tumor-informed strategies, ctDNA was detected in the majority of patients with early stage NSCLC (53/85 or 62%), including in 52%, 67%, and 88% of patients with I, II, and III disease, respectively.

Figure 20:
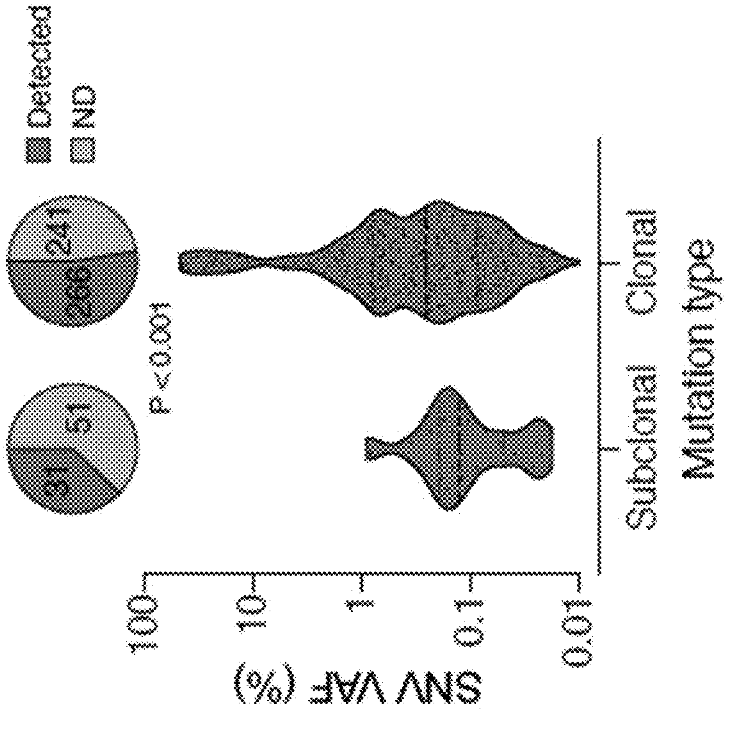

FIG. 20 shows that properties of ctDNA molecules were identified that may inform tumor-naïve screening. Clonal tumor mutations, defined as those variants estimated to be uniformly present in all tumor cells were more frequently detected in plasma and observed at higher allele frequencies than their subclonal counterparts (Fisher's Exact Test P<0.05, Wilcoxon rank-sum test P<0.001).

Figure 21:
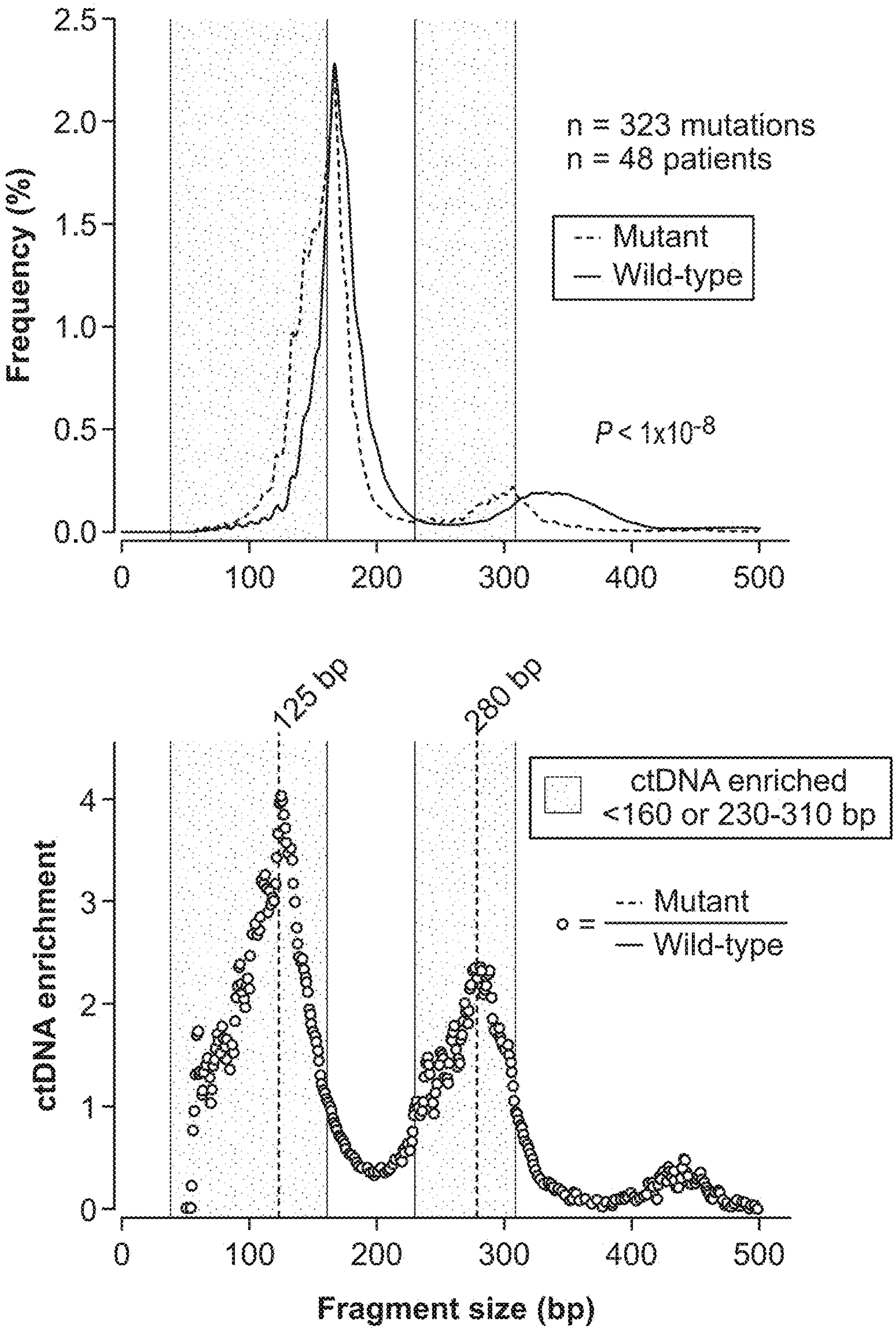
Figure 21:
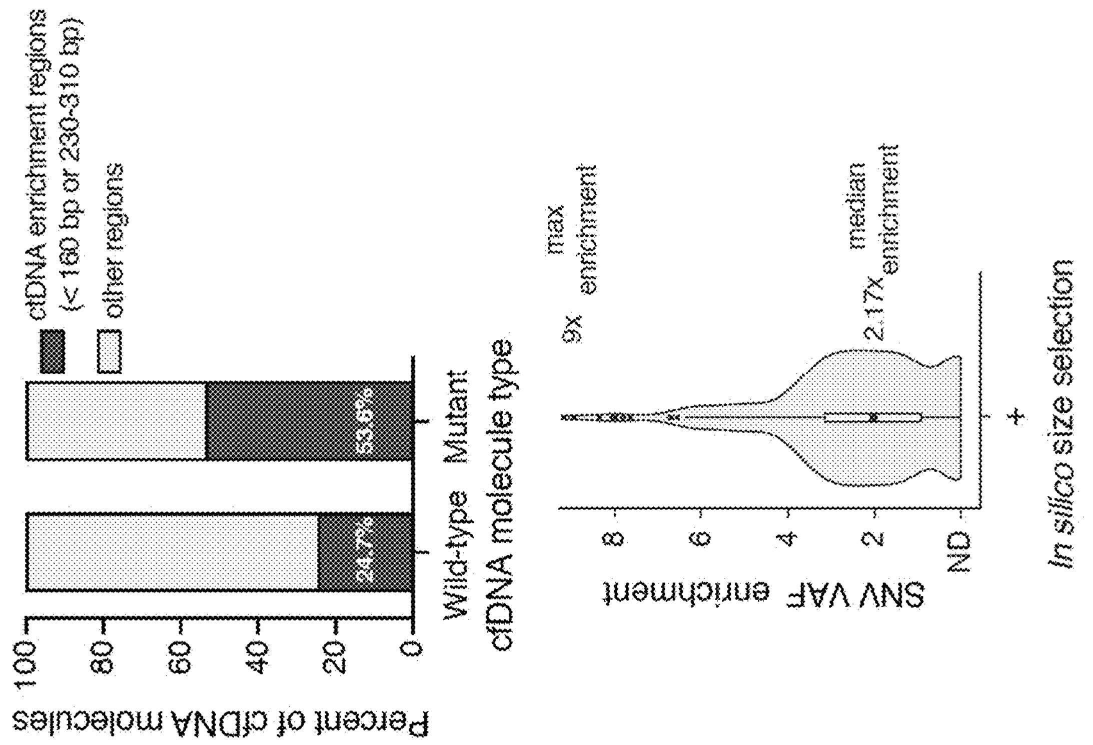

FIG. 21 shows that the size distribution of cfDNA fragments was also considered as a potential means of enriching for tumor-derived cfDNA molecules (e.g., ctDNA). It was found that cfDNA molecules harboring mutations present in matched tumor samples to be significantly shorter than their non-mutant counterparts (Wilcoxon rank-sum test $P<1\times10^{-8}$).

Figure 22:
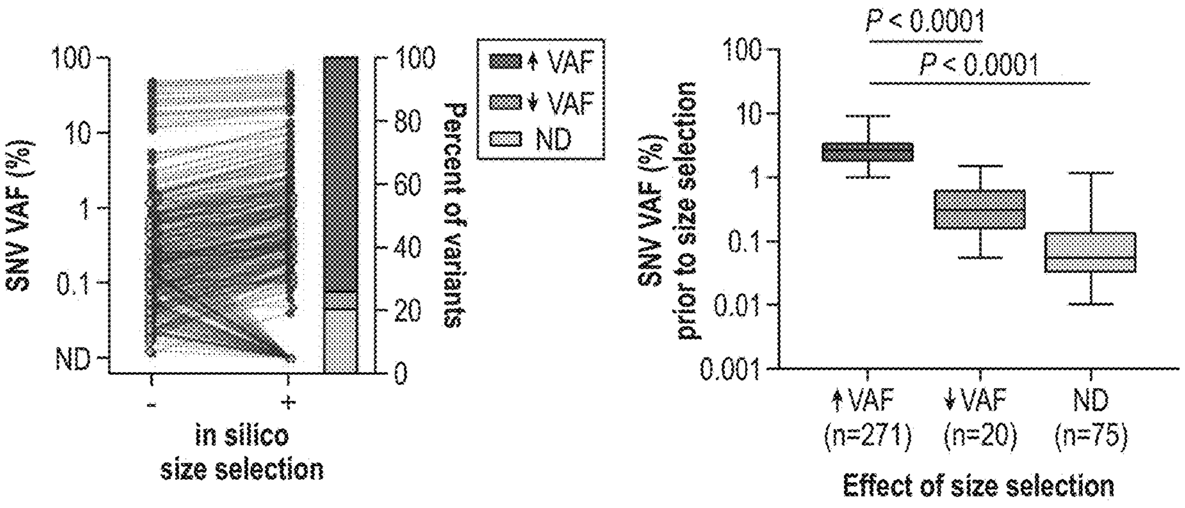

FIG. 22 shows that mutant cfDNA molecules were enriched among sub-mononucleosomal fragments (<160 bp) and in sub-disomal fragments (230-310 bp, FIG. 21). When only considering molecules <160 bp and between 230-310 bp, a 2.17-fold median enrichment in VAFs of tumor-derived mutations was observed (range 0-9.2, FIG. 21). It was found that 53.6% of mutant molecules fell in these regions as compared to 24.7% of non-mutant molecules (FIG. 21), indicating that size selection of molecules in these windows may prove useful. However, although the majority of mutations (74%, 271/366) were enriched in these size windows, VAFs decreased following size selection for 26% of mutations (95/366), with 78% of such mutations (75/95) becoming undetectable.

Figure 23:
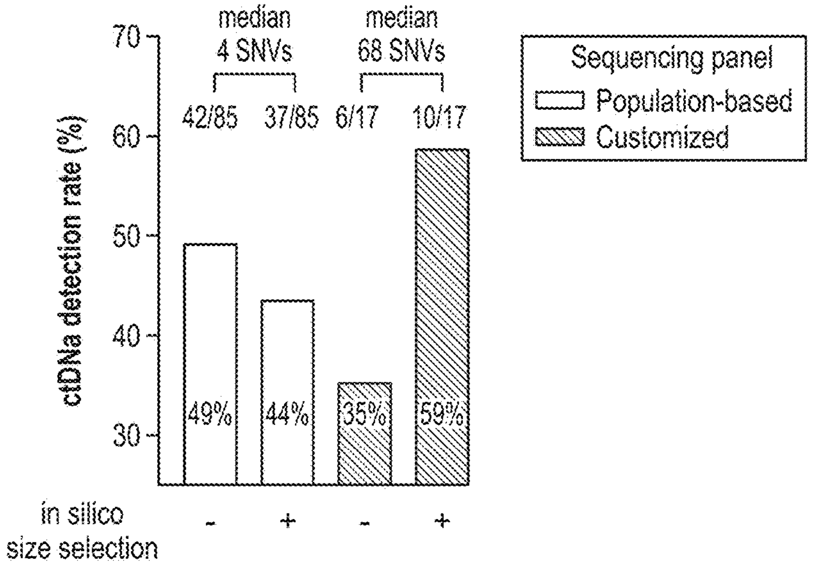

FIG. 23 shows that while size selection improved overall sensitivity of ctDNA detection in patients with many mutations tracked through customized panels, sensitivity degraded in patients monitored with our population-based lung cancer panel due to loss of tumor mutations not represented on any short cfDNA molecules.

Figure 24:
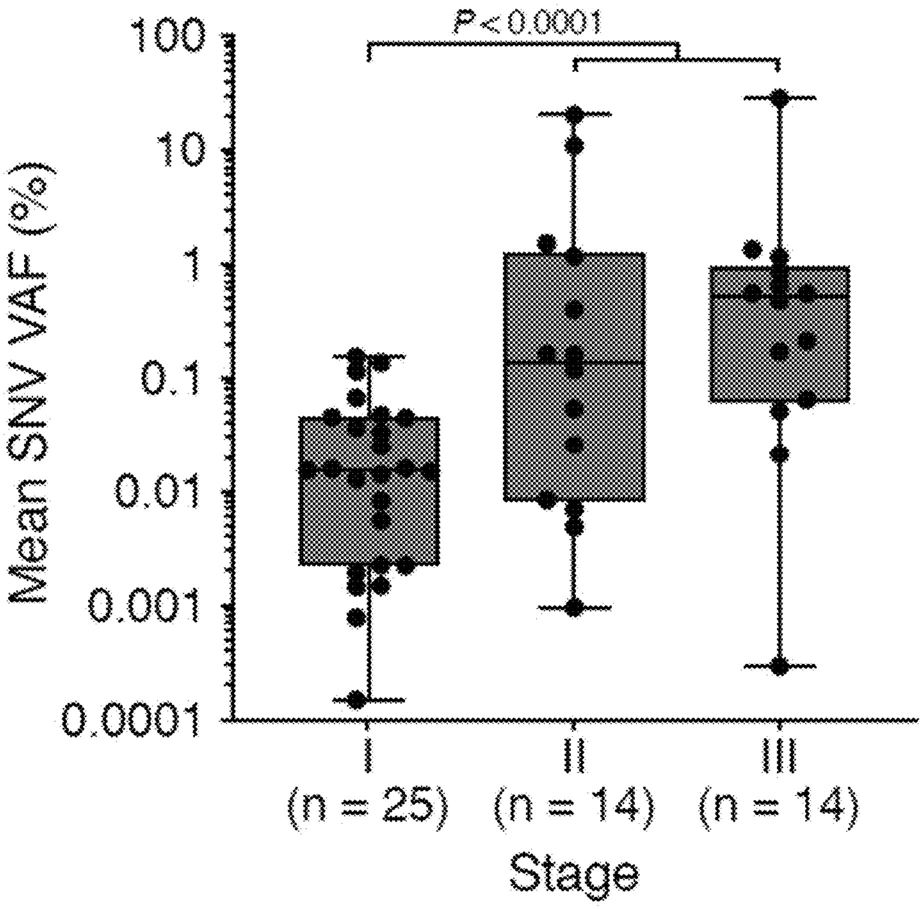

FIG. 24 shows that having observed detectable ctDNA in the majority of early stage NSCLC patients, it was next sought to identify clinical and pathological correlates of ctDNA levels in these patients. ctDNA levels were found to be strongly associated with advancing stage, with median VAFs of 0.015% in stage I, 0.14% in stage II, and 0.52% in stage III disease (Wilcoxon rank-sum test, P<0.0001).

Figure 25:
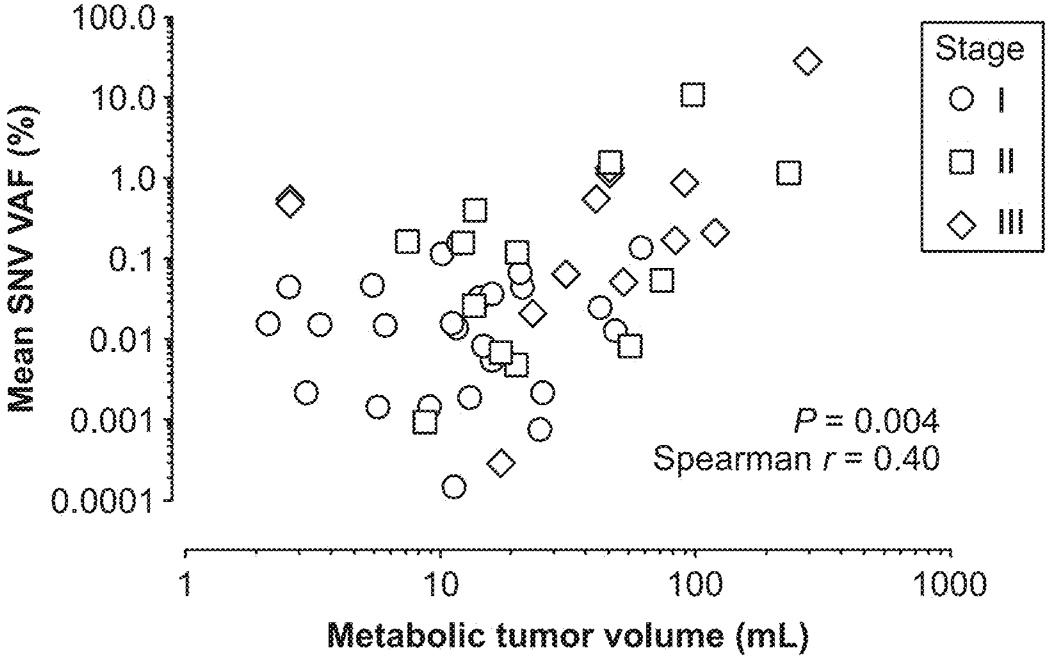
Figure 26:
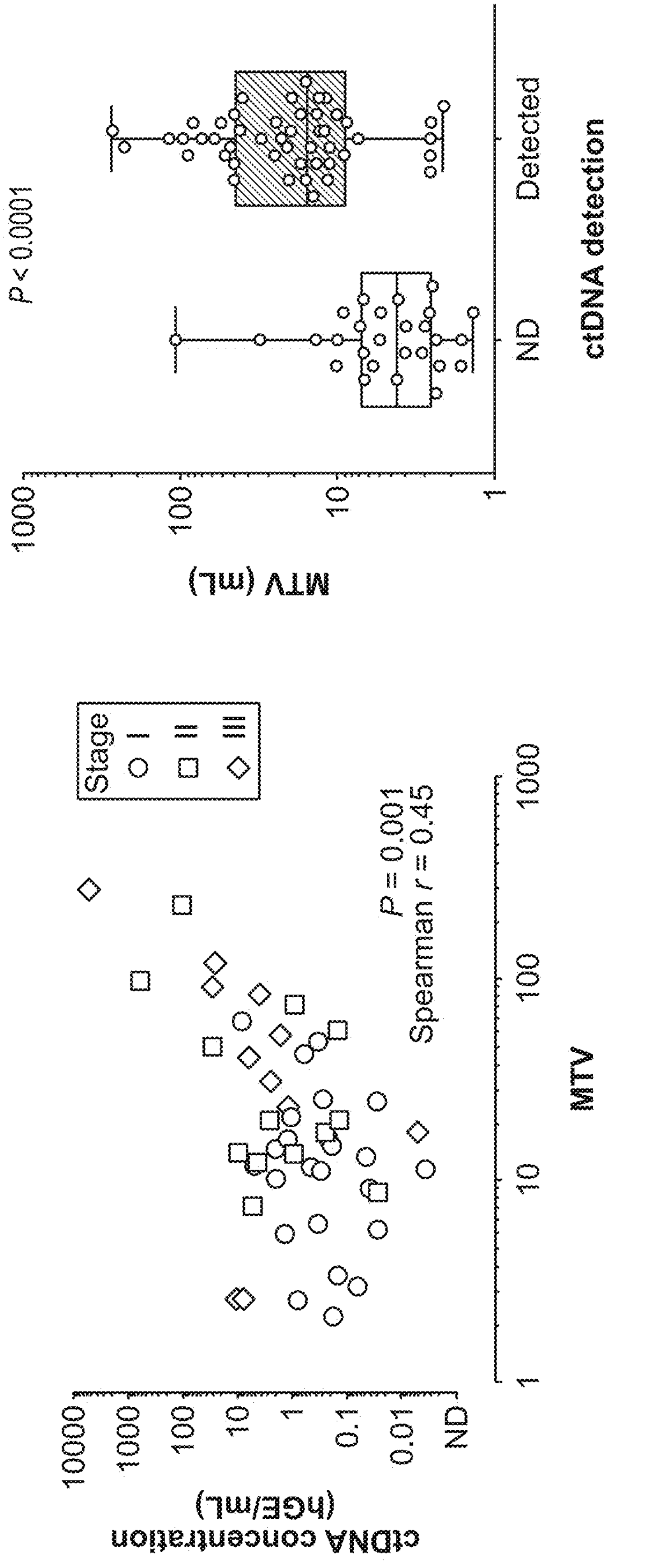

FIGS. 25-26 show that significant associations between ctDNA levels and metabolic tumor volume (MTV) were found, as measured by [18F] FDG PET/CT (Spearman r=0.40, P=0.004).

Figure 27:
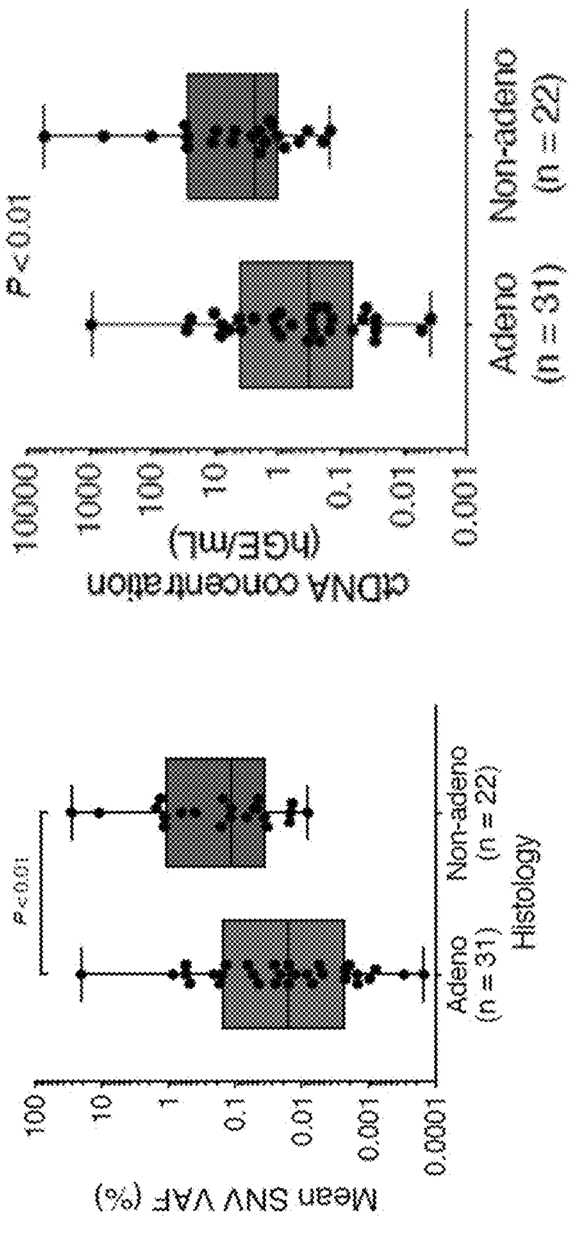

FIG. 27 shows that significant associations between ctDNA levels and metabolic tumor volume (MTV) were found, as measured with non-adenocarcinoma histology (Wilcoxon Rank Sum Test, P<0.01). Stage, MTV, and non-adenocarcinoma histology were each independently associated with ctDNA burden in multivariable analysis, indicating that ctDNA levels are a function of multiple biological parameters.

Figure 28:
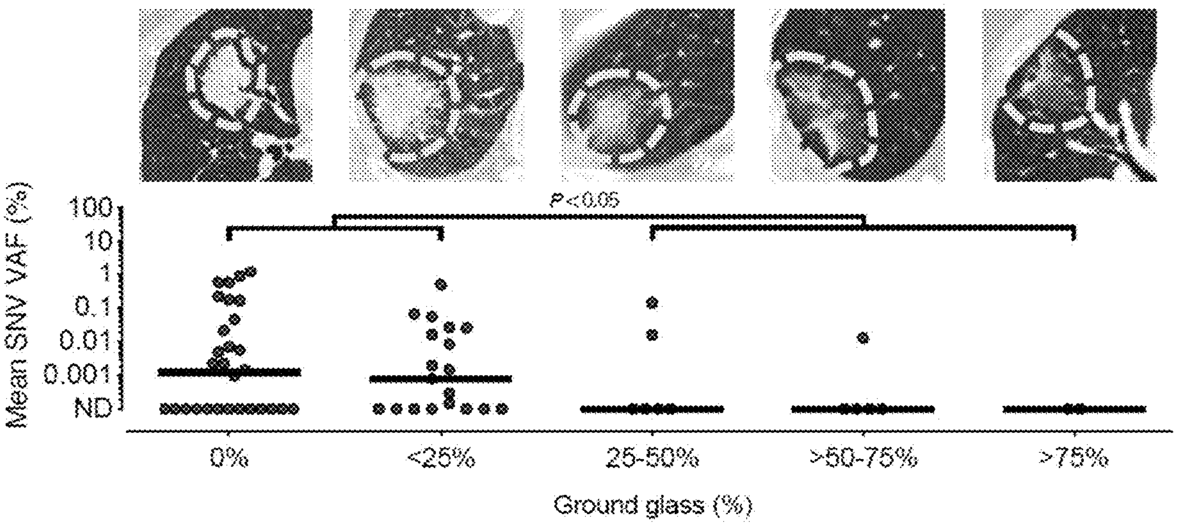

FIG. 28 shows that among patients with a major ground-glass component (≥25% GGO), ctDNA was detected less frequently and at lower concentration than in patients with <25% GGO (Fisher's Exact Test P<0.05, Wilcoxon rank-sum test P<0.05).

Figure 29:
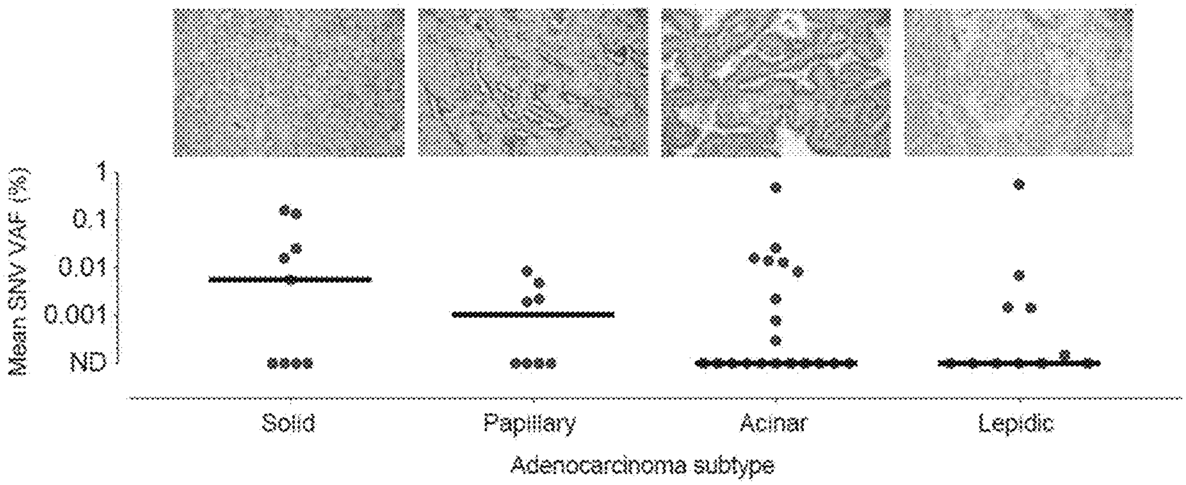

FIG. 29 shows that when ctDNA levels were compared across adenocarcinoma histologic subtypes, patients with solid and papillary tumors had higher ctDNA levels than those with acinar or lepidic tumors, although this relationship did not reach statistical significance.

Figure 30:
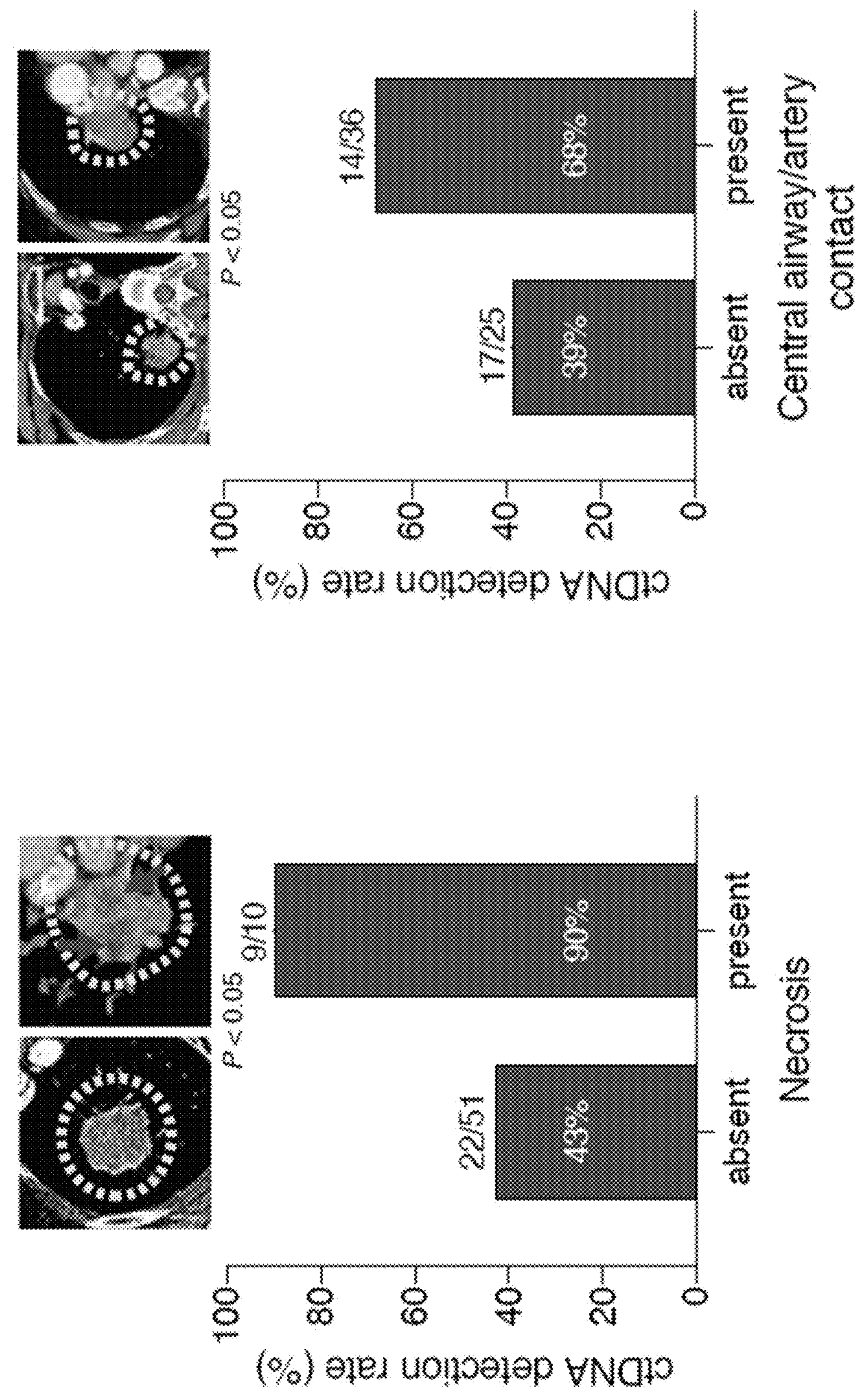

FIG. 30 shows that ctDNA was more frequently detectable in patients whose tumors had evidence of necrosis or contacted a central airway or artery.

Figure 31:
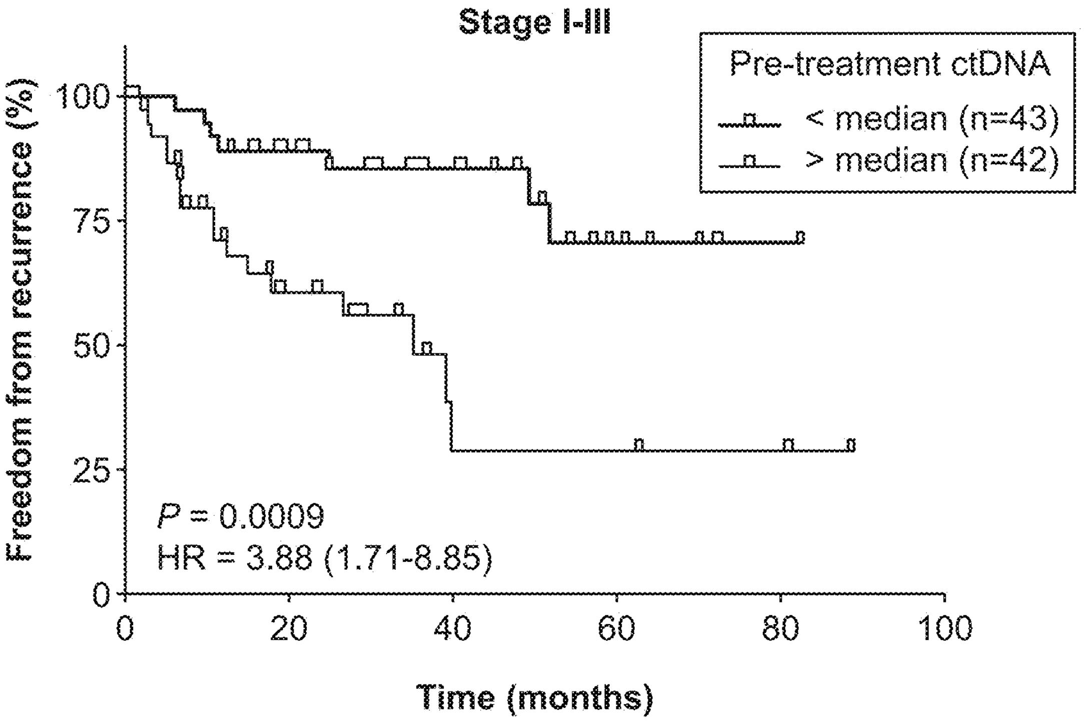

FIG. 31 shows that given the correlations between ctDNA shedding and imaging parameters known to be associated with disease aggressiveness, the association of pre-treatment ctDNA levels with clinical outcomes was examined. Patients with higher than median ctDNA levels had significantly inferior rates of freedom from recurrence (hazard ratio=3.88, P=0.0009).

Figure 32:
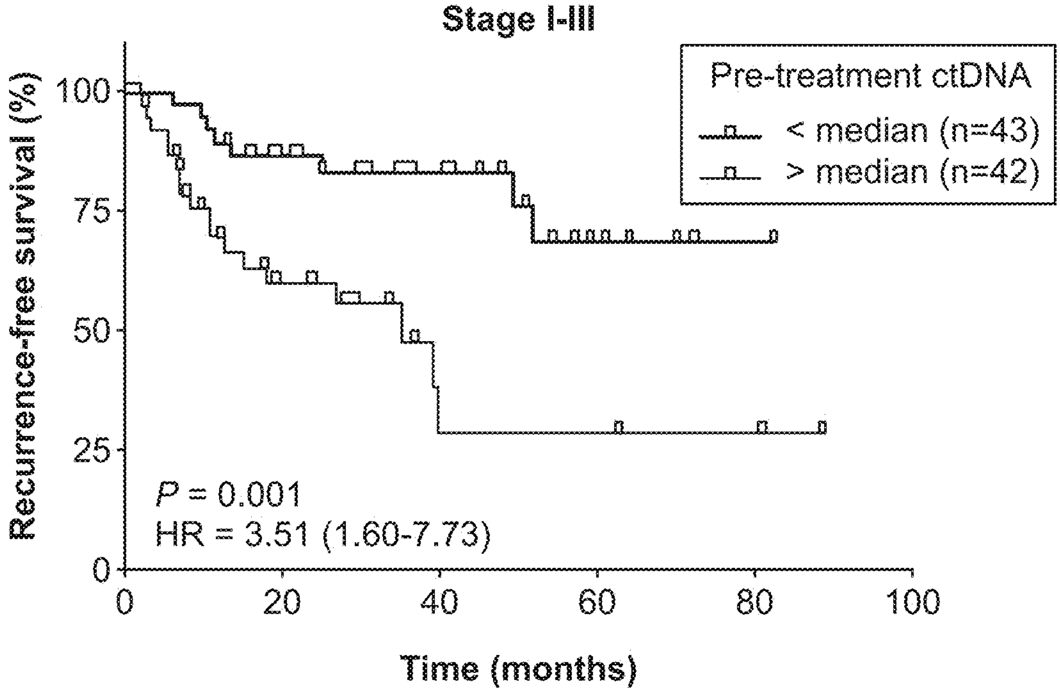

FIG. 32 shows that given the correlations between ctDNA shedding and imaging parameters known to be associated with disease aggressiveness, the association of pre-treatment ctDNA levels with clinical outcomes was examined. Patients with higher than median ctDNA levels had significantly inferior rates of recurrence-free survival (hazard ratio=3.51, P=0.001).

Figure 33:
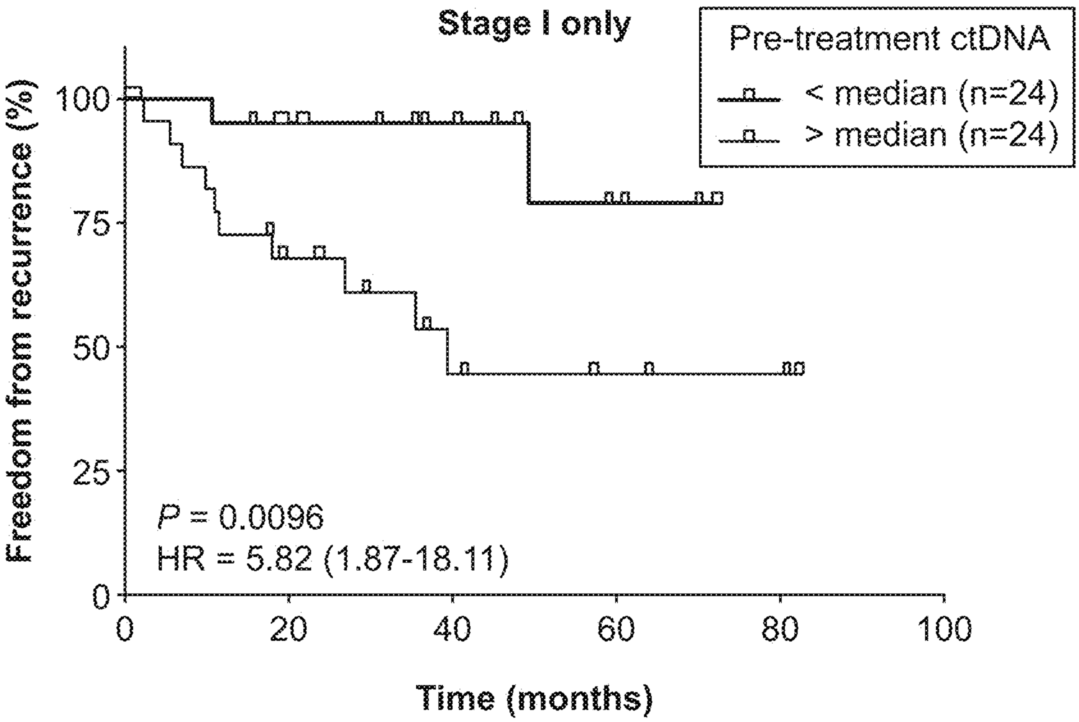
Figure 34:
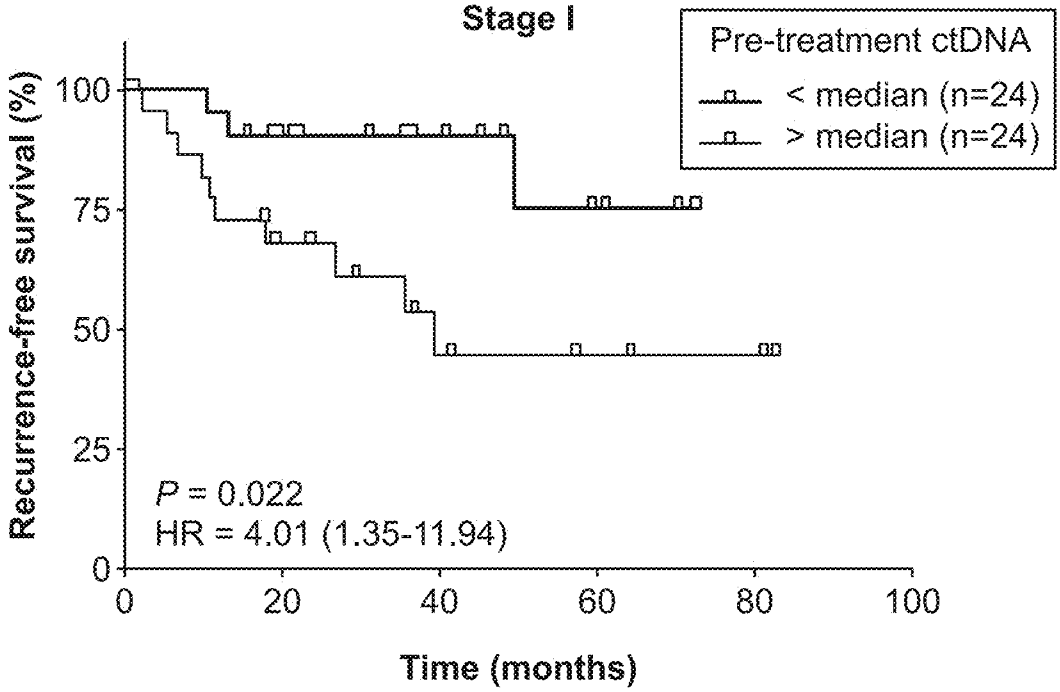

FIGS. 33-34 show that pre-treatment ctDNA levels were similarly prognostic when only considering patients with stage I disease (n=48).

FIG. 35 shows that in a multivariable analysis including both MTV and stage, only ctDNA was significantly associated with outcome.

Figure 36:
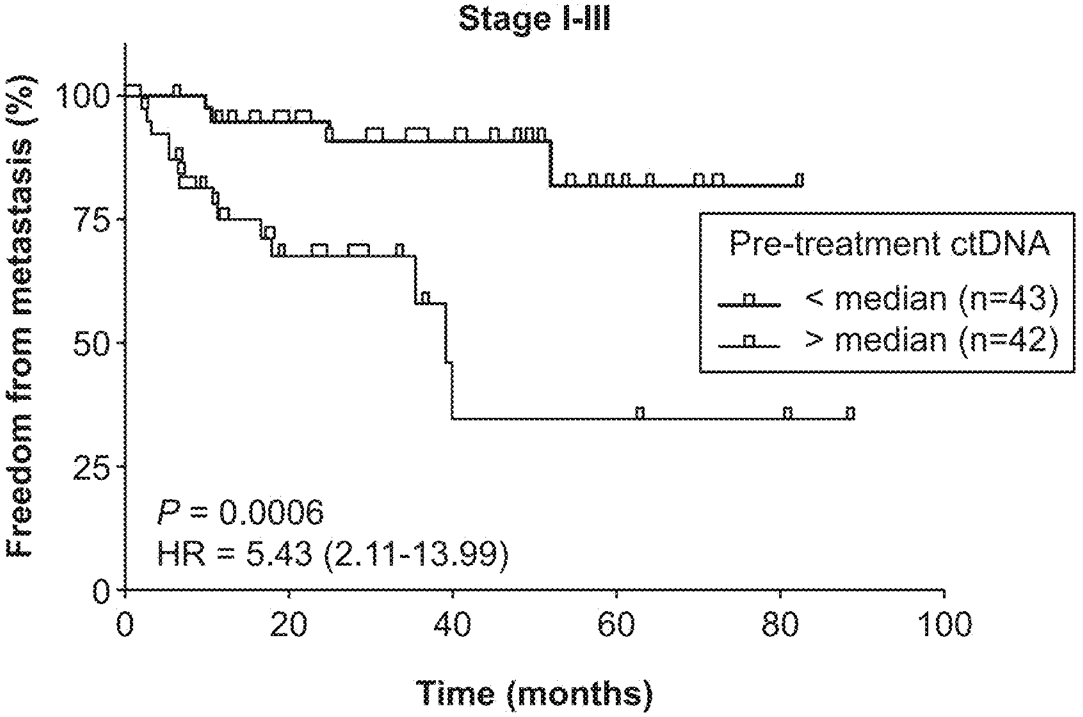
Figure 37:
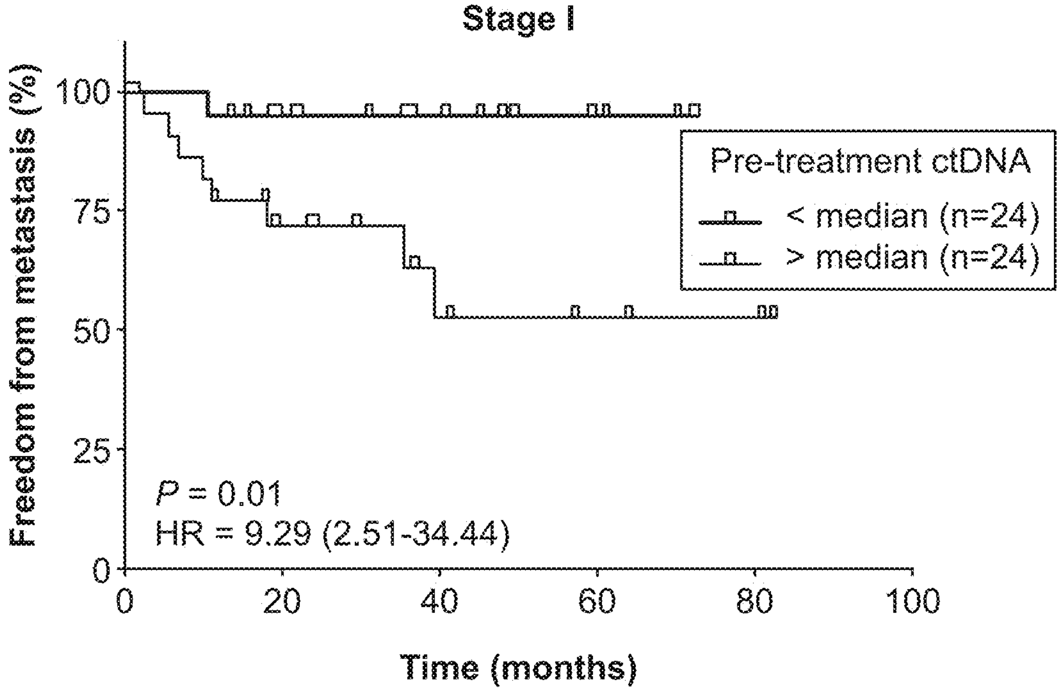

FIGS. 36-37 shows that since distant metastasis is the main cause of cancer-associated mortality after treatment of localized NSCLC, the association of pre-treatment ctDNA levels with future metastasis was also examined. Higher ctDNA concentrations were significantly associated with inferior freedom from distant metastasis in both univariable and multivariable analysis.

Figure 38:
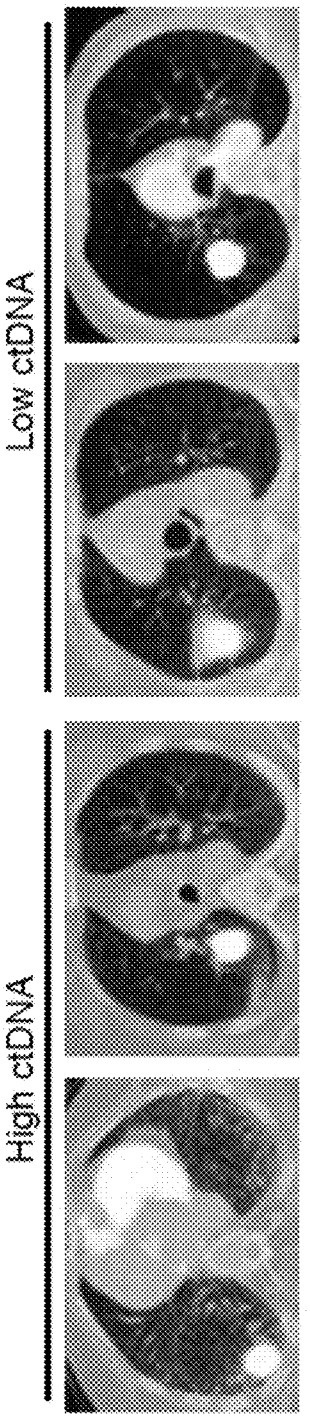

FIG. 38 shows that pre-treatment ctDNA concentration is a prognostic factor in localized NSCLC that may identify patients harboring micrometastatic disease.

Figure 39:
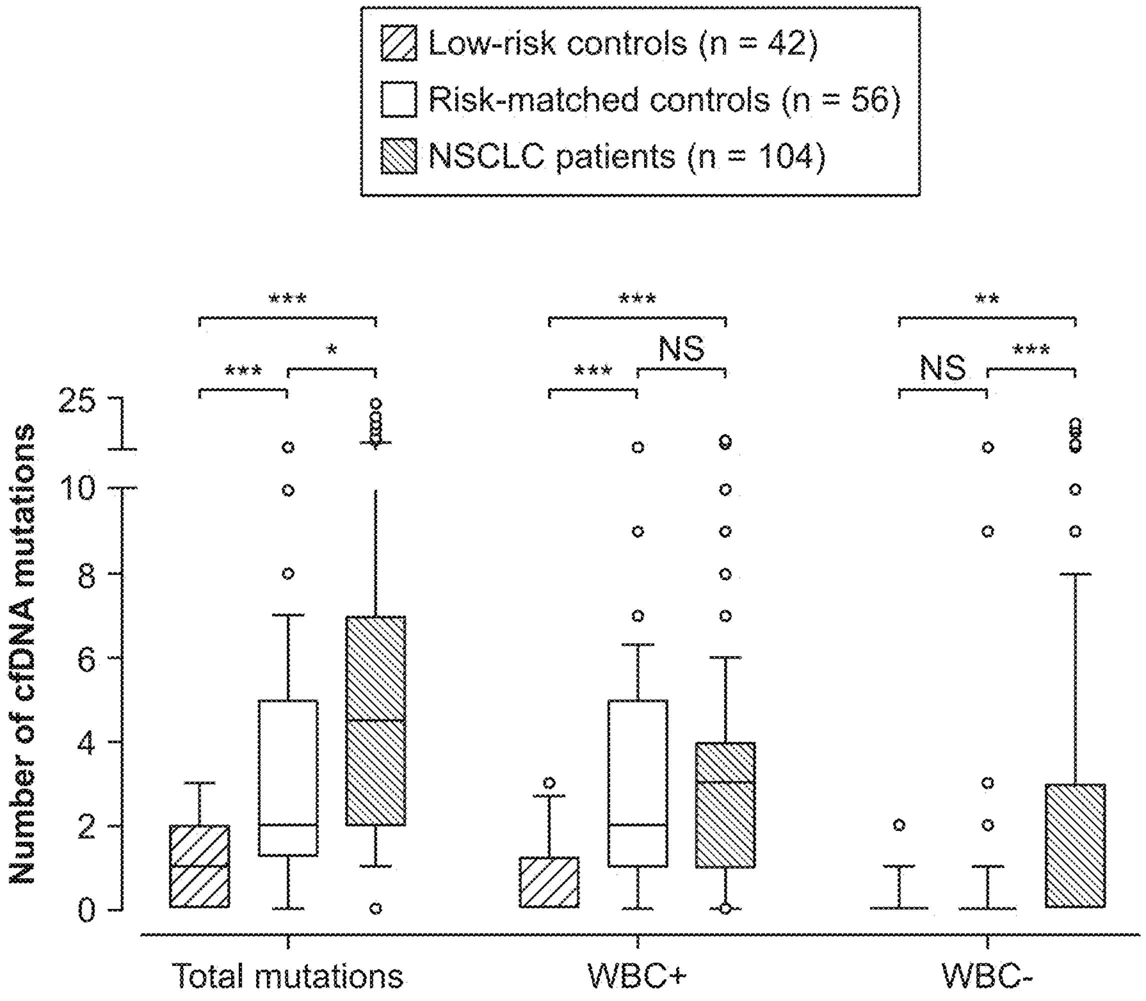

FIG. 39 shows that on average, NSCLC patients harbored significantly more non-synonymous mutations in cfDNA than both risk-matched and low-risk controls (Wilcoxon rank-sum test, P<0.01 & P<0.0001).

Figure 40:
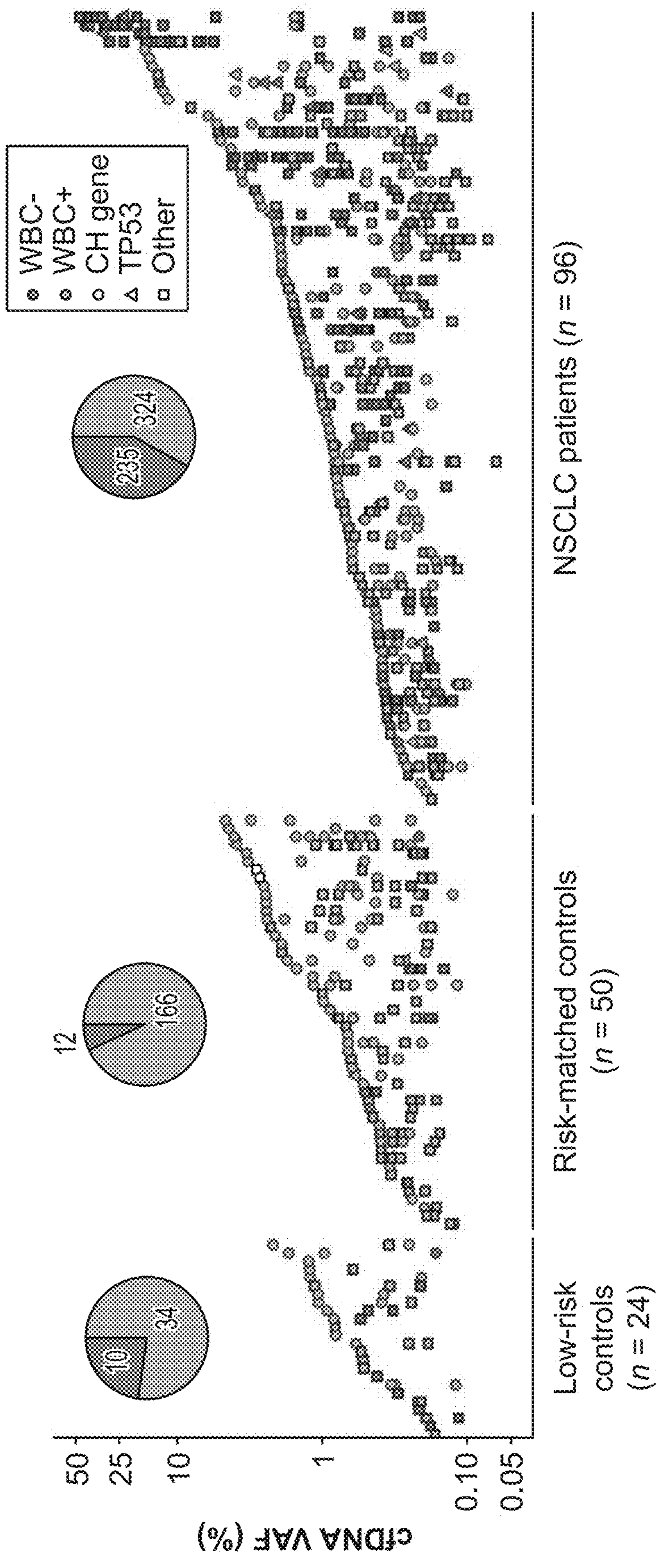

FIG. 40 shows that the mutation observed at the highest VAF in the cfDNA was also present in matched WBCs in 76% of patients and 91% of controls.

Figure 41:
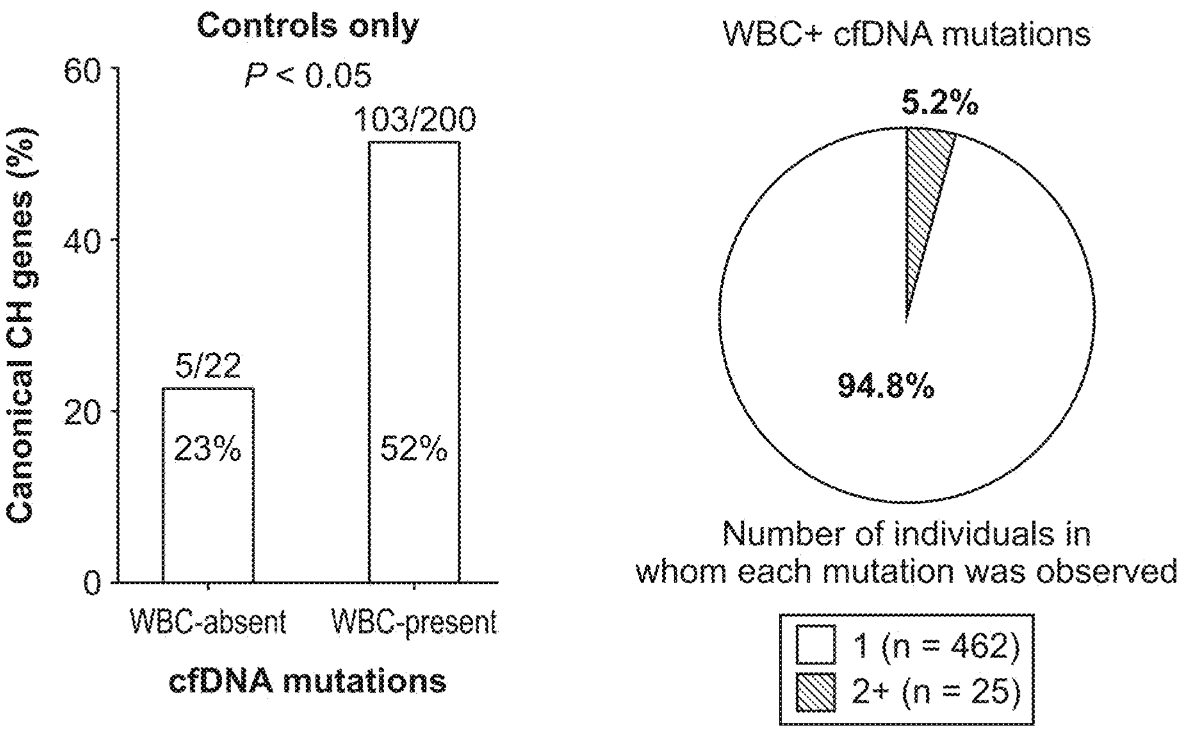

FIG. 41 shows that 48% of WBC+ cfDNA mutations were in other genes beside the 12 of the most recurrently mutated genes canonically associated with CH. Furthermore, 94.8% of WBC+ cfDNA mutations were private, highlighting the importance of genotyping matched leukocytes to reliably determine whether cfDNA mutations are CH-derived.

Figure 42:
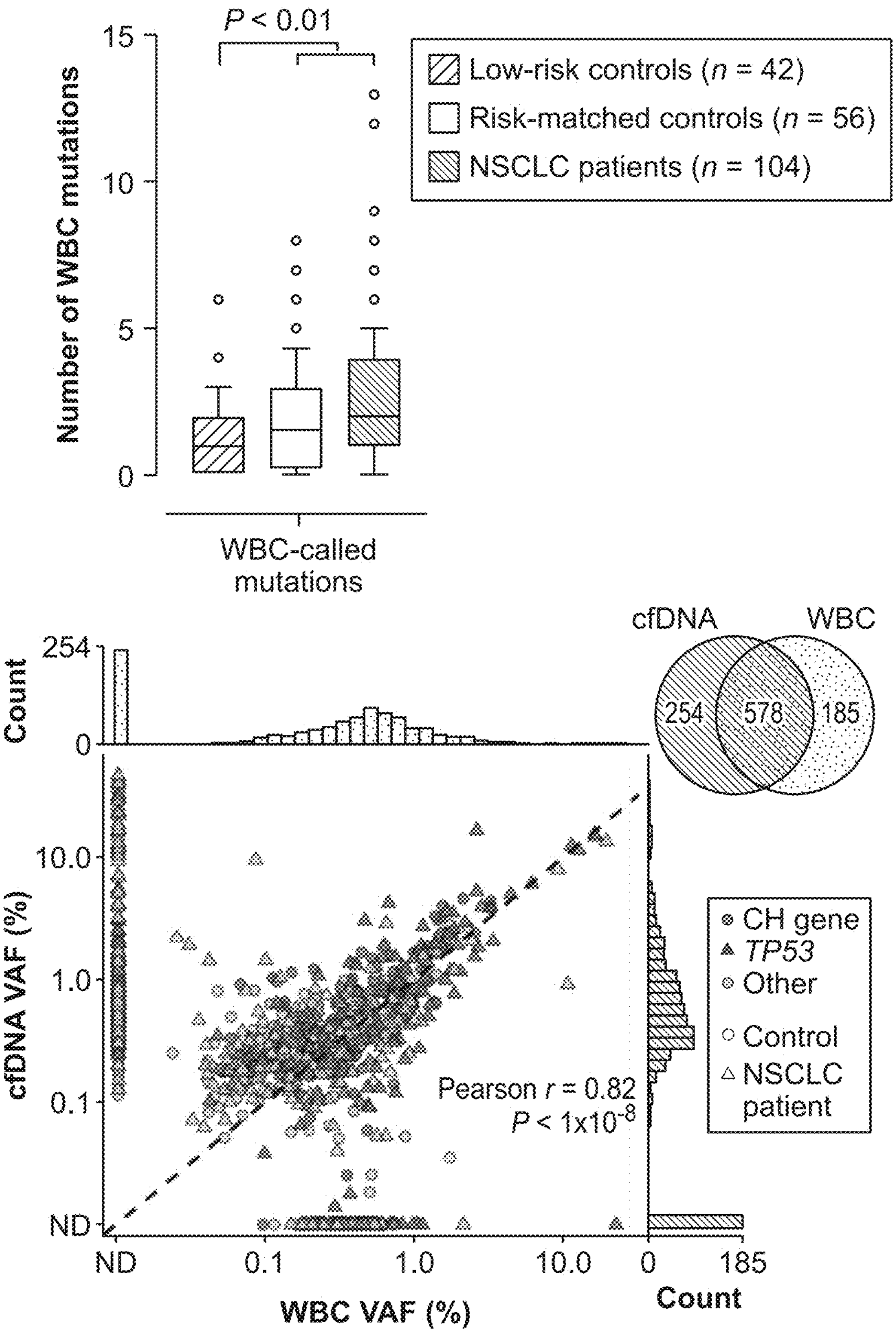

FIG. 42 shows that a similar rate of CH variants was observed in NSCLC patients and controls, whether identifying mutations directly from WBCs or from cfDNA. The allelic fractions of mutations observed in both cellular and cell-free compartments were significantly correlated (Pearson r=0.83, $P<1\times10^{-8}$).

Figure 43:
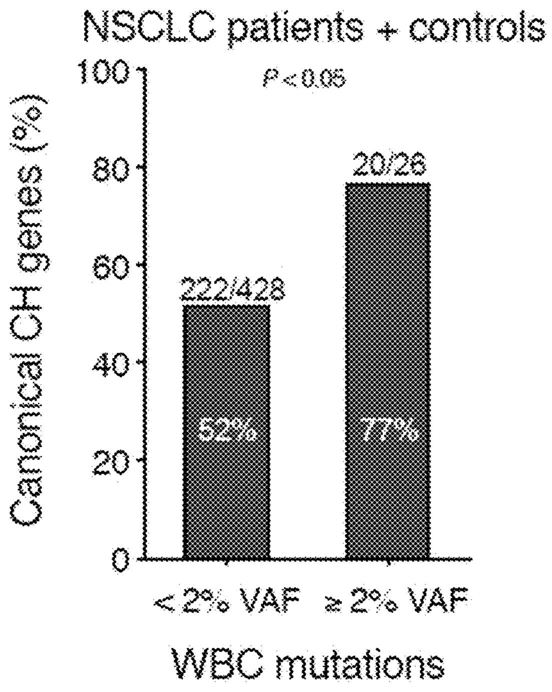

FIG. 43 shows that unlike the tendency of most CH variants to be private and to have low allelic fractions across our cohorts, 77% (20/26) of variants in WBCs occurring at ≥2% VAF affected canonical CH genes, with DNMT3A, TET2 and TP53 most commonly affected.

Figure 44:
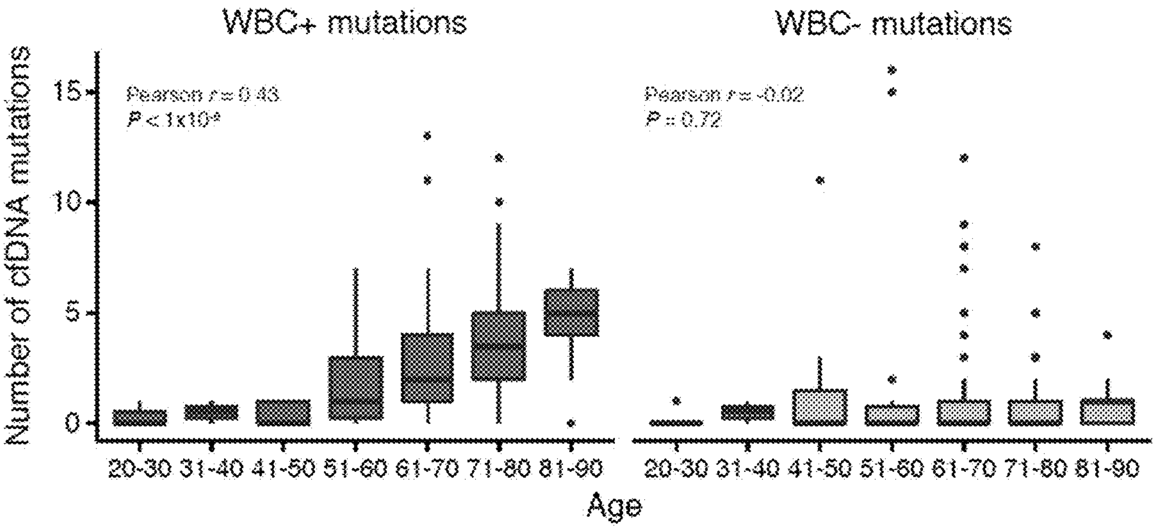
Figure 45:
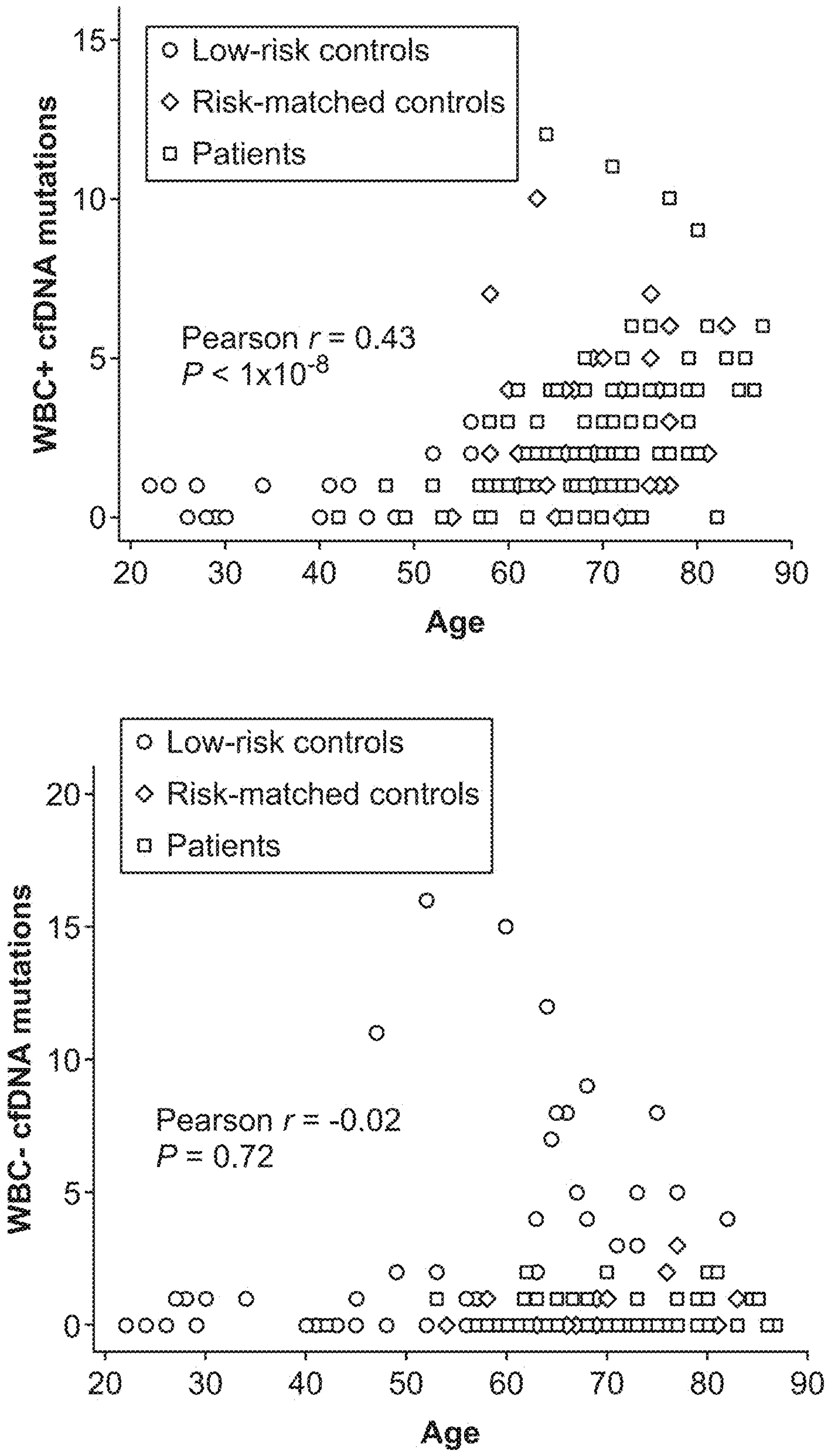

FIGS. 44-45 show that since CHIP incidence is known to increase with age, the number of WBC+ cfDNA mutations associated with age was examined. The number of WBC+ cfDNA mutations, but not WBC− cfDNA mutations, was significantly correlated with age (Pearson r=0.43, $P<1\times10^{-8}$).

FIG. 46 shows that, consistent with the concept that these mutations constitute CH events, genes most frequently containing WBC+ mutations were canonical CH genes, including DNMT3A, TET2, TP53, SF3B1 and PPM1D.

Figure 47:
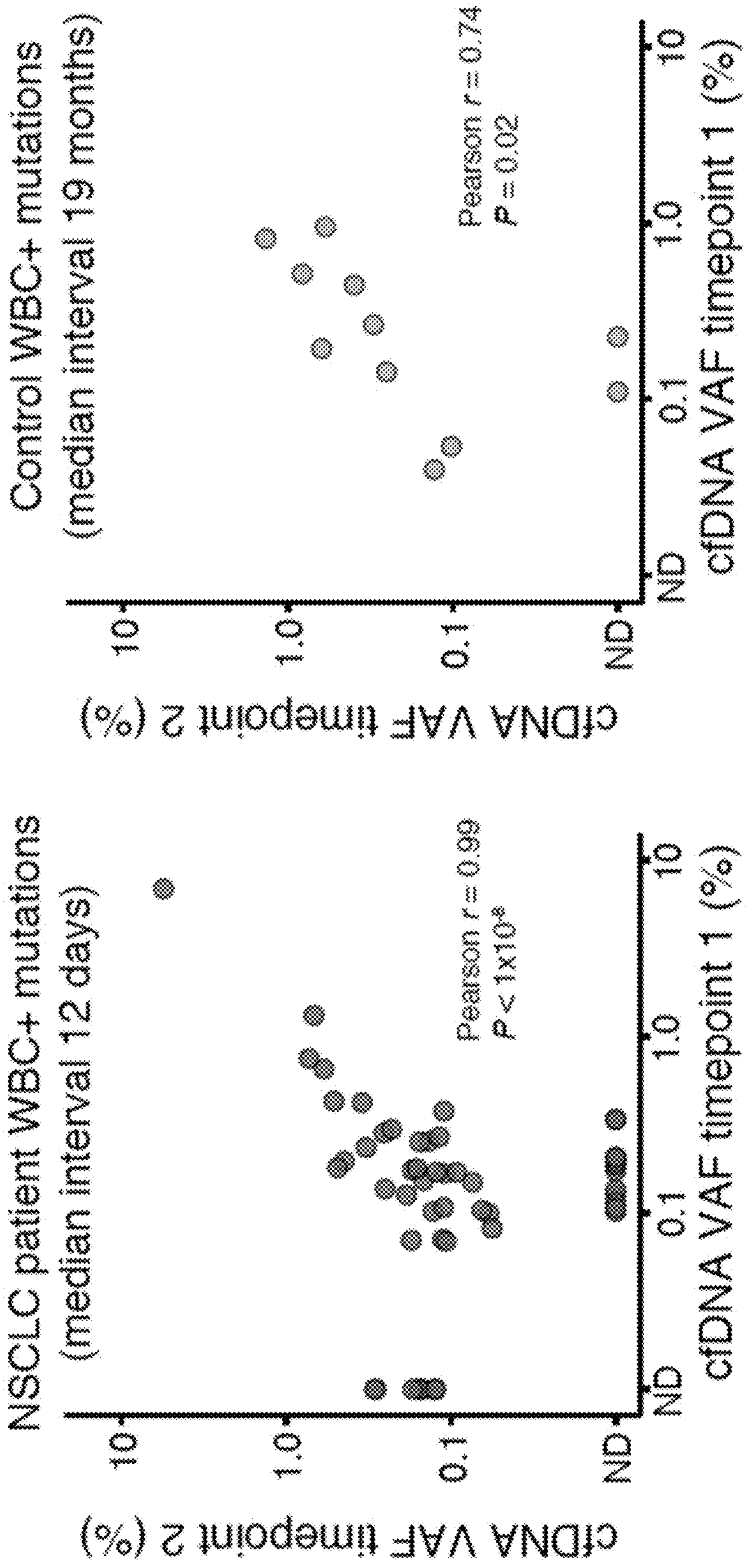

FIG. 47 shows that to examine temporal changes in WBC+ cfDNA mutations, the subset of the cohort that had plasma samples extracted at two time points were considered (8 NSCLC patients, median interval between blood draws=12 days; 5 risk-matched controls, median interval=19 months). Among WBC+ cfDNA mutations detected at the first blood collection time point, 73% (41/56) were also detected at the second time point and had highly correlated VAFs (Pearson r=0.99, P<0.0001 for patients; Pearson r=0.74, P=0.02 for controls).

Figure 48:
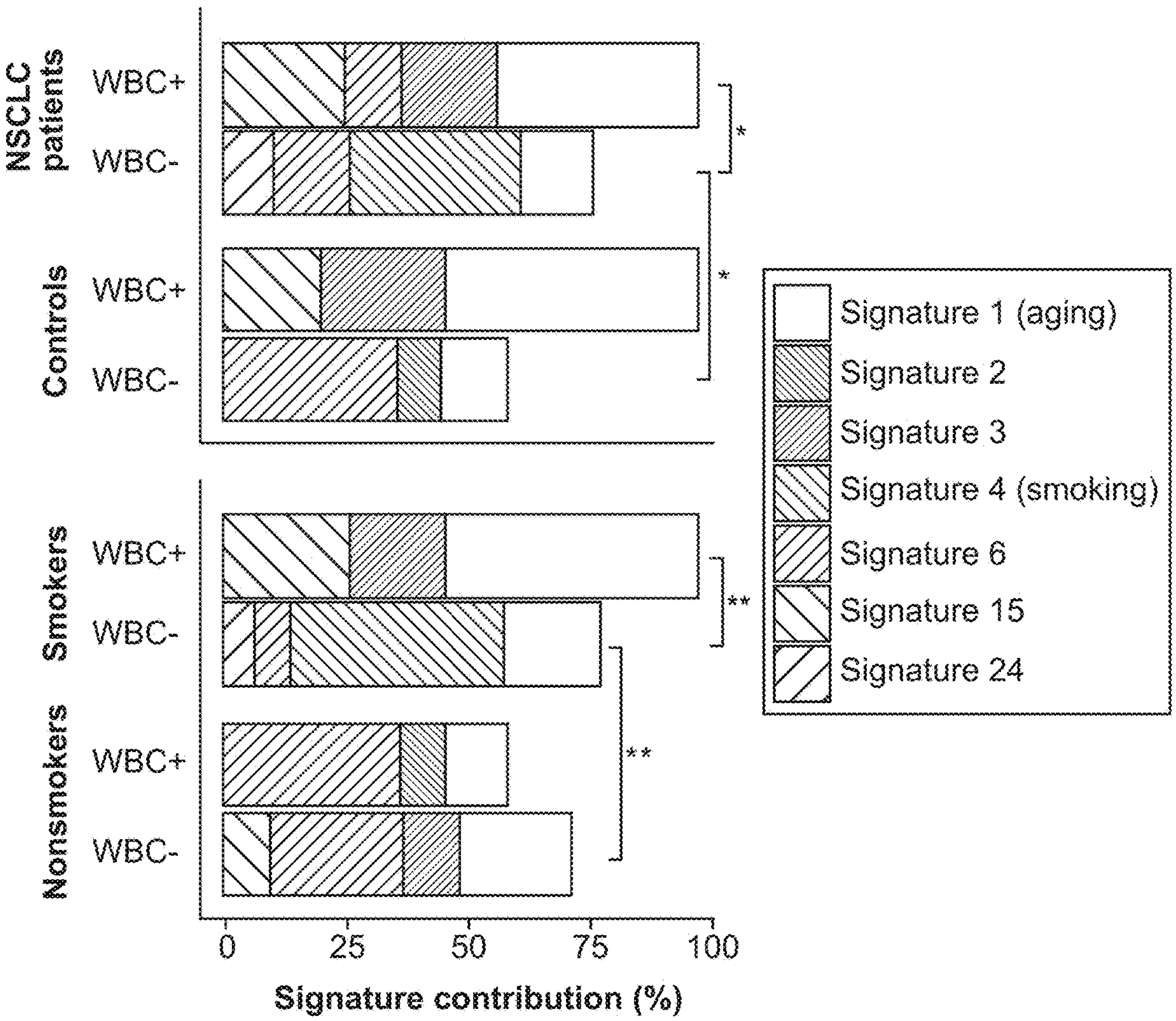
Figure 49:
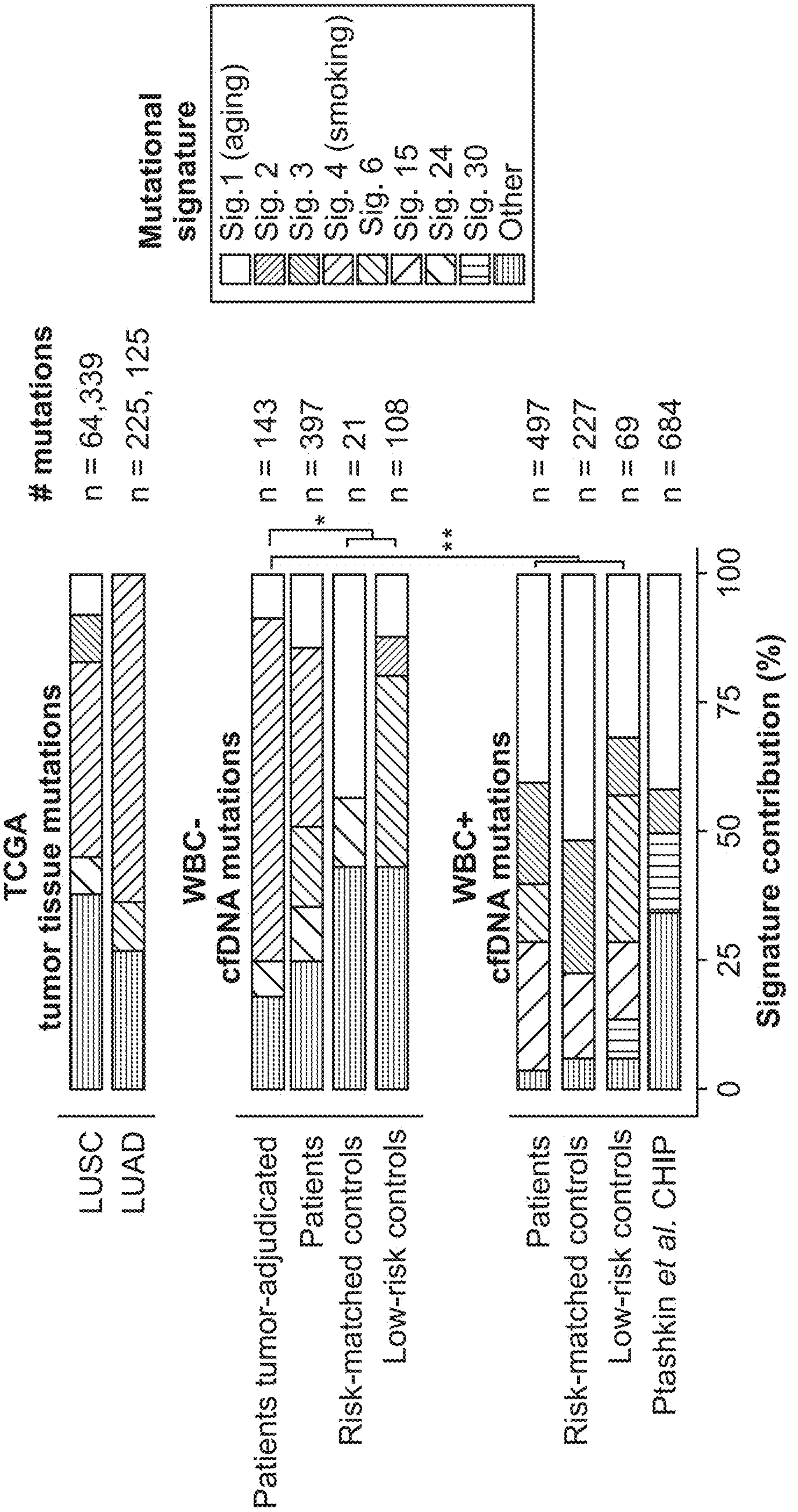

FIGS. 48-49 show that to identify properties of CH mutations that may be useful for distinguishing them from tumor-derived mutations, the mutational signatures of WBC+ and WBC− cfDNA mutations were compared and contrasted, as well as to previously published mutation datasets from the CH and lung cancer literature. WBC+ mutations detected in cfDNA across cases and controls were dominated by the aging-associated mutational signature (Signature 1).

Figure 50:
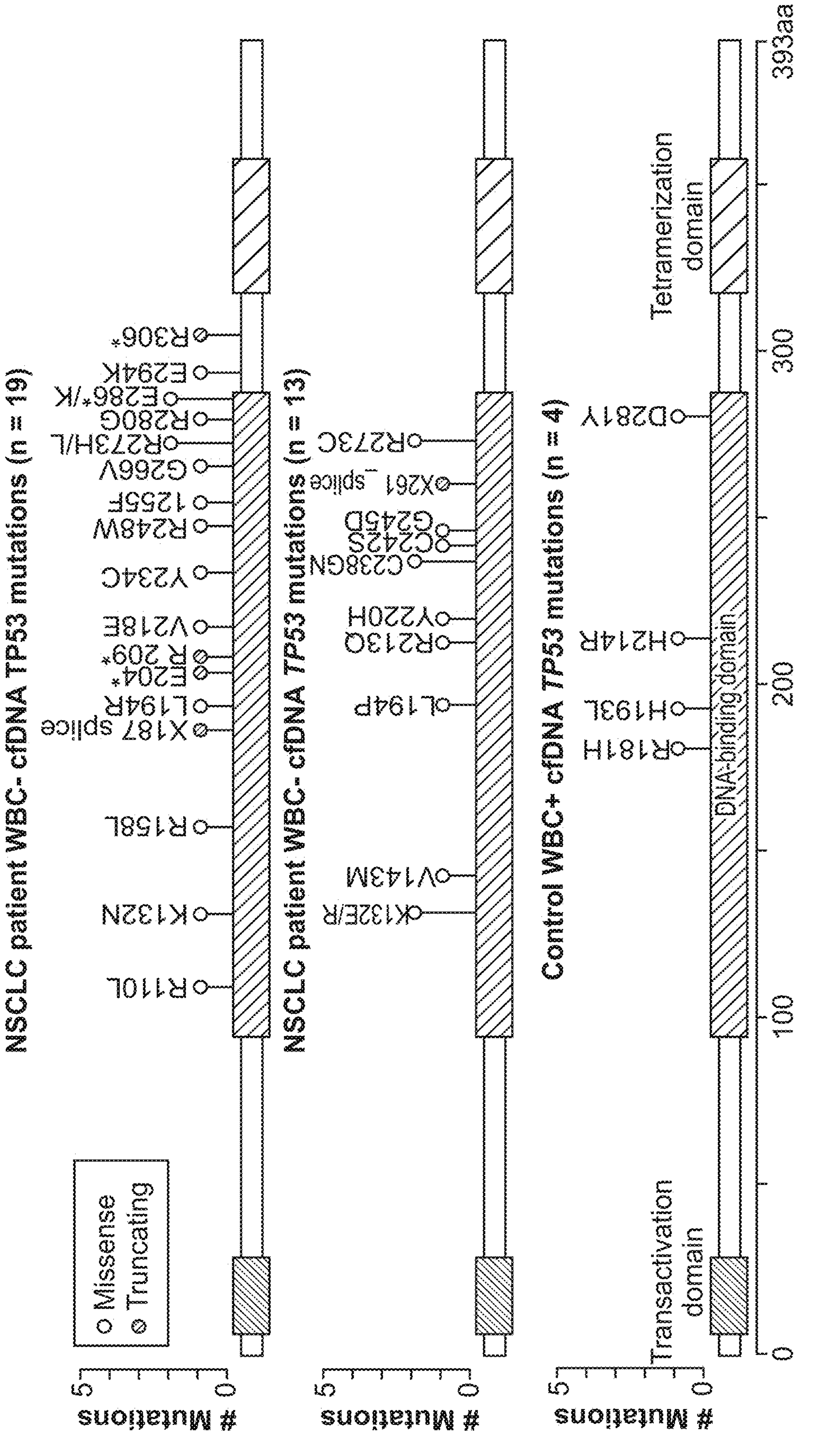

FIG. 50 shows that the distribution of WBC+ and WBC− cfDNA mutations was similar across the TP53 protein, with both classes of mutations primarily affecting its DNA-binding domain.

Figure 51:
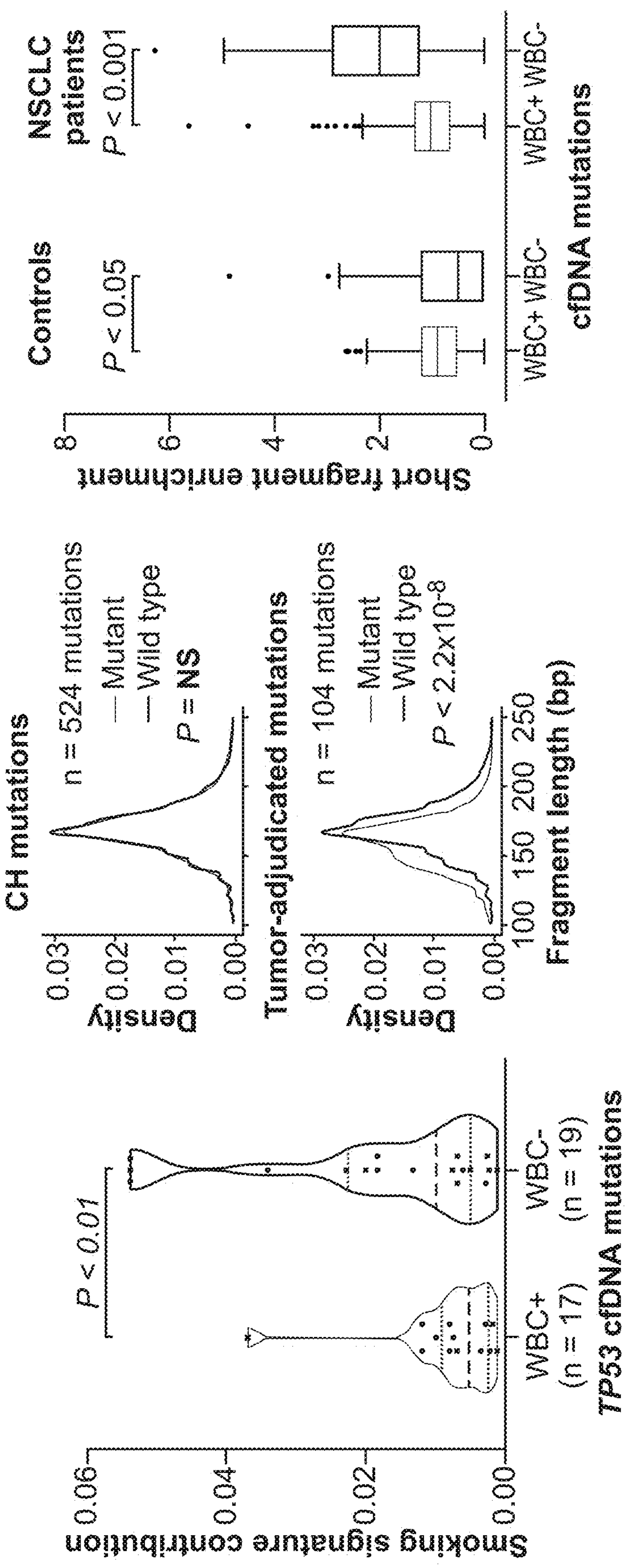

FIG. 51 shows that consistent with the results of the global signature analysis, WBC− TP53 cfDNA mutations displayed significantly stronger evidence of the smoking signature than their WBC+ counterparts (Wilcoxon rank-sum test, P<0.01).

Figure 52:
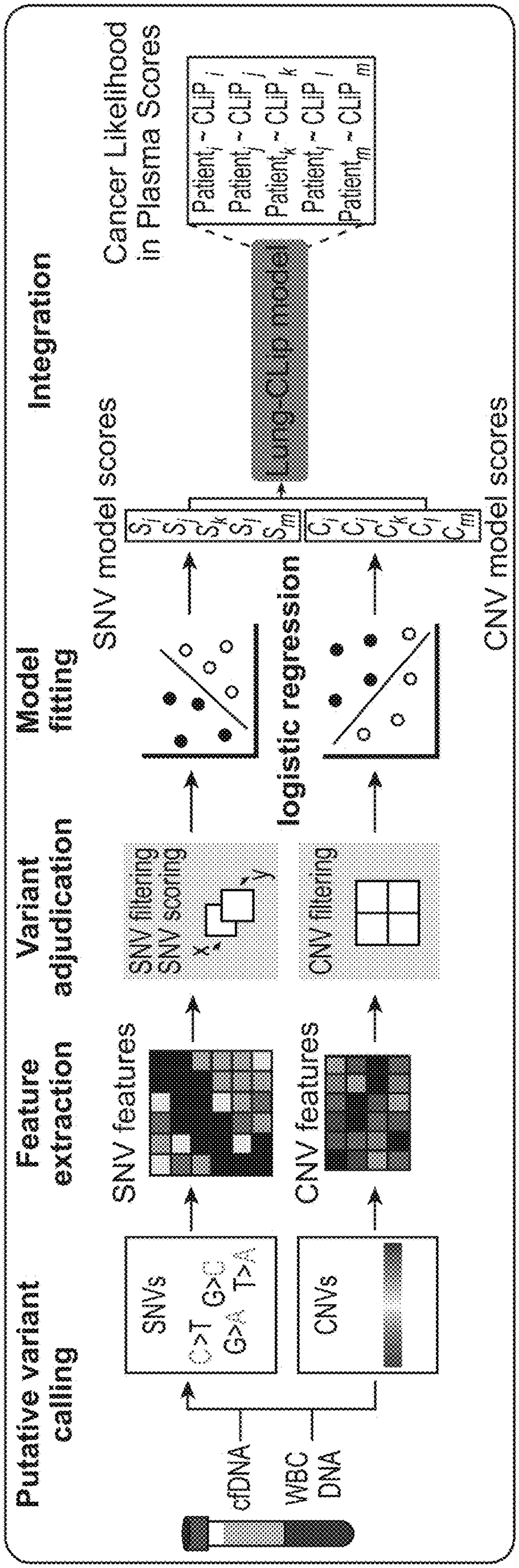

FIG. 52 shows that the SNV model leverages key biological and technical features specific to each individual variant including background frequencies, cfDNA fragment size, smoking signature contribution, presence in a gene frequently mutated in NSCLC, and CH likelihood.

Figure 53:
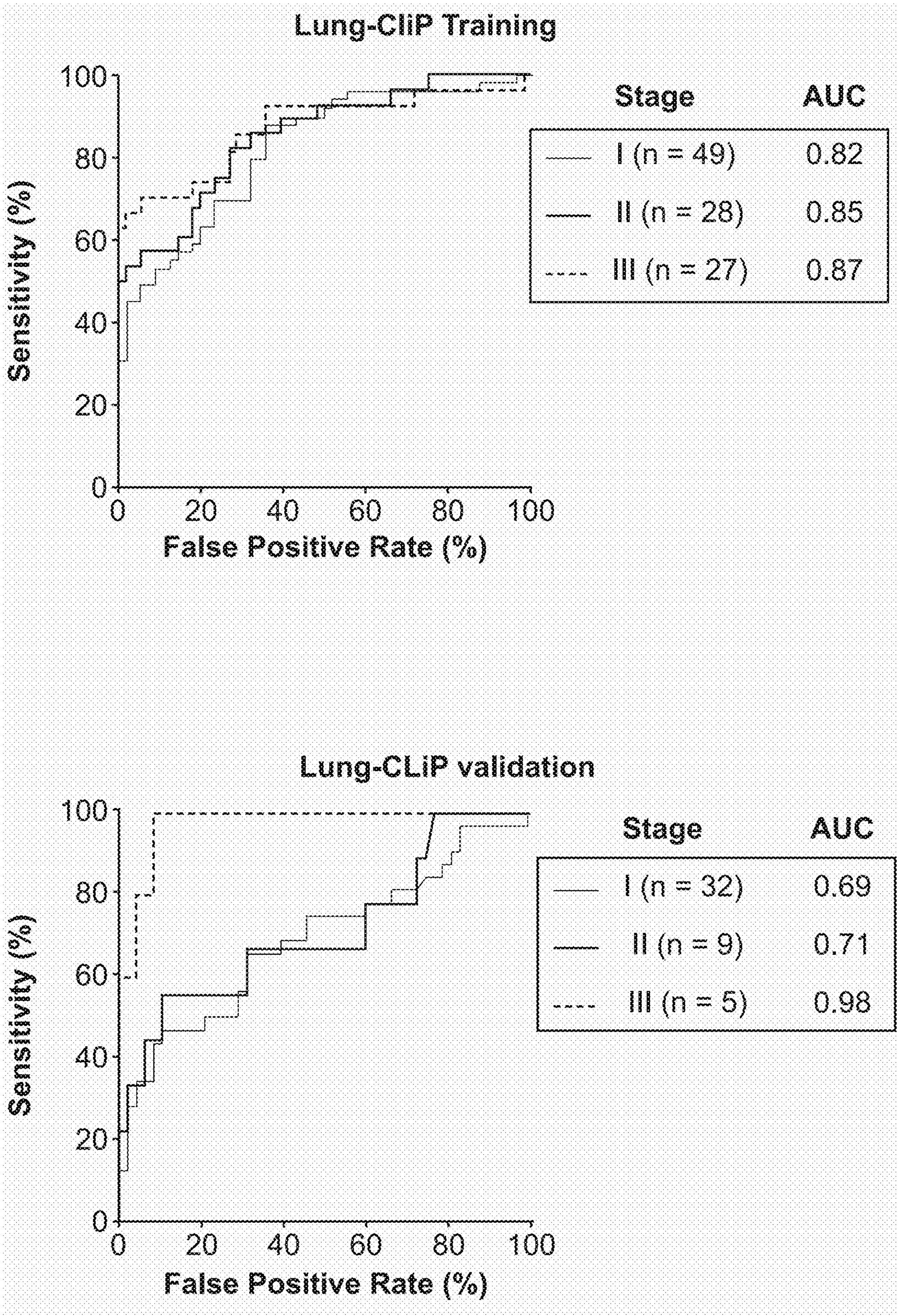

FIG. 53 shows that receiver-operator characteristic curve shapes revealed that Lung-CLiP can easily be tuned to desirable specificities depending on the target clinical application.

Figure 54:
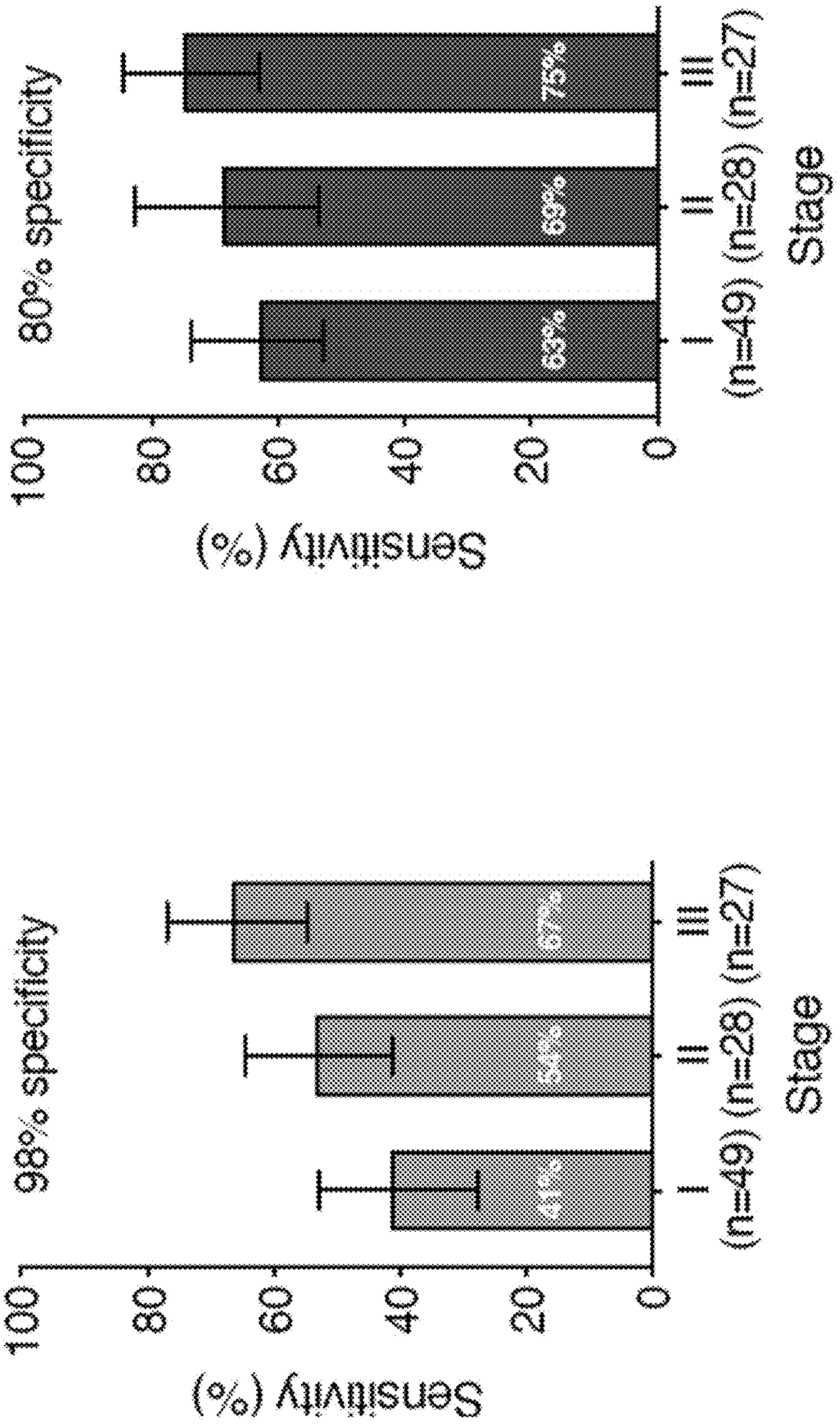

FIG. 54 shows that at 80% specificity, sensitivities of 63% in stage I, 69% in stage II, and 75% in stage III patients were observed; further, at 98% specificity, sensitivities of 41% in stage 1, 54% in stage II, and 67% in stage III patients were observed.

Figure 55:
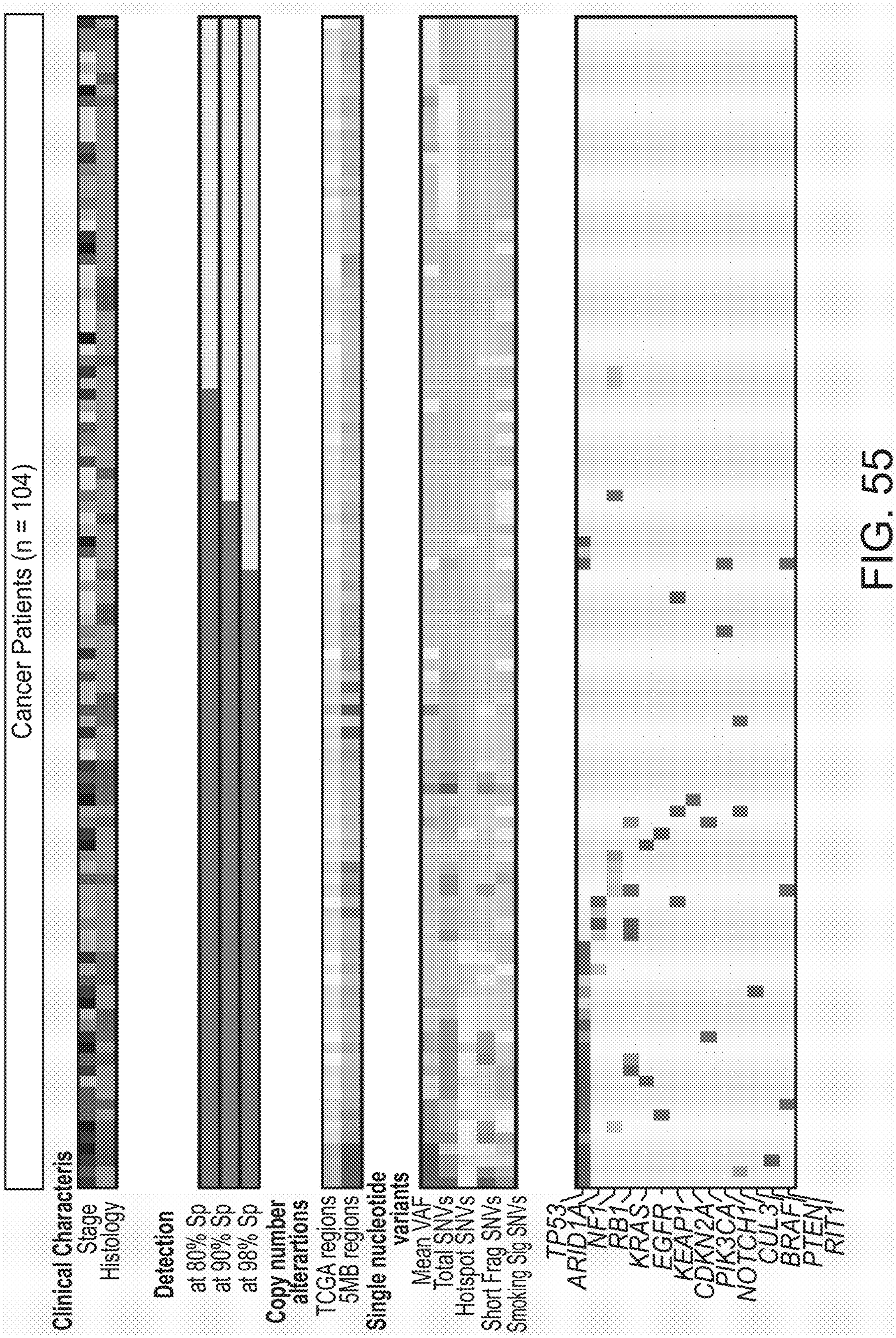
Figure 55:
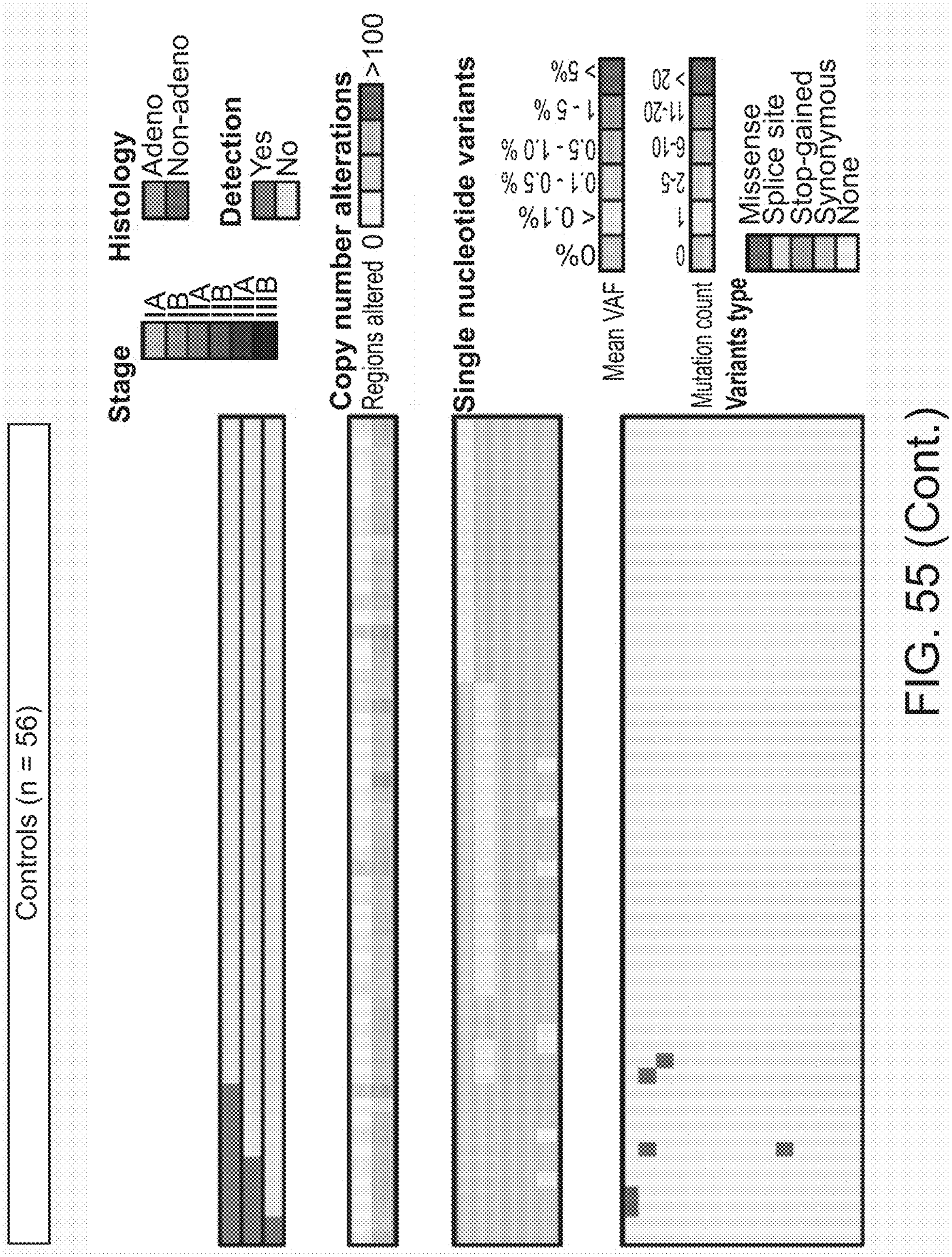

FIG. 55 shows that genes in which mutations were recurrently identified in patient cfDNA included expected NSCLC drivers such as TP53, KRAS, and EGFR. Classifier features with the strongest impact on patient classification included SNV VAF levels, cfDNA fragment size, number of SNVs detected, number of CNVs detected, and whether alterations were previously observed in lung cancer.

Figure 56:
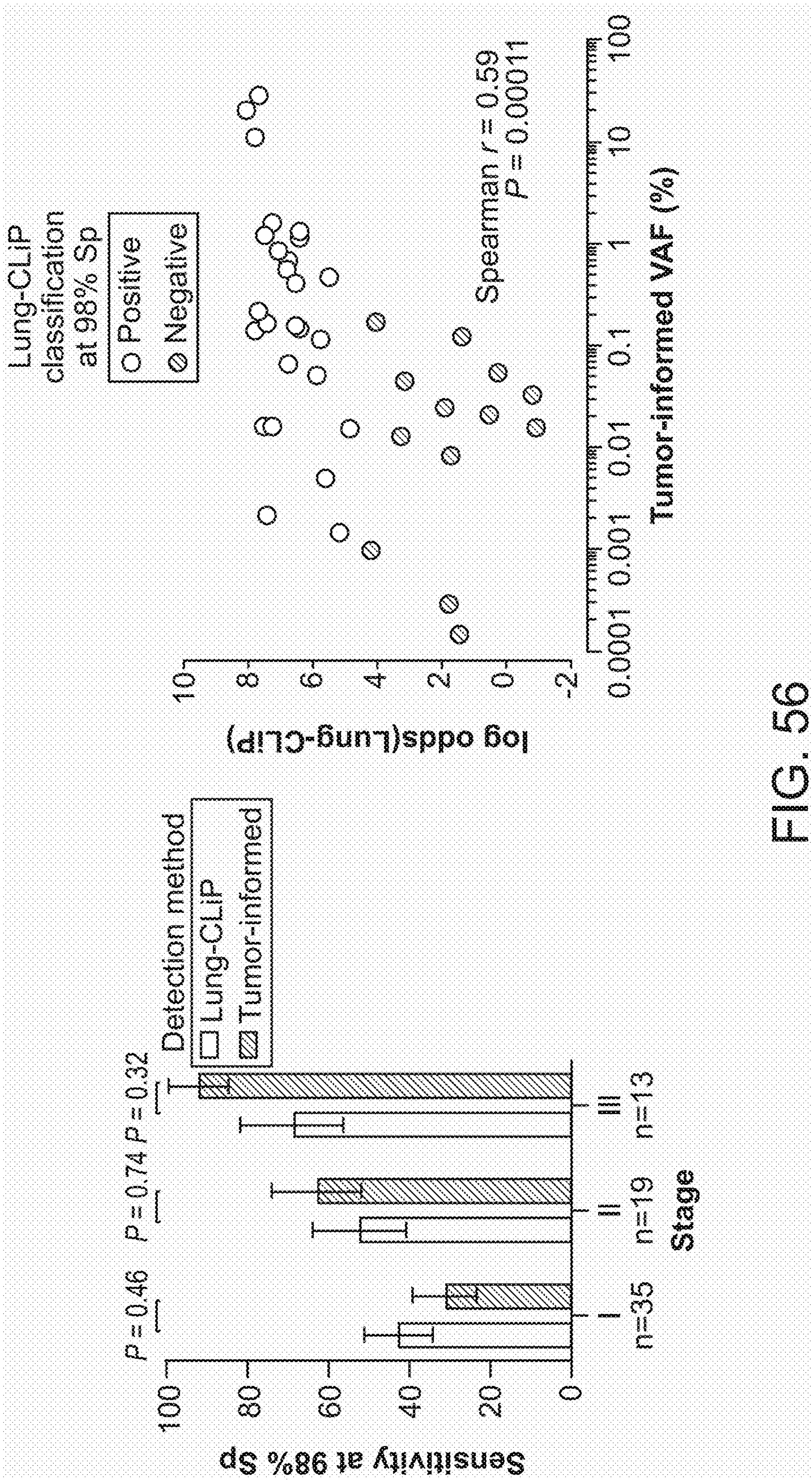

FIG. 56 shows that Lung-CLiP scores were compared to tumor-informed ctDNA levels and clinicopathological features. Importantly, sensitivities at 98% specificity were not significantly different than those observed using tumor-informed ctDNA analysis, indicating that Lung-CLiP achieves sensitivities similar to tumor-informed ctDNA detection. Furthermore, tumor-naïve Lung-CLiP scores were found to be significantly correlated with tumor-informed ctDNA levels (Spearman r=0.59, P<0.0001).

Figure 57:
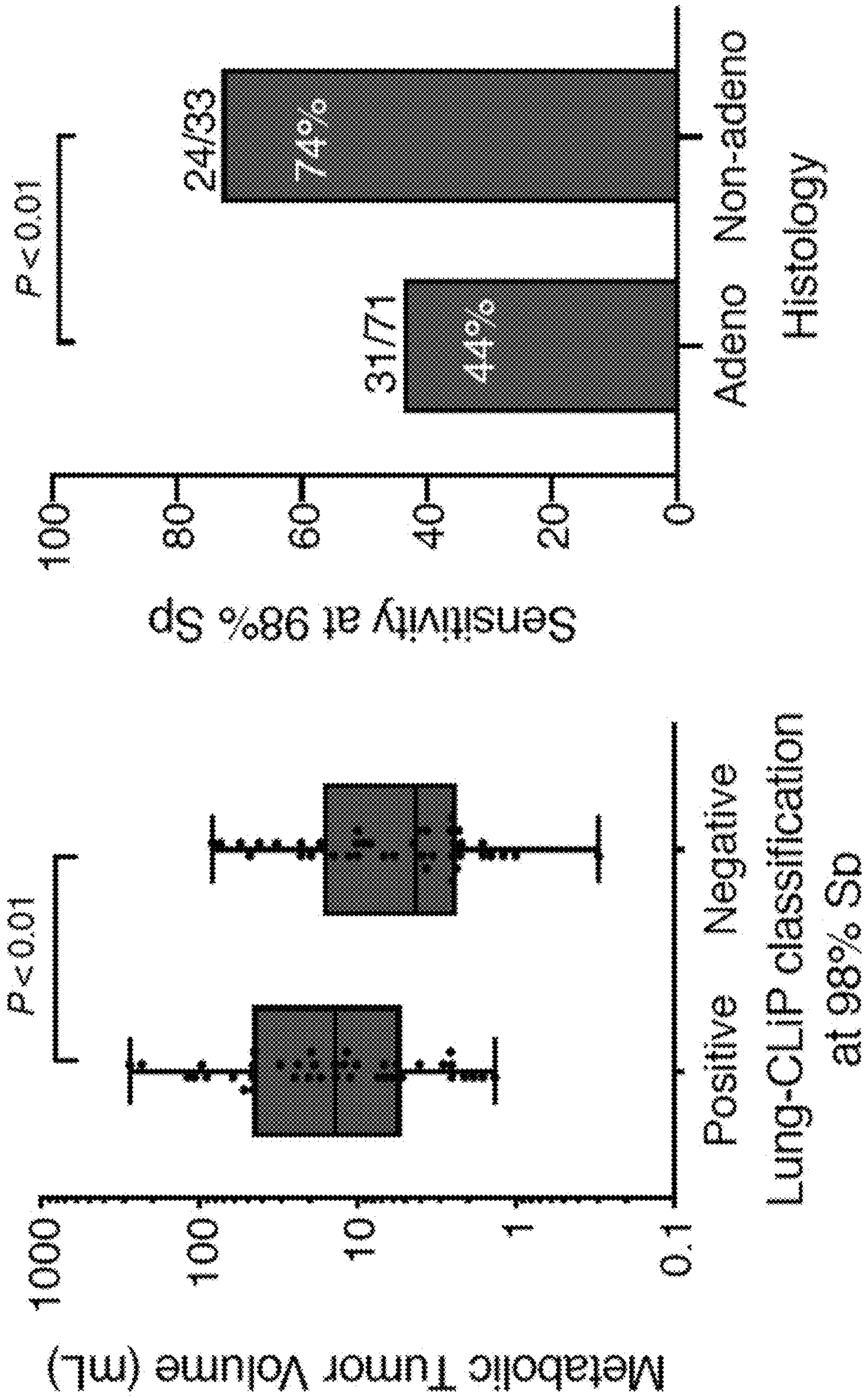

FIG. 57 shows that tumors from NSCLC patients classified as positive by Lung-CLiP were significantly larger than those classified as negative (Wilcoxon rank-sum test, P<0.01), and similarly, patients with non-adenocarcinoma histology were more frequently detected (Fisher's Exact Test, P<0.01).

Figure 58:
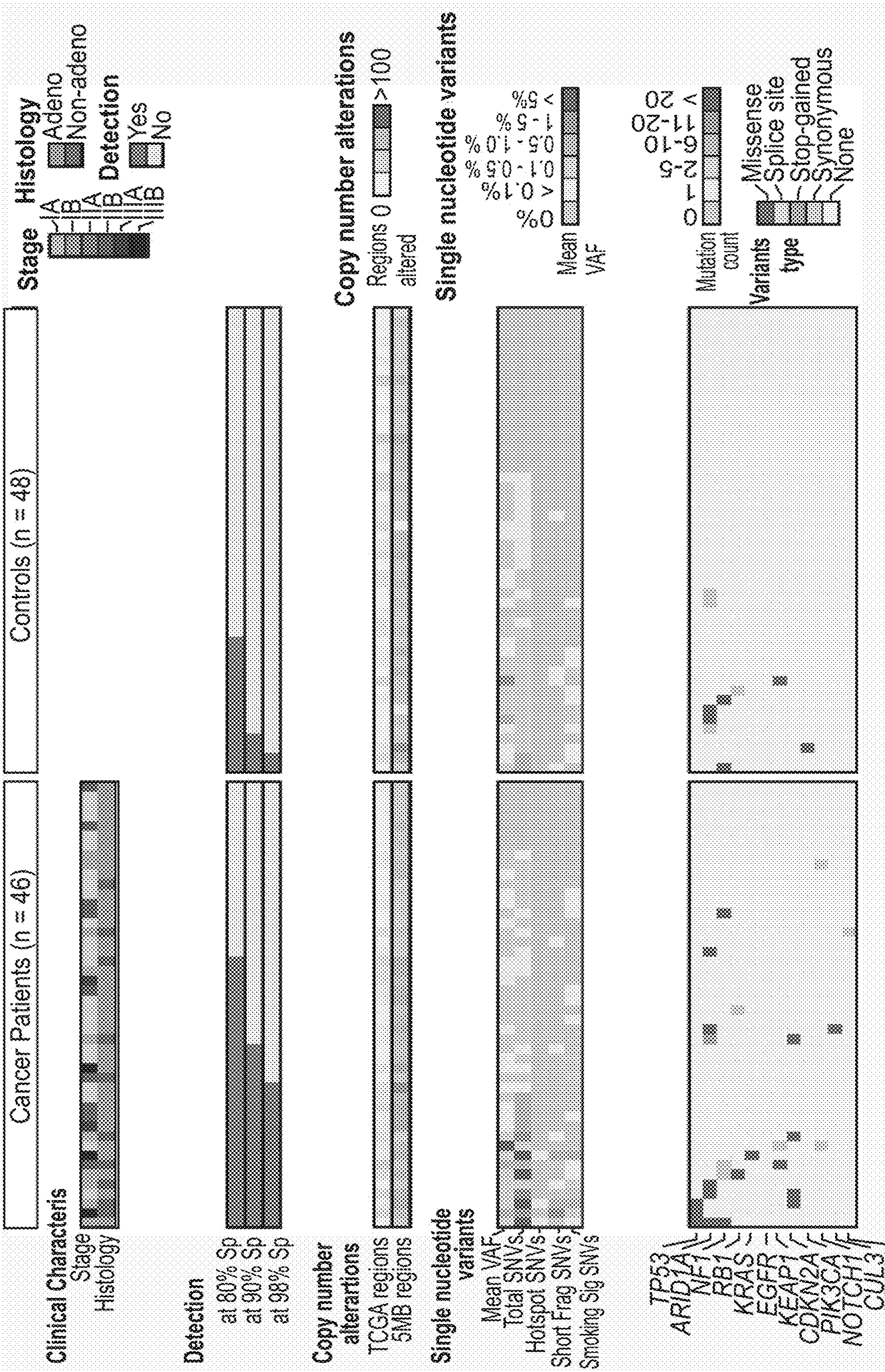

FIG. 58 shows that performance of the Lung-CLiP assay was validated in an independent cohort of 46 NSCLC patients (n=32 stage I; n=9 stage II; n=5 stage III) and 48 risk-matched controls with negative LDCT scans that were prospectively enrolled at a different institution.

Figure 59:
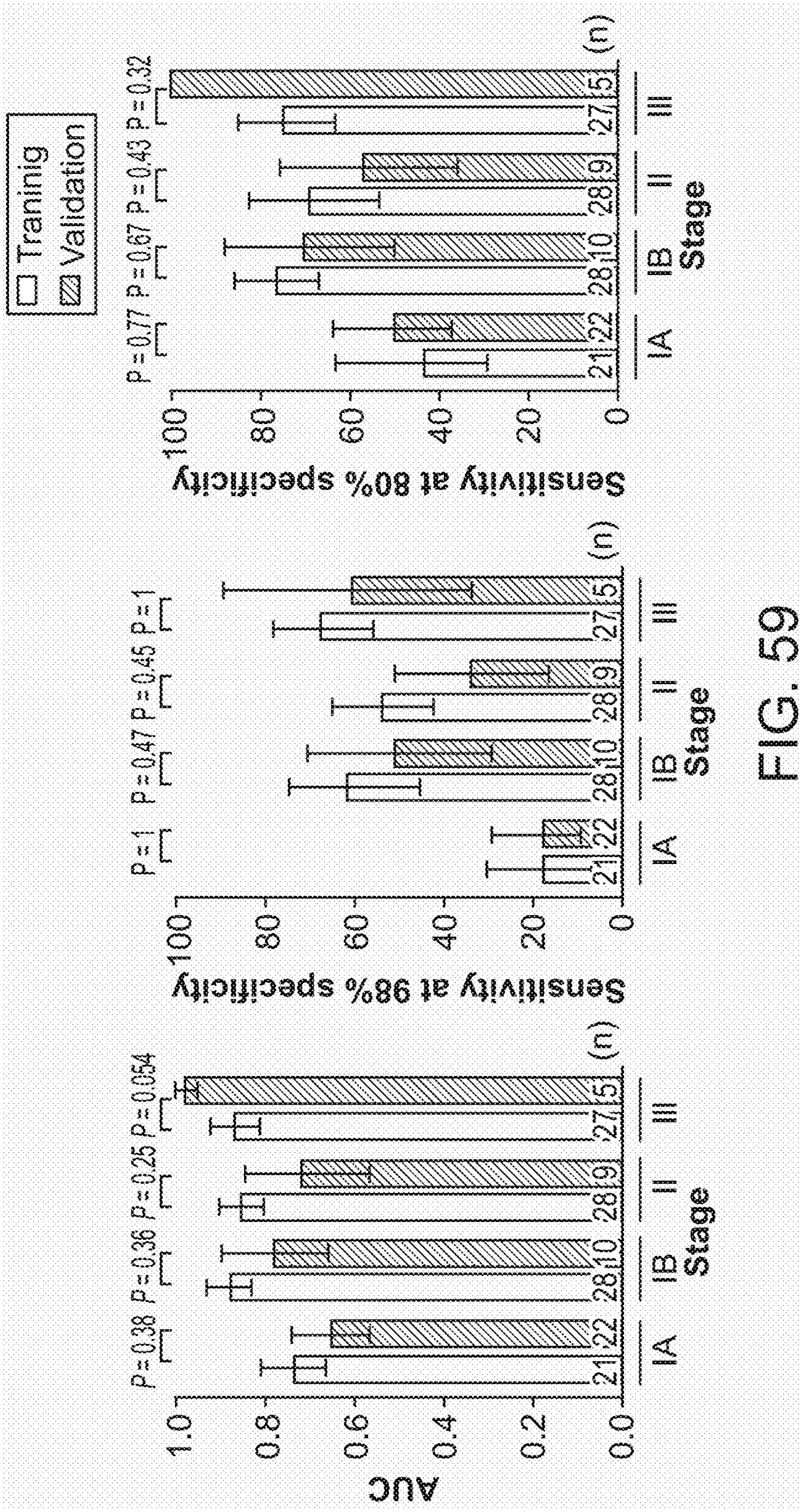

FIG. 59 shows that stage-matched performance of the model in the validation cohort was statistically similar to that observed in the training by AUC and sensitivity metrics, with numerical differences in stage I performance attributable to a larger fraction of stage IA vs. IB cases in the validation cohort.

Figure 60:
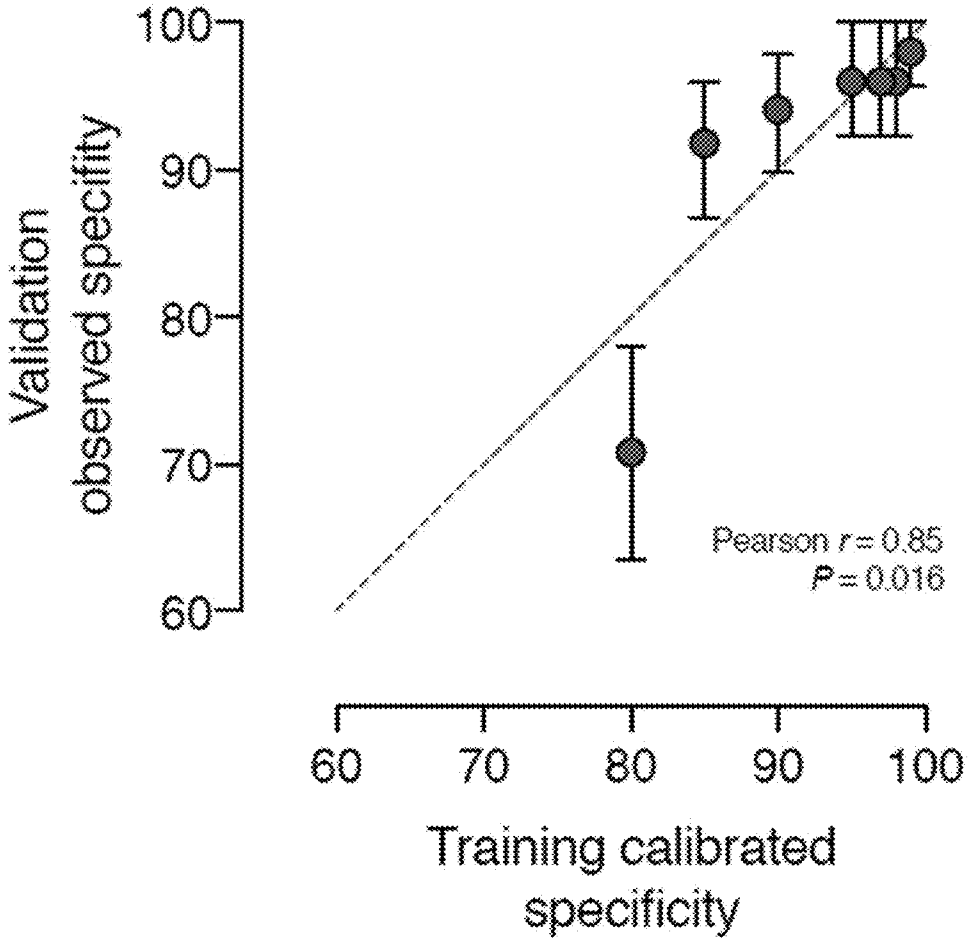

FIG. 60 shows that specificity thresholds set in the training cohort performed similarly when applied to the controls in the validation cohort, indicating that the Lung-CLiP scores are well calibrated.

Figure 61:
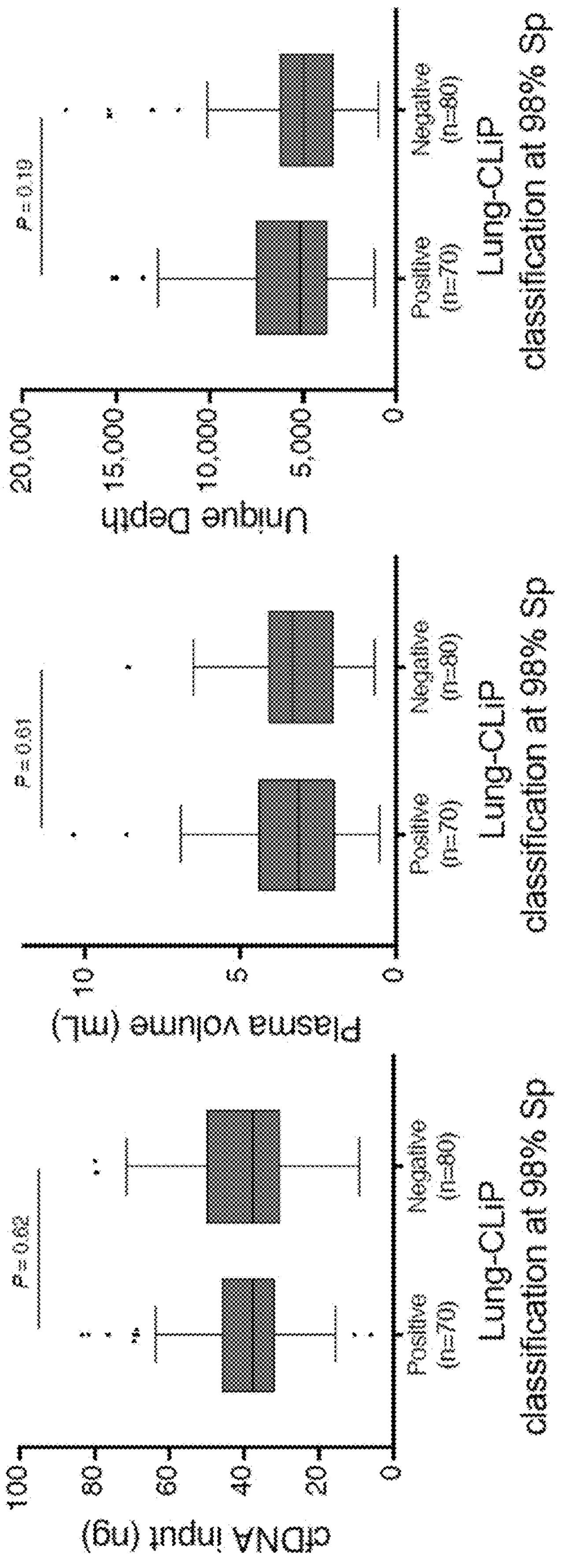

FIG. 61 shows that several exploratory analyses were performed on the combined training and validation cohorts. The influence of sequencing depth or related metrics on sensitivity was examined. It was found that cfDNA input, plasma volume input and unique sequencing depth were not significantly associated with the sensitivity of Lung-CLiP.

Figure 62:
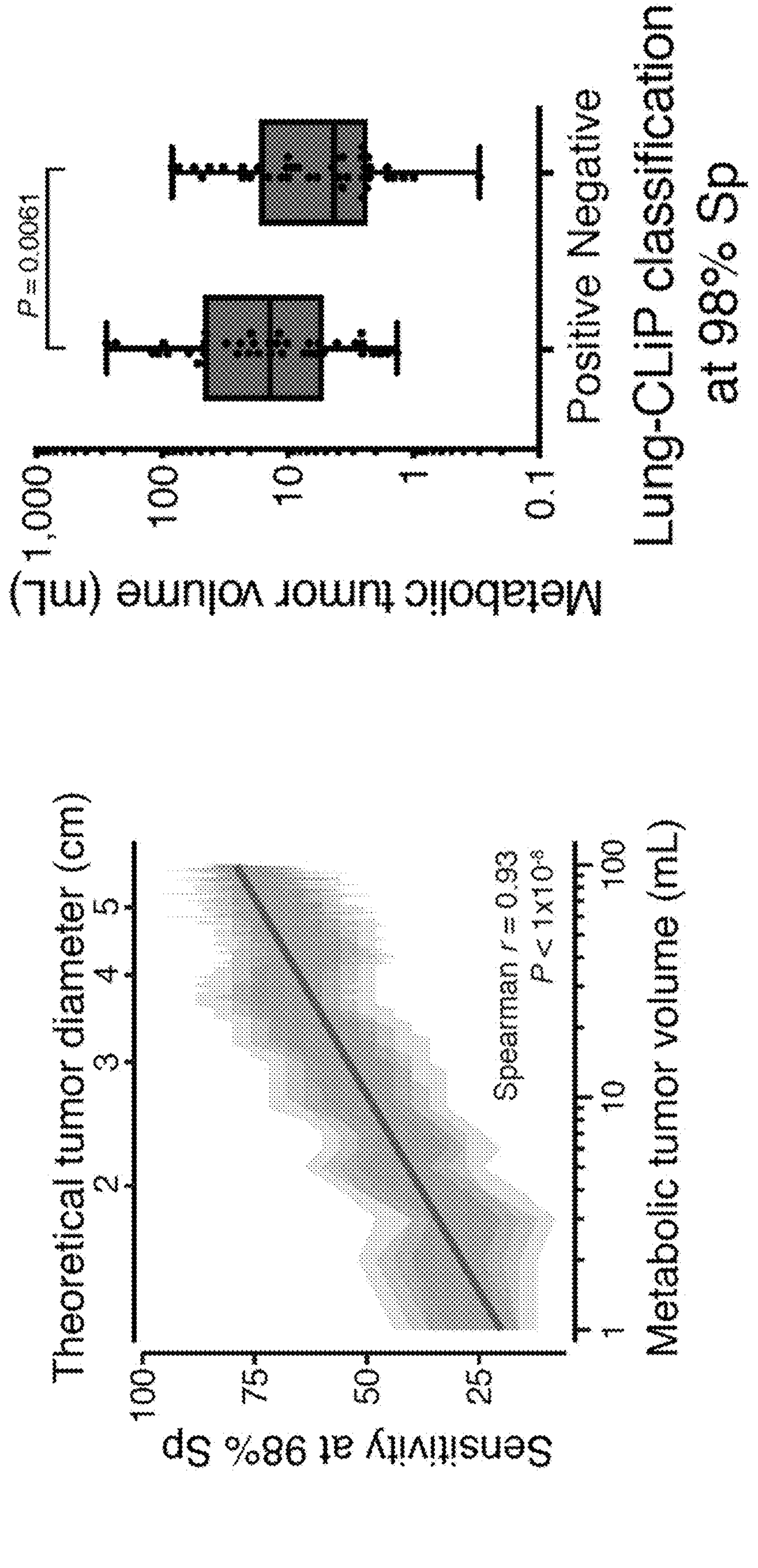

FIG. 62 shows that, considering all NSCLC patients with available MTV data (n=103), a strong correlation was observed between MTV and sensitivity of Lung-CLiP, with approximate sensitivities of 16% (95% CI: 4%-24%), 52% (95% CI: 32%-72%) and 80% (95% CI: 60%-96%) for 1 mL tumors, 10 mL tumors, and >100 mL tumors, respectively.

Figure 63:
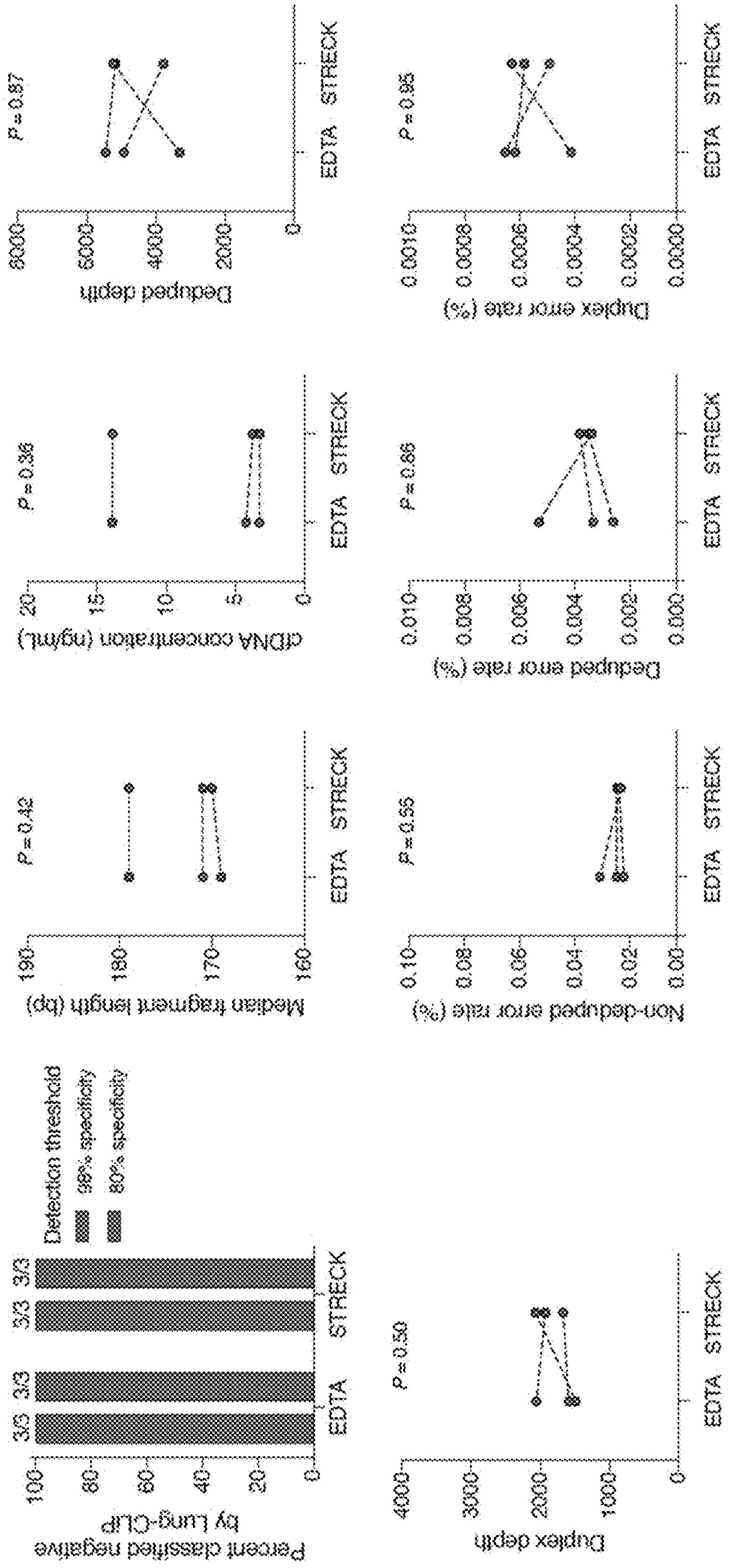
Figure 64:
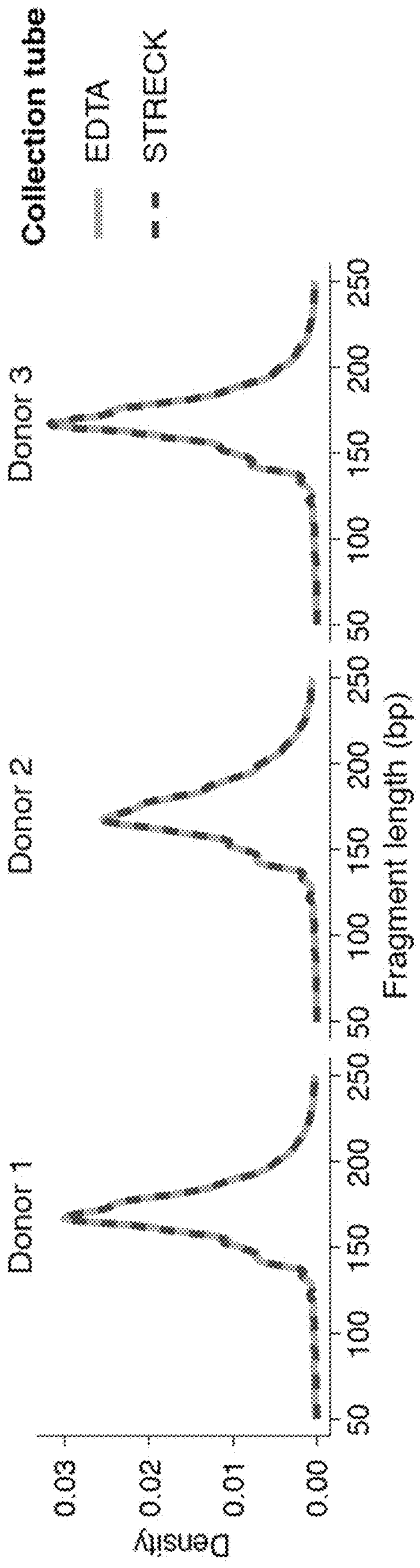
Figure 65:
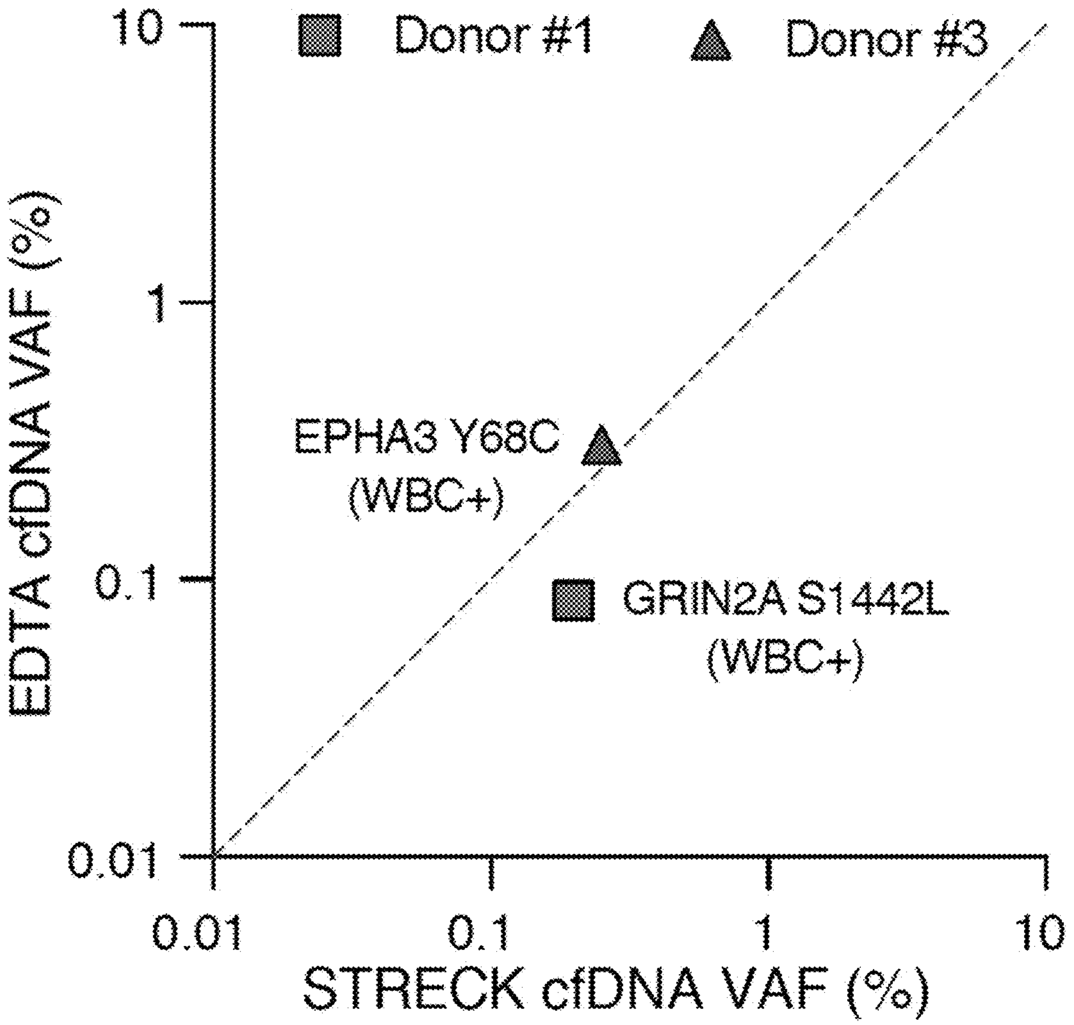

FIGS. 63-65 show that blood was drawn from each of three healthy donors into two Streck tubes and two $K_2$EDTA tubes and processed using the protocols used in our study. cfDNA extraction and library preparation were performed as described herein with 25 ng of cfDNA input for each sample. Sequencing and data processing were performed as described herein, and each sample was downsampled to 80 million reads before barcode-deduplication to facilitate comparison.

FIG. 63 shows that the Lung-CLiP model was trained on the 104 patients with NSCLC and 56 risk-matched controls in the training cohort and applied to the cfDNA samples extracted from plasma drawn into Streck and $K_2$EDTA tubes. The fraction of donors classified as negative by Lung-CLiP at the 98% (1st and 3rd bars) and 80% (2nd and 4th bars) specificity thresholds defined in the training data are depicted. Comparison of median cfDNA fragment size, cfDNA concentration in ng ml-1, deduped depth, duplex depth, and error metrics in cfDNA samples extracted from plasma drawn into the two tube types. cfDNA samples from the same donor are connected with dashed lines, comparisons were performed using a paired two-sided t-test.

FIG. 64 shows a comparison of the fragment size distribution of cfDNA samples extracted into the two tube types.

FIG. 65 shows that genotyping was performed as described herein on cfDNA samples extracted from plasma drawn into the two tube types from the three donors. Donor 1 and donor 3 each had one mutation identified in cfDNA that was present in samples extracted from plasma drawn into both tube types and was also present in matched WBCs (WBC$^+$). Donor 2 had no mutations identified in cfDNA samples extracted from plasma drawn into either tube type.

Figure 66A:
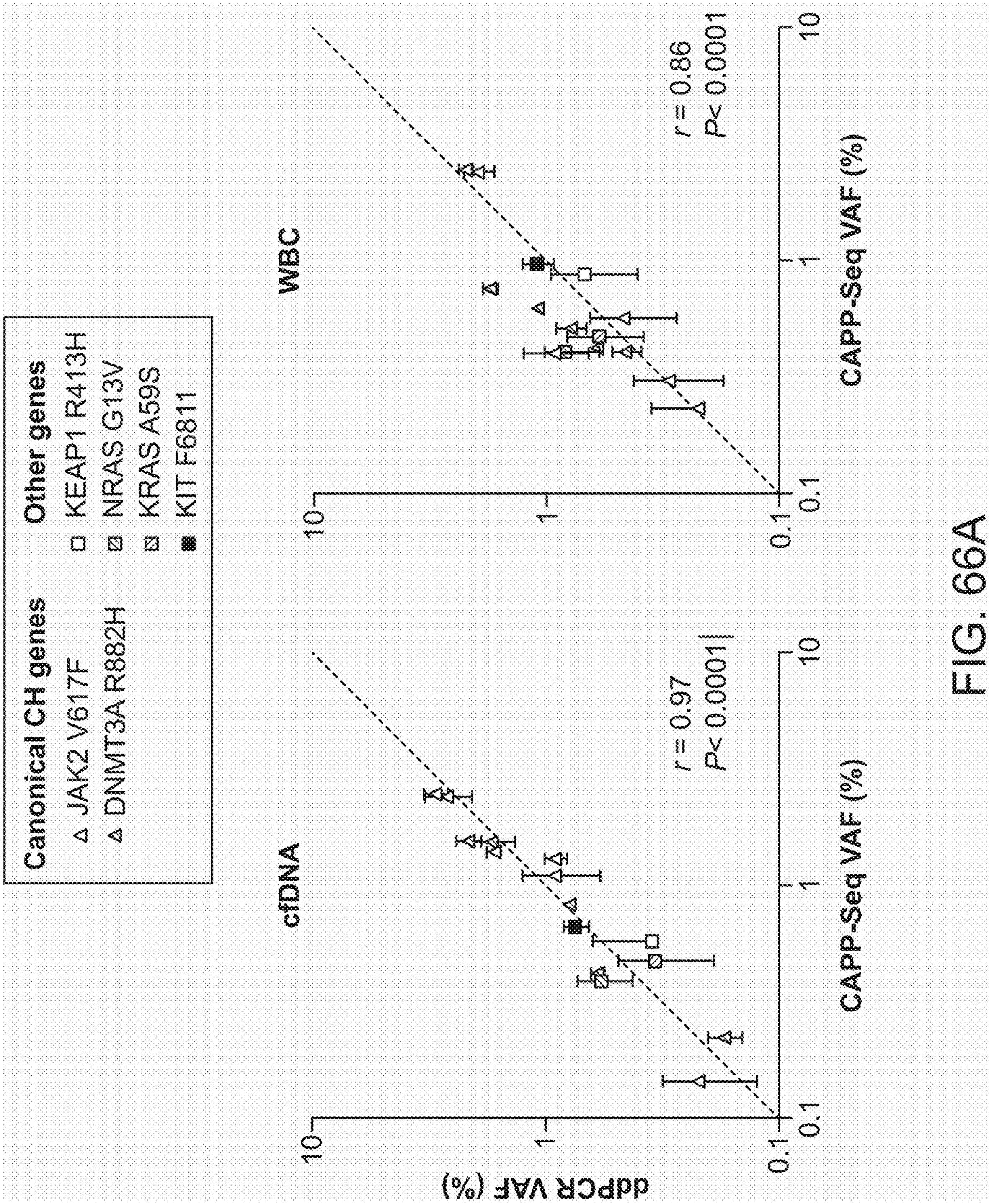

FIG. 66A shows that an orthogonal validation of 15 WBC+ cfDNA mutations observed in a subset of patients and controls was performed using droplet digital PCR (ddPCR). ddPCR was performed on a Bio-Rad QX200 instrument using reagents, primers, and probes obtained from Bio-Rad. Four private mutations were validated, as well as two recurrent hotspot mutations in DNMT3A and JAK2 that were observed in 11 cfDNA samples. It was found that 100% (15/15) of the mutations tested validated by ddPCR in both the cfDNA and WBC gDNA compartments and that VAFs quantified by CAPP-Seq and ddPCR were significantly correlated.

Figure 66B:
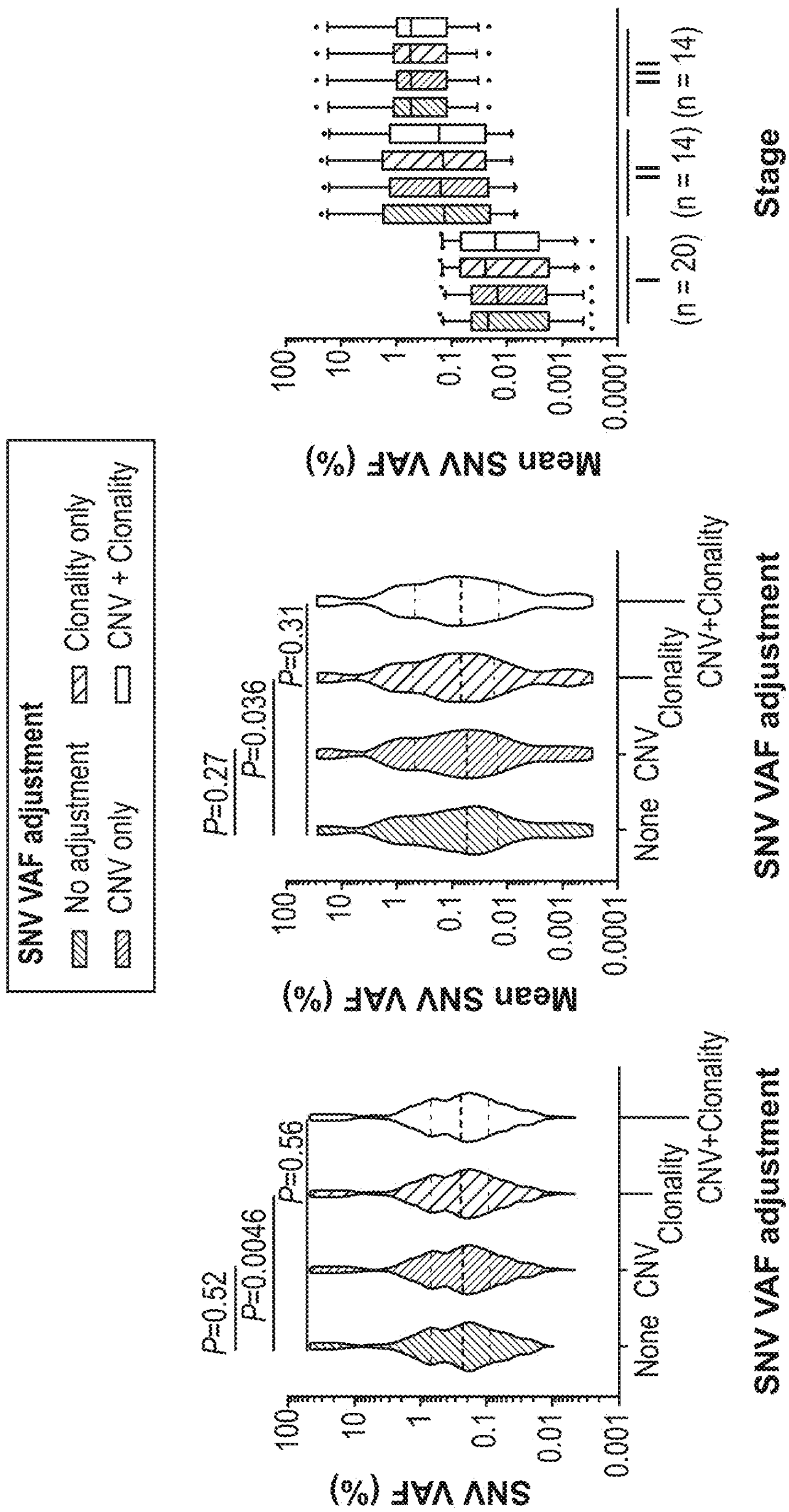

FIG. 66B shows (left) VAFs of individual mutations (n=323) observed in cfDNA with different SNV VAF adjustment strategies. Comparisons were performed using a paired two-sided t-test; (middle) The mean cfDNA VAF across all tracked mutations tracked in patients with detectable ctDNA (n=48) with the different adjustment strategies. Comparisons were performed using a paired two-sided t-test; and (right) The same data as in m separated by stage. In box plots, the center line denotes the median, the box contains the interquartile range, and the whiskers denote the extrema that are no more than 1.5×IQR from the edge of the box (Tukey style). Copy number and clonality adjustment was performed as described herein.

Figure 67:
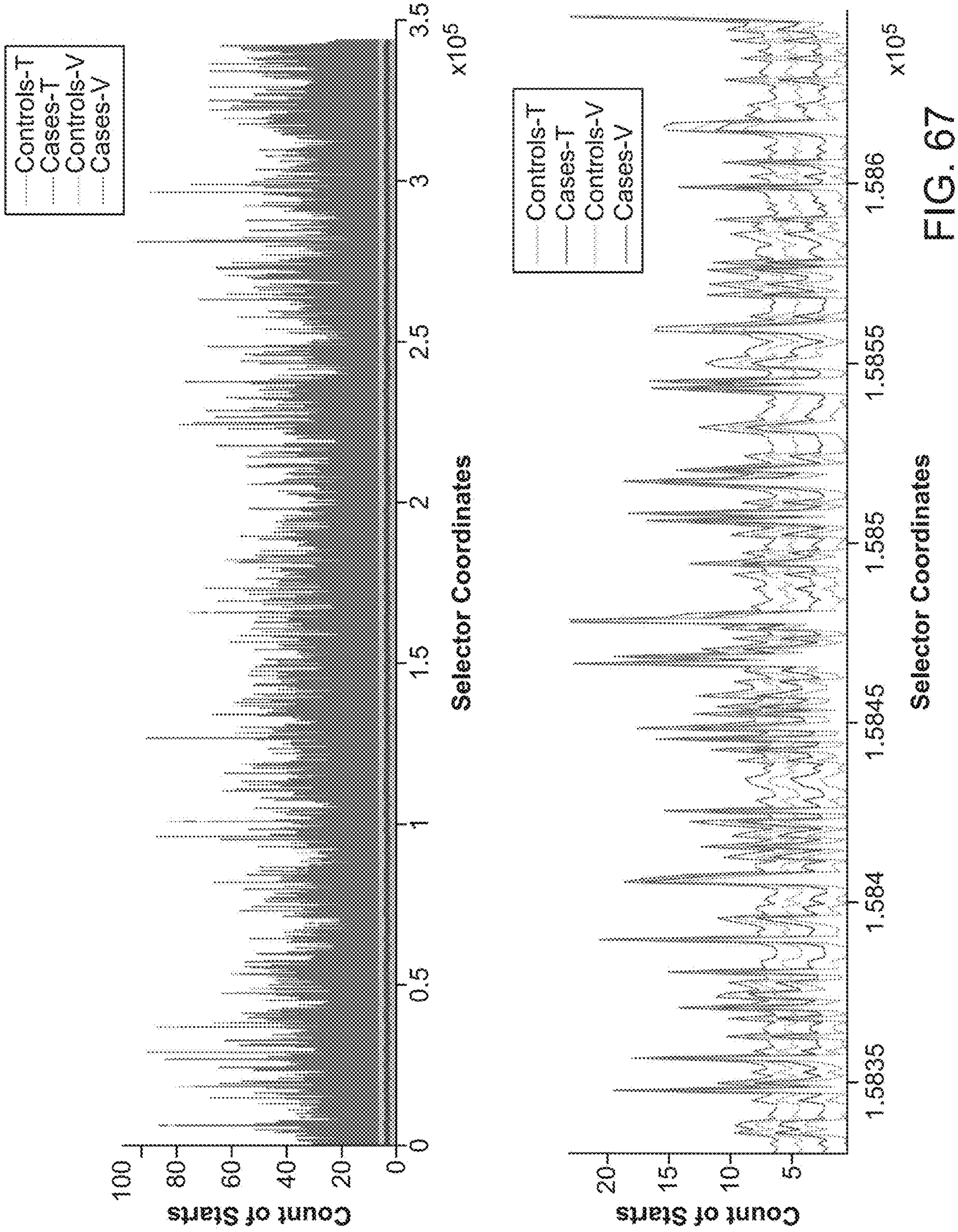

FIG. 67 shows that a strikingly stereotyped nature of fragment start positions was observed throughout the sequencing panel.

FIG. 68 shows that the start CPM across all 8,192 informative positions were summed to create a 'StartUp Score', intended to be used to classify lung cancer patients from non-cancer controls. Importantly, StartUp Score correlated with biological measurements of disease burden, including ctDNA tumor allele fraction and metabolic tumor volume.

FIG. 69 shows that the correlation between StartUp Score and Lung-CLiP was also assessed. Interestingly, while the StartUp Score was significantly correlated with Lung-CLiP scores in the training cohort, the correlation diminished in the validation set, indicating that fragment start positioning represent a biologically orthogonal feature to SNV and SCNAs with independent classification utility.

Figure 70:
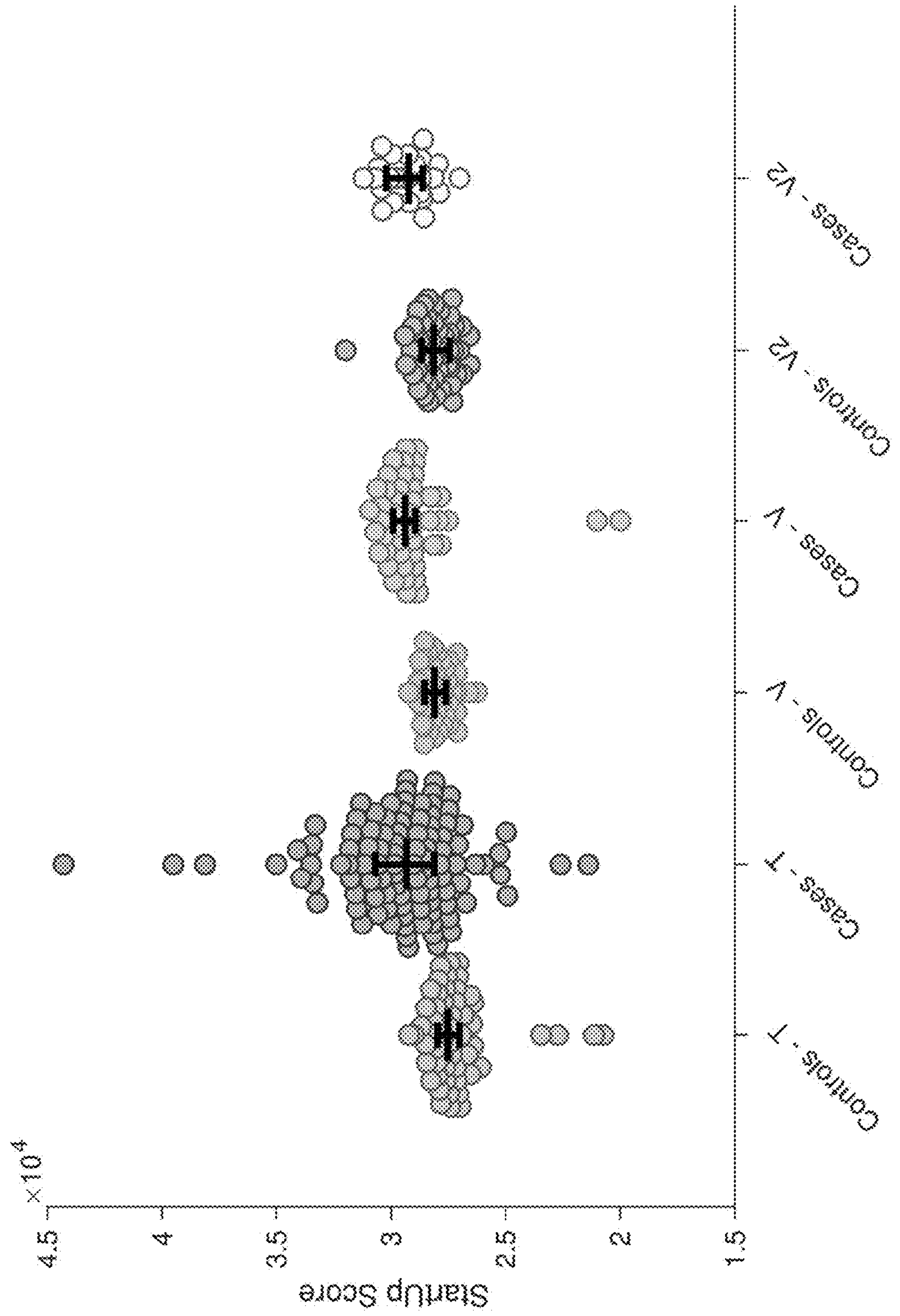

FIG. 70 shows that the utility of StartUp Score for distinguishing lung cancer patients from non-cancer controls in three separate cohorts, including the training cohort and two independent validation cohorts, was assessed. StartUp Scores were higher in lung cancer patients than controls in each cohort tested.

Figure 71:
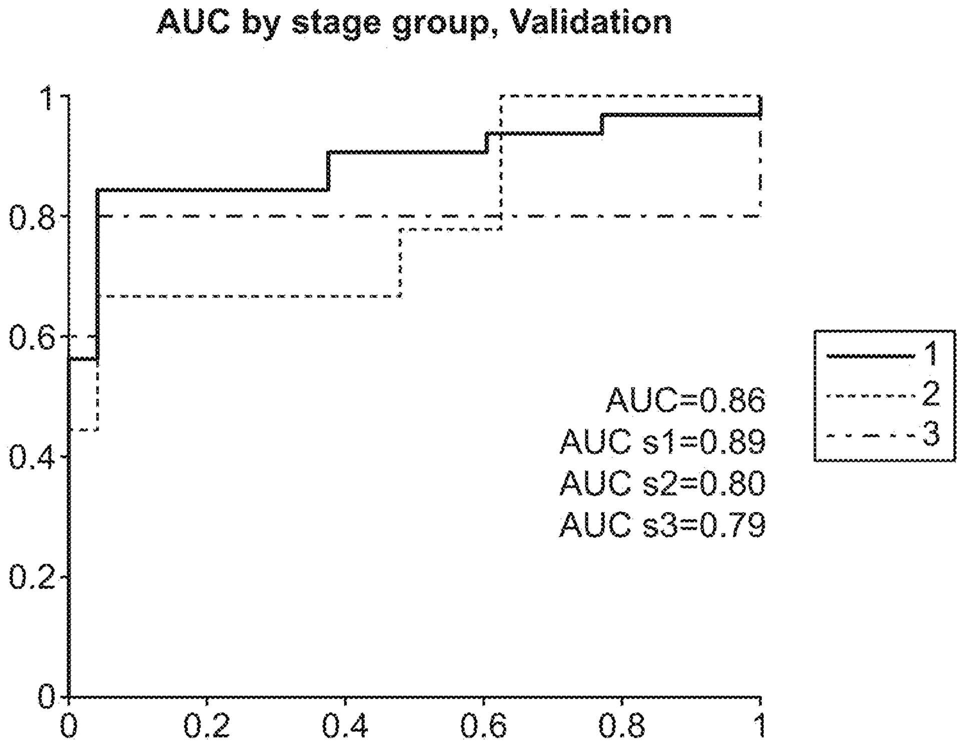
Figure 71:
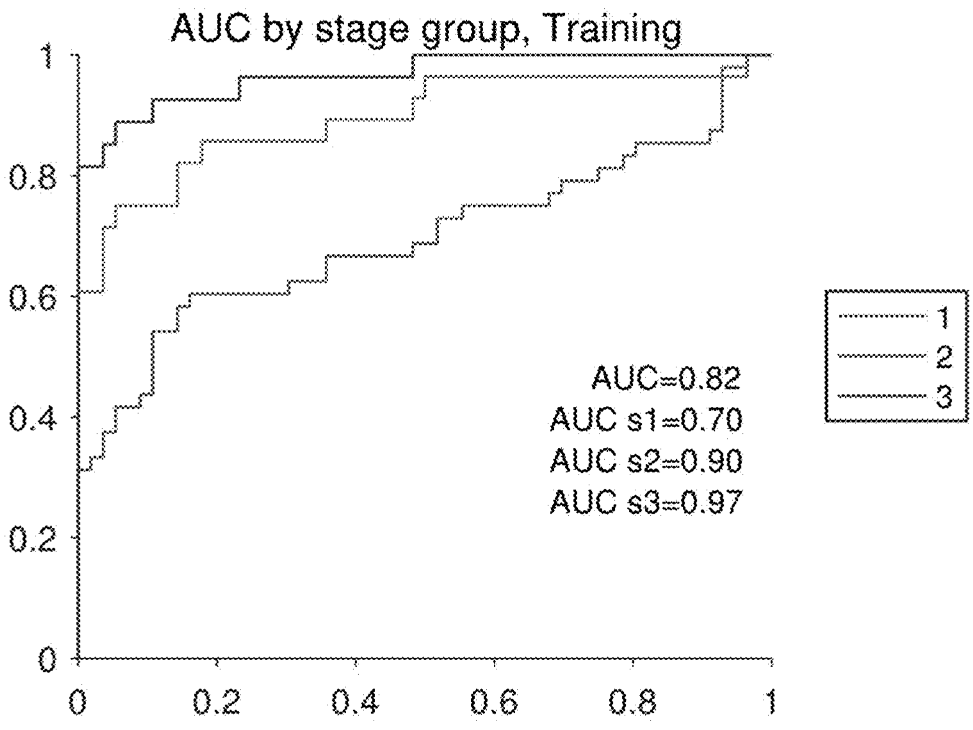
Figure 72:
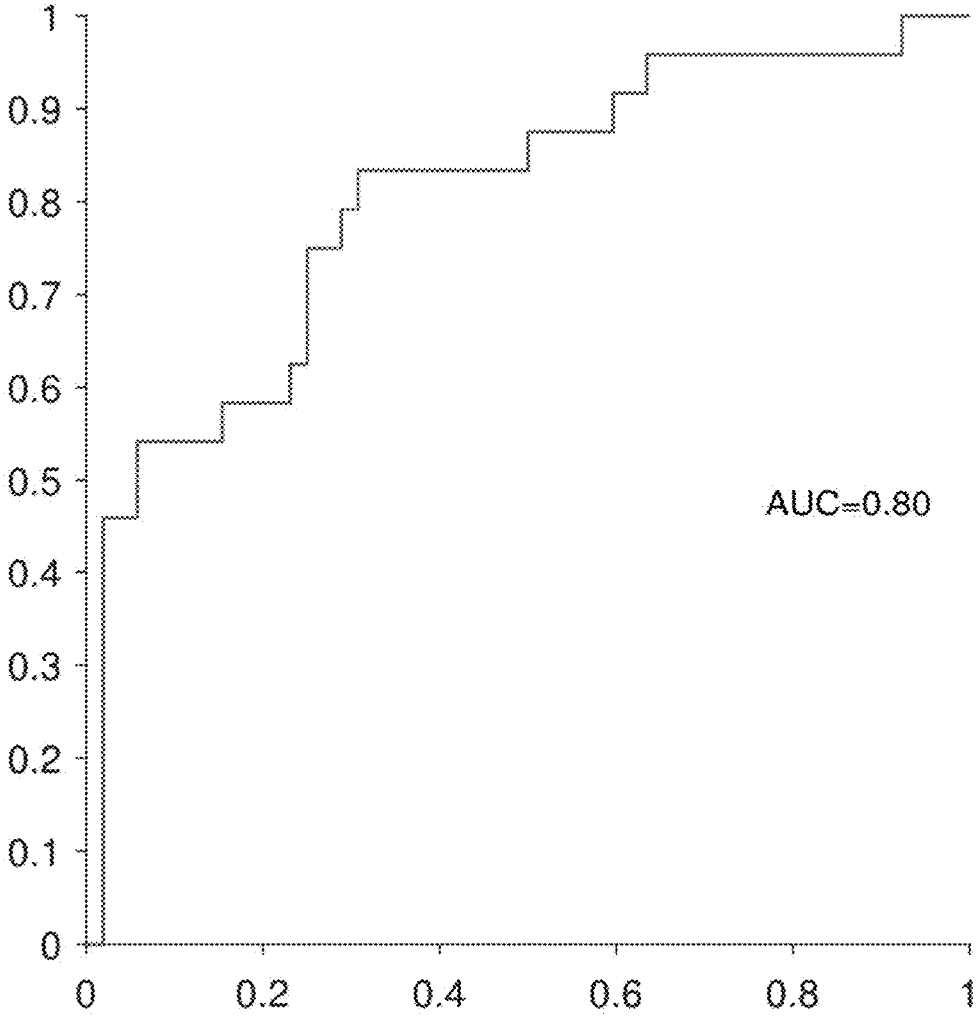

FIGS. 71-72 show that the performance of the StartUp Score for distinguishing lung cancer patients from controls was similar in the training and validation cohorts (AUC=0.82 in training, AUC=0.86 in validation set 1, 0.80 in validation set 2).

Figure 73:
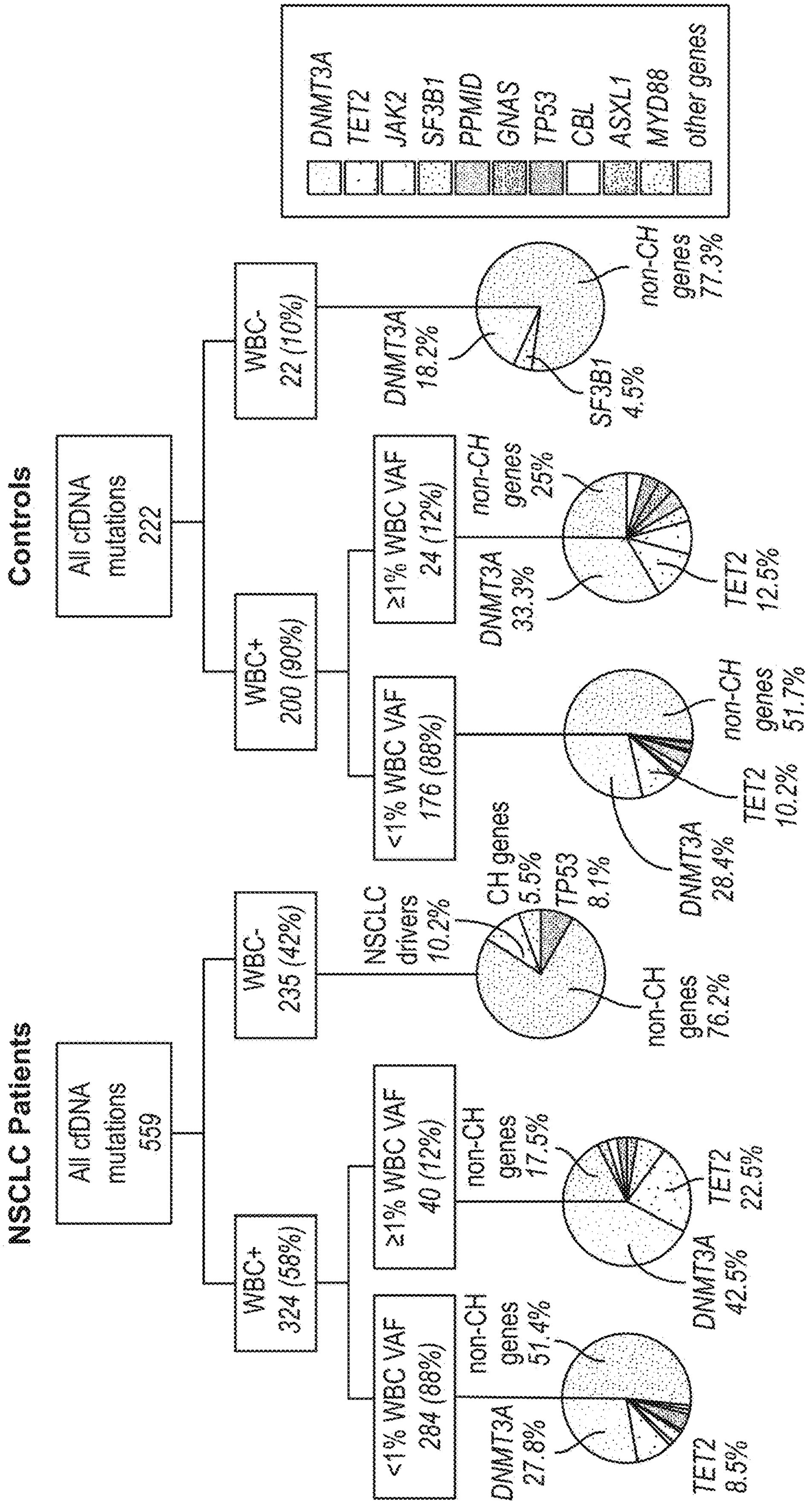

FIG. 73 shows a flow chart depicting the fraction of $WBC^+$ and $WBC^-$ cfDNA mutations affecting canonical clonal haematopoiesis genes in patients with NSCLC and controls. $WBC^+$ cfDNA mutations present at ≥1% VAF in matched leukocytes more frequently affect canonical clonal haematopoiesis genes than those present at levels below 1% (51/64 versus 223/460 $WBC^+$ cfDNA mutations present at ≥1% versus <1% VAF in matched leukocytes affect canonical CH genes, respectively; $P=1.9\times10^{-6}$, Fisher's exact test). Only mutations identified de novo in the cfDNA for which presence in the matched WBCs could be confidently assessed are considered.

Figure 74:
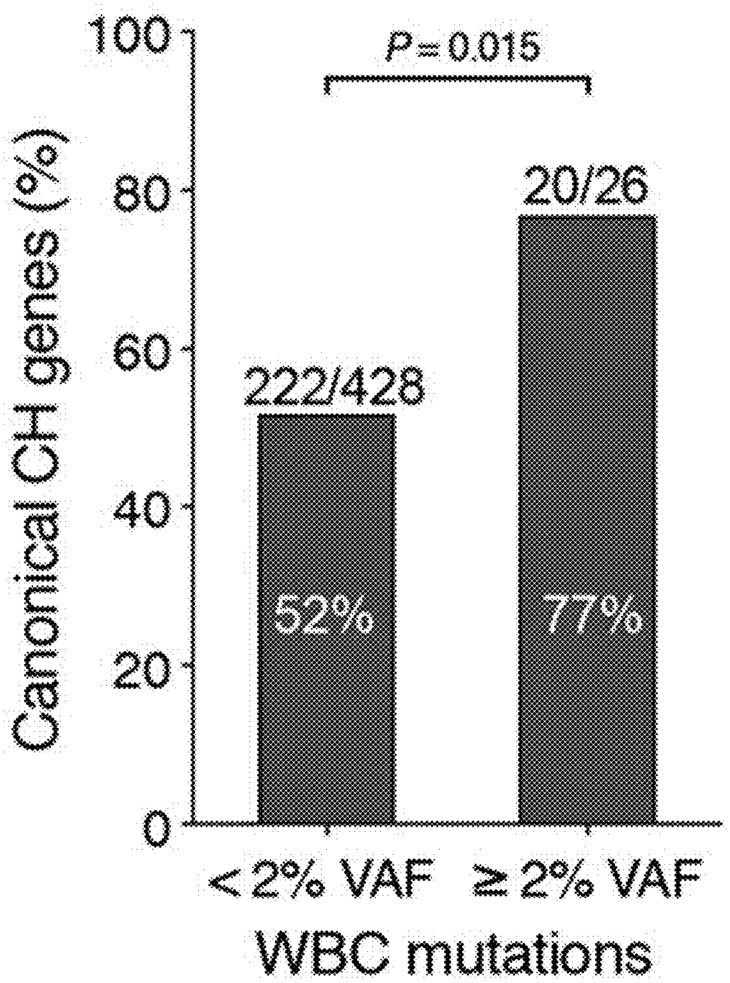

FIG. 74 shows the percentage of mutations genotyped de novo from WBC DNA at VAFs of <2% and ≥2% affecting canonical clonal haematopoiesis genes in patients and controls (all patients and controls are considered). The comparison was performed by Fisher's exact test.

Figure 75:
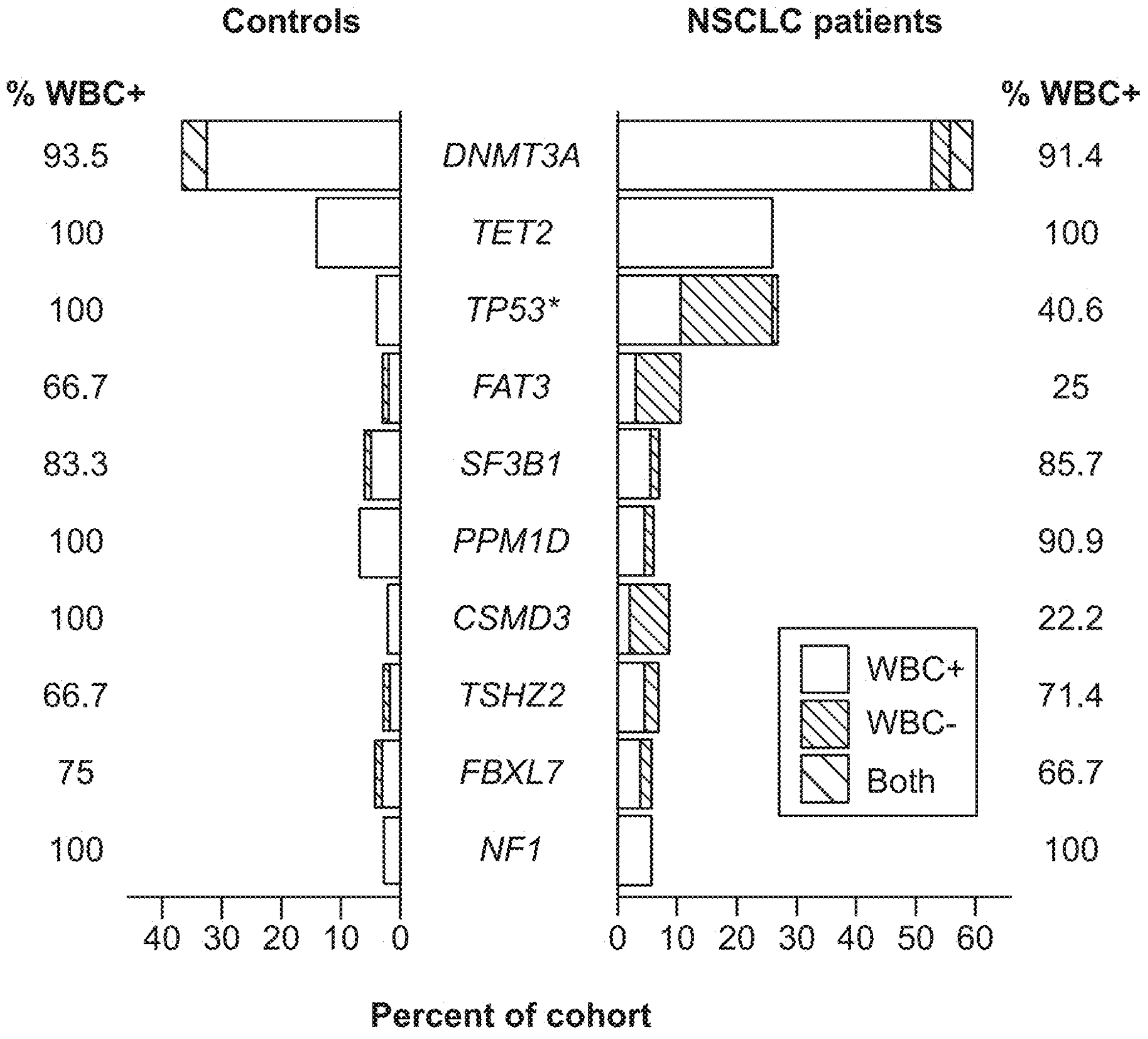

FIG. 75 shows the percentage of controls (left) and patients with NSCLC (right) with one or more mutations in the ten genes that most frequently contained $WBC^+$ cfDNA mutations. Patients with NSCLC and controls with only $WBC^+$ mutations, only $WBC^-$ mutations, or both $WBC^+$ and $WBC^-$ mutations in a gene are depicted in red, grey and pink, respectively. The numbers next to each bar represent the percentage of all cfDNA mutations in that gene that are $WBC^+$ in patients with NSCLC (right) or controls (left). Patients with NSCLC had significantly more $WBC^-$ cfDNA mutations in TP53 than controls (19/32 and 0/4 in patients and controls, respectively. *P=0.04, Fisher's exact test).

Figure 76:
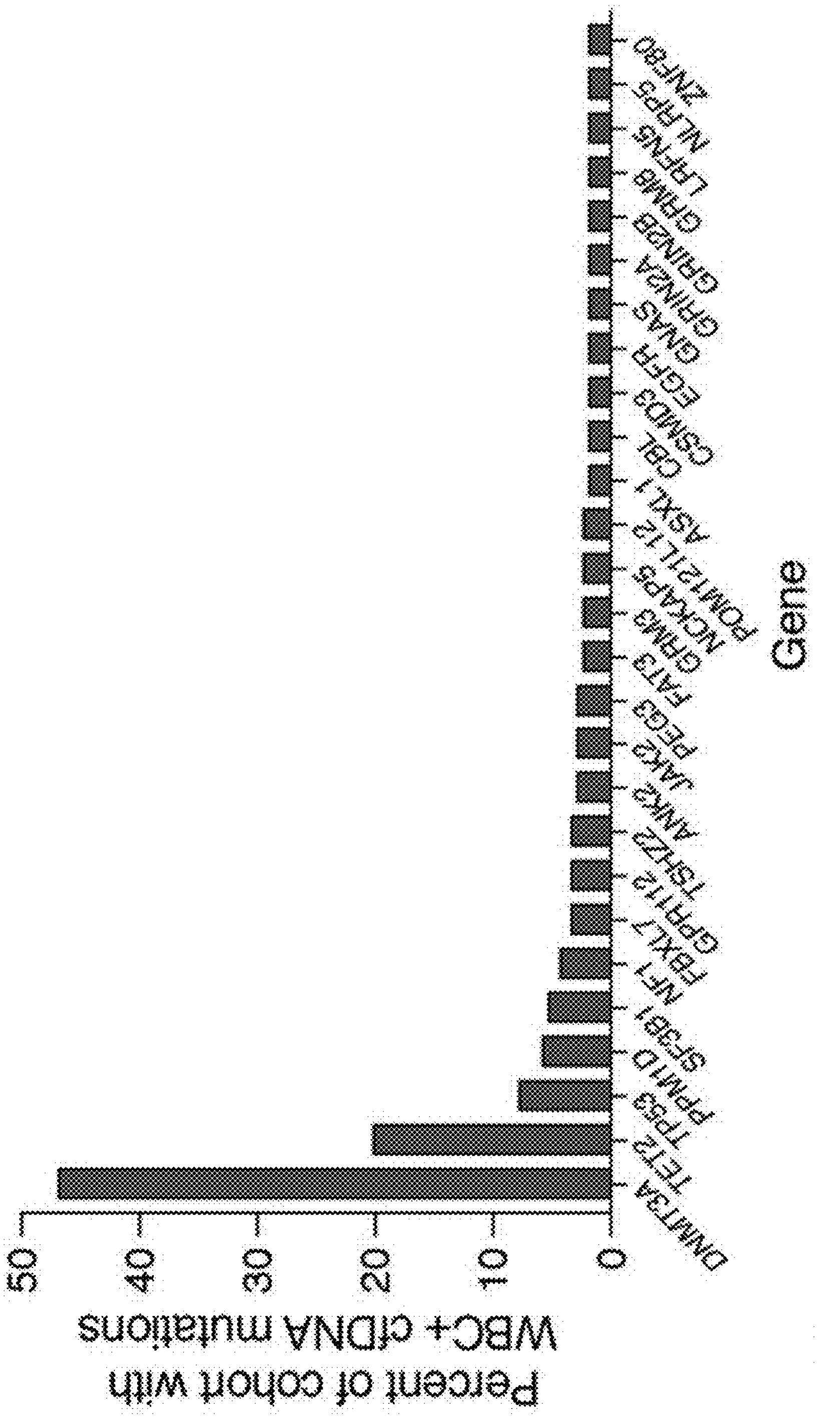

FIG. 76 shows the mutation frequency by gene for $WBC^+$ cfDNA mutations observed across all patients with NSCLC (n=104) and controls (n=98). The y axis depicts the percentage of the combined cohort with $WBC^+$ cfDNA mutations affecting a given gene. All genes with mutations in four or more individuals in the combined cohort are depicted.

Figure 77:
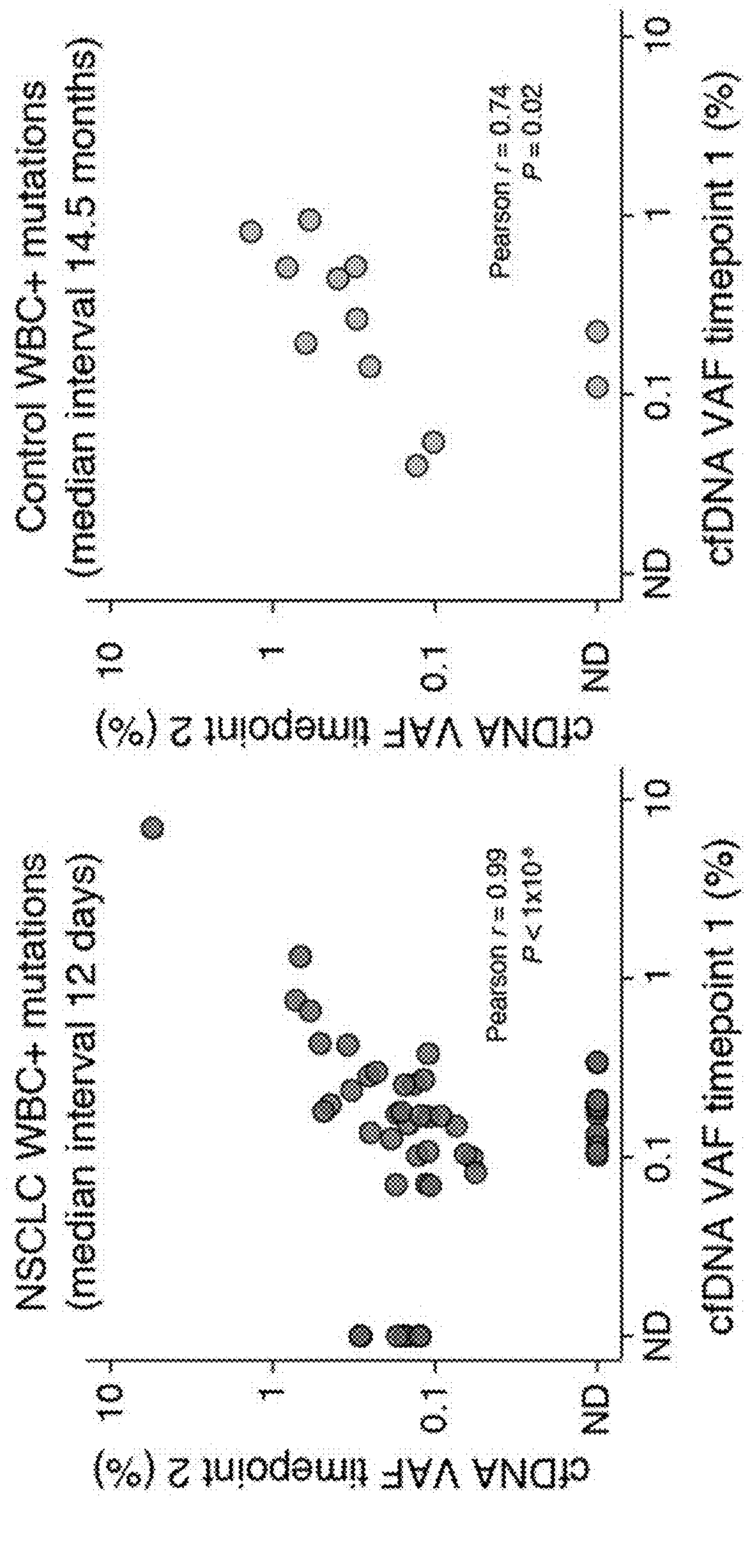

FIG. 77 shows a scatter plot comparing the VAFs of $WBC^+$ cfDNA mutations across multiple time points in patients with NSCLC (left panel, n=54 mutations, n=8 individuals) and controls (right panel, n=12 mutations, n=6 individuals). The statistical comparison was performed by Pearson correlation on mutations detected at both time points.

Figure 78:
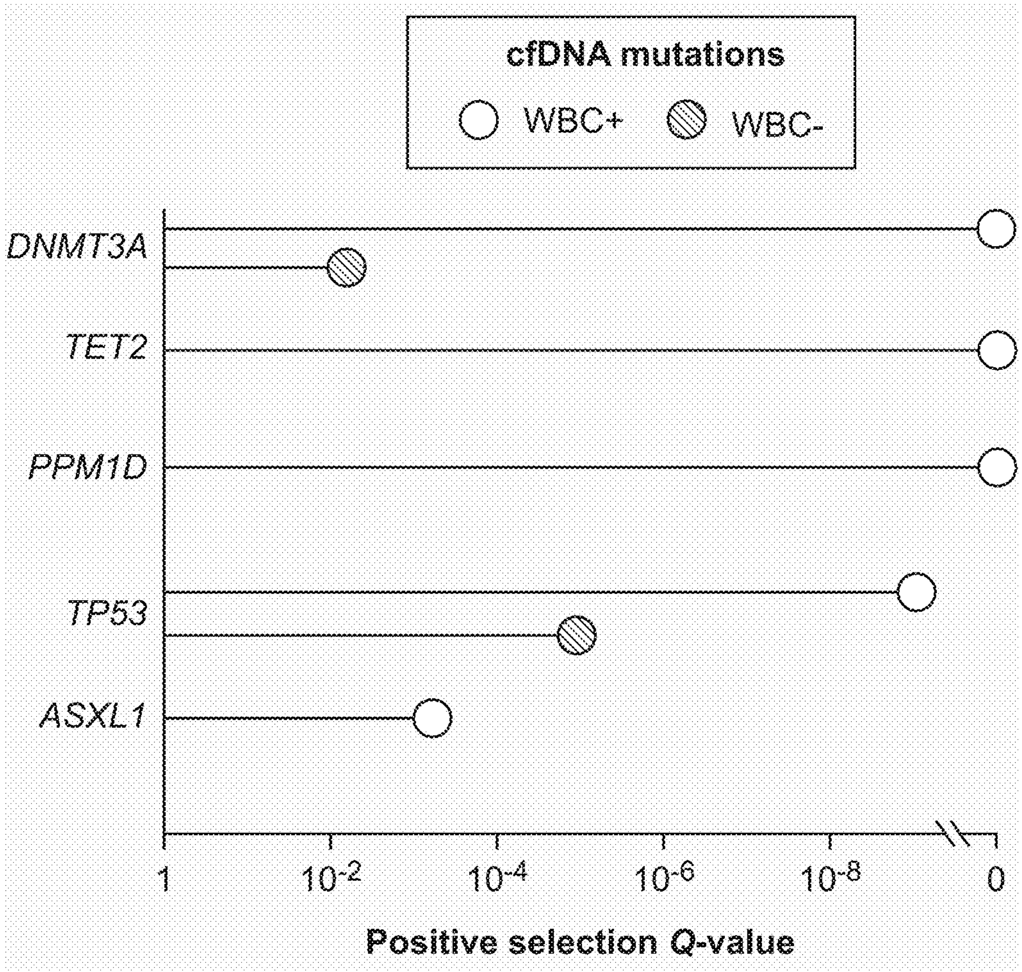

FIG. 78 shows that positive selection analysis was carried out on all synonymous and nonsynonymous $WBC^+$ (n=693 mutations, red) and $WBC^-$ (n=526 mutations, grey) cfDNA mutations observed in patients with NSCLC and controls using the dNdScv R package with a modification to account for the fraction of a given gene covered by our sequencing panel. The x axis indicates the dNdScv adjusted P value (Q value) for all substitution types. Genes were considered under positive selection if the Q value was less than 0.05. All genes meeting this threshold are displayed.

Figure 79:
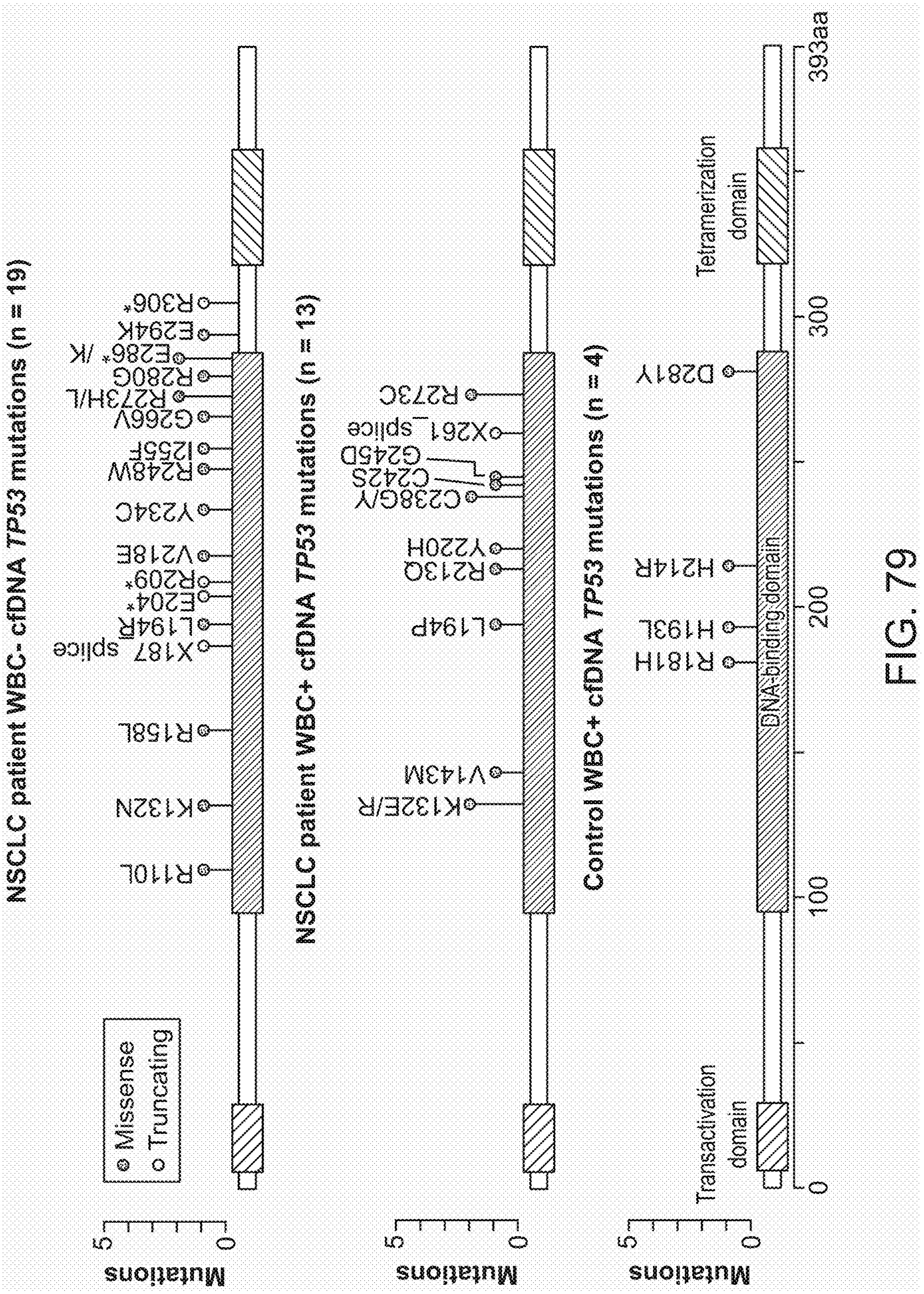

FIG. 79 shows a distribution of $WBC^+$ and $WBC^-$ cfDNA mutations across the p53 protein in patients with NSCLC and controls.

Figure 80:
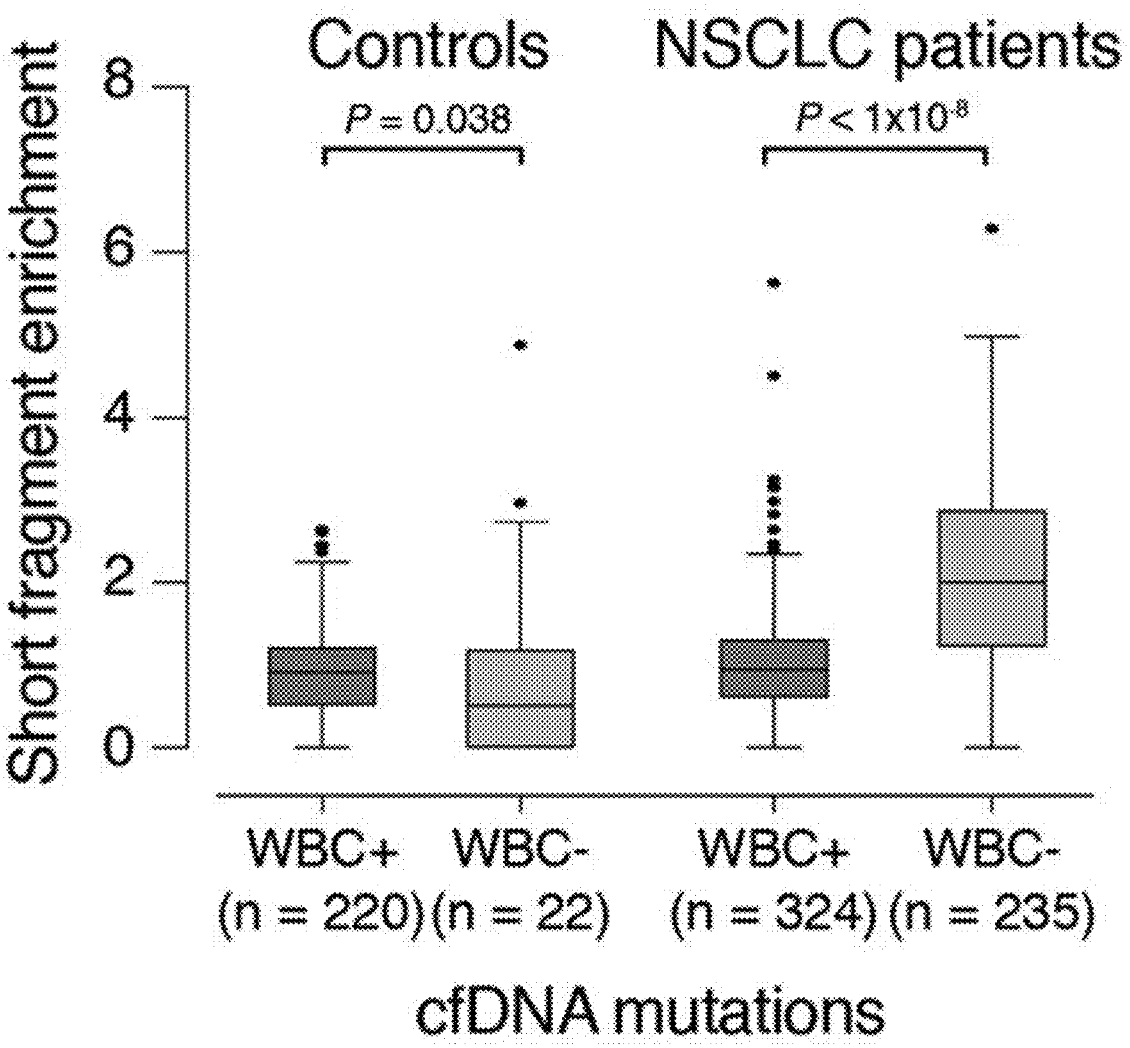

FIG. 80 shows short fragment enrichment of $WBC^+$ and $WBC^-$ cfDNA mutations in patients with NSCLC and controls, defined as the fold change in VAF for a given mutation after in silico size selection for the cfDNA fragment sizes found to be ctDNA-enriched in FIG. 21. The center line denotes the median, the box contains the interquartile range, and the whiskers denote the 10th and 90th percentile values.

Figure 81:
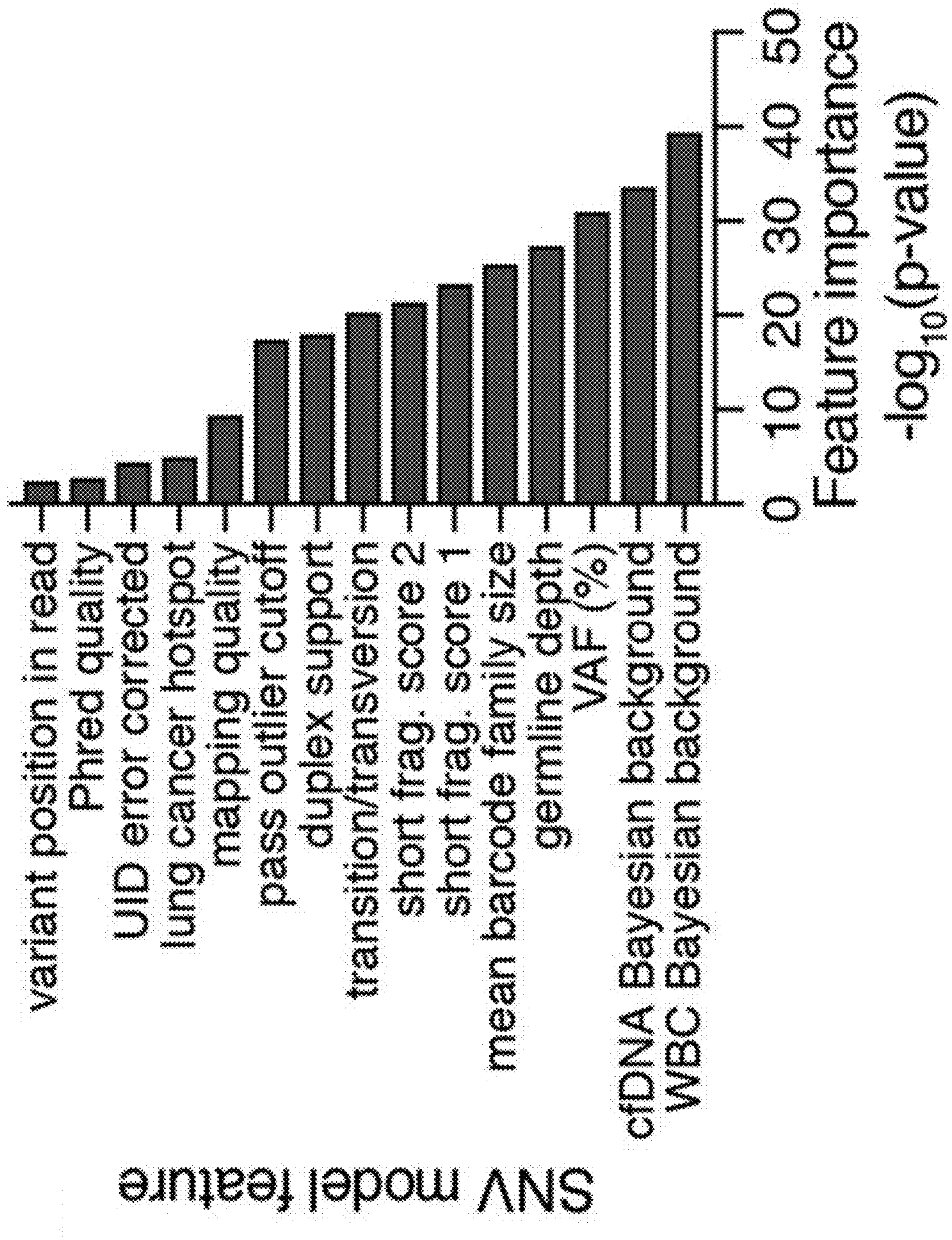

FIG. 81 shows biological and technical parameters specific to each individual variant used as features in a dedicated logistic regression 'SNV model'. The feature names are depicted on the y axis, and the negative $\log_{10}$ of the P value derived from comparing all post-filtered SNVs in patients with NSCLC (n=574 mutations from n=104 individuals) with those in risk-matched controls (n=64 mutations from n=56 individuals) in a univariable linear model in the training set is shown on the x axis. All features with a P value of less than 0.01 are shown, P values were calculated using an unpaired two-sided t-test. Additional information about each feature is provided herein.

Figure 82:
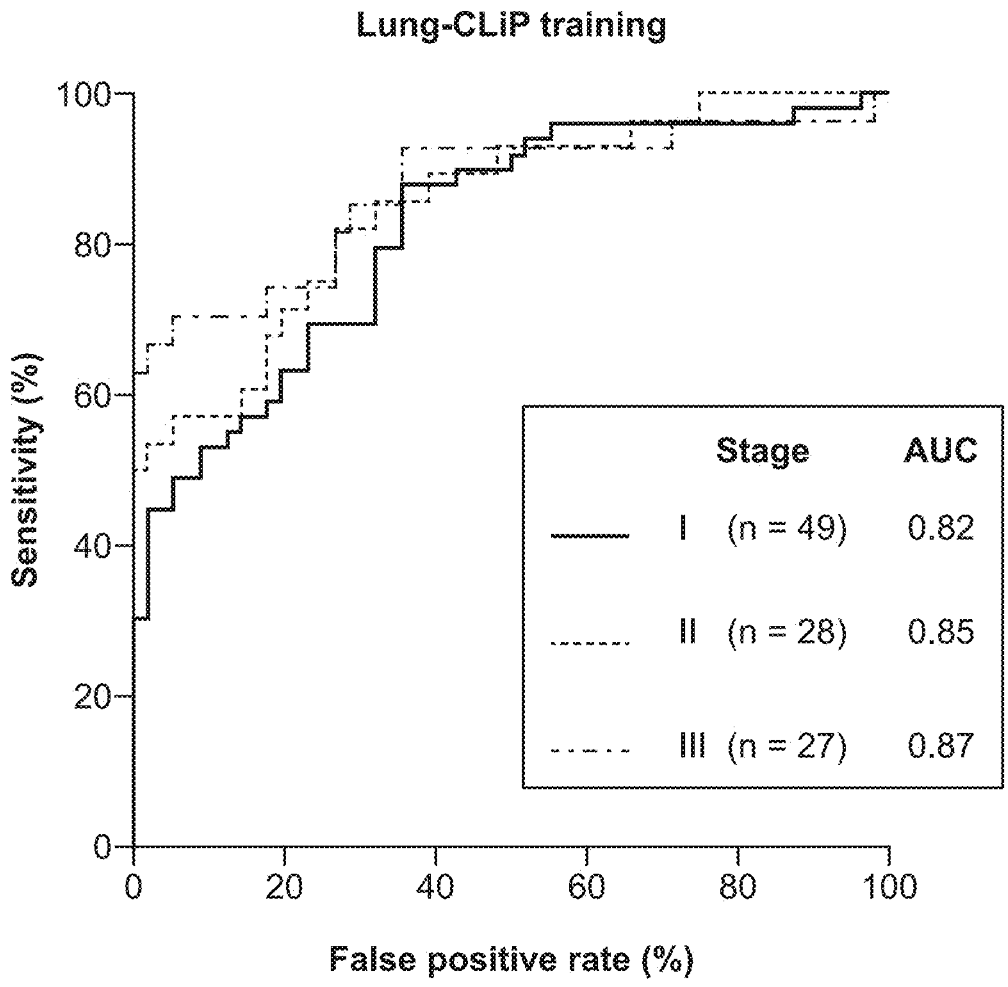

FIG. 82 shows receiver operating characteristic (ROC) curves for the Lung-CLiP model depicting performance stratified by tumor stage in the training set (n=104 patients with NSCLC and n=56 risk-matched controls).

Figure 83:
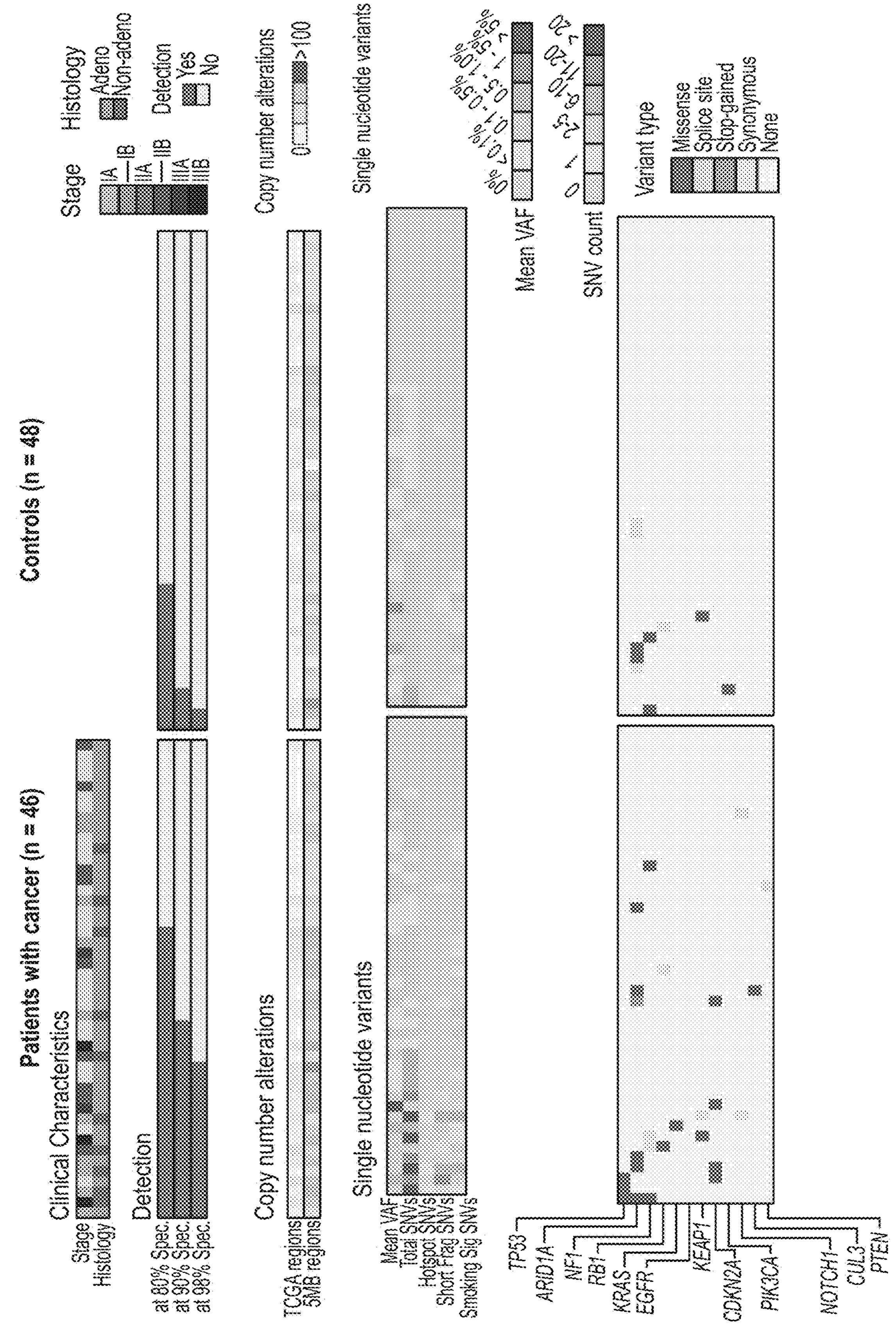

FIG. 83 shows spectrum of clinicopathologic correlates and selected features observed across the 46 patients with early-stage NSCLC and 48 risk-matched controls undergoing annual lung cancer screening in a prospectively enrolled independent validation cohort.

Figure 84:
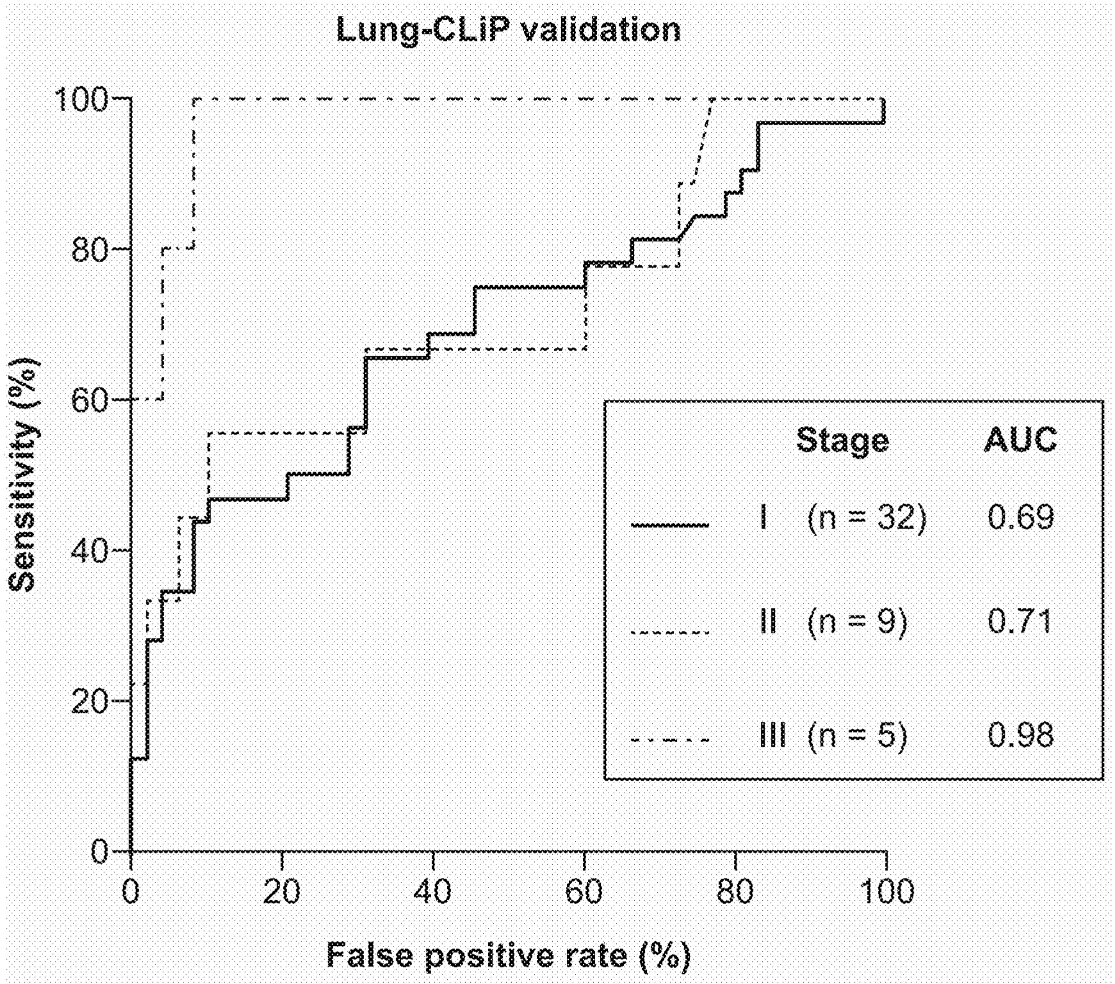

FIG. 84 shows receiver operating characteristic curves for the Lung-CLiP model depicting performance stratified by tumor stage in the validation set (n=46 patients with NSCLC and n=48 risk-matched controls).

Figure 85:
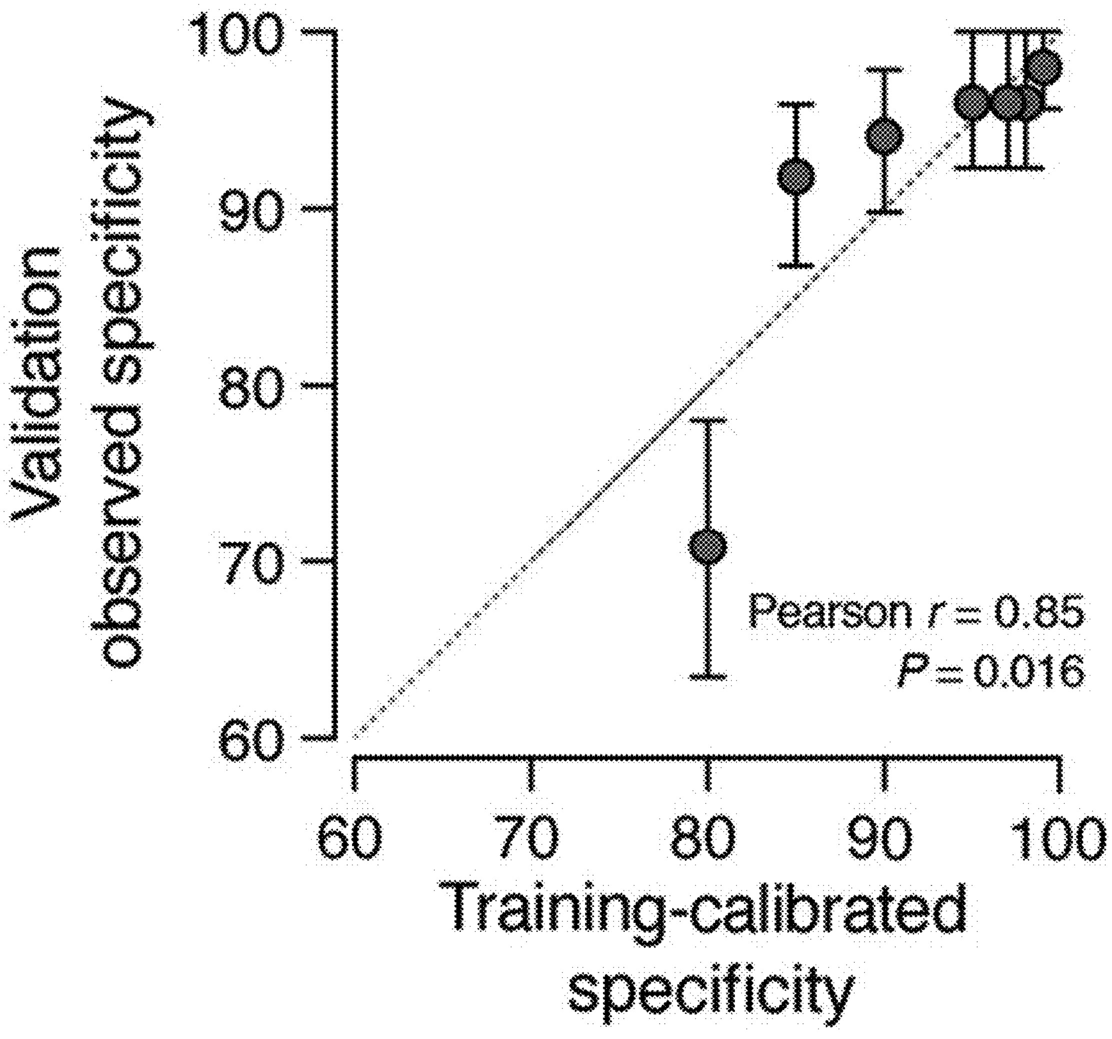
Figure 86A:
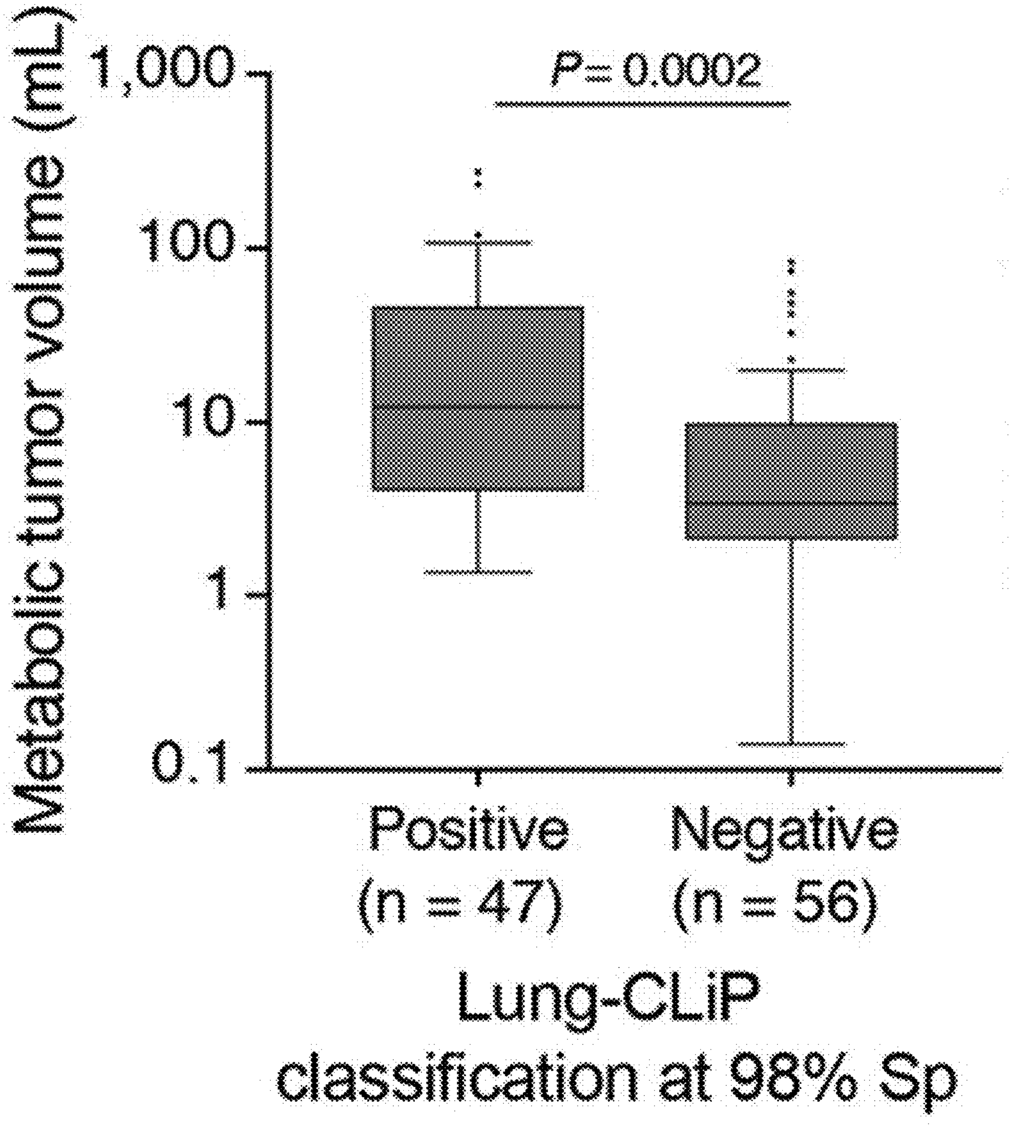
Figure 86B:
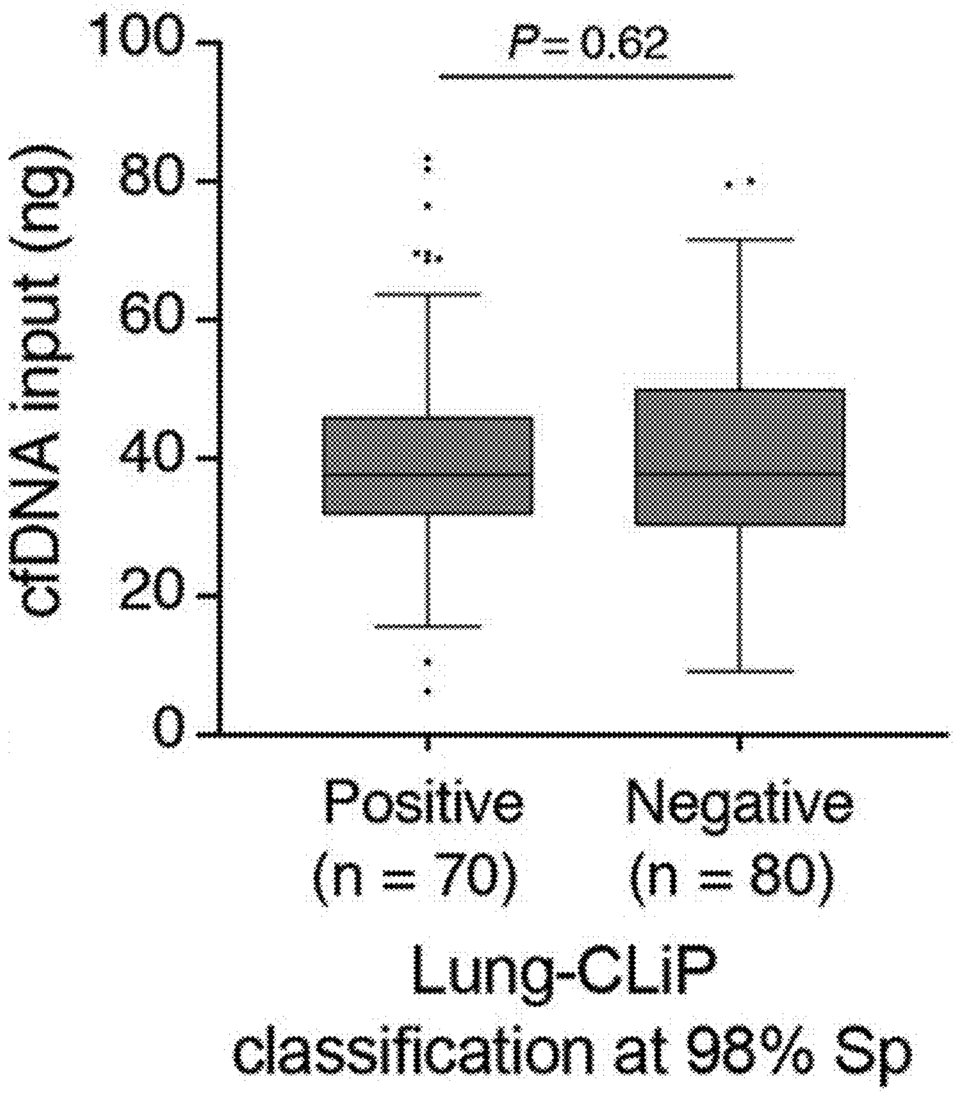
Figure 86C:
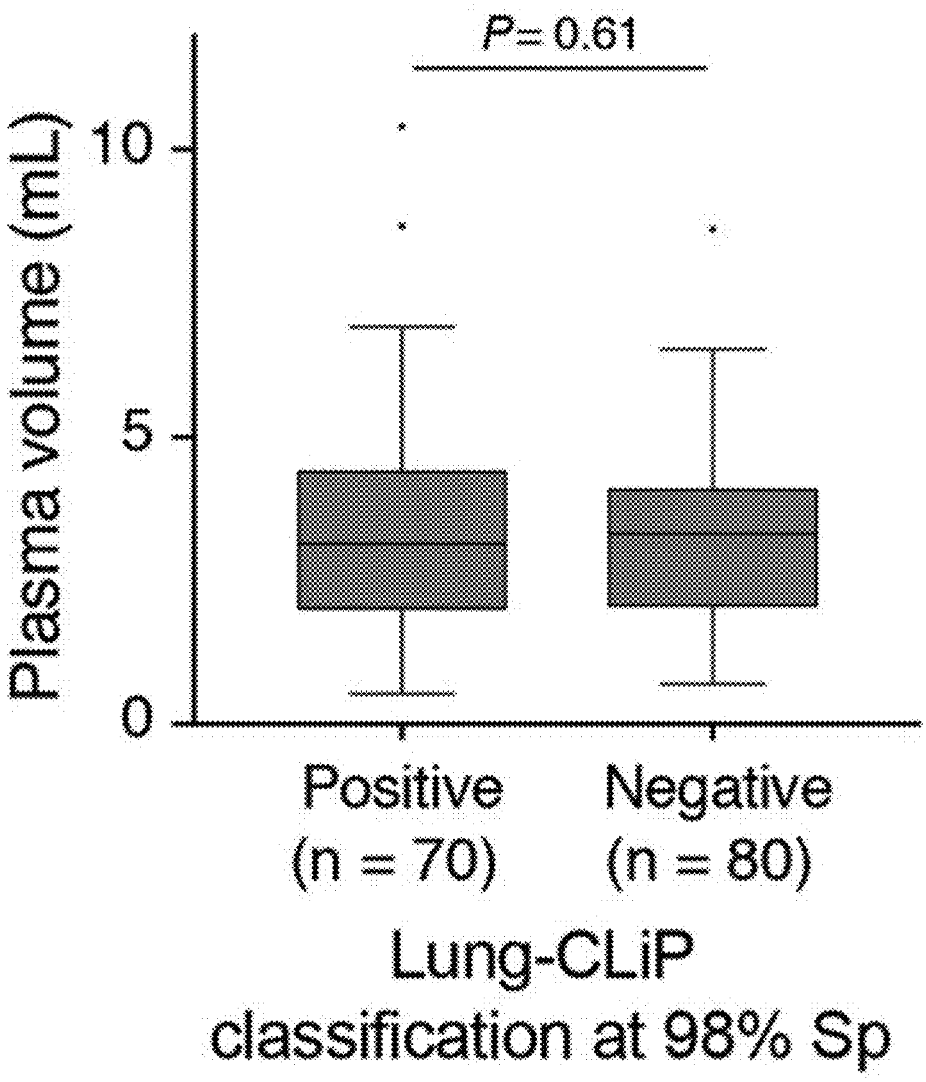
Figure 86D:
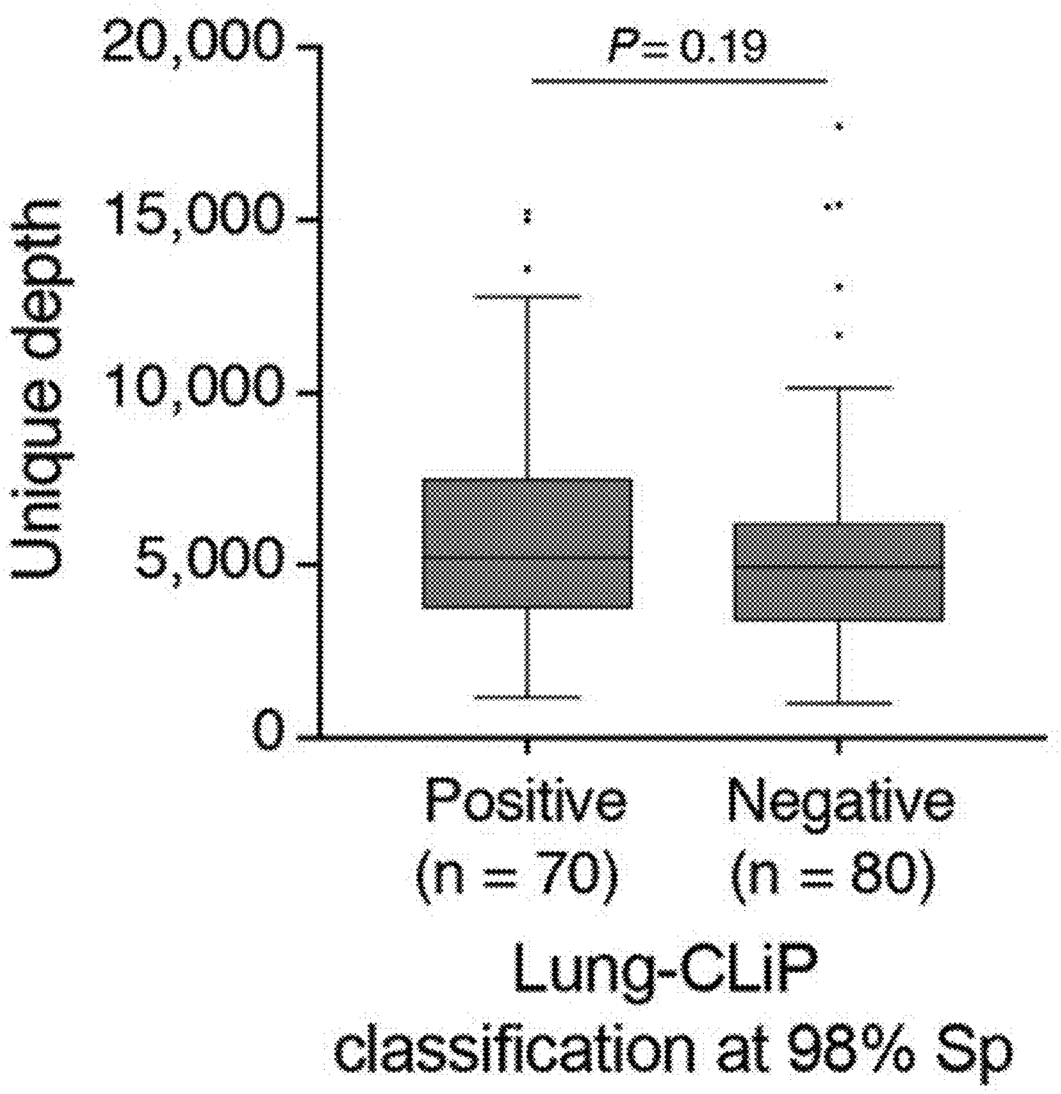

FIG. 85 shows a comparison of the specificity observed in the validation cohort at different thresholds defined in the training cohort. Dots denote the median specificity across 1,000 bootstrap resamplings and error bars depict the interquartile range. Statistical comparison was performed by Pearson correlation on the non-bootstrapped data.

FIGS. 86A-86D show a comparison of metabolic tumor volume (FIG. 86A), cfDNA input to library preparation (FIG. 86B), plasma volume used (FIG. 86C) and unique sequencing depth (FIG. 86D) in patients with NSCLC correctly classified at 98% specificity (positive) to those in patients that were incorrectly classified (negative). All patients with NSCLC in the training and validation cohorts were considered (n=103 patients with metabolic tumor volume measurements in FIG. 86A and n=150 patients in FIGS. 86B-86D). In box plots, the center line denotes the median, the box contains the interquartile range, and the whiskers denote the extrema that are no more than 1.5×IQR from the edge of the box (Tukey style).

DETAILED DESCRIPTION

Turning now to the drawings and data, embodiments related to cell-free nucleic acid sequencing and detection of cancer are provided. In some embodiments, cell-free nucleic acids (cfDNA or cfRNA) are extracted from a liquid biopsy and prepared for sequencing. In many embodiments, sequencing results of cell-free nucleic acids are analyzed by computational models to detect circulating tumor nucleic acid (ctDNA or ctRNA) sequences (e.g., sequences of nucleic acids that derive from a neoplasm). Accordingly, in various embodiments, neoplasms (including cancer) can be detected in an individual by extracting a liquid biopsy from the individual and sequencing the cell-free nucleic acids derived from that liquid biopsy to detect circulating tumor nucleic acid sequences, and the presence of circulating tumor nucleic acid sequences indicates that the individual has a neoplasm. In some embodiments, a clinical intervention is performed on the individual based on the detection of a neoplasm.

Figure 1:
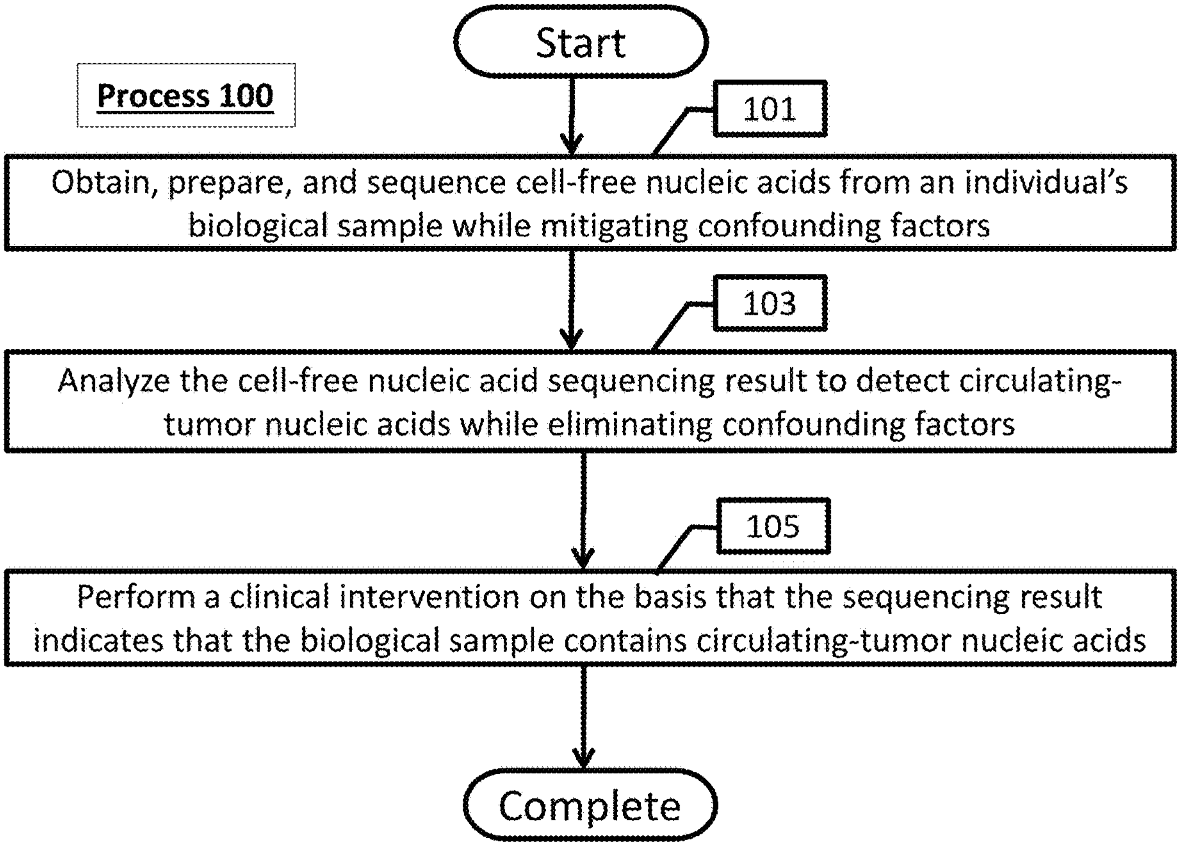
FIG. 1 provides a flow diagram of a process to perform a clinical intervention on an individual based on detecting circulating tumor nucleic acid sequences in a sequencing result.

Provided in FIG. 1 is a process to perform a clinical intervention based on detecting circulating tumor nucleic acids in an individual's biological sample. In some embodiments, detection of circulating tumor nucleic acids indicates a neoplasm (e.g., cancer) is present, and thus appropriate clinical intervention can be performed.

Process 100 may comprise obtaining, preparing, and sequencing (101) cell-free nucleic acids obtained from a non-invasive biopsy (e.g., liquid or waste biopsy). In some embodiments, cfDNA and/or cfRNA is extracted from plasma, blood, lymph, saliva, urine, stool, and/or other appropriate bodily fluid. In some embodiments, a biopsy is extracted prior to any indication of cancer. In some embodiments, a biopsy is extracted to provide an early screen in order to detect a neoplasm (e.g., cancer). In some embodiments, a biopsy is extracted to detect if residual neoplasm (e.g., cancer) exists after a treatment. Screening of any particular cancer can be performed. For more on examples of cancers that can be detected for intervention, see the section entitled "Clinical Interventions."

In some embodiments, a biopsy is extracted from an individual with a known risk of developing cancer, such as those with a familial history of the disorder or have known risk factors (e.g., cigarette smoker). In many embodiments, a biopsy is extracted from any individual within the general population. In some embodiments, a biopsy is extracted from individuals within a particular age group with higher risk of cancer, such as aging individuals above the age of 50.

In many embodiments, extracted cell-free nucleic acids are prepared for sequencing. Accordingly, cell-free nucleic acids are converted into a molecular library for sequencing. In some embodiments, adapters and primers are attached onto cell-free nucleic acids to facilitate sequencing. In some embodiments, targeted sequencing of particular genomic loci is to be performed, and thus particular sequences corresponding to the particular loci are captured via hybridization prior to sequencing. In some embodiments, various reagents are included during the library and/or capture operations to mitigate cofounding factors. In some embodiments, an antioxidant is included during one or more sequencing preparation operations to prevent oxidation of various nucleotides that result in nucleotide transversions. In some embodiments, the antioxidant hypotaurine is utilized in various sequencing preparation operations.

In some embodiments, any appropriate sequencing technique can be utilized that can detect sequence variations indicative of circulating tumor nucleic acids. Sequencing techniques include (but are not limited to) 454 sequencing, Illumina sequencing, SOLID sequencing, Ion Torrent sequencing, single-read sequencing, paired-end sequencing, etc.

Process 100 analyzes (103) the cell-free nucleic acid sequencing result to detect circulating tumor nucleic acid sequences. Because neoplasms (especially metastatic tumors) are actively growing and expanding, neoplastic cells are often releasing biomolecules (especially nucleic acids) into the vasculature, lymph, and/or waste systems. In addition, due to biophysical constraints in their local environment, neoplastic cells are often rupturing, releasing their inner cell contents into the vasculature, lymph, and/or waste systems. Accordingly, it is possible to detect distal primary tumors and/or metastases from a liquid or waste biopsy.

In a number of embodiments, a cell-free nucleic acid sequencing result is analyzed to detect whether somatic single nucleotide variants (SNVs), copy number variations (CNVs), genomic position features, and/or germline SNVs exist within the cell-free nucleic acid sample. In some embodiments, presence of particular somatic SNVs, CNVs, genomic position features, and/or germline SNVs is indicative of circulating tumor nucleic acid sequences (and thus indicative of a tumor present). In various embodiments, a computational model is utilized to analyze detected somatic SNVs, CNVs, genomic position features, and/or germline SNVs to determine whether these detected molecular elements are indicative of circulating tumor nucleic acids. In some embodiments, a computational model provides a relative indication (e.g., numerical confidence score) on whether a particular sample contains circulating tumor nucleic acids. In some embodiments, a computational model is trained on somatic SNVs, CNVs, genomic position features, and/or germline SNVs detected in patients and matched controls.

In some embodiments, cofounding factors are removed from a cell-free nucleic acid sequencing result. It is now understood that clonal hematopoiesis (CH) is a confounding source of somatic SNVs and CNVs within a cell-free nucleic acid sample. Accordingly, in various embodiments, somatic SNVs and CNVs associated with CH are removed from further analysis. In some embodiments, somatic SNVs and CNVs derived from CH are determined for each particular individual analyzed. To detect an individual's particular somatic SNVs and CNVs derived from CH, leukocytes or white blood cells (WBCs) or hematopoietic cells of the individual are collected and their nucleic acids extracted and sequenced to detect somatic SNVs and CNVs derived from those cells. In some embodiments, somatic SNVs and CNVs detected in WBCs are removed during analysis of cell-free nucleic acid sequencing result.

Detection of circulating tumor nucleic acid sequences indicates that a neoplasm is present in the individual being examined. Accordingly, based on detection of circulating tumor nucleic acids, a clinical intervention may be performed (105). In some embodiments, a clinical procedure is performed, such as (for example) a blood test, medical imaging, physical exam, a tumor biopsy, or any combination thereof. In some embodiments, diagnostics are preformed to determine the particular stage of cancer. In some embodiments, a treatment is performed, such as (for example) chemotherapy, radiotherapy, immunotherapy, hormone therapy, targeted drug therapy, medical surveillance, or any combination thereof. In some embodiments, an individual is assessed and/or treated by medical professional, such as a doctor, nurse, dietician, or similar.

While specific examples of processes for molecularly analyzing cell-free nucleic acids and performing a clinical intervention are described above, some operations of the process can be performed in different orders and certain operations may be optional. As such, some operations of the process may be used as appropriate to the requirements of specific applications. Furthermore, any of a variety of processes for molecularly analyzing cell-free nucleic acids appropriate to the requirements of a given application can be utilized.

Sequencing Library Preparation

Some embodiments are directed toward preparing a cell-free sample of nucleic acids, including cell-free DNA (cfDNA) and/or cell-free RNA (cfRNA), for sequencing. Accordingly, embodiments involve extracting nucleic acids from a biological sample having extracellular nucleic acids. Biological samples include (but not limited to) blood, plasma, lymphatic fluid, cerebral spinal fluid, saliva, urine, stool, etc. Cell-free nucleic acids can be isolated and purified by any appropriate means, as known in the art. In some embodiments, column purification is utilized (e.g., QIAamp Circulating Nucleic Acid Kit from Qiagen, Hilden, Germany). In some embodiments, isolated RNA fragments can be converted into complementary DNA for further downstream analysis.

Some embodiments are directed toward preparing cell-derived nucleic acid samples for sequencing. Accordingly, some embodiments isolate cells and or tissue to be analyzed (e.g., tumor cells, neoplastic cells, blood cells). Cells and tissue can be extracted and isolated as understood in the art. In some embodiments, blood cells (e.g., leukocytes) are isolated from plasma via centrifugation. Furthermore, nucleic acids from the cells and tissues can be isolated and purified by any appropriate means, as known in the art. In some embodiments, column purification is utilized (e.g., DNeasy Blood and Tissue Kit from Qiagen, Hilden, Germany). Nucleic acids can be broken down into smaller fragments (e.g., 50-450 bp) for library preparation by any appropriate means (e.g., sonication).

In some embodiments, isolated nucleic acid fragments can be prepared into a sequencing library. In many embodiments, adapters having unique identifiers (UIDs) and dual index sample barcodes, each with optimized GC content and sequence diversity, are utilized to build a library. In many of these embodiments, the UIDs and dual index barcodes are decoupled (e.g., each are distinct barcodes). In some embodiments, the UIDs are predefined (e.g., not random) sequences to provide an error-correcting benefit. Errors in UIDs or sample barcodes are often introduced during library preparation, which can lead to inaccurate enumeration of unique molecules observed by sequencing. To correct these errors, some embodiments utilize pre-defined sequences with pair-wise Hamming edit distances, which can be utilized for error correction. For example, when 6 bp UID sequences are utilized, the sequences can be designed with pair-wise Hamming edit distances ≥3, enabling correction of 1 bp errors and detection of 2 bp errors. Likewise, when 8 bp sample barcodes sequences are utilized, the sequences can be designed with pair-wise Hamming edit distances ≥5, which enables correction of 1 or 2 bp errors and detection of 3 bp errors.

In a number embodiments, GC content of UIDs and sample barcodes is optimized to approximately 50% GC content, which may be beneficial for annealing and improves sequence diversity. Some embodiments are also directed to developing UIDs and barcodes with sequence diversity. In these embodiments, UID and sample barcode sequences, as well as additional sequences in the adapters, are designed to have near equal nucleotide selection at each base position. For example, a collection of adapters may have approximately 25% A nucleotides, 25% C nucleotides, 25% T nucleotides, and 25% G nucleotides at each base position within the UID, sample barcode and surrounding adapter sequences. Sequence diversity can improve the optical function of sequencers to calibrate properly. By engineering increased sequence diversity into adapters, the necessity to sequence PhiX is removed, increasing sequencing read yields. In many embodiments, dual index refers to adapters that utilize two sample barcodes, typically added on both sides of a sequence read.

Some embodiments are directed toward library molecules to be used in a sequencing reaction. In some embodiments, nucleic acids are DNA, and thus can be used directly for library preparation. In some embodiments, nucleic acids are RNA, and thus conversion into cDNA is necessary before library preparation. In many embodiments, a pair of error-correcting UID is attached to the DNA (or cDNA) fragment such that DNA (or cDNA) is flanked by on each side by the UID. A pair of flanking UIDs provides an indication of a particular nucleic acid molecule derived from a biological source, which may enable more accurate enumeration of original unique molecules (e.g., each pair of UIDs indicates a ligation event of that nucleic acid molecule which occurs prior to amplification operations, enabling identification of duplicate molecules that arise due to amplification operations). In some embodiments, a pair of index sample barcodes is attached to the DNA (or cDNA) fragment such that DNA (or cDNA) is flanked by on each side by the index sample barcodes, which indicate the sample source (e.g., all molecules derived from a sample are flanked with the pair of index sample barcodes). In some embodiments, the use of dual index sample barcodes better ensures that a sequencing product is in fact a bona fide product from the sample source, as determined by having both index barcodes properly flanked. In some embodiments, an isolated sample DNA (or cDNA) fragment incorporating flanking UIDs and flanking sample barcodes further incorporates an annealing site for a universal primer for PCR and/or sequencing.

FIG. 2A shows that an excess of molecular barcodes (that is, unique identifier or UIDs) differing by 1 bp in cfDNA molecules with the same start and end positions indicates that sequencing errors in UIDs can create erroneous UID families. Depicted are the expected and observed distributions of barcode Hamming edit distances (UID edit distance)

when comparing UIDs from different groups of barcode-deduped (that is, unique) cfDNA molecules sequenced using tandem adaptors.

The use of index adaptors may result in significant error suppression; however, only information from single-stranded molecules may be considered, since the parental double-stranded 'duplex' molecules may not be reconstituted. Being able to identify which single strands were originally paired in duplexes may allow for additional error suppression. Therefore, "tandem adaptors" were designed, which may include two exogenous barcodes: index barcodes for single-strand error suppression along with dedicated barcodes for double-stranded error suppression. The latter were incorporated as 2-base barcodes into the double stranded portion of the adaptors, and were read at the beginning of each main sequencing read (which may be termed 'insert' barcodes). Because insert barcodes were sequenced with the main reads, a dinucleotide insert barcode was obtained from each end of each DNA fragment, yielding a 4 base insert barcode and a maximum diversity of 256 molecules per genomic start/end position. In some embodiments, index and/or insert barcodes may be placed in other adaptor locations or synthesized with different lengths to accommodate a higher or lower molecule diversity.

Tandem adaptors may utilize random 4-mer UIDs, resulting in 256 distinct UIDs that cannot be error corrected. The theoretical distribution of UID edit distances across all 256 UIDs (that is, the fraction of UIDs that differ from one another by 1, 2, 3, and 4 bp) is shown by the 1st, 5th, 9th, and 13th bars (e.g., the 1st bar within each group of four bars). The other bars represent the distribution of UID edit distances observed in healthy control cfDNA samples sequenced with tandem adaptors (n=24 individuals). Randomly sampled UIDs are shown by the 2nd, 6th, 10th, and 14th bars (e.g., the 2nd bar within each group of four bars). UIDs from cfDNA molecules with different genomic start and end positions are shown by the 3rd, 7th, 11th, and 15th bars (e.g., the 3rd bar within each group of four bars). cfDNA molecules that share the same start and end positions are shown by the 4th, 8th, 12th, and 16th bars (e.g., the 4th bar within each group of four bars). UIDs differing by only one base are significantly overrepresented when comparing cfDNA molecules with the same start and end position (the 4th bar within each group of four bars) to each of the other UID distributions, suggesting that 1-bp errors are erroneously creating new UID families. Group comparisons were performed with a paired two-sided t-test, except when comparing to the theoretical distribution, for which an unpaired two-sided t-test was used ($P<1\times10^{-8}$). Bars denote the mean and error bars denote the standard error of the mean.

Provided in FIG. 2B is an embodiment of a process to prepare libraries using double stranded DNA (or cDNA) molecules as input. As shown, Y-shaped partial adapters are ligated onto DNA (or cDNA) molecules. Each Y-shaped partial adapter contains an error-correcting unique identifier (UID) that delineates a molecular barcode to identify a particular DNA (or cDNA) molecule prior to amplification. Any appropriate error-correcting UID molecular barcode may be used, typically having a length of at least 3 bp. In some embodiments, an error-correcting UID molecular barcode is 3 bp, 4 bp, 5 bp, 6 bp, 7 bp or 8 bp. In some embodiments, de-coupling of the UIDs and sample barcodes allows for independent tailoring of UID diversity and sample multiplexing capacity.

Provided in FIG. 3 is an example of a Y-shaped partial adapter. As can be seen, the adapter has a 6 bp UID that is flanked by a 1 bp offset sequence and a 0-3 bp stagger sequence. In many embodiments, the 1 bp offset sequence and/or a 0-3 bp stagger have sequence diversity such that there is equal nucleotide selection at each base position. Having a stagger prior to the annealing base T helps increase sequence diversity, potentially benefitting the optical function on the sequencer. The 1 bp may help ensure accurate reading of the UID, as mistakes most often occur in the first base sequenced. In addition, a Y-shaped partial adapter has annealing sequences for promoters for grafting PCR (see P5 and P7).

After ligating the Y-shaped partial adapters, the ligation products are used to graft error-correcting dual index barcodes that signify a sample (e.g., the biological source) to be sequenced. Accordingly, in many embodiments, a grafting PCR is performed with a particular set of grafting primers for each sample. To perform the grating PCR, in some embodiments, grafting PCR primers are utilized to graft the sample-specific error-correcting barcode onto the ligation product (see operations 3 and 4). In many embodiments, a grafting PCR includes one or more the following: a sample-specific error-correcting barcode, a graft primer sequence, and an annealing sequence for a universal primer. Accordingly, in some embodiments, a grafting PCR results in a library of DNA molecules. In some embodiments, each DNA molecule in the library has the sequence of the isolated sample DNA fragments and one or more of the following: a flanking pair of error-correcting UIDs, a flanking pair of error-correcting dual index sample barcodes, and sequence for annealing a universal primer to perform a universal PCR prior to sequencing.

In some embodiments, libraries are prepared for a number of samples that may be combined to perform sequencing. Accordingly, in many of these embodiments, each sample has its own sample-specific error-correcting barcode, which may be derived from a grafting PCR. Further, in some embodiments, each sample library share the same universal PCR primer annealing sequence(s), which allows for the combined samples to be amplified in the same reaction prior to sequencing. And in some embodiments, the combined samples are sequenced in the same reaction.

In some embodiments, libraries are enhanced to help detect certain molecular elements, such as (for example), single nucleotide variants (SNVs) in particular loci of the genome. Enhancement may be necessary in order to be able to detect molecular elements above the limit of detection, especially when the molecular elements are rare and/or somatic SNVs. Accordingly, in some embodiments, targeted sequencing is performed on prepared libraries. In many embodiments, capture hybridization is utilized to selectively pull down library molecules having a particular sequence (e.g., sequence of genomic loci of interest). In some embodiments, captured hybridization is performed on a library to pull down DNA molecules with specific genomic loci in order to detect molecular features in those loci via sequencing. In some embodiments, captured hybridization is performed on a library in order to detect rare and/or somatic SNVs in genomic loci known to harbor SNVs involved in cancer and/or oncogenic pathology. In some embodiments, captured hybridization is performed on a library in order to detect rare and/or somatic SNVs in genomic loci known to harbor SNVs, as detected in a prior sequencing result of a tumor sample.

Capture Hybridization

Some embodiments utilize capture hybridization techniques to perform targeted sequencing. When performing sequencing on cell-free nucleic acids, in order to enhance resolution on particular genomic loci, library products can be captured by hybridization prior to sequencing. Capture hybridization can be particularly useful when trying to detect somatic variants and/or germline variants from a sample at particular genomic loci. In some situations, detection of somatic variants is indicative that the source of nucleic acids, including nucleic acids derived from a tumor or other neoplastic source. In some situations, identification of particular germline variants that are associated with neoplasm pathogenesis can provide support that a neoplasm is present. Accordingly, capture hybridization is a tool that can enhance detection of circulating tumor nucleic acids within cell-free nucleic acids.

In an aspect, the present disclosure provides a bait set for hybridization capture, the bait set comprising at least 1, 2, 3, 4, 5, 6, 7, 8, 9, 10, 20, 30, 40, 50, 60, 70, 80, 90, 100, 200, 300, 400, 500, 600, 700, 800, 900, 1000, 1200, 1400, 1600, 1800, 2000, 2200, 2400, 2600, 2800, 3000, 3200, 3400, 3600, 3800, 4000, 4200, 4400, 4600, 4800, or 5000 different polynucleotide-containing probes, wherein the polynucleotide-containing probes are, collectively, configured to hybridize to cfDNA derived from at least 5% of the genomic regions set forth in Table 1.

TABLE 1

Lung-CliP Genomic Loci (Human Genome, Build hg19 (GRCh37)).

| Chromosome | Beginning Genomic Coordinate | Ending Genomic Coordinate | Chromosome | Beginning Genomic Coordinate | Ending Genomic Coordinate |
|---|---|---|---|---|---|
| chr1 | 1747151 | 1747349 | chr2 | 133539730 | 133543194 |
| chr1 | 27056116 | 27056380 | chr2 | 137813960 | 137814783 |
| chr1 | 27057621 | 27058114 | chr2 | 141665427 | 141665655 |
| chr1 | 27059126 | 27059339 | chr2 | 141819591 | 141819839 |
| chr1 | 27087326 | 27087617 | chr2 | 155555284 | 155555956 |
| chr1 | 27087811 | 27088033 | chr2 | 155711230 | 155711835 |
| chr1 | 27088611 | 27088831 | chr2 | 163693040 | 163693289 |
| chr1 | 27089431 | 27089786 | chr2 | 178095482 | 178096583 |
| chr1 | 27092686 | 27092893 | chr2 | 178096597 | 178096770 |
| chr1 | 27092896 | 27093107 | chr2 | 178097127 | 178097329 |
| chr1 | 27094256 | 27094498 | chr2 | 178097922 | 178098121 |
| chr1 | 27097581 | 27097828 | chr2 | 178098702 | 178099022 |
| chr1 | 27098956 | 27099171 | chr2 | 178129177 | 178129382 |
| chr1 | 27099276 | 27099503 | chr2 | 198266441 | 198266613 |
| chr1 | 27099806 | 27100025 | chr2 | 198266681 | 198266885 |
| chr1 | 27100031 | 27100177 | chr2 | 198267256 | 198267583 |
| chr1 | 27100236 | 27100454 | chr2 | 198948599 | 198950946 |
| chr1 | 27100796 | 27101744 | chr2 | 211512589 | 211512797 |
| chr1 | 27102031 | 27102249 | chr2 | 212286679 | 212286887 |
| chr1 | 27105491 | 27105662 | chr2 | 212288844 | 212289051 |
| chr1 | 27105721 | 27107260 | chr2 | 212293069 | 212293241 |
| chr1 | 38227225 | 38227530 | chr2 | 212295644 | 212295851 |
| chr1 | 38227535 | 38227755 | chr2 | 212426604 | 212426850 |
| chr1 | 65300182 | 65300389 | chr2 | 212483849 | 212484049 |
| chr1 | 65301037 | 65301234 | chr2 | 212488609 | 212488815 |
| chr1 | 65301742 | 65301951 | chr2 | 212495154 | 212495335 |
| chr1 | 65303592 | 65303795 | chr2 | 225338930 | 225339131 |
| chr1 | 65304102 | 65304324 | chr2 | 225342880 | 225343098 |
| chr1 | 65305252 | 65305515 | chr2 | 225346585 | 225346828 |
| chr1 | 65306877 | 65307082 | chr2 | 225360510 | 225360692 |
| chr1 | 65307107 | 65307318 | chr2 | 225362410 | 225362618 |
| chr1 | 65309722 | 65309940 | chr2 | 225365045 | 225365245 |
| chr1 | 65310407 | 65310611 | chr2 | 225367635 | 225367843 |
| chr1 | 65311162 | 65311375 | chr2 | 225368335 | 225368547 |
| chr1 | 65312267 | 65312490 | chr2 | 225370650 | 225370855 |
| chr1 | 65313187 | 65313397 | chr2 | 225371545 | 225371754 |
| chr1 | 65316442 | 65316657 | chr2 | 225376050 | 225376300 |
| chr1 | 65321167 | 65321414 | chr2 | 225378195 | 225378402 |
| chr1 | 65323302 | 65323511 | chr2 | 225379295 | 225379508 |
| chr1 | 65325757 | 65325980 | chr2 | 225400205 | 225400425 |
| chr1 | 65330437 | 65330641 | chr2 | 225422350 | 225422599 |
| chr1 | 65332517 | 65332919 | chr2 | 225449595 | 225449798 |
| chr1 | 65334962 | 65335180 | chr2 | 228881110 | 228882939 |
| chr1 | 65339032 | 65339243 | chr2 | 228882950 | 228884865 |
| chr1 | 65344672 | 65344812 | chr2 | 237172765 | 237172979 |
| chr1 | 65348937 | 65349191 | chr20 | 1960990 | 1961630 |
| chr1 | 65351842 | 65352043 | chr20 | 9546523 | 9547018 |
| chr1 | 70503769 | 70505502 | chr20 | 31022212 | 31022642 |
| chr1 | 74506881 | 74507632 | chr20 | 31023287 | 31023534 |
| chr1 | 75036823 | 75039178 | chr20 | 31023697 | 31023944 |
| chr1 | 75065358 | 75065614 | chr20 | 51870192 | 51871180 |
| chr1 | 77509858 | 77510303 | chr20 | 51871182 | 51873103 |
| chr1 | 99771217 | 99772585 | chr20 | 57484341 | 57484549 |
| chr1 | 103491722 | 103491946 | chr20 | 57766076 | 57769826 |
| chr1 | 115251118 | 115251288 | chr21 | 44513179 | 44513396 |
| chr1 | 115252158 | 115252372 | chr21 | 44514529 | 44514606 |
| chr1 | 115256398 | 115256631 | chr21 | 44514649 | 44514724 |

TABLE 1-continued

Lung-CliP Genomic Loci (Human Genome, Build hg19 (GRCh37)).

| Chromosome | Beginning Genomic Coordinate | Ending Genomic Coordinate | Chromosome | Beginning Genomic Coordinate | Ending Genomic Coordinate |
|---|---|---|---|---|---|
| chr1 | 115258618 | 115258830 | chr21 | 44514769 | 44514848 |
| chr1 | 155874079 | 155874333 | chr21 | 44514869 | 44514942 |
| chr1 | 155874449 | 155874659 | chr21 | 44515494 | 44515565 |
| chr1 | 158627234 | 158627494 | chr21 | 44515614 | 44515684 |
| chr1 | 158651289 | 158651493 | chr21 | 44515729 | 44515944 |
| chr1 | 159175237 | 159176182 | chr21 | 44520499 | 44520702 |
| chr1 | 165175094 | 165175306 | chr21 | 44524369 | 44524462 |
| chr1 | 167088520 | 167088733 | chr21 | 44524484 | 44524593 |
| chr1 | 167095025 | 167095602 | chr21 | 44527474 | 44527693 |
| chr1 | 167095620 | 167097864 | chr3 | 12627132 | 12627346 |
| chr1 | 175046551 | 175046907 | chr3 | 12641792 | 12642004 |
| chr1 | 176915056 | 176915269 | chr3 | 12645607 | 12645829 |
| chr1 | 177001571 | 177001959 | chr3 | 38182589 | 38182802 |
| chr1 | 181708254 | 181708423 | chr3 | 73432541 | 73432791 |
| chr1 | 216372944 | 216373442 | chr3 | 73432816 | 73433420 |
| chr1 | 216419924 | 216420537 | chr3 | 73433426 | 73434058 |
| chr1 | 216737549 | 216737736 | chr3 | 89258987 | 89259688 |
| chr1 | 222716891 | 222717559 | chr3 | 89390042 | 89390244 |
| chr1 | 247587162 | 247588364 | chr3 | 89390882 | 89391281 |
| chr1 | 247588367 | 247588922 | chr3 | 96706154 | 96706784 |
| chr1 | 248039182 | 248039793 | chr3 | 113955089 | 113955841 |
| chr10 | 25886672 | 25888076 | chr3 | 147108706 | 147109046 |
| chr10 | 25888077 | 25888214 | chr3 | 147113616 | 147113714 |
| chr10 | 50818856 | 50820329 | chr3 | 147113721 | 147113866 |
| chr10 | 55912830 | 55913084 | chr3 | 147113871 | 147114260 |
| chr10 | 81374394 | 81374610 | chr3 | 147127926 | 147128644 |
| chr10 | 81374644 | 81374971 | chr3 | 147128646 | 147128724 |
| chr10 | 81375139 | 81375215 | chr3 | 147128786 | 147128911 |
| chr10 | 81375224 | 81375300 | chr3 | 147131126 | 147131345 |
| chr10 | 81375304 | 81375491 | chr3 | 164905695 | 164908605 |
| chr10 | 81375504 | 81375634 | chr3 | 165547273 | 165547665 |
| chr10 | 81375644 | 81375858 | chr3 | 165547678 | 165548843 |
| chr10 | 89624282 | 89624358 | chr3 | 178916584 | 178917005 |
| chr10 | 89653727 | 89653803 | chr3 | 178917454 | 178917695 |
| chr10 | 89653842 | 89653920 | chr3 | 178919044 | 178919358 |
| chr10 | 89685182 | 89685251 | chr3 | 178921304 | 178921594 |
| chr10 | 89685277 | 89685396 | chr3 | 178922234 | 178922437 |
| chr10 | 89690717 | 89690913 | chr3 | 178927329 | 178927533 |
| chr10 | 89692747 | 89693019 | chr3 | 178927964 | 178928132 |
| chr10 | 89711767 | 89711990 | chr3 | 178928189 | 178928400 |
| chr10 | 89717587 | 89717905 | chr3 | 178935989 | 178936159 |
| chr10 | 89720642 | 89720852 | chr3 | 178936919 | 178937029 |
| chr10 | 89725022 | 89725129 | chr3 | 178937334 | 178937536 |
| chr10 | 108923700 | 108924087 | chr3 | 178937679 | 178937897 |
| chr11 | 532585 | 532797 | chr3 | 178938749 | 178938954 |
| chr11 | 533430 | 533640 | chr3 | 178941824 | 178942022 |
| chr11 | 533740 | 533957 | chr3 | 178942449 | 178942657 |
| chr11 | 534170 | 534280 | chr3 | 178943679 | 178943890 |
| chr11 | 534295 | 534367 | chr3 | 178947039 | 178947248 |
| chr11 | 7981361 | 7982882 | chr3 | 178947754 | 178947954 |
| chr11 | 18730979 | 18731227 | chr3 | 178947984 | 178948194 |
| chr11 | 30032240 | 30033823 | chr3 | 178951854 | 178952172 |
| chr11 | 30033840 | 30034243 | chr3 | 181430124 | 181430290 |
| chr11 | 40135967 | 40137061 | chr3 | 181430364 | 181430658 |
| chr11 | 40137072 | 40137875 | chr3 | 181430674 | 181430918 |
| chr11 | 69456056 | 69456312 | chr3 | 181430939 | 181431086 |
| chr11 | 69457776 | 69458039 | chr3 | 181431099 | 181431164 |
| chr11 | 69458571 | 69458782 | chr3 | 181431359 | 181431459 |
| chr11 | 69462726 | 69462943 | chr3 | 181431509 | 181431580 |
| chr11 | 69465861 | 69465967 | chr3 | 181431589 | 181431794 |
| chr11 | 69465991 | 69466066 | chr3 | 181431804 | 181431904 |
| chr11 | 88337853 | 88338141 | chr3 | 181431914 | 181432015 |
| chr11 | 92085255 | 92088559 | chr3 | 181432184 | 181432255 |
| chr11 | 92530995 | 92535065 | chr3 | 183209693 | 183210045 |
| chr11 | 105795118 | 105795494 | chr3 | 183210248 | 183210540 |
| chr11 | 119148858 | 119149031 | chr3 | 183211838 | 183212089 |
| chr12 | 13715702 | 13717569 | chr3 | 183217353 | 183217634 |
| chr12 | 25362523 | 25362588 | chr3 | 183225813 | 183226312 |
| chr12 | 25362623 | 25362716 | chr3 | 183245603 | 183245824 |
| chr12 | 25368323 | 25368539 | chr3 | 183273118 | 183273477 |
| chr12 | 25378518 | 25378707 | chr3 | 189526039 | 189526183 |
| chr12 | 25380133 | 25380346 | chr3 | 189526189 | 189526324 |
| chr12 | 25398133 | 25398394 | chr3 | 189581989 | 189582239 |
| chr12 | 25403603 | 25403786 | chr3 | 189586329 | 189586544 |

TABLE 1-continued

Lung-CliP Genomic Loci (Human Genome, Build hg19 (GRCh37)).

| Chromosome | Beginning Genomic Coordinate | Ending Genomic Coordinate | Chromosome | Beginning Genomic Coordinate | Ending Genomic Coordinate |
|---|---|---|---|---|---|
| chr12 | 68619324 | 68619540 | chr3 | 189590619 | 189590835 |
| chr12 | 69202154 | 69202367 | chr3 | 189604159 | 189604380 |
| chr12 | 69202924 | 69203127 | chr3 | 189611964 | 189612326 |
| chr12 | 69207269 | 69207480 | chr4 | 16504234 | 16504529 |
| chr12 | 69210559 | 69210764 | chr4 | 44176790 | 44177282 |
| chr12 | 69214019 | 69214088 | chr4 | 52860522 | 52862331 |
| chr12 | 69214094 | 69214225 | chr4 | 55140641 | 55140852 |
| chr12 | 69218069 | 69218284 | chr4 | 55140976 | 55141175 |
| chr12 | 69218314 | 69218488 | chr4 | 55144016 | 55144235 |
| chr12 | 69222529 | 69222663 | chr4 | 55144496 | 55144724 |
| chr12 | 69222664 | 69222740 | chr4 | 55151966 | 55152178 |
| chr12 | 69229599 | 69229774 | chr4 | 55593546 | 55593746 |
| chr12 | 69230389 | 69230599 | chr4 | 55594136 | 55594343 |
| chr12 | 69233029 | 69233654 | chr4 | 55595471 | 55595693 |
| chr12 | 72680490 | 72680749 | chr4 | 55599201 | 55599403 |
| chr12 | 75444200 | 75445072 | chr4 | 62758348 | 62758673 |
| chr12 | 75807330 | 75807535 | chr4 | 62845263 | 62845511 |
| chr12 | 78225225 | 78225503 | chr4 | 94006115 | 94006439 |
| chr12 | 78515690 | 78516231 | chr4 | 106155079 | 106158545 |
| chr12 | 81110856 | 81111359 | chr4 | 106162434 | 106162645 |
| chr12 | 100811761 | 100811983 | chr4 | 106163969 | 106164137 |
| chr12 | 129558404 | 129559598 | chr4 | 106164699 | 106164950 |
| chr13 | 29598786 | 29599014 | chr4 | 106180744 | 106180954 |
| chr13 | 29599016 | 29601044 | chr4 | 106182864 | 106183071 |
| chr13 | 48878015 | 48878227 | chr4 | 106190734 | 106190926 |
| chr13 | 48881380 | 48881575 | chr4 | 106193694 | 106194110 |
| chr13 | 48916685 | 48916895 | chr4 | 106196174 | 106197711 |
| chr13 | 48919175 | 48919373 | chr4 | 114274285 | 114280432 |
| chr13 | 48921880 | 48922043 | chr4 | 164271411 | 164272631 |
| chr13 | 48923025 | 48923236 | chr4 | 164393031 | 164393893 |
| chr13 | 48934110 | 48934314 | chr4 | 164393901 | 164394894 |
| chr13 | 48936925 | 48937127 | chr5 | 1264487 | 1264736 |
| chr13 | 48938960 | 48939171 | chr5 | 1282522 | 1282772 |
| chr13 | 48941575 | 48941798 | chr5 | 1294862 | 1295387 |
| chr13 | 48942600 | 48942805 | chr5 | 7789725 | 7789938 |
| chr13 | 48947485 | 48947686 | chr5 | 9629262 | 9630080 |
| chr13 | 48951005 | 48951218 | chr5 | 11346465 | 11346752 |
| chr13 | 48953715 | 48953823 | chr5 | 11364790 | 11365048 |
| chr13 | 48954165 | 48954250 | chr5 | 15927978 | 15928615 |
| chr13 | 48954295 | 48954424 | chr5 | 15936543 | 15937312 |
| chr13 | 48955375 | 48955626 | chr5 | 19473339 | 19473857 |
| chr13 | 49027085 | 49027303 | chr5 | 21751850 | 21752353 |
| chr13 | 49030315 | 49030517 | chr5 | 22078530 | 22078784 |
| chr13 | 49033800 | 49034011 | chr5 | 24487765 | 24488112 |
| chr13 | 49037820 | 49038023 | chr5 | 24488125 | 24488293 |
| chr13 | 49039120 | 49039297 | chr5 | 24491650 | 24491937 |
| chr13 | 49039320 | 49039533 | chr5 | 24498460 | 24498668 |
| chr13 | 49047400 | 49047623 | chr5 | 24509725 | 24509937 |
| chr13 | 49050810 | 49051024 | chr5 | 24537460 | 24537789 |
| chr13 | 49051405 | 49051619 | chr5 | 24593340 | 24593623 |
| chr13 | 49054060 | 49054281 | chr5 | 26881214 | 26881749 |
| chr13 | 58206681 | 58209277 | chr5 | 26903729 | 26903967 |
| chr13 | 58298726 | 58299430 | chr5 | 26915729 | 26916048 |
| chr14 | 29237175 | 29237981 | chr5 | 31302213 | 31302416 |
| chr14 | 36986461 | 36986961 | chr5 | 33576138 | 33577299 |
| chr14 | 36987071 | 36987255 | chr5 | 33624323 | 33624504 |
| chr14 | 36988166 | 36988269 | chr5 | 33936823 | 33938022 |
| chr14 | 36988281 | 36988596 | chr5 | 35876078 | 35876605 |
| chr14 | 36989196 | 36989403 | chr5 | 63256314 | 63257576 |
| chr14 | 42355817 | 42357220 | chr5 | 82937302 | 82937621 |
| chr14 | 42360442 | 42361174 | chr5 | 149498258 | 149498471 |
| chr14 | 105246390 | 105246595 | chr5 | 149498973 | 149499187 |
| chr15 | 23889109 | 23890965 | chr5 | 149499523 | 149499735 |
| chr15 | 24921029 | 24922991 | chr5 | 149500413 | 149500595 |
| chr15 | 24922994 | 24923368 | chr5 | 149500728 | 149500936 |
| chr15 | 24923374 | 24924521 | chr5 | 149501418 | 149501626 |
| chr15 | 26792953 | 26793313 | chr5 | 149502573 | 149502798 |
| chr15 | 45003678 | 45003897 | chr5 | 149503758 | 149503978 |
| chr15 | 45007593 | 45007907 | chr5 | 149504243 | 149504459 |
| chr15 | 45008423 | 45008648 | chr5 | 149504978 | 149505180 |
| chr15 | 88678321 | 88678642 | chr5 | 151783998 | 151784635 |
| chr15 | 89386591 | 89386878 | chr5 | 156589467 | 156590715 |
| chr16 | 9857011 | 9858810 | chr5 | 156592547 | 156593123 |
| chr16 | 20043027 | 20043994 | chr6 | 40399471 | 40400884 |

TABLE 1-continued

Lung-CliP Genomic Loci (Human Genome, Build hg19 (GRCh37)).

| Chromosome | Beginning Genomic Coordinate | Ending Genomic Coordinate | Chromosome | Beginning Genomic Coordinate | Ending Genomic Coordinate |
|---|---|---|---|---|---|
| chr16 | 20380807 | 20381010 | chr6 | 47846079 | 47847607 |
| chr16 | 26146946 | 26147562 | chr6 | 57398115 | 57398318 |
| chr16 | 49669576 | 49672771 | chr6 | 66204630 | 66205259 |
| chr16 | 61687499 | 61688005 | chr6 | 87725073 | 87725398 |
| chr17 | 648196 | 648398 | chr6 | 87725403 | 87726176 |
| chr17 | 3101443 | 3101663 | chr6 | 96651031 | 96652090 |
| chr17 | 4638476 | 4638695 | chr6 | 130761546 | 130763049 |
| chr17 | 4936886 | 4937043 | chr6 | 146719890 | 146720800 |
| chr17 | 7572869 | 7573080 | chr6 | 165715051 | 165715324 |
| chr17 | 7573869 | 7574094 | chr6 | 165715336 | 165715720 |
| chr17 | 7576534 | 7576671 | chr6 | 165715741 | 165715815 |
| chr17 | 7576789 | 7577197 | chr7 | 2578123 | 2578336 |
| chr17 | 7577444 | 7577669 | chr7 | 4841355 | 4841559 |
| chr17 | 7578129 | 7578341 | chr7 | 5662485 | 5662802 |
| chr17 | 7578344 | 7578591 | chr7 | 6590790 | 6591012 |
| chr17 | 7579289 | 7579992 | chr7 | 8125890 | 8126119 |
| chr17 | 7760424 | 7760639 | chr7 | 12409294 | 12409508 |
| chr17 | 8243484 | 8243708 | chr7 | 23240015 | 23240248 |
| chr17 | 10535875 | 10536068 | chr7 | 30795192 | 30795423 |
| chr17 | 13980108 | 13980313 | chr7 | 31682342 | 31683533 |
| chr17 | 17696564 | 17696786 | chr7 | 36445879 | 36446097 |
| chr17 | 21318648 | 21319168 | chr7 | 43664177 | 43664387 |
| chr17 | 21319203 | 21319315 | chr7 | 45148522 | 45148680 |
| chr17 | 25909791 | 25910018 | chr7 | 50070679 | 50070914 |
| chr17 | 29422258 | 29422454 | chr7 | 53103341 | 53104267 |
| chr17 | 29482988 | 29483163 | chr7 | 55086916 | 55087111 |
| chr17 | 29485973 | 29486179 | chr7 | 55209956 | 55210157 |
| chr17 | 29490183 | 29490427 | chr7 | 55210966 | 55211214 |
| chr17 | 29496863 | 29497064 | chr7 | 55214261 | 55214477 |
| chr17 | 29508418 | 29508584 | chr7 | 55218911 | 55219132 |
| chr17 | 29508663 | 29508813 | chr7 | 55220191 | 55220408 |
| chr17 | 29509503 | 29509705 | chr7 | 55221666 | 55221880 |
| chr17 | 29528108 | 29528204 | chr7 | 55223476 | 55223683 |
| chr17 | 29528413 | 29528542 | chr7 | 55224191 | 55224602 |
| chr17 | 29533223 | 29533427 | chr7 | 55225301 | 55225502 |
| chr17 | 29545998 | 29546175 | chr7 | 55227811 | 55228047 |
| chr17 | 29550513 | 29550630 | chr7 | 55229151 | 55229365 |
| chr17 | 29552178 | 29552252 | chr7 | 55231361 | 55231588 |
| chr17 | 29554248 | 29554350 | chr7 | 55232951 | 55233168 |
| chr17 | 29559793 | 29559905 | chr7 | 55238786 | 55239011 |
| chr17 | 29560038 | 29560156 | chr7 | 55240636 | 55240857 |
| chr17 | 29562698 | 29562776 | chr7 | 55241576 | 55242598 |
| chr17 | 29562883 | 29563070 | chr7 | 55248946 | 55249197 |
| chr17 | 29575988 | 29576162 | chr7 | 55259376 | 55259601 |
| chr17 | 29579878 | 29579997 | chr7 | 55260396 | 55260603 |
| chr17 | 29579998 | 29580062 | chr7 | 55266386 | 55266601 |
| chr17 | 29587353 | 29587553 | chr7 | 55267956 | 55269055 |
| chr17 | 29588703 | 29588906 | chr7 | 55269341 | 55269555 |
| chr17 | 29592318 | 29592387 | chr7 | 55270166 | 55270374 |
| chr17 | 29652813 | 29653300 | chr7 | 55272926 | 55273340 |
| chr17 | 29654488 | 29654867 | chr7 | 64292087 | 64292166 |
| chr17 | 29657288 | 29657531 | chr7 | 73279393 | 73279622 |
| chr17 | 29661828 | 29662071 | chr7 | 86415597 | 86416352 |
| chr17 | 29663323 | 29663533 | chr7 | 87913258 | 87913459 |
| chr17 | 29663628 | 29663942 | chr7 | 89856436 | 89856657 |
| chr17 | 29664353 | 29664636 | chr7 | 97361885 | 97362085 |
| chr17 | 29664758 | 29664974 | chr7 | 100486595 | 100486810 |
| chr17 | 29665003 | 29665204 | chr7 | 102574720 | 102574923 |
| chr17 | 29665703 | 29665873 | chr7 | 106507970 | 106509172 |
| chr17 | 29667483 | 29667697 | chr7 | 106509180 | 106509848 |
| chr17 | 29669993 | 29670187 | chr7 | 113517766 | 113519549 |
| chr17 | 29676133 | 29676306 | chr7 | 113519556 | 113520181 |
| chr17 | 29677168 | 29677377 | chr7 | 116339113 | 116340373 |
| chr17 | 29679253 | 29679456 | chr7 | 116371698 | 116371956 |
| chr17 | 29683433 | 29683656 | chr7 | 116379963 | 116380174 |
| chr17 | 29683933 | 29684149 | chr7 | 116380883 | 116381108 |
| chr17 | 29684238 | 29684436 | chr7 | 116395383 | 116395595 |
| chr17 | 29685488 | 29685657 | chr7 | 116397443 | 116397645 |
| chr17 | 29685903 | 29686123 | chr7 | 116397673 | 116397840 |
| chr17 | 29687483 | 29687763 | chr7 | 116398488 | 116398696 |
| chr17 | 29700998 | 29701206 | chr7 | 116399358 | 116399577 |
| chr17 | 33689810 | 33690009 | chr7 | 116403078 | 116403359 |
| chr17 | 37856428 | 37856628 | chr7 | 116409688 | 116409859 |
| chr17 | 37863208 | 37863423 | chr7 | 116411523 | 116411873 |

TABLE 1-continued

Lung-CliP Genomic Loci (Human Genome, Build hg19 (GRCh37)).

| Chromosome | Beginning Genomic Coordinate | Ending Genomic Coordinate | Chromosome | Beginning Genomic Coordinate | Ending Genomic Coordinate |
|---|---|---|---|---|---|
| chr17 | 37864553 | 37864804 | chr7 | 116411888 | 116412211 |
| chr17 | 37865533 | 37865751 | chr7 | 116414913 | 116415190 |
| chr17 | 37865993 | 37866213 | chr7 | 116417383 | 116417584 |
| chr17 | 37866298 | 37866506 | chr7 | 116418808 | 116419051 |
| chr17 | 37866553 | 37866770 | chr7 | 116421998 | 116422207 |
| chr17 | 37868138 | 37868355 | chr7 | 116423323 | 116423536 |
| chr17 | 37868528 | 37868760 | chr7 | 116435668 | 116435880 |
| chr17 | 37871478 | 37871848 | chr7 | 116435918 | 116436202 |
| chr17 | 37871958 | 37872207 | chr7 | 119914681 | 119915800 |
| chr17 | 37872518 | 37872922 | chr7 | 123152060 | 123152275 |
| chr17 | 37873548 | 37873757 | chr7 | 126172979 | 126173941 |
| chr17 | 37875963 | 37876167 | chr7 | 131195733 | 131195949 |
| chr17 | 37879533 | 37879746 | chr7 | 140453012 | 140453268 |
| chr17 | 37879748 | 37879955 | chr7 | 140481272 | 140481387 |
| chr17 | 37880103 | 37880313 | chr7 | 140481442 | 140481513 |
| chr17 | 37880948 | 37881204 | chr7 | 143175012 | 143175917 |
| chr17 | 37881268 | 37881488 | chr7 | 146536778 | 146537028 |
| chr17 | 37881508 | 37881723 | chr7 | 146997208 | 146997408 |
| chr17 | 37881933 | 37882156 | chr7 | 150439876 | 150440084 |
| chr17 | 37882763 | 37882976 | chr7 | 154862609 | 154863341 |
| chr17 | 37883043 | 37883300 | chr7 | 157959754 | 157959928 |
| chr17 | 37883518 | 37883838 | chr8 | 1496845 | 1497403 |
| chr17 | 37883913 | 37884334 | chr8 | 1497415 | 1497762 |
| chr17 | 39890628 | 39890845 | chr8 | 22020097 | 22020557 |
| chr17 | 40474279 | 40474527 | chr8 | 22025512 | 22025959 |
| chr17 | 40474994 | 40475203 | chr8 | 22026052 | 22026406 |
| chr17 | 45369613 | 45369830 | chr8 | 22028757 | 22029226 |
| chr17 | 46688003 | 46688219 | chr8 | 38271198 | 38271341 |
| chr17 | 51900376 | 51902422 | chr8 | 38272258 | 38272463 |
| chr17 | 58740335 | 58740924 | chr8 | 38273358 | 38273430 |
| chr17 | 59763255 | 59763474 | chr8 | 38273438 | 38273621 |
| chr17 | 72937608 | 72937820 | chr8 | 38274778 | 38274969 |
| chr17 | 74732853 | 74733253 | chr8 | 38277018 | 38277278 |
| chr17 | 76503613 | 76503829 | chr8 | 38287178 | 38287492 |
| chr17 | 78306058 | 78306278 | chr8 | 52320630 | 52322120 |
| chr17 | 81042929 | 81043145 | chr8 | 53071430 | 53071643 |
| chr18 | 13825750 | 13826764 | chr8 | 55537259 | 55538037 |
| chr18 | 22804416 | 22807669 | chr8 | 55538044 | 55542455 |
| chr18 | 42529941 | 42533266 | chr8 | 55542464 | 55542839 |
| chr18 | 63547606 | 63548072 | chr8 | 73479962 | 73480591 |
| chr19 | 1206890 | 1207229 | chr8 | 89053667 | 89054011 |
| chr19 | 1218360 | 1218559 | chr8 | 89086797 | 89087016 |
| chr19 | 1219270 | 1219468 | chr8 | 89179872 | 89180212 |
| chr19 | 1220340 | 1220538 | chr8 | 104897551 | 104898463 |
| chr19 | 1220550 | 1220750 | chr8 | 105360771 | 105361729 |
| chr19 | 1221165 | 1221380 | chr8 | 106813257 | 106815708 |
| chr19 | 1221880 | 1222092 | chr8 | 113236969 | 113237194 |
| chr19 | 1222960 | 1223204 | chr8 | 113304739 | 113304955 |
| chr19 | 1226420 | 1226679 | chr8 | 113568994 | 113569205 |
| chr19 | 8130853 | 8131129 | chr8 | 113697609 | 113697986 |
| chr19 | 10597293 | 10597511 | chr8 | 113988039 | 113988390 |
| chr19 | 10599833 | 10600090 | chr8 | 114326789 | 114327023 |
| chr19 | 10600303 | 10600551 | chr8 | 116631375 | 116632308 |
| chr19 | 10602228 | 10602960 | chr8 | 128748752 | 128748895 |
| chr19 | 10610048 | 10610751 | chr8 | 128750472 | 128751302 |
| chr19 | 30934446 | 30936220 | chr8 | 128752612 | 128753235 |
| chr19 | 30936246 | 30936659 | chr8 | 139144802 | 139145052 |
| chr19 | 31038826 | 31040406 | chr8 | 139163422 | 139165464 |
| chr19 | 54312873 | 54314547 | chr8 | 139263067 | 139263281 |
| chr19 | 56369029 | 56370595 | chr9 | 5021964 | 5022242 |
| chr19 | 56465844 | 56467497 | chr9 | 5029739 | 5029948 |
| chr19 | 56538504 | 56539902 | chr9 | 5044364 | 5044574 |
| chr19 | 57325044 | 57325578 | chr9 | 5050659 | 5050868 |
| chr19 | 57325594 | 57325699 | chr9 | 5054539 | 5054916 |
| chr19 | 57325734 | 57328957 | chr9 | 5055619 | 5055843 |
| chr19 | 57640039 | 57642769 | chr9 | 5064874 | 5065075 |
| chr19 | 57646264 | 57646508 | chr9 | 5066634 | 5066768 |
| chr19 | 57646534 | 57647480 | chr9 | 5066769 | 5066839 |
| chr2 | 25457128 | 25457301 | chr9 | 5068989 | 5069230 |
| chr2 | 25458528 | 25458638 | chr9 | 5069904 | 5070077 |
| chr2 | 25458653 | 25458728 | chr9 | 5072449 | 5072678 |
| chr2 | 25459743 | 25459820 | chr9 | 5073689 | 5073836 |
| chr2 | 25459823 | 25459926 | chr9 | 5077419 | 5077620 |
| chr2 | 25461953 | 25462131 | chr9 | 5078274 | 5078482 |

TABLE 1-continued

| Lung-CliP Genomic Loci (Human Genome, Build hg19 (GRCh37)). | | | | | |
|---|---|---|---|---|---|
| Chromosome | Beginning Genomic Coordinate | Ending Genomic Coordinate | Chromosome | Beginning Genomic Coordinate | Ending Genomic Coordinate |
| chr2 | 25463148 | 25463354 | chr9 | 5080199 | 5080409 |
| chr2 | 25463443 | 25463666 | chr9 | 5080509 | 5080717 |
| chr2 | 25464398 | 25464614 | chr9 | 5081694 | 5081903 |
| chr2 | 25466708 | 25466916 | chr9 | 5089649 | 5089891 |
| chr2 | 25466993 | 25467232 | chr9 | 5090404 | 5090621 |
| chr2 | 25467368 | 25467571 | chr9 | 5090714 | 5090915 |
| chr2 | 25468058 | 25468263 | chr9 | 5122954 | 5123134 |
| chr2 | 25468803 | 25469213 | chr9 | 5126289 | 5126491 |
| chr2 | 25469458 | 25469671 | chr9 | 5126634 | 5126841 |
| chr2 | 25469873 | 25470083 | chr9 | 5456029 | 5456207 |
| chr2 | 25470433 | 25470540 | chr9 | 5457054 | 5457446 |
| chr2 | 25470553 | 25470658 | chr9 | 5462809 | 5463160 |
| chr2 | 25470873 | 25471124 | chr9 | 5465484 | 5465650 |
| chr2 | 25497783 | 25497987 | chr9 | 5466699 | 5466908 |
| chr2 | 25498293 | 25498495 | chr9 | 5467744 | 5467957 |
| chr2 | 25505288 | 25505608 | chr9 | 5522474 | 5522674 |
| chr2 | 25522963 | 25523183 | chr9 | 5534724 | 5535070 |
| chr2 | 25536713 | 25536929 | chr9 | 5549314 | 5549627 |
| chr2 | 29419573 | 29419785 | chr9 | 5557589 | 5557801 |
| chr2 | 29420368 | 29420587 | chr9 | 5563079 | 5563254 |
| chr2 | 29429988 | 29430192 | chr9 | 5569859 | 5570070 |
| chr2 | 29432598 | 29432804 | chr9 | 8528565 | 8528810 |
| chr2 | 29436798 | 29437011 | chr9 | 21968034 | 21968280 |
| chr2 | 29443528 | 29443749 | chr9 | 21968649 | 21968861 |
| chr2 | 29445138 | 29445285 | chr9 | 21970864 | 21971014 |
| chr2 | 29445318 | 29445536 | chr9 | 21971084 | 21971156 |
| chr2 | 29446178 | 29446811 | chr9 | 21974639 | 21974857 |
| chr2 | 29446818 | 29448488 | chr9 | 21994114 | 21994361 |
| chr2 | 40655674 | 40657075 | chr9 | 104432327 | 104433405 |
| chr2 | 40657079 | 40657434 | chr9 | 120474664 | 120476878 |
| chr2 | 49189918 | 49191116 | chr9 | 138651518 | 138651732 |
| chr2 | 50724436 | 50724868 | chr9 | 139390542 | 139391063 |
| chr2 | 51254636 | 51255310 | chr9 | 139397602 | 139397822 |
| chr2 | 85883222 | 85883740 | chr9 | 139399092 | 139399590 |
| chr2 | 85884302 | 85884439 | chr9 | 139409912 | 139410196 |
| chr2 | 85884467 | 85884784 | chr9 | 139413022 | 139413308 |
| chr2 | 85884987 | 85885052 | chr9 | 139417387 | 139417604 |
| chr2 | 85885257 | 85885632 | chrX | 54497690 | 54497893 |
| chr2 | 85885932 | 85887253 | chrX | 77912505 | 77913919 |
| chr2 | 85887867 | 85889126 | chrX | 79285968 | 79286638 |
| chr2 | 107423111 | 107423432 | chrX | 90690583 | 90691747 |
| chr2 | 107459476 | 107460459 | chrX | 127185094 | 127185672 |
| chr2 | 125261856 | 125262161 | chrX | 127185719 | 127185923 |
| chr2 | 125530352 | 125530630 | chrX | 127185924 | 127186106 |
| chr2 | 125671647 | 125671886 | chrX | 135426542 | 135432592 |
| chr2 | 131519628 | 131522263 | chrX | 142716401 | 142718933 |
| chr2 | 133539495 | 133539711 | chrX | 144903922 | 144906519 |

In some embodiments, a polynucleotide-containing probe is configured to selectively hybridize to DNA molecules that are at least partially complementary to at least a portion of the polynucleotide-containing probe. In some embodiments, the portion is at least 10%, at least 20%, at least 30%, at least 40%, at least 50%, at least 60%, at least 70%, at least 80%, at least 90%, at least 95%, at least 98%, or at least 99% of the polynucleotide-containing probe. In some embodiments, the portion is at least 2, 3, 4, 5, 6, 7, 8, 9, 10, 15, 20, 25, 30, 35, 40, 45, 50, 55, 60, 65, 70, 75, 80, 85, 90, 95, or 100 consecutive nucleotides of the polynucleotide-containing probe.

In some embodiments, a polynucleotide-containing probe is configured to hybridize to at least 10%, at least 20%, at least 30%, at least 40%, at least 50%, at least 60%, at least 70%, at least 80%, at least 90%, at least 95%, at least 98%, or at least 99% of a given target sequence (e.g., genomic region). In some embodiments, a polynucleotide-containing probe is configured to hybridize to the entire target sequence (e.g., genomic region).

In some embodiments, each of the polynucleotide-containing probes has a nucleic acid sequence that is at least 1, 2, 3, 4, 5, 6, 7, 8, 9, 10, 20, 30, 40, 50, 60, 70, 80, 90, 100, 120, 140, 160, 180, 200, 220, 240, 260, 280, or 300 nucleotides in length. In some embodiments, each of the polynucleotide-containing probes has a nucleic acid sequence of no more than 300, 280, 260, 240, 220, 200, 180, 160, 140, 120, 100, 90, 80, 70, 60, 50, 40, 30, 20, 10, 9, 8, 7, 6, 5, 4, 3, or 2 nucleotides in length. In some embodiments, each of the polynucleotide-containing probes is conjugated to an affinity moiety. In some embodiments, the affinity moiety comprises biotin.

In some embodiments, the polynucleotides probes are, collectively, configured to hybridize to cfDNA derived from at least 10%, at least 20%, at least 30%, at least 40%, at least 50%, at least 60%, at least 70%, at least 80%, at least 90%, at least 95%, at least 98%, at least 99%, or 100% of the genomic regions set forth in Table 1. In some embodiments, an entirety of polynucleotide probes in the bait set are configured to hybridize to cfDNA molecules derived from at least 30%, at least 40%, at least 50%, at least 60%, at least 70%, at least 80%, at least 90%, at least 95%, or 100% of the genomic regions set forth in Table 1.

In an aspect, a method of performing capture hybridization may comprise obtaining a plurality of DNA molecules derived from a cell-free DNA source; and mixing a fraction of the plurality of DNA molecules with a set of capture bait molecules. In some embodiments, the set of capture bait molecules are configured to selectively hybridize to DNA molecules comprising sequences that comprise at least a portion of a genomic locus selected from the group of genomic loci in Table 1.

In some embodiments, the portion of the genomic locus comprises at least 1, 2, 3, 4, 5, 6, 7, 8, 9, 10, 20, 30, 40, 50, 60, 70, 80, 90, 100, 120, 140, 160, 180, 200, 220, 240, 260, 280, or 300 consecutive nucleotides of the genomic locus. In some embodiments, the fraction is at least about 5%, 10%, 15%, 20%, 25%, 30%, 35%, 40%, 45%, 50%, 55%, 60%, 65%, 70%, 75%, 80%, 85%, 90%, 95%, or 100% of the plurality of DNA molecules.

In some embodiments, the method further comprises optimizing a molar ratio of the fraction of the plurality of DNA molecules and the set of capture bait molecules to yield an optimal recovery of a total number of unique molecules or to yield an optimal recovery of a total number of duplexed cell-free DNA molecules in which both strands of the sourced cell-free DNA duplex are sequenced, wherein the molar ratio is at least about 5%, 10%, 15%, 20%, 25%, 30%, 35%, 40%, 45%, 50%, 55%, 60%, 65%, 70%, 75%, 80%, 85%, 90%, 95%, or 100%.

In some embodiments, the method further comprises using an in silico simulation of the capture hybridization to determine the fraction of the plurality of DNA molecules that is mixed with the set of capture bait molecules, wherein the fraction is no more than about 100%, 95%, 90%, 85%, 80%, 75%, 70%, 65%, 60%, 55%, 50%, 45%, 40%, 35%, 30%, 25%, 20%, 15%, 10%, or 5%.

Through in silico analysis, it was found that the most common sequencing artifact observed in capture-based sequencing methods are oxidation of guanine (G) that occurs during the hybrid capture step, which resulted in transformation of guanine into 8-oxoguanine. This unintended in vitro oxidation result can result in a G>T transversion, which can confound sequencing results, especially when searching for polymorphic variants in a sample. It is further noted that G>T transversions are common mutagenesis event that occurs in vivo, especially in a neoplasm or cancer. Some environmental agents (e.g., UV radiation, cigarette smoke, free radicals) oxidize guanine (G) causing G>T transversions and thus a G>T transversion may have already occurred within the biological source prior to extraction (FIGS. 4A-4B). Accordingly, to mitigate the confounding in vitro mutagenesis, it was hypothesized that an enzyme and/or antioxidant may prevent the oxidation occurring during hybrid capture. To test this hypothesis, enzymes and/or reactive oxygen species (ROS) scavengers were utilized to see which scavengers may prevent in vitro formation of 8-oxoguanine during capture hybridization. Enzymes tested included uracil-DNA glycosylase (UDG), Formamidopyrimidine [fapy]-DNA glycosylase (FPG), and catalase enzyme. Antioxidants tested included glutathione, hypotaurine, and sodium sulfite. It was found that these enzymes and compounds, especially hypotaurine, mitigated formation of 8-oxoguanine during capture hybridization (FIGS. 4A-4B).

In some embodiments, an antioxidant and/or enzyme is included during a hybrid capture assay. In some of these embodiments, the antioxidant is hypotaurine. Various embodiments are directed to capture hybridization methods in which hypotaurine is added to the hybridization reaction mixture. In many of these embodiments, hypotaurine is utilized within a sequencing protocol to mitigate the detection of in vitro G>T transversions in the sequencing result that occur during sequencing preparation. Accordingly, in some embodiments, hypotaurine is utilized to capture particular DNA molecules that are then used for a sequencing reaction.

Detection of Circulating Tumor Nucleic Acids from Cell-Free Nucleic Acids

Some embodiments are directed to utilization of computational models to determine whether a cell-free nucleic acid sample includes circulating tumor nucleic acids. In some embodiments, SNVs and/or CNVs within a sequencing result of a cell-free nucleic acid sample are analyzed via computational models to determine whether the SNVs and/or CNVs are derived from circulating tumor nucleic acids. In some embodiments, computational models are trained on nucleic acid samples derived from cancer patients and unaffected individuals.

In some embodiments, a computational model is utilized to detect circulating tumor nucleic acids based on the SNVs within sequencing reads derived from cell-free nucleic acid sequencing result. In many embodiments, a computational model is utilized to detect circulating tumor nucleic acids based on the CNVs based upon sequencing reads derived from cell-free nucleic acid sequencing result. In some embodiments, a computational model considers genomic position of a sequencing read. In some embodiments, a computational model considers a polygenic risk score (PRS) derived from a sequencing result. In various embodiments, a computational model yields a confidence score indicative of a likelihood that cell-free nucleic acid sequencing result includes circulating tumor nucleic acid sequences. In some embodiments, a classifier is utilized that combines confidence scores of various computational modules to classify cell-free nucleic acid sequencing results based on their likelihood of containing circulating tumor nucleic acids. In some embodiments, computational modules are combined, tiered, nested, utilized sequentially, utilized in tandem, or any combination thereof.

In various embodiments, a computational model is trained utilizing sequencing results of nucleic acids extracted directly from cancer cells (e.g., patient tumor), which can be utilized to identify true positive results. In some embodiments, a computational model is trained utilizing sequencing results of nucleic acids extracted from another host source (e.g., hematopoietic cells), which can be utilized to identify false positive results. In some embodiments, sequencing results of nucleic acids extracted from hematopoietic cells is utilized to remove confounding variants that are often present in cell-free nucleic acids, such as variants that arise from clonal hematopoiesis (CH). In some embodiments, cell-free nucleic acid fragment length is utilized as a feature, as it has been found that that cfDNA molecules harboring tumor derived mutations have distinct fragment size distributions as compared to molecules harboring non-tumor derived mutations.

In many embodiments, a computational model to detect circulating tumor nucleic acids is utilized specifically for detection of a particular cancer type. In some instances, a cancer-specific detection model can utilize features specific to that particular cancer, which can provide a better prediction. For example, SNVs and/or CNVs that occur within genomic loci "hotspots" known to occur in particular cancer can be utilized within a model. In some instances, "hotspots" are oncogenic driver genes. In another example, SNVs and/or CNVs that are consistent with a tobacco smoking mutational signature can be utilized for detection of lung cancer. Models can be built for some cancers, including (but not limited to) acute lymphoblastic leukemia (ALL), acute myeloid leukemia (AML), anal cancer, astrocytomas, basal cell carcinoma, bile duct cancer, bladder cancer, breast cancer, cervical cancer, chronic lymphocytic leukemia (CLL) chronic myelogenous leukemia (CML), chronic myeloproliferative neoplasms, colorectal cancer, endometrial cancer, ependymoma, esophageal cancer, esthesioneuroblastoma, Ewing sarcoma, fallopian tube cancer, gallbladder cancer, gastric cancer, gastrointestinal carcinoid tumor, hairy cell leukemia, hepatocellular cancer, Hodgkin lymphoma, hypopharyngeal cancer, Kaposi sarcoma, Kidney cancer, Langerhans cell histiocytosis, laryngeal cancer, leukemia, liver cancer, lung cancer, lymphoma, melanoma, Merkel cell cancer, mesothelioma, mouth cancer, neuroblastoma, non-Hodgkin lymphoma, non-small cell lung cancer, osteosarcoma, ovarian cancer, pancreatic cancer, pancreatic neuroendocrine tumors, pharyngeal cancer, pituitary tumor, prostate cancer, rectal cancer, renal cell cancer, retinoblastoma, skin cancer, small cell lung cancer, small intestine cancer, squamous neck cancer, T-cell lymphoma, testicular cancer, thymoma, thyroid cancer, uterine cancer, vaginal cancer, and vascular tumors. It should be noted, however, that computational models can be built to detect circulating tumor nucleic acids for pan-cancer analysis (e.g., detect cancer generally, not specific subtype).

Provided in FIG. 5 is a process to build and utilize computational models to detect circulating tumor nucleic acid molecules within cell-free nucleic acids utilizing sequencing results. Process 500 can begin by obtaining (501) sequencing results of cell-free nucleic acids. Any appropriate sequencing result can be utilized. In some embodiments, a liquid or waste biopsy is extracted from an individual, the cell-free nucleic acids within that biopsy are processed and then sequenced. In some embodiments, sequencing results derived from cancer cells (e.g., tumors) and/or confounding sources (e.g., hematopoietic cells) are also utilized, especially for model training.

Process 500 optionally utilizes (503) a somatic single nucleotide variant module to determine whether a variant within a cell-free nucleic acid sequencing result is derived from circulating tumor nucleic acids. Somatic SNVs are highly common in nucleic acids derived from neoplastic cells, and thus are common in circulating tumor nucleic acids. Accordingly, detection of somatic SNVs in a cell-free nucleic acid sequencing result provides an indication that the source of the SNV is from neoplastic tissue.

Although somatic SNVs are often derived from neoplastic tissue, detected somatic SNVs can often arise due to reasons other than neoplastic growth, including (but not limited to) natural aging, clonal hematopoiesis, and other innocuous sources. It is therefore beneficial to utilize a system capable of accurately predicting whether a detected SNV is derived from a neoplastic source. In some embodiments, a computational model is utilized to provide an indication of whether a detected SNV in a cell-free nucleic acid sequencing result is truly derived from circulating tumor nucleic acid molecules.

Some embodiments are directed toward variant calling and filtering called variants derived from circulating tumor nucleic acid molecules, which may be performed prior to computational analysis of the variants. In some embodiments, germline variants are removed, which can be identified utilizing a sequencing result of another host source (e.g., hematopoietic cells). In some embodiments, variants at low depth positions (e.g., <50% of the median depth), and those in repeat, intronic, intergenic, or pseudogene regions are removed. In some embodiments, variants falling in regions with poor uniqueness or mappability are removed. In some embodiments, variants with a population allele frequency >0.1% as identified by an appropriate database (e.g., the gnomAD database) are removed. In some embodiments, recurrent background artifacts are removed. In some embodiments, bona fide variants (e.g., variant with a detection index P-value<0.10) present in a matched host source (e.g., hematopoietic cells) are removed. In some embodiments, variants in genes canonically associated with clonal hematopoiesis (CH) are removed. CH genes include (but are not limited to) DNMT3A, TET2, ASXL1, PPM1D, GNB1, CBL, JAK2, STAT3, GNAS, MYD88, and SF3B1. In some embodiments, removed variants are rescued if they have been observed to be involved in cancer. In some embodiments, removed variants are rescued if they exist within a gene that has been observed to be involved in cancer.

In some embodiments, a computational model is utilized to distinguish tumor-adjudicated variants from non-adjudicated variants (e.g., detect whether variants are derived from cancerous tissue). In various embodiments, a computational model utilizes supervised, semi-supervised, or unsupervised training, which may include the use of patient data that includes cell-free nucleic acid sequencing result and matched tumor sequencing result. In many embodiments, a regression model is utilized for distinguishing tumor-adjudicated variants from non-adjudicated variants. Any appropriate regression model can be utilized, including (but not limited to) linear regression, elastic net regression, logistic regression, polynomial regression, stepwise regression, ridge regression, LASSO regression, and any combined regression models. In some embodiments, a semi-supervised elastic net logistic regression model is trained to distinguish tumor-adjudicated variants from non-adjudicated variants in samples without matched tumor samples. In some embodiments, a score is assigned to each detected SNV, indicating a confidence that the SNV is derived from a neoplastic source. In some embodiments, features for a training model can be identified and defined utilizing a tumor-informed analysis in which patients have both their cell-free nucleic acids and matched tumor derived nucleic acids (e.g., derived directly from tumor biopsy) analyzed. In some of these embodiments, a learning model is used to learn variant features that are derived from neoplastic cells and using these features to assign a label and confidence score that the variant is derived from neoplastic cells. In some embodiments, confidence scores within a sample are combined, summed, averaged, weighted, or otherwise summarized to provide a summary score for the sample, indicating the likelihood that the sample contains circulating tumor nucleic acid molecules.

In some embodiments, a model to identify SNVs derived from circulating tumor nucleic acid molecules integrates biological and technical features that are specific to each individual variant, including (but not limited to) background frequency of variant, fragment size of the cell-free nucleic acid molecule, variant signatures common to a particular source, presence in genomic loci (e.g., oncogenic genes) frequently mutated in cancer (or in particular cancer type), the likelihood that the variant is derived from CH, and whether or not the presence of the mutation may be confidently assessed in host hematopoietic cells relative to the VAF of the variant in the cfDNA and positional depth in the hematopoietic cells. Provided in FIG. 6 is an exemplary set of model features used to determine whether a particular SNV is derived from circulating tumor nucleic acid molecules and their contribution to the model. This exemplary set of features includes WBC Bayesian background, cfDNA Bayesian background, variant allele frequency (VAF %), germline depth, mean barcode family size, short fragment score 1, short fragment score 2, transition/transversion, duplex support, pass outlier, mapping quality, cancer hotspot, UMI error corrected, Phred quality, and variant position in read. For details on these features, see the Exemplary Embodiments section. Although this exemplary set of features were developed specifically to identify ctDNA in non-small cell lung cancer (NSCLC), the same and/or similar set of features can be used in models for pan-cancer or other specific cancers as well. Accordingly, various embodiments utilize a model to detect circulating tumor nucleic acids based on identification of SNVs that integrate one or more of the following features: cell-derived DNA Bayesian background, cfDNA Bayesian background, variant allele frequency (VAF %), germline depth, mean barcode family size, short fragment score 1, short fragment score 2, transition/transversion, duplex support, pass outlier, mapping quality, cancer hotspot, UMI error corrected, Phred quality, and variant position in read. In some embodiments, a model incorporates two or more of these features. In some embodiments, a model incorporates three or more of these features. In some embodiments, a model incorporates four or more of these features. In some embodiments, a model incorporates five or more of these features. In some embodiments, a model incorporates six or more of these features. In some embodiments, a model incorporates seven or more of these features. In some embodiments, a model incorporates eight or more these features. In some embodiments, a model incorporates nine or more of these features. In some embodiments, a model incorporates ten or more of these features. In some embodiments, a model incorporates eleven or more of these features. In some embodiments, a model incorporates twelve or more of these features. In some embodiments, a model incorporates thirteen or more of these features. In some embodiments, a model incorporates fourteen or more of these features. In some embodiments, a model incorporates all fifteen of these features.

Returning back to FIG. 5, process 500 optionally utilizes (505) a copy variation module to determine whether copy number variations (CNVs) within a cell-free nucleic acid sequencing result is derived from circulating tumor nucleic acid molecules. Somatic CNVs are highly common in neoplastic cells, and thus can be utilized to detect circulating tumor nucleic acids. Accordingly, detection of somatic CNVs in a cell-free nucleic acid sequencing result provides an indication that the source of the CNV is from neoplastic tissue. Although somatic CNVs are often derived from neoplastic tissue, detected somatic CNVs can often arise due to reasons other than neoplastic growth, including (but not limited to) natural aging, clonal hematopoiesis, and other innocuous sources. It is therefore beneficial to utilize a system capable of accurately predicting whether a detected CNV is derived from a neoplastic source. In some embodiments, a computational model is utilized to provide an indication of whether a detected CNV in a cell-free nucleic acid sequencing result is truly derived from circulating tumor nucleic acid molecules.

In some embodiments, CNVs are able to be detected from targeted sequencing result (e.g., sequencing result lacking full genome or exome coverage). In many embodiments, copy numbers are examined in a set of uniformly distributed windows (e.g., 5 MB windows) across the genome. In many embodiments, copy numbers are examined in a set of genomic loci "hotspots" that are known to have copy number alterations in cancer. In some embodiments, GISTIC2.0 is utilized to identify genomic loci "hotspots" (For more on GISTIC2.0, see C. H. Mermel, et al., *Genome Biol.* 12, 1-14 (2011), which is incorporated herein by reference). In some embodiments, filters are applied to remove background noise. In some embodiments, filters are applied to remove constitutional or CH-derived copy number events.

In various embodiments, the number of uniformly distributed window regions and GISTIC "hotspot" regions are used as features in a copy number model alongside a third feature which captures whether there is enrichment for regions known to be recurrently copy number altered in cancer (e.g., GISTIC) as compared to the uniform windows. In some embodiments, the computational model yields a confidence score that a cell-free nucleic acid sequencing result includes circulating tumor nucleic acid sequences, based on the detection of somatic CNVs.

Process 500 also optionally utilizes (507) a genomic position read module to determine whether sequencing reads having particular genomic positions from a cell-free nucleic acid sequencing result is derived from circulating tumor nucleic acid molecules. It is now understood that genomic positions of the first two and last two nucleotides of circulating tumor DNA are different from genomic positions of non-tumor cell-free DNA. In various embodiments, the genomic position of a cell-free DNA molecule can be utilized to distinguish circulating tumor nucleic acids from non-tumor cell-free DNA. In some embodiments, the genomic position of the first and last nucleotides of a cell-free DNA molecule can be utilized to distinguish circulating tumor nucleic acids from non-tumor cell-free DNA. In some embodiments, genomic positions of circulating tumor DNA are differentiated from genomic positions of non-tumor cell-free DNA at single base-pair resolution. In some embodiments, the genomic position of the first and/or last base of a sequencing read is determined and quantified, revealing a count of reads having particular genomic location. In some embodiments, the count of reads is normalized (e.g., counts per million reads).

In some embodiments, genomic position of sequencing reads are utilized within a classifier or other computational model to determine whether a sequencing result contains reads derived from circulating tumor DNA. In many of these embodiments, a classifier or other computational model is trained using cell-free nucleic acid sequencing results of cancer patient and controls. For more on utilizing of a genomic position of cell-free molecule to identify circulating tumor nucleic acids, see Example 2 within the Exemplary embodiments section.

Process 500 also optionally utilizes (509) a polygenic risk score (PRS) module to determine whether germline variants within a sequencing result signifies a risk of cancer in an individual. Various studies have determined that some germline variants are more common in various cancers (see J. Dai, et al., *Lancet Respir. Med.* 7, 881-891 (2019); J. L. Weissfeld, et al., *J Thorac. Oncol.* 10, 1538-1545 (2015); and D. C. Qian, et al., *Cancer Epidemiol. Biomarkers Prev.* 25, 1208-1215 (2016); each of which is incorporated herein by reference). Identification of particular variants within a sequencing result can be utilized to calculate a PRS, providing a likelihood that an individual would develop cancer. Accordingly, a PRS can be utilized along with cell-free nucleic acid sequencing analysis to further support identification of circulating tumor nucleic acids. In other words, PRS can be utilized in conjunction with, alongside, or within a computational model to detect circulating tumor nucleic acids. For more on how to compute a PRS, see J. Dai, et al. (2019), J. L. Weissfeld, et al. (2015), and D. C. Qian, et al. (2016), cited supra.

Any appropriate sequencing result can be utilized to determine a PRS, including (but not limited to) cell-free nucleic acid sequencing, whole genome sequencing, exome sequencing, targeted sequencing, and RNA-sequencing. To perform targeted sequencing, probes can be utilized that specifically target loci encompassing the location of variants that are utilized to compute a PRS. In some embodiments, targeted sequencing is performed on cell-free nucleic acid molecules to determine a PRS.

Process 500 also optionally utilizes (511) a module to identify nuclease motifs at the start and/or end of cell-free nucleic acid molecules. It is now understood that the sequences at the start and/or end of cfDNA molecules, typically (but not necessarily) the first and/or last 1-4 bp sequences of cfDNA molecules, can be used to inform which particular nucleases digested the cfDNA fragment. It is to be understood that the identified sequences can be utilized to infer the full nuclease recognition site, including any sequence that was cleaved away from the cfDNA molecule. In some embodiments, the cleaved away portion of a motif (e.g., 1-4 bp sequence genomically adjacent) that can be inferred from the genomic start and/or end position of the cfDNA molecule can be used to inform which particular nucleases digested the cfDNA fragment. Further, in many instances, various nucleases are stereotypically associated with particular cells and/or tissues. (L. Serpas, et al., *Proc. Natl. Acad. Sci. U.S.A.* 116, 641-649 (2019); and D. S. C. Han, et al., *Am. J. Hum. Genet.* 106, 202-214 (2020); each of which is incorporated herein by reference). Accordingly, in some embodiments, a nuclease recognition site (e.g., motif) is used to provide an indication of the cellular and/or tissue origin of a cfDNA molecule (e.g. motif indicating lung cell origin or tumor origin). In many embodiments, cfDNA motif frequencies can be determined from a sequencing result, which in turn can be utilized to calculate the likelihood that an individual has cancer. Accordingly, motif frequencies can be utilized along with cell-free nucleic acid sequencing analysis to further support identification of circulating tumor nucleic acids. It should be understood that nuclease motif frequencies can be utilized in conjunction with, alongside, or within a computational model to detect circulating tumor nucleic acids.

Process 500 integrates (513) results of one or more modules within a classifier that classifies a cell-free nucleic acid sequencing result. Accordingly, in some embodiments a classifier that incorporates confidence scores derived from the various modules to produce an overall confidence score that a cell-free nucleic acid sequencing result includes circulating tumor nucleic acid sequences. In many embodiments, the classifier used is one of the following: 5-nearest neighbor (5NN), 3NN, naïve Bayes, logistic regression, decision tree, or any combination thereof. In some embodiments, an ensemble classifier is utilized in which two or more classifiers are utilized. In some embodiments, an ensemble classifier is utilized in which three or more classifiers are utilized. In some embodiments, an ensemble classifier is utilized in which four or more classifiers are utilized. In some embodiments, an ensemble classifier is utilized in which five or more classifiers are utilized. In many embodiments, sample bagging is performed via bootstrapping the samples. In some embodiments, each classification that is utilized is penalized according to its variation in the bagging step. And in some embodiments, a summarized score of the classifiers is produced. Scores can be summed, averaged, or combined in any appropriate fashion. Based on a final score, a cell-free nucleic acid sample can be classified as positive for containing circulating tumor nucleic acid sequences.

In various embodiments, computational models can be validated utilizing a holdout, K-fold, or leave-one-out cross validation. In some embodiments, a validation cohort is utilized to validate computational models.

In some embodiments, sensitivity, specificity, and area under the curve (AUC) metrics can be modified to achieve desired performance. In some instances, higher specificity may be desired to ensure robust detection of circulating tumor nucleic acids. In some instances, higher sensitivity is desired such that the limit-of-detection is lower, decreasing the number of missed true positive results. Accordingly, in various embodiments, specificity is set at one of: 70%, 75%, 80%, 85%, 90%, 95%, 98%, 100%, or there between.

While specific examples of processes for building single nucleotide variant models, copy number variation models, genomic position read models, PRS, and integrated classifiers are described above, various operations of the process can be performed in different orders and certain operations may be optional. For instance, the various SNV, CNV, or genomic position read modules can be utilized on their own to determine whether a cell-free nucleic acid sample contains circulating tumor nucleic acid sequences. As such, various operations of the process may be used as appropriate to the requirements of specific applications. Furthermore, any of a variety of processes for building single nucleotide variant models, copy number variation models, genomic position read models, PRS, and integrated classifiers appropriate to the requirements of a given application can be utilized. Other classification systems for detecting cancer in an individual can be combined or used in addition to any of the models described herein.

Some embodiments are directed toward the utilization of computational models to determine whether an individual has cancer. In many embodiments, a method to determine whether an individual has cancer is as follows:

(a) extract liquid or waste biopsy from individual
(b) sequence cell-free nucleic acids and other host source (e.g., WBCs)
(c) utilize sequencing results in one or more computational models to detect circulating tumor nucleic acid sequences within the cell-free nucleic acid sequencing result It is to be understood that any of the computational models as described herein can be utilized solitarily or in combination. Accordingly, in some embodiments, SNV models are utilized to provide an indication of whether an individual has cancer. In some embodiments, CNV models are utilized to provide an indication of whether an individual has cancer. In some embodiments, genomic position read models are utilized to provide an indication of whether an individual has cancer. In some embodiments, various SNV, CNV, and/or genomic position read models are integrated within a classifier to classify an individual as having cancer.

In various embodiments, computational models are utilized to provide an early detection of cancer. In some embodiments, a computational model can detect cancer in individuals having stage I, II, or III cancer. In some embodiments, computational models are utilized to detect residual cancer in individuals after treatment of the cancer.

Clinical Interventions

Various embodiments are directed toward utilizing detection of cancer to perform clinical interventions. In some embodiments, an individual has a liquid or waste biopsy screened and processed by methods described herein to indicate that the individual has cancer and thus an intervention is to be performed. Clinical interventions include clinical procedures and treatments. Clinical procedures include (but are not limited to) blood tests, medical imaging, physical exams, and tumor biopsies. Treatments include (but are not limited to) chemotherapy, radiotherapy, immunotherapy, hormone therapy, targeted drug therapy, and medical surveillance. In some embodiments, diagnostics are preformed to determine the particular stage of cancer. In some embodiments, an individual is assessed and/or treated by medical professional, such as a doctor, nurse, dietician, or similar.

Detection of Cancer for Clinical Intervention

In some embodiments as described herein a cancer can be detected utilizing a sequencing result of cell-free nucleic acids derived from blood, serum, cerebrospinal fluid, lymph fluid, urine or stool. In some embodiments, another host source is sequenced (e.g., hematopoietic cells) to provide a more robust determination of whether the sequencing result of cell-free nucleic acids includes sequences of circulating tumor nucleic acids. Use of hematopoietic cells for sequencing can help identify and remove confounding signals, such as somatic SNVs and CNVs derived from natural aging, clonal hematopoiesis, and other innocuous sources. Various embodiments utilize an antioxidant (e.g., hypotaurine) during hybrid capture in embodiments that perform targeted sequencing. In addition, some embodiments utilize computational models, including those described herein, to determine whether a sequencing result of cell-free nucleic acids includes sequences of circulating tumor nucleic acids based on a confidence score provided by the computational model. Accordingly, in some embodiments, cell-free nucleic acids are extracted, processed, and sequenced, and the sequencing result is analyzed to detect cancer. This process is especially useful in a clinical setting to provide a diagnostic scan.

An exemplary procedure for a diagnostic scan of an individual is as follows:

(a) extract liquid or waste biopsy from individual (b) prepare and sequence cell-free nucleic acids and a host source (e.g., WBCs)

(c) utilize sequencing results in one or more computational models to detect circulating tumor nucleic acid sequences within the cell-free nucleic acid sequencing result (d) perform clinical intervention based on detection of circulating tumor nucleic acid sequences In various embodiments, diagnostic scans can be performed for any neoplasm type, including (but not limited to) acute lymphoblastic leukemia (ALL), acute myeloid leukemia (AML), anal cancer, astrocytomas, basal cell carcinoma, bile duct cancer, bladder cancer, breast cancer, cervical cancer, chronic lymphocytic leukemia (CLL) chronic myelogenous leukemia (CML), chronic myeloproliferative neoplasms, colorectal cancer, endometrial cancer, ependymoma, esophageal cancer, esthesioneuroblastoma, Ewing sarcoma, fallopian tube cancer, gallbladder cancer, gastric cancer, gastrointestinal carcinoid tumor, hairy cell leukemia, hepatocellular cancer, Hodgkin lymphoma, hypopharyngeal cancer, Kaposi sarcoma, Kidney cancer, Langerhans cell histiocytosis, laryngeal cancer, leukemia, liver cancer, lung cancer, lymphoma, melanoma, Merkel cell cancer, mesothelioma, mouth cancer, neuroblastoma, non-Hodgkin lymphoma, non-small cell lung cancer, osteosarcoma, ovarian cancer, pancreatic cancer, pancreatic neuroendocrine tumors, pharyngeal cancer, pituitary tumor, prostate cancer, rectal cancer, renal cell cancer, retinoblastoma, skin cancer, small cell lung cancer, small intestine cancer, squamous neck cancer, T-cell lymphoma, testicular cancer, thymoma, thyroid cancer, uterine cancer, vaginal cancer, and vascular tumors.

In some embodiments, diagnostic scans are utilized to provide an early detection of cancer. In some embodiments, diagnostic scans can detect cancer in individuals having stage I, II, or III cancer. In some embodiments, diagnostic scans are utilized to detect residual cancer in individuals after treatment of the cancer.

Cancer Diagnostics and Treatments

Some embodiments are directed toward performing a diagnostic scan on cell-free nucleic acids of an individual and then based on results of the scan indicating cancer, performing further clinical procedures and/or treating the individual.

In some embodiments, numerous types of neoplasms can be detected, including (but not limited to) acute lymphoblastic leukemia (ALL), acute myeloid leukemia (AML), anal cancer, astrocytomas, basal cell carcinoma, bile duct cancer, bladder cancer, breast cancer, cervical cancer, chronic lymphocytic leukemia (CLL) chronic myelogenous leukemia (CML), chronic myeloproliferative neoplasms, colorectal cancer, endometrial cancer, ependymoma, esophageal cancer, esthesioneuroblastoma, Ewing sarcoma, fallopian tube cancer, gallbladder cancer, gastric cancer, gastrointestinal carcinoid tumor, hairy cell leukemia, hepatocellular cancer, Hodgkin lymphoma, hypopharyngeal cancer, Kaposi sarcoma, Kidney cancer, Langerhans cell histiocytosis, laryngeal cancer, leukemia, liver cancer, lung cancer, lymphoma, melanoma, Merkel cell cancer, mesothelioma, mouth cancer, neuroblastoma, non-Hodgkin lymphoma, non-small cell lung cancer, osteosarcoma, ovarian cancer, pancreatic cancer, pancreatic neuroendocrine tumors, pharyngeal cancer, pituitary tumor, prostate cancer, rectal cancer, renal cell cancer, retinoblastoma, skin cancer, small cell lung cancer, small intestine cancer, squamous neck cancer, T-cell lymphoma, testicular cancer, thymoma, thyroid cancer, uterine cancer, vaginal cancer, and vascular tumors.

In some embodiments, once a diagnosis of neoplastic growth is indicated, some follow-up diagnostic procedures can be performed, including (but not limited to) physical exam, medical imaging, mammography, endoscopy, stool sampling, pap test, alpha-fetoprotein blood test, CA-125 test, prostate-specific antigen (PSA) test, biopsy extraction, bone marrow aspiration, and tumor marker detection tests. Medical imaging includes (but is not limited to) X-ray, magnetic resonance imaging (MRI), computed tomography (CT), ultrasound, and positron emission tomography (PET). Endoscopy includes (but is not limited to) bronchoscopy, colonoscopy, colposcopy, cystoscopy, esophagoscopy, gastroscopy, laparoscopy, neuroendoscopy, proctoscopy, and sigmoidoscopy.

In some embodiments, once a diagnosis of neoplastic growth is indicated, some treatments can be performed, including (but not limited to) surgery, chemotherapy, radiation therapy, immunotherapy, targeted therapy, hormone therapy, stem cell transplant, and blood transfusion. In some embodiments, an anti-cancer and/or chemotherapeutic agent is administered, including (but not limited to) alkylating agents, platinum agents, taxanes, *vinca* agents, anti-estrogen drugs, aromatase inhibitors, ovarian suppression agents, endocrine/hormonal agents, bisphophonate therapy agents and targeted biological therapy agents. Medications include (but are not limited to) cyclophosphamide, fluorouracil (or 5-fluorouracil or 5-FU), methotrexate, thiotepa, carboplatin, cisplatin, taxanes, paclitaxel, protein-bound paclitaxel, docetaxel, vinorelbine, tamoxifen, raloxifene, toremifene, fulvestrant, gemcitabine, irinotecan, ixabepilone, temozolmide, topotecan, vincristine, vinblastine, eribulin, mutamycin, capecitabine, capecitabine, anastrozole, exemestane, letrozole, leuprolide, abarelix, buserlin, goserelin, megestrol acetate, risedronate, pamidronate, ibandronate, alendronate, zoledronate, tykerb, daunorubicin, doxorubicin, epirubicin, idarubicin, valrubicin mitoxantrone, bevacizumab, cetuximab, ipilimumab, ado-trastuzumab emtansine, afatinib, aldesleukin, alectinib, alemtuzumab, atezolizumab, avelumab, axtinib, belimumab, belinostat, bevacizumab, blinatumomab, bortezomib, bosutinib, brentuximab vedoitn, briatinib, cabozantinib, canakinumab, carfilzomib, certinib, cetuximab, cobimetnib, crizotinib, dabrafenib, daratumumab, dasatinib, denosumab, dinutuximab, durvalumab, elotuzumab, enasidenib, erlotinib, everolimus, gefitinib, ibritumomab tiuxetan, ibrutnib, idelalisib, imatinib, ipilimumab, ixazomib, lapatinib, lenvatinib, midostaurin, nectiumumab, neratinib, nilotinib, niraparib, nivolumab, obinutuzumab, ofatumumab, olaparib, loaratumab, osimertinib, palbocicilib, panitumumab, panobinostat, pembrolizumab, pertuzumab, ponatinib, ramucirumab, reorafenib, ribociclib, rituximab, romidepsin, rucaparib, ruxolitinib, siltuximab, sipuleucel-T, sonidebib, sorafenib, temsirolimus, tocilizumab, tofacitinib, tositumomab, trametinib, trastuzumab, vandetanib, vemurafenib, venetoclax, vismodegib, vorinostat, and ziv-aflibercept. In some embodiments, an individual may be treated, by a single medication or a combination of medications described herein. A common treatment combination is cyclophosphamide, methotrexate, and 5-fluorouracil (CMF).

Many embodiments are directed to diagnostic or companion diagnostic scans performed during cancer treatment of an individual. When performing diagnostic scans during treatment, the ability of agent to treat the neoplastic growth can be monitored. Most anti-cancer therapeutic agents result in death and necrosis of neoplastic cells, which may release higher amounts nucleic acids from these cells into the samples being tested. Accordingly, the level of circulating tumor nucleic acids can be monitored over time, as the level may increase during treatments and begin to decrease as the number of neoplastic cells are decreased. In some embodiments, treatments are adjusted based on the treatment effect on neoplastic cells. For instance, if the treatment isn't cytotoxic to neoplastic cells, a dosage amount may be increased or an agent with higher cytotoxicity can be administered. In the alternative, if cytotoxicity of neoplastic cells is good but unwanted side effects are high, a dosage amount can be decreased or an agent with less side effects can be administered.

Various embodiments are also directed to diagnostic scans performed after treatment of an individual to detect residual disease and/or recurrence of neoplastic growth. If a diagnostic scan indicates residual and/or recurrence of neoplastic growth, further diagnostic tests and/or treatments may be performed as described herein. If the neoplastic growth and/or individual is susceptible to recurrence, diagnostic scans can be performed frequently to monitor any potential relapse.

EXAMPLES

The embodiments of the present disclosure may be better understood with the several examples provided within. Many exemplary results of cell free nucleic acid sequencing tools and methods are described. Also provided are description of diagnostics, especially for non-small-cell lung cancer (NLCLC).

Example 1: Integrating Genomic Features for Noninvasive Early Lung Cancer Detection Lung cancer is the leading cause of cancer deaths and the majority of patients are diagnosed with metastatic disease that is generally incurable. Nevertheless, a significant fraction of patients with localized disease (stage I-III) can be cured, illustrating the utility of early detection. Indeed, screening of high-risk adults via low-dose computed tomography (LDCT) scans reduces lung cancer-related mortality, and as a result, annual radiologic screening may be recommended for high-risk populations. Despite its efficacy, the clinical utility of LDCT screening is complicated by a high false discovery rate (>90%) and low compliance, with <5% of eligible individuals in the US currently undergoing screening. Multiple factors contribute to this low adoption rate, including limited access to qualified radiology centers and patient inconvenience. Therefore, there is an unmet need for new approaches to improve early detection of early stage resectable lung cancers in high risk individuals.

Noninvasive blood tests that can detect tumor-derived somatic alterations based on the analysis of cfDNA are attractive candidates for cancer screening applications due to the relative ease of obtaining blood specimens. However, cfDNA assays currently in clinical use are intended for noninvasive genotyping of patients with advanced disease where ctDNA levels are significantly higher than in patients with early stage tumors. Separately, some studies examining ctDNA in patients with localized non-small-cell lung cancers (NSCLC) may use tumor-informed approaches where tumor tissue must be genotyped first. While this approach maximizes sensitivity, it may not be useful for screening. Lastly, clonal hematopoiesis (CH), which involves acquisition of somatic alterations in non-malignant hematopoietic progenitors and produces mutant cell-free DNA fragments, complicates use of ctDNA for early cancer detection.

Described within this example are methodological enhancements to Cancer Personalized Profiling by deep Sequencing (CAPP-Seq) that facilitate detection of ctDNA in early stage cancers or detection of residual cancer after treatment (for more on CAPP-Seq, see A. M. Newman *Nat. Biotechnol.* 34, 547-555 (2016), which is incorporated herein by reference). The improved method was applied to plasma and tumor samples from patients with early stage NSCLC, initially employing a tumor-informed strategy to determine the fraction of patients whose tumors shed detectable ctDNA. The method was extended to early detection using a tumor-naïve approach to screen plasma samples from lung cancer patients and controls at high risk for lung cancer. It was found that cfDNA from both cases and controls harbor circulating somatic variants, the majority of which can be attributed to CH. Importantly, key molecular features were identified, including mutational signatures and fragment length profiles that distinguish CH variants from tumor-derived mutations. Finally, these findings were leveraged to develop and independently validate a Lung Cancer Likelihood in Plasma (Lung-CLiP) assay for noninvasive early lung cancer detection.

Improving Detection of Ultra-Rare Circulating Variants

It has been demonstrated that ctDNA levels in localized lung cancers are low, with the majority of patients with stage I disease having circulating variant allele frequency (VAF)

levels below about 0.1%. To improve sensitivity for detection of such low allelic levels, a few methodologies were developed and tested for maximizing the yield of unique, successfully sequenced cfDNA molecules while simultaneously minimizing their associated sequencing error profile (FIG. 7).

A new adapter schema was developed for library preparation by combining dual-indexed error-correcting sample barcodes, which guard against sample cross-contamination, with error-correcting duplex molecular barcodes (e.g., unique identifiers or 'UIDs') that enable more accurate enumeration of unique cfDNA molecules. Furthermore, decoupling of the UIDs and sample barcodes allows for independent tailoring of UID diversity and multiplexing capacity based on the application (FIGS. 2 and 3).

Using these custom adapters, we then sought to identify key operations associated with the largest loss of unique cfDNA molecules. To do so, individual strands of cfDNA fragments were tracked from the start of library preparation to their ultimate sequencing within an in silico simulation of the CAPP-Seq molecular biology workflow (FIGS. 8 and 9). The simulation predicted that the largest losses occurred at the hybrid capture operation and were due to the typical input of only a small fraction of each amplified sequencing library into the hybridization reaction for target enrichment. This effect arises due to uneven representation of original molecules following PCR. Many hybrid capture sequencing methods multiplex samples in the capture operation (e.g. capture many samples together in a single reaction), and this can result in a small fraction of the total amount of each library being captured. For example, if one has 2,000 ng of each sequencing library and were to multiplex 20 samples into a single 1,000 ng capture reaction, only 2.5% (50 ng) of each individual sequencing library is input into the capture reaction. Increasing the fraction of library input into the reaction improves molecular recovery. For example, increasing the fraction of library input from 8.3% to 100% significantly improved recovery of both total unique molecules and the fraction of sourced cfDNA duplexes for which both strands were sequenced (FIGS. 10 to 12). Notably, increasing the input percentage of sequencing library from 8.3% to 25% achieved most of the possible gains in unique molecule recovery and inputting 50% or more improved the fraction of original cfDNA duplexes for which both strands were sequenced. In addition, the ratio of sequencing library input to capture baits (e.g. biotinylated oligonucleotides used to enrich for genomic regions of interest) also influences molecular recovery following the capture reaction.

It was additionally sought to further improve the technical error profile of CAPP-Seq. The most common sequencing artifact observed in CAPP-Seq and other hybrid capture-based sequencing methods are G>T transversions arising due to oxidative damage occurring during the hybrid capture reaction and leading to the generation of 8-oxoguanine (See A. M. Newman, et al., *Nat. Biotechnol.* (2016), cited supra; and M. Costelleo, et al., *Nucleic Acids Res.* 41, 1-12 (2013), which is incorporated herein by reference). Interestingly, G>T transversions are also the most common base substitution in lung cancers, arising in vivo as a result of exposure to the carcinogens in cigarette smoke (FIGS. 4A-4B). Therefore, G>T transversions from in vitro oxidation during hybrid capture can mimic and confound detection of genuine lung cancer-derived mutations. It was hypothesized that the addition of a scavenger of reactive oxygen species (ROS) would reduce oxidative damage-derived G>T artifacts (FIGS. 4A-4B). After testing several antioxidants and free-radical scavengers, hypotaurine, a sulfinic acid, was identified as a favorable candidate. Hypotaurine is a naturally occurring intermediate of the cysteine-to-taurine pathway and has a non-enzymatic protective effect against ROS. When we compared the error profiles of cfDNA samples from 12 healthy adults captured with and without hypotaurine, it was found that samples captured with the ROS scavenger had significantly lower background error-rates and fewer G>T errors (Wilcoxon rank-sum test P<0.001, FIG. 13). A similar relative reduction of G>T errors (16% vs 57% of all errors, Wilcoxon rank-sum test, $P<1\times10^{-8}$) and background error rate (about 50% reduction, Wilcoxon rank-sum test, P<0.0001) was observed in 104 healthy control cfDNA samples captured with the ROS scavenger compared to 69 control cfDNA samples captured without hypotaurine (FIG. 14).

Tumor-Informed ctDNA Detection

As a step toward developing a noninvasive assay for NSCLC screening, ctDNA detection rates were determined in patients with early stage tumors using a tumor-informed approach. This strategy establishes the maximal sensitivity for a CAPP-Seq-based tumor-naïve screening approach (FIG. 15). Tumor tissue, pre-treatment plasma cfDNA, and leukocyte DNA were genotyped from 85 patients with stage I-III NSCLC through targeted deep sequencing of 255 genes recurrently mutated in lung cancer using a 355 kilobase (kb) CAPP-Seq panel (FIG. 16, Table 1). Using this panel, which is a 'population-based' approach (e.g., does not require patient-specific molecular biology customization), a median of 4 mutations were identified per patient in tumor specimens (range 0-35), and ctDNA was detected in 49% (42/85) of NSCLC patients at 95% specificity. Sensitivity of detection was significantly higher as the number of monitored tumor mutations increased (FIG. 17). To empirically test the observation that tracking more mutations improves overall ctDNA detection rates, customized capture panels were designed based on tumor exome sequencing data for 17 patients in whom ctDNA was not initially detectable using the population-based lung cancer panel. This customized approach increased the number of mutations available for monitoring from a median of 4 to 68 (paired two-sided t-test, P<0.01). Using these customized assays, ctDNA was detected in 11/17 (65%) patients at a median VAF of 0.0019% and at levels as low as 1.5 in $10^6$ molecules (FIG. 18).

Combining the results of population-based (n=68) and customized (n=17) tumor-informed strategies, ctDNA was detected in the majority of patients with early stage NSCLC (53/85 or 62%), including in 52%, 67%, and 88% of patients with I, II, and III disease, respectively (FIG. 19). In the tumor-informed approach, the patient-specific analytical limit of detection (LOD) can be determined from the number of mutations tracked and the number of cfDNA molecules sequenced. The LOD was significantly inferior in patients in whom ctDNA was undetectable (Wilcoxon rank-sum test, P<0.001, FIG. 19), indicating that the overall rate of detectable ctDNA may improve by increasing the number of mutations or the unique molecular depth. Indeed, when considering only patients for whom a LOD of at least 0.01% was achievable (n=43), sensitivity increased to 73%, 82%, and 100% for stage I, II, and III tumors, respectively (FIG. 19). Strikingly, 48%, 38% and 7% of stage I, II, and III patients had ctDNA levels below 0.01%, respectively (FIG. 19). Thus, the majority of localized NSCLCs shed ctDNA, but ctDNA levels for many stage I-III cases are relatively low.

Properties of ctDNA molecules were identified that may inform tumor-naïve screening. Clonal tumor mutations, defined as those variants estimated to be uniformly present in all tumor cells were more frequently detected in plasma and observed at higher allele frequencies than their subclonal counterparts (Fisher's Exact Test P<0.05, Wilcoxon rank-sum test P<0.001, FIG. 20).

The size distribution of cfDNA fragments was also considered as a potential means of enriching for tumor-derived cfDNA molecules (e.g., ctDNA). It was found that cfDNA molecules harboring mutations present in matched tumor samples to be significantly shorter than their non-mutant counterparts (Wilcoxon rank-sum test $P<1\times10^{-8}$, FIG. 21). Mutant cfDNA molecules were enriched among sub-mononucleosomal fragments (<160 bp) and in sub-disomal fragments (230-310 bp, FIG. 21). When only considering molecules <160 bp and between 230-310 bp, a 2.17-fold median enrichment in VAFs of tumor-derived mutations was observed (range 0-9.2, FIG. 21). It was found that 53.6% of mutant molecules fell in these regions as compared to 24.7% of non-mutant molecules (FIG. 21), indicating that size selection of molecules in these windows may prove useful. However, although the majority of mutations (74%, 271/366) were enriched in these size windows, VAFs decreased following size selection for 26% of mutations (95/366), with 78% of such mutations (75/95) becoming undetectable (FIG. 22). Furthermore, ctDNA enrichment by size selection disproportionately favored variants with higher pre-enrichment VAFs (FIG. 22). Interestingly, while size selection improved overall sensitivity of ctDNA detection in patients with many mutations tracked through customized panels, sensitivity degraded in patients monitored with our population-based lung cancer panel due to loss of tumor mutations not represented on any short cfDNA molecules (FIG. 23). This indicates that even though NSCLC-derived cfDNA molecules tend to be shorter than non-mutant cfDNA molecules, size selection can hamper ctDNA detection at low VAFs unless many mutations are considered.

It is worth noting that actual measured ctDNA fragment size may depend on the method sequencing preparation and/or analysis data. Using the methods described herein (e.g., within this Example), sub-mononucleosomal ctDNA fragments were found to be less than 160 bp and sub-disomal ctDNA fragments were found to be from 230 bp to 310 bp (see FIG. 21). Generally, ctDNA fragments are enriched in sizes relatively shorter than non-neoplastic cfDNA fragments, and the regions specified here should not be interpreted as the only size window that are ctDNA enriched. For example, molecules less than 150 bp are also ctDNA enriched. Additionally, variability in methods of analysis can affect what specific regions are found to be ctDNA enriched. Factors that may affect the specific sizes of cfDNA molecules found to be enriched with ctDNA include (but are not limited to): 1) the mapping algorithm used, 2) the manner by which PCR duplicates were removed from the data, 3) the manner by adapter read-through were trimmed from the 3' end of sequencing reads, 4) the amount of sequencing data is considered (e.g. only considering cfDNA molecules for which both sequencing reads are mapped in the proper pair), 5) the mapping quality or other quality metrics related to the sequencing data may be used to determine what cfDNA molecules are considered.

Clinical Correlates of ctDNA Detection

Having observed detectable ctDNA in the majority of early stage NSCLC patients, it was next sought to identify clinical and pathological correlates of ctDNA levels in these patients. ctDNA levels were found to be strongly associated with advancing stage, with median VAFs of 0.015% in stage I, 0.14% in stage II, and 0.52% in stage III disease (Wilcoxon rank-sum test, P<0.0001, FIG. 24). Significant associations between ctDNA levels and metabolic tumor volume (MTV) were found, as measured by [18F] FDG PET/CT (Spearman r=0.40, P=0.004, FIGS. 25 and 26), and with non-adenocarcinoma histology (Wilcoxon Rank Sum Test, P<0.01, FIG. 27). Stage, MTV, and non-adenocarcinoma histology were each independently associated with ctDNA burden in multivariable analysis (FIG. 27), indicating that ctDNA levels are a function of multiple biological parameters.

Lung adenocarcinomas exist on a spectrum from pre-invasive to frankly invasive epithelial proliferations that are associated with differences in radiologic appearance ranging from pure ground glass opacities (GGOs) to solid lesions. Since GGO-predominant lung cancers are slow growing and often clinically indolent, it was hypothesized that they shed less ctDNA than solid tumors. Among patients with a major ground-glass component (≥25% GGO), ctDNA was detected less frequently and at lower concentration than in patients with <25% GGO (Fisher's Exact Test P<0.05, Wilcoxon rank-sum test P<0.05, FIG. 28). Similarly, when ctDNA levels were compared across adenocarcinoma histologic subtypes, patients with solid and papillary tumors had higher ctDNA levels than those with acinar or lepidic tumors, although this relationship did not reach statistical significance (FIG. 29). Separately, ctDNA was more frequently detectable in patients whose tumors had evidence of necrosis or contacted a central airway or artery (FIG. 30). Thus, anatomic and radiologic characteristics of NSCLCs are associated with ctDNA shedding and may help identify patients most appropriate for noninvasive analysis.

Given these correlations between ctDNA shedding and imaging parameters known to be associated with disease aggressiveness, the association of pre-treatment ctDNA levels with clinical outcomes was examined. Patients with higher than median ctDNA levels had significantly inferior rates of both freedom from recurrence (hazard ratio=3.88, P=0.0009, FIG. 31) and recurrence-free survival (hazard ratio=3.51, P=0.001, FIG. 32). Pre-treatment ctDNA levels were similarly prognostic when only considering patients with stage I disease (n=48, FIGS. 33 and 34). Importantly, in multivariable analysis including both MTV and stage, only ctDNA was significantly associated with outcome (FIG. 35). Since distant metastasis is the main cause of cancer-associated mortality after treatment of localized NSCLC, the association of pre-treatment ctDNA levels with future metastasis was also examined. Higher ctDNA concentrations were significantly associated with inferior freedom from distant metastasis in both univariable and multivariable analysis (FIGS. 35 to 37). Thus, pre-treatment ctDNA concentration is a prognostic factor in localized NSCLC that may identify patients harboring micrometastatic disease (FIG. 38).

Sources of cfDNA Somatic Variants

Clonal hematopoiesis (CH) arises from somatic alterations in non-malignant hematopoietic progenitors and is a common biological phenomenon associated with aging. Hematopoietic cells are the primary source of cfDNA and contribute somatic CH variants to the cfDNA pool, CH was characterized in patients with localized NSCLC and non-cancer controls to identify potential approaches for distinguishing CH-derived mutations from their tumor-derived counterparts.

Variants originally found in cfDNA were examined to determine whether they were also detected in matched white-blood cell (WBC) DNA in NSCLC patients (n=104) and control subjects (n=98). Two separate control groups were utilized: (1) age-, sex- and smoking status-matched adults undergoing annual LDCT screening ("risk-matched controls"), and (2) un-matched adult blood donors ("low-risk controls", FIG. 16). On average, NSCLC patients harbored significantly more non-synonymous mutations in cfDNA than both risk-matched and low-risk controls (Wilcoxon rank-sum test, $P<0.01$ & $P<0.0001$, FIG. 39). Similarly, cfDNA from lung cancer patients harbored more variants absent in matched leukocytes (e.g. "WBC−") than both control groups. Interestingly, similar to NSCLC patients, risk-matched controls have both more total cfDNA mutations and more CH variants (e.g., "WBC+") than the low-risk controls (Wilcoxon rank-sum test, $P<0.0001$). This observation highlights the importance of risk-matching cases and controls in cfDNA− based early detection studies. Remarkably, the majority of detected variants in cfDNA were attributable to CH in lung cancer patients (58%), risk-matched controls (93%), and low-risk controls (77%). Furthermore, the mutation observed at the highest VAF in the cfDNA was also present in matched WBCs in 76% of patients and 91% of controls (FIG. 40). 48% of WBC+ cfDNA mutations were in other genes beside the 12 of the most recurrently mutated genes canonically associated with CH (FIG. 41). Furthermore, 94.8% of WBC+ cfDNA mutations were private (FIG. 41), highlighting the importance of genotyping matched leukocytes to reliably determine whether cfDNA mutations are CH-derived.

A similar rate of CH variants was observed in NSCLC patients and controls, whether identifying mutations directly from WBCs or from cfDNA (FIG. 42). The allelic fractions of mutations observed in both cellular and cell-free compartments were significantly correlated (Pearson $r=0.83$, $P<1\times10^{-8}$, FIG. 42). Of the 1,017 mutations originally identified in either cfDNA or WBCs, 57% were found in both compartments, while 25% were only observed in cfDNA and 18% were only observed in WBCs. Importantly, 73% of WBC+ cfDNA variants had VAFs below 1% in leukocytes, highlighting the importance of sequencing leukocyte DNA and cfDNA to equivalent depths to determine whether cfDNA mutations are CH derived.

Detection of CH mutations in genes associated with leukemias in individuals without a hematologic neoplasm and occurring at a VAF≥2% in WBC DNA is commonly referred to as clonal hematopoiesis of indeterminate potential (CHIP). One or more such mutations was observed in WBCs from 13.5% (14/104) of lung cancer cases, 7.1% (4/56) of risk matched controls, but none of the (0/42) low risk controls. As expected, individuals with CHIP were significantly older than those without evidence of CHIP (Wilcoxon rank-sum test, $P=0.011$). Interestingly, unlike the tendency of most CH variants to be private and to have low allelic fractions across our cohorts, 77% (20/26) of variants in WBCs occurring at ≥2% VAF affected canonical CH genes, with DNMT3A, TET2 and TP53 most commonly affected (FIG. 43).

Since CHIP incidence is known to increase with age, the number of WBC+ cfDNA mutations associated with age was examined. The number of WBC+ cfDNA mutations, but not WBC− cfDNA mutations, was significantly correlated with age (Pearson $r=0.43$, $P<1\times10^{-8}$, FIGS. 44 and 45). Consistent with the concept that these mutations constitute CH events, genes most frequently containing WBC+ mutations were canonical CH genes, including DNMT3A, TET2, TP53, SF3B1 and PPM1D (FIG. 46).

To examine temporal changes in WBC+ cfDNA mutations, the subset of the cohort for whom had plasma samples extracted at two time points were considered (8 NSCLC patients, median interval between blood draws=12 days; 5 risk-matched controls, median interval=19 months). Among WBC+ cfDNA mutations detected at the first blood collection time point, 73% (41/56) were also detected at the second time point and had highly correlated VAFs (Pearson $r=0.99$, $P<0.0001$ for patients; Pearson $r=0.74$, $P=0.02$ for controls, FIG. 47). Similarly, when considering all WBC+ cfDNA mutations across all the patients and controls, canonical CH genes harbored higher rates of non-synonymous mutations than synonymous variants (FIG. 46), consistent with these mutations being under positive selection. These observations are consistent with the relative stability of CH clones when studying their allelic levels in WBCs over time.

To identify properties of CH mutations that may be useful for distinguishing them from tumor-derived mutations, the mutational signatures of WBC+ and WBC− cfDNA mutations were compared and contrasted, as well as to previously published mutation datasets from the CH and lung cancer literature. WBC+ mutations detected in cfDNA across cases and controls were dominated by the aging-associated mutational signature (Signature 1, FIGS. 48 and 49). Of note, Signature 4, which is associated with tobacco smoking and is the predominant mutational signature of NSCLC tumor genomes, was observed in WBC− but not WBC+ cfDNA mutations in NSCLC patients ($P<0.001$), and was not observed in either compartment among controls with or without a history of smoking ($P<0.001$). This is consistent with prior observations that distinct patterns of DNA lesions arise as a result of exposure to different carcinogenic agents, and indicates that in addition to sequencing matched WBCs, the base substitution spectrum of cfDNA variants may be useful for distinguishing carcinoma-derived from CH-derived mutations.

TP53 is the most frequently mutated gene in human cancers; however, mutations in TP53 are also frequently seen in CH. Discrimination between carcinoma-derived and CH-derived TP53 mutations is therefore an important consideration for cfDNA− based cancer screening approaches. Notably, a large fraction of TP53 variants found in cfDNA were also detectable in WBCs, whether considering lung cancer cases (40.6%; 13 of 32) or all controls (100%; 4 of 4, Fisher's Exact test $P<0.05$, FIG. 46). The distribution of WBC+ and WBC− cfDNA mutations was similar across the TP53 protein, with both classes of mutations primarily affecting its DNA-binding domain (FIG. 50). Consistent with the results of the global signature analysis, WBC− TP53 cfDNA mutations displayed significantly stronger evidence of the smoking signature than their WBC+ counterparts (Wilcoxon rank-sum test, $P<0.01$, FIG. 51).

The fragment size distribution of cfDNA molecules harboring variants present in matched WBCs or in matched tumor biopsies were examined. It was found that cfDNA molecules harboring WBC+ mutations (e.g. "CH mutations") displayed a nearly identical size distribution as non-mutant cfDNA molecules spanning the same genomic positions (FIG. 51). In contrast, cfDNA molecules with mutations also present in matched tumor biopsy specimens (e.g., "tumor-adjudicated mutations") displayed a shifted size distribution, with tumor-adjudicated variants being significantly shorter (Wilcoxon rank-sum test, $P<1\times10^{-8}$, FIG. 51). Accordingly, in silico selection for the fragment sizes found to be ctDNA-enriched in our tumor-informed analysis (<160 bp or 230-310 bp, FIG. 21) did not increase the VAFs of WBC+ CH variants in the cfDNA of NSCLC patients or controls (median enrichment of 0.94 and 0.91 in patients and controls, respectively, FIG. 51). In contrast, the VAFs of WBC− mutations in NSCLC patients, but not in controls, significantly enriched with size selection (Wilcoxon rank-sum test P<0.001, median enrichment of 1.99 and 0.51 in patients and controls, respectively). This indicates that in addition to the type of base substitution, cfDNA fragment size may also be useful for distinguishing carcinoma-derived from CH-derived mutations.

A Method for Estimating Lung Cancer Likelihood in Plasma

Having identified properties that distinguish tumor- and CH-derived cfDNA fragments, the Lung Cancer Likelihood in Plasma (Lung-CLiP) assay was developed. A probabilistic approach was utilized to estimate the likelihood that a plasma sample contains tumor-derived cfDNA without using prior knowledge of tumor variants. This approach involves deep sequencing of plasma cfDNA and matched leukocytes and integrates both SNVs and genome-wide copy number analysis. The Lung-CLiP assay was trained using samples from a discovery cohort of 104 lung cancer patients and 56 high-risk controls undergoing annual radiologic screening for lung cancer at 4 cancer centers (FIG. 35, Table 4). To develop the assay, a multi-tiered machine learning approach was employed in which a model was first trained to estimate the probability that a given cfDNA SNV is tumor-derived. The SNV model leverages key biological and technical features specific to each individual variant including background frequencies, cfDNA fragment size, smoking signature contribution, presence in a gene frequently mutated in NSCLC, and CH likelihood (FIG. 52, see FIG. 6 for model features). Additionally, to identify copy number variants (CNVs), the genome was binned into 5 megabase (MB) regions and both the on- and off-target sequencing reads from CAPP-Seq were used to identify genome-wide copy number alterations. The results of the SNV model were integrated with genome-wide copy number alterations (generated via analysis of both on- and off-target sequencing reads) within a final patient-level probabilistic classifier that estimates the likelihood a given blood sample contains lung cancer derived cfDNA (e.g., “CLiP score”) (Table 4).

Receiver-operator characteristic curve shapes revealed that Lung-CLiP can easily be tuned to desirable specificities depending on the target clinical application (FIG. 53). For example, as a stand-alone screening test, high specificity would be desirable to minimize false positives. At 98% specificity, Lung-CLiP sensitivities were 41% in stage I, 54% in stage II, and 67% in stage III patients (FIG. 54). Alternatively, a lower specificity may be acceptable if the assay were to be applied to the about 95% of at-risk individuals who are currently not undergoing LDCT due to access limitations or other hurdles. In this context, tuning the assay to a lower specificity (e.g., 80% which is similar to that of LDCT in the NLST trial) would be reasonable since the reflex test for a positive test would be LDCT. At 80% specificity, we observed sensitivities of 63% in stage I, 69% in stage II, and 75% in stage III patients (FIG. 54). Genes in which mutations were recurrently identified in patient cfDNA included expected NSCLC drivers such as TP53, KRAS, and EGFR (FIG. 55). Classifier features with the strongest impact on patient classification included SNV VAF levels, cfDNA fragment size, number of SNVs detected, number of CNVs detected, and whether alterations were previously observed in lung cancer (FIG. 55).

Lung-CLiP scores were compared to tumor-informed ctDNA levels and clinicopathological features. Importantly, sensitivities at 98% specificity were not significantly different than those observed using tumor-informed ctDNA analysis (FIG. 56), indicating that Lung-CLiP achieves sensitivities similar to tumor-informed ctDNA detection. Furthermore, tumor-naïve Lung-CLiP scores were found to be significantly correlated with tumor-informed ctDNA levels (Spearman r=0.59, P<0.0001, FIG. 56). As expected, tumors from NSCLC patients classified as positive by Lung-CLiP were significantly larger than those classified as negative (Wilcoxon rank-sum test, P<0.01, FIG. 57), and similarly, patients with non-adenocarcinoma histology were more frequently detected (Fisher’s Exact Test, P<0.01, FIG. 57). Taken together, these data indicate that Lung-CLiP scores capture biologically meaningful factors related to overall ctDNA burden.

Finally, performance of the Lung-CLiP assay was validated in an independent cohort of 46 NSCLC patients (n=32 stage I; n=9 stage II; n=5 stage III) and 48 risk-matched controls with negative LDCT scans that were prospectively enrolled at a different institution (FIGS. 35 and 58; Table 4). The prospective enrollment of the validation cohort at an independent clinical site was a key aspect of the study design, as it represents a stringent test of the assay and decreases the risk of reporting overly optimistic results. Stage-matched performance of the model in the validation cohort was statistically similar to that observed in the training by AUC (FIGS. 53 and 59) and sensitivity metrics (FIG. 59), with numerical differences in stage I performance attributable to a larger fraction of stage IA vs. IB cases in the validation cohort (FIG. 59). Furthermore, specificity thresholds set in the training cohort performed similarly when applied to the controls in the validation cohort, indicating that the Lung-CLiP scores are well calibrated (FIG. 60).

Lastly, several exploratory analyses were performed on the combined training and validation cohorts. First, the influence of sequencing depth or related metrics on sensitivity was examined. It was found that cfDNA input, plasma volume input and unique sequencing depth were not significantly associated with the sensitivity of Lung-CLiP (FIG. 61). However, considering all NSCLC patients with available MTV data (n=103), a strong correlation was observed between MTV and sensitivity of Lung-CLiP, with approximate sensitivities of 16% (95% CI: 4%-24%), 52% (95% CI: 32%-72%) and 80% (95% CI: 60%-96%) for 1 mL tumors, 10 mL tumors, and >100 mL tumors, respectively (FIG. 62).

Study Design and Patients

All biospecimens analyzed in this study were collected with informed consent from subjects enrolled on Institutional Review Board-approved protocols at their respective centers, including Stanford University, MD Anderson Cancer Center, Mayo Clinic, Vanderbilt University Medical Center, and Massachusetts General Hospital. All patients were de-identified and had AJCC v7 stage I-III NSCLC and received curative-intent treatment with surgery or radiotherapy.

This study consisted of two cohorts, a discovery cohort and a validation cohort. Clinical characteristics of patients in both cohorts are provided in FIG. 35. The discovery cohort consisted of two groups of patients: (1) tumor-informed NSCLC patients (and (2) Lung-CLiP training NSCLC cases. These two groups consisted of lung cancer patients enrolled at Stanford University (n=80), Vanderbilt University (n=21), Mayo Clinic (n=14) and MD Anderson Cancer Center (n=7) between November of 2009 and July of 2018. The tumor-informed NSCLC cases consisted of 85 patients with matched tumor tissue available, the majority of which (67/85) were analyzed with all aspects of the improved CAPP-Seq workflow described in FIG. 7. The Lung-CLiP training group was restricted only to patients analyzed with the improved workflow (n=104) and studied for the tumor-naïve analyses, serving as the training group for the Lung-CLiP classifier. Among the 104 Lung-CLiP training NSCLC cases, 67 overlap with the 85 patients in the tumor-informed group. After initial training of a noninvasive classifier, NSCLC patients in the independent validation cohort (46 lung cancer cases) were prospectively enrolled at Massachusetts General Hospital (MGH) between January and December of 2018.

The discovery cohort consisted of two separate control groups (FIG. 35). The first group consisted of 42 adult blood donors who were un-matched for risk ("low-risk controls"). The second group consisted of 56 age-, sex- and smoking status-matched adults ("risk-matched controls") who had negative low-dose computed tomography (LDCT) screening scans for lung cancer at Stanford University and served as the training group for the Lung-CLiP classifier. The validation cohort contained a third control group, comprised of 48 risk-matched adults undergoing LDCT screening at Massachusetts General Hospital that were prospectively enrolled between January and December of 2018. This control group was only considered for the validation of the Lung-CLiP model.

Blood Collection and Processing

Whole blood collected in $K_2EDTA$ tubes was processed immediately or within 4 hours following storage at 4° C. Whole blood collected in Cell-Free DNA BCT (STRECK) tubes was processed within 72 hours. $K_2EDTA$ tubes were centrifuged once at 1,800×g for 10 min and STRECK tubes were centrifuged twice at 1,600×g for 10 min at room temperature. Following centrifugation, plasma was stored at −80° C. in 1.8 ml aliquots until cfDNA isolation. Plasma-depleted whole blood was stored at −80° C. for DNA isolation from leukocytes.

Cell-free DNA was extracted from 2 to 16 mL of plasma (median of 3.6 mL) using the QIAamp Circulating Nucleic Acid Kit (Qiagen) according to the manufacturer's instructions. After isolation, cfDNA was quantified using the Qubit dsDNA High Sensitivity Kit (Thermo Fisher Scientific) and High Sensitivity NGS Fragment Analyzer (Agilent). Genomic DNA (gDNA) from matched plasma-depleted whole blood (e.g., "WBCs" or "leukocytes") was extracted using the Qiagen DNeasy Blood and Tissue kit, quantified using Qubit dsDNA High Sensitivity Kit, and fragmented to a target size of 170 bp using Covaris S2 sonicator. Post-sonication, fragmented gDNA was purified using the QIAquick PCR Purification Kit (Qiagen). For cfDNA, a median of 38 ng (8-85 ng) was input into library preparation. DNA input was scaled to control for high molecular weight DNA contamination, targeting input of 40 ng of cfDNA in the 50-450 bp size range based on Fragment Analyzer data when available. For gDNA from leukocytes, ≤100 ng of fragmented gDNA was input into library preparation.

Logistical considerations related to the prospective collection of the validation cohort required the use of STRECK blood collection tubes, while $K_2EDTA$ collection tubes were used for the training cohort. The study design guards against such pre-analytical variables driving classification of cases versus controls because all samples within the validation cohort (e.g., cases and controls) were collected in STRECK tubes. Nevertheless, to confirm that the type of collection tube does not confound the Lung-CLiP model blood was collected from three healthy donors in $K_2EDTA$ and STRECK tubes and compared key metrics including Lung-CLiP classification, cfDNA mutation concordance, fragment size, cfDNA concentration, molecular recovery and error profiles and found that none of these were significantly affected by the type of collection tube used (FIGS. 63 to 65).

Tumor Tissue Collection and Processing

Tumor DNA was extracted from frozen biopsy samples using the Qiagen DNeasy Blood and Tissue kit or from FFPE biopsy samples using the Qiagen AllPrep DNA/RNA FFPE kit according to the manufacturer's instructions. Following extraction, DNA was quantified and fragmented in the same manner as gDNA from plasma depleted whole blood and ≤100 ng of sheared DNA was input into library preparation.

Library Preparation and Sequencing

A new adapter schema, Flexible Error-correcting duplex adapters ("FLEX adapters"), was developed that de-couples the portion of the adapter containing the duplex molecular barcode (e.g., unique identifier or "UID") from the portion containing the sample barcode (FIGS. 2 and 3). FLEX adapters utilize dual-index 8 bp sample barcodes (pairwise edit distances ≥5) and 6 bp error correcting UIDs (pairwise edit distances ≥3) with optimized GC content and sequence diversity. End repair, A-tailing, and adapter ligation are performed following the KAPA Hyper Prep Kit manufacturer's instructions with ligation performed overnight at 4° C. Adapter ligation is performed using a partial Y adapter containing a 6 bp UID and the T overhang required for ligation (FIG. 3). Following ligation, a bead cleanup is performed using SPRI select magnetic beads (Beckman Coulter). Next, "grafting PCR" is performed to add dual-index 8 bp sample barcodes and the remaining adapter sequence necessary to make a functional Illumina sequencing library. Following another SPRI bead cleanup, universal PCR is performed.

Rationale for FLEX adapters: A strategy that would allow flexibility and efficiency in molecular biology and bioinformatics workflows for DNA high throughput sequencing, and that would simultaneously guard against two major sources of errors observed during sequencing was desired. These two sources comprise: (1) sequencing errors that result in misidentification of unique DNA molecules within a given sample, and (2) potential cross-contamination between samples. Accurate enumeration of unique molecules observed by sequencing is important when DNA input is limited and/or identification of low allele fraction events is desired, as is the case for cell-free DNA analysis. An important consideration when counting unique molecules observed in high depth targeted sequencing is removing PCR duplicates so as not to count a given unique molecule more than once. PCR duplicates are generally identified during cfDNA sequencing using the genomic start and end positions of the molecule and molecular barcodes (e.g., unique identifier or "UIDs") that are attached to each side of the molecule during adapter ligation. Molecules with the same start position, end position, and UID are considered to be PCR duplicates and are collapsed to one representative "unique molecule" through a process known as "barcode deduplication." Errors in UIDs introduced during library preparation can lead to an artificial increase in sequencing depth. This occurs when error(s) in the UID of a PCR duplicate of a previously observed molecule results in the misclassification of the molecule as belonging to a separate barcode family, causing the molecule to not be removed during barcode deduplication. It was investigated whether genome inflation was resulting in the inaccurate enumeration of unique cfDNA molecules sequenced. To assess such inflation, the UID "edit distances" of cfDNA molecules were compared with the same start/end positions to the theoretical distribution that would be expected by chance and to that of molecules with different start/end positions. The measured edit distances represent the number of base changes required to change one UID into another, as may occur by PCR and/or sequencing errors. It was hypothesized that if genome inflation was present, a higher number of UIDs that were separated by only 1 base (i.e., edit distance of 1) would be seen in the molecules with same starts/ends. Indeed, it was found that UIDs differing by 1 bp were significantly over-represented when comparing cfDNA molecules with the same start/end position to each of the other UID distributions. This strongly indicates that 1 bp errors can erroneously create new UID families when using our prior generation of adapters, thus motivating the error-correcting schemes within the new FLEX adapters to suppress them.

As one sequences to higher unique depths, the possibility that distinct parental molecules with the same start/end positions receive the same exogenous UID increases. One way to mitigate such barcode collisions is to increase the number of UIDs used. Additionally, as high-throughput sequencing technologies improve, the ability to sequence many samples in parallel (sample multiplexing) is increasingly important.

This new scheme has several potential advantages over historical designs, including: (i) more economical scaling of multiplexing capacity; (ii) more efficient guarding against sample cross contamination using dual-index sample barcodes; (iii) increased demultiplexed sequencing read yield using error-correcting sample barcodes; (iv) more accurate removal of PCR duplicates to guard against barcode collisions by increasing UID diversity to 1,024 UIDs (compared to 256 in prior schema); and (v) the use of error-correcting duplex UIDs guards against erroneous depth inflation that occurs when errors in UIDs result in misclassification of PCR duplicates as unique molecules.

Following library preparation, hybrid capture (SeqCap EZ Choice, NimbleGen) is performed. In this study a custom 355 kb NSCLC-focused panel targeting 255 genes recurrently mutated in lung cancer and 11 genes canonically associated with clonal hematopoiesis was utilized (Table 3). Hybrid capture was performed according to the manufacturer's protocol, with all 47° C. operations conducted on a thermal cycler. Following enrichment, libraries were sequenced on an Illumina HiSeq4000 with 2×150 bp paired-end reads.

Sequencing Data Analysis and Variant Calling

Fastq files were demultiplexed using a custom pipeline in which read pairs were only considered if both 8 bp sample barcodes and 6 bp UIDs matched expected sequences following error-correction. Following demultiplexing, UIDs were removed and adapter read-through was trimmed from the 3' end of the reads using AfterQC to preserve short fragments. Reads were aligned to the human reference genome (hg19, GRCh37) using BWA ALN.

Error suppression and variant calling: Molecular barcode-mediated error suppression and background polishing were performed as previously described (See A. M. Newman, *Nat. Biotechnol*. (2016), cited supra). To leverage the improved error profile afforded by capturing samples with the ROS scavenger hypotaurine, a background database built from 12 withheld healthy control plasma samples captured with hypotaurine was used for background polishing. Following error suppression, selector-wide single nucleotide variant (SNV) calling was performed as previously described using a custom variant calling algorithm optimized for the detection of low allele frequency variants from deep sequencing data (See A. M. Newman, *Nat. Biotechnol*. (2016), cited supra). This approach, termed "adaptive variant calling," considers local and global variation in background error rates in order to determine position-specific variant calling thresholds within each sample. Adaptive variant calls were then further filtered as follows: (I) germline variants identified in WBC gDNA from any individual in the study at >25% VAF were removed, (II) variants at low depth positions (<50% of the median depth), and those in repeat, intronic, intergenic, or pseudogene regions were removed, (III) variants falling in regions with poor uniqueness or mappability were removed, (IV) variants with a population allele frequency >0.1% in the gnomAD database were removed, (V) recurrent background artifacts were removed using a blacklist specific to our targeted sequencing space derived from a database of 430 WBC gDNA samples. Following variant calling and filtering, additional filters were applied depending on the tissue compartment and analysis being performed (described below).

Tumor Genotyping

Somatic variant calling in tumor tissue was performed as described in the prior section except for the following requirements: (1) a minimum allele frequency threshold of 5%, (2) variants may not be present in the matched WBCs, and (3) variants in canonical clonal hematopoiesis genes other than TP53 were removed.

Tumor-Informed ctDNA Detection

To query plasma for the presence of ctDNA using mutations identified in matched tumor tissue, a Monte Carlo-based ctDNA detection index was utilized (see A. M. Newman, et al., *Nat. Biotechnol*. (2016), cited supra). The ctDNA detection index threshold was set to achieve ≥95% specificity in 56 held-out control cfDNA samples from patients with negative LDCT scans analyzed using the same selector. In samples with detectable ctDNA the plasma VAF of mutations was adjusted based on the copy number state of the tumor. The ctDNA VAF for each sample was then calculated by averaging the VAFs of all tumor variants used for monitoring (including variants with 0 mutant reads in the sample).

The patient-specific analytical limit of detection (LOD) was determined as previously described (see A. M. Newman, et al., *Nat. Biotechnol*. (2016), cited supra). Briefly, the LOD was defined as the lowest tumor fraction expected to yield 3 or more mutation-containing cfDNA molecules with 95% confidence based on the binomial distribution, the number of mutations tracked, and the unique molecular depth.

Whole-exome sequencing of tumor DNA and matched leukocyte DNA was performed for 17 patients using the SeqCap EZ Exome version 3.0 capture reagent (NimbleGen) according to the manufacturer's protocol. Sequencing data were demultiplexed and mapped as described above and duplicate reads were removed using 'samtools rmdup'. Single-nucleotide variants were called using VarScan2, Mutect, and Strelka (For more on VarScan, Mutect, and Strelka, see D. C. Kobo, et al., *Genome Res*. 22, 568-576 (2012); K. Cibulskis, et al., *Nat. Biotechnol*. 31, 213-219 (2013); and C. T. Saunders, et al., *Bioinformatics* 28, 1811-1817 (2012); each of which is incorporated herein by reference). Variants called by ≥2 callers were then further filtered requiring: (i) VAF≥5%, (ii) ≥30× positional depth in both tumor and germline, (iii) 0 germline reads, (iv) a population allele frequency ≤0.1% in the gnomAD database, and removing variants lying in repeat, intronic, intergenic, or pseudogene regions (For more on gnomAD database, see K. J. Karczewski, et al., *bioRxiv* 531210 (2019), which is incorporated herein by reference). Custom capture panels (SeqCap EZ Choice, NimbleGen) were then designed, each targeting the union of mutations from 5-7 patients and ranging in size from 212-487 kb. Tumor and matched leukocyte sequencing libraries from each patient were recaptured using these custom panels and tumor variants were re-called from the targeted sequencing data using the standard CAPP-Seq pipeline. These final variant lists, targeting a median of 68 mutations per patient (range 7-543), were then used for ctDNA detection.

To query for the presence of ctDNA using custom CAPP-Seq panels, the same Monte Carlo-based sampling approach used for standard CAPP-Seq tumor-informed detection was applied to two different subsets of molecules: (i) cfDNA molecules for which both strands of the original cfDNA duplex were observed and (ii) cfDNA molecules <160 bp or 230-310 bp in size. We then combined these two P-values using Fisher's method. The ctDNA detection index threshold then was set to achieve ≥95% specificity in 24 healthy control cfDNA samples analyzed using the same sequencing panel.

Cancer Cell Fraction Analysis

To determine the clonality of mutations identified in tumor samples, ABSOLUTE was used as previously described to estimate the fraction of tumor cells harboring each somatic mutation (e.g., cancer cell fraction, CCF) (For more on ABSOLUTE, see S. L. Carter, et al., *Nat. Biotechnol.* 30, 413-421 (2012), which is herein incorporated by reference). Genome-wide segmented copy number calls and the positions and VAFs of point mutations were used as input. Clonal mutations were defined as those for which the upper bound of the CCF confidence interval was >0.95, while mutations with CCF estimates below this threshold were defined as subclonal. If only 1 mutation was identified in a tumor sample, this mutation was considered to be clonal as it was not possible to obtain a CCF estimate.

ctDNA Fragment Size Analysis

To compare the size distribution of tumor-derived and non-mutant cfDNA molecules, the plasma was queried for cfDNA molecules overlapping the genomic positions of mutations identified in matched tumor samples. the cfDNA fragment size (TLEN field in SAM Spec v1.6) of each molecule containing a tumor-derived mutation (e.g., "mutant molecules" or "ctDNA") and every non-mutant molecule spanning the same genomic locus in the same individual was extracted. Mutant and non-mutant fragment lengths across all positions to generate the fragment size distributions depicted were then pooled. The same methodology was applied to cfDNA mutations identified following tumor-naïve variant calling to generate the "CH" and "Tumor-adjudicated" mutation fragment size distributions.

To determine what fragment size windows were enriched for ctDNA, the fraction of all mutant and non-mutant molecules falling in a 5 bp sliding window was calculated using the roll apply function in R (zoo package). The relative enrichment of mutant vs. non-mutant molecules (e.g., "ctDNA enrichment") was then calculated for every cfDNA fragment size between 50-500 bp.

Clinical Correlates of ctDNA Detection

Metabolic tumor volume was determined using whole body [18F] FDG positron emission tomography (PET)-CT scans. Percent ground glass opacity (GGO), the presence of necrosis, and tumor location were determined using pre-treatment imaging with chest computed tomography (CT) by a thoracic radiologist. GGO was defined by the presence of hazy, increased opacity of the lung with preservation of the bronchial and vascular margins. Percent GGO was determined by examining the entire volume of the lesion on axial, sagittal, and coronal reconstructions with percent GOO in the entire tumor quantified and rounded to the nearest quartile. Adenocarcinoma histologic subtype was assessed by a pathologist in the subset of patients for whom formalin-fixed, paraffin-embedded tumor tissue was available for analysis (48/63 patients with adenocarcinoma). For univariable and multivariable analysis, logistic regression was performed to associate stage, MTV, and non-adenocarcinoma histology with mean ctDNA VAF (as a continuous dependent variable). MTV and mean ctDNA VAF were log transformed to produce normally distributed data.

The following survival endpoints were considered: (1) freedom from recurrence (radiographic or biopsy proven recurrence), (2) freedom from metastasis (radiographic or biopsy proven metastasis to a distant organ or the contralateral lung), (3) recurrence free survival (radiographic or biopsy proven recurrence or death from any cause), (4) metastasis free survival (radiographic or biopsy proven metastasis to a distant organ or the contralateral lung or death from any cause), (5) overall survival (death from any cause). Patients without events were censored at last radiographic follow-up. Survival probabilities were estimated using the Kaplan-Meier method and survival of groups was compared using the log-rank test. Regression analysis was performed by Cox proportional hazards modeling, P-values were assessed using the log-likelihood test, and all P-values were two-sided. For regression analyses, log-transformed mean VAF and tumor volume measurements were used; log transformation was performed to produce normally distributed data. All variables were standardized to enable comparison of hazard ratios and 95% confidence intervals using Cox models.

Characterization of Clonal Hematopoiesis in cfDNA and WBCs

To characterize clonal hematopoiesis (CH) in the cfDNA and WBC compartments variants were called as described in the "Error suppression and variant calling" section described herein with the following additional filters: (1) required mutations be nonsynonymous except for the positive selection analysis and the mutational signature analysis for which synonymous mutations were also considered, (2) mutations were rescued from blacklisting if they were in the following 12 genes canonically associated with CH: ASXL1, PPM1D, DNMT3A, TET2, GNB1, CBL, JAK2, STAT3, GNAS, MYD88, SF3B1, TP53, and (3) mutations in canonical lung cancer driver genes were rescued from blacklisting if they had been observed in ≥10 COSMIC lung cancer cases (CosmicGenomeScreens v85).

Using matched white blood cell (WBC) sequencing, mutations identified in the cfDNA were labeled as WBC−, WBC+, or WBC− undetermined as follows:

(i) A mutation was considered WBC+ if it was above background in matched WBCs as assessed using the same Monte Carlo approach used for tumor informed ctDNA detection and requiring a detection index P-value<0.05.

(ii) A mutation was considered WBC− if there were 0 supporting reads in the matched WBC DNA and there was sufficient depth in the matched WBC DNA to identify the mutation given the VAF observed in plasma. Specifically, a mutation was only labeled WBC− if the probability of observing ε1 supporting read in the WBCs was >95% given the VAF of the variant in the cfDNA and the positional depth in the WBCs.

(iii) A mutation was considered WBC− undetermined if there were >0 supporting reads in the WBCs but the detection index P-value was ≥0.05 (e.g., mutation was not significantly above background in WBCs) or if there were 0 supporting reads but the probability of observing the mutation in the matched WBCs was ≤95% given the VAF of the variant in the cfDNA and positional depth in the WBCs.

Only mutations identified de novo in the cfDNA for which presence in the matched WBCs may be confidently assessed (labeled as WBC− or WBC+) were considered for all the analyses with the following exceptions:

(i) For FIGS. 42 and 45, mutations identified de novo from WBCs were also considered.

(ii) For the analysis comparing VAFs of mutations found in cfDNA and WBCs, mutations called de novo in either compartment (cfDNA or WBCs) were considered as long as the presence or absence of the alteration may be confidently assessed in both tissue compartments, as detailed above. Therefore, mutations identified de novo in WBCs were labeled as cfDNA−, cfDNA+, or cfDNA− undetermined in the same manner that WBC support was determined for cfDNA mutations (see above).

Positive selection analysis was carried out on all synonymous and nonsynonymous WBC+ and WBC− cfDNA mutations using the dNdScv R package with a modification to account for the fraction of a given gene covered by the sequencing panel (For more on the dNdScv R package, see I. Martincorena *Cell* 171, 1029-1041.e21 (2017), which is incorporated herein by reference). Genes were considered under positive selection for nonsynonymous mutations if the dNdScv-reported Q-value for all substitution types was <0.05.

The contribution of known mutational processes to the mutations we observed in cfDNA was assessed with the deconstructSigs R package using the COSMIC signature set (v2) (for more on the deconstructSigs R package, see R. Rosenthal, et al., *Genome Biol.* 17, 1-11 (2016), which is incorporated herein by reference). Due to the limited number of mutations per individual, mutations were pooled across individuals to evaluate mutational signatures present in WBC+ and WBC− compartments for a given comparison (e.g., patients vs. controls, smokers vs. nonsmokers). To assess the statistical significance of differences in the contribution of Signature 4 (smoking) to different sets of mutations, 1,000 permutations were performed per comparison of interest (patients WBC+ vs. WBC−, patients WBC− vs. controls WBC−, smokers WBC+ vs. WBC−, and smokers WBC− vs. nonsmokers WBC−) in which mutation labels were scrambled and mutational signature contributions were recalculated with deconstructSigs. For each permutation, the difference in Signature 4 contributions between the two mutation groups was computed to generate a null distribution, and an empirical P-value was determined by comparing the observed difference in Signature 4 between true mutation groups to the null distribution. To correct for mutation sets that had imbalanced label counts due to differences in cohort size (e.g., different numbers of mutations in the groups being compared), the number of mutations was down-sampled to the less-represented label's total in each iteration before recalculating the mutational signature contributions.

To assign each mutation a score reflecting the likelihood it resulted from smoking-associated mutational processes, the trinucleotide context and base substitution for the mutation were considered and then the weight for that context was extracted from the COSMIC Signature 4 vector as provided by deconstructSigs.

Lung-CLiP Model

The Lung-CLiP model is an ensemble classification framework integrating the outputs of two constituent SNV and CNV models using five different classification rules, 5-nearest neighbor (5NN), 3NN, naïve Bayes, logistic regression and decision tree. For the SNV model a statistical model was developed to distinguish cfDNA mutations observed in patients from those observed in controls. Within this model a semi-supervised learning framework was leverage in which an elastic net logistic regression model is trained to distinguish tumor-adjudicated variants from non-adjudicated variants ('tumor-adjudicated model') in the subset of patients with matched tumors. This tumor-adjudicated model is used to label variants from patients without matched tumor samples. The SNV model is then used to assign scores to all variants in patients and controls using the labels assigned by the semi-supervised tumor-adjudicated model. After variant scores were assigned, "Patient SNV Featurization" was performed to summarize the variant scores in each sample. These summary scores are then used in a final elastic net logistic regression model trained to distinguish patients from controls. All these operations are performed in a nested patient-level leave-one-out framework.

The CNV model enumerates altered genomic regions using two annotation lists: (1) a set of uniformly distributed 5 MB windows across the genome, and (2) recurrently altered regions identified by running GISTIC2.0 on 1,017 TCGA NSCLC cases (e.g., "hotspot regions") (For more on GISTIC2.0, see C. H. Mermel, et al., *Genome Biol.* (2011), cited supra). The number of 5 MB regions and GISTIC "hotspot" regions are used as features in the copy number model alongside a third feature which captures whether there is enrichment for regions known to be recurrently copy number altered in NSCLC (e.g., GISTIC) as opposed to uniform bins.

Rationale: The Lung Cancer Likelihood in Plasma (Lung-CLiP) method was developed as a probabilistic approach to estimate the probability that a plasma sample contains tumor-derived cfDNA without using prior knowledge of tumor variants. This approach involves deep sequencing of plasma cfDNA and matched leukocytes for genotyping of somatic variants in each compartment, followed by integration of SNVs and genome-wide copy number alterations. Classification of a given blood sample using Lung-CLiP is achieved by applying a multi-tiered machine learning framework in which a sub-classification layer initially estimates the probability that a given cfDNA SNV is tumor-derived. As detailed below, this SNV model (described below) integrates key biological and technical features specific to each individual variant including background frequencies, cfDNA fragment size, smoking signature contribution, presence in a gene frequently mutated in NSCLC, and CH likelihood. A second CNV model (described below) enumerates somatic copy number alterations in both cfDNA and in leukocytes with appropriate consideration of CH-derived and constitutional copy number alteration. A final patient-level probabilistic ensemble classifier then integrates the output of the SNV and CNV models to estimate the likelihood a given blood sample contains lung cancer derived cfDNA (e.g., "CLiP score").

A case: control design and a training and independent validation framework employing specimens from 254 subjects was utilized, with cases comprising patients with localized NSCLC and controls comprising risk-matched adults undergoing annual radiologic screening for lung cancer by LDCT. The Lung-CLiP classifier was first trained using samples from a discovery cohort of 160 subjects including lung cancer patients and high-risk controls at 4 of the 5 participating cancer centers (Stanford, MDACC, Mayo, and Vanderbilt, as described above); an additional set of 18 NSCLC patients with tumor tissue available for analysis were also utilized in the discovery cohort and served to inform the identification of ctDNA features in tumor-informed analyses. Model training was performed in a leave-one-out cross-validation framework in the discovery cohort and Lung-CliP score thresholds achieving 98% and 80% specificity in the training samples were applied to an independent validation cohort. As described above, this independent validation cohort comprised 94 subjects including NSCLC patients (n=46) and risk-matched controls (n=48) with negative LDCT scans that were prospectively enrolled from a separate institution (MGH/Harvard). Performance of the model in the validation cohort was then compared to measures observed in training including sensitivity, AUC, and specificity metrics.

SNV Model

Variants were genotyped and filtered as described in the "Error suppression and variant calling" section described herein with the following additional filters: (1) removed mutations present in matched WBCs with a detection index P-value<0.10, (2) removed mutations in the canonical CH genes DNMT3A, TET2, ASXL1, PPM1D, GNB1, CBL, JAK2, STAT3, GNAS, MYD88, SF3B1, (3) rescued mutations in the following lung cancer oncogenes from blacklisting if they have been observed in one or more lung cancer cases in COSMIC (CosmicGenomeScreens v85): EGFR, KRAS, PIK3CA, BRAF, MET, U2AF1, NFE2L2, TERT, ERBB2, HRAS, NRAS, TERT, RAF1.

Fifteen features were used in the SNV model and detailed here in order of feature importance:

(1) WBC Bayesian background: This metric measures the significance of the difference between the VAF of a variant compared to a background distribution of 430 WBC samples.

To model the background distribution for every variant $$v_{bc}^{p}$$

(defined by genomic position p and base change bc (x→y; x≠y∈{A, C, G, T})), the background distribution in the cohort of WBC samples was first modelled via a zero-inflated Beta distribution as $$f_p^{bc} \sim \pi_0^{p,bc}\delta_{fp} + \pi_1^{p,bc}Beta(f_p; \alpha^{p,bc}, \beta^{p,bc})$$

(for the sake of simplicity, the superscripts p and bc are dropped in what follows). All the parameters are estimated from the "background cohort" ($\mathcal{B}$). In this model, $\pi_1$ is estimated as the fraction of samples in the set $\mathcal{B}$ with that position changed as bc, leading to $\hat{\pi}_0=1-\hat{\pi}_1$. The set $\mathcal{B}$ was then limited to the samples with their position p altered as bc, denoted by $\mathcal{B}_{p,bc}$. Then for each sample in the background set, i∈ $\mathcal{B}_{p,bc}$, 20 random numbers were generated (bounded by 0 and 1), $$[p_1^i, p_2^i, \ldots , p_{20}^i]$$

from a Beta distribution, $$Beta(n_{p:bc,alt}^i, n_p^i) \text{ where } n_{p:bc,alt.}^i$$

is the number of supporting reads in sample i covering position p with the non-reference allele as in bc and $$n_p^i$$

is the total depth in sample i in position p. A combined "in silico background VAF vector" is defined as:

$$p_{\mathcal{B}} := \left[p_1^1, p_2^1, \ldots , p_{20}^1, p_1^2, p_2^2, \ldots , p_{20}^2, \ldots , p_1^{|\beta_{p,bc}|}, p_2^{|\beta_{p,bc}|}, \ldots , p_{20}^{|\beta_{p,bc}|}\right]$$

Next, the overall Beta distribution parameters in this position were estimated as follows: the mean and standard deviation of $\boldsymbol{p}_{\mathcal{B}}$ were calculated and then "method of moments" to infer $\alpha^{p,bc}$ and $\beta^{p,bc}$ was employed. This Beta distribution would effectively capture the stochastic noise factors among the background samples in the position of interest. More importantly, each sample in the background set would have the same opportunity to weigh in (due to the 20 random draws from the individual sample-variant operation above).

With this inferred from the "background cohort", for an observed variant with $n_{alt}$ supporting mutant reads and n total depth ($n=n_{ref}+n_{alt}$) the Bayesian significance value was calculated as $$p = 1 - \pi_1 \times \sum_{k=1}^{n_{alt}} \binom{n}{k} \frac{\Gamma(k+\alpha)\Gamma(n-k+\beta)\Gamma(\alpha+\beta)}{\Gamma(n+\alpha+\beta)\Gamma(\alpha)\Gamma(\beta)} - \pi_0$$

(2) cfDNA Bayesian background: This metric measures the significance of the difference between the VAF of the variant compared to a background distribution of 51 withheld control cfDNA samples ("low-risk controls" that are entirely withheld from the Lung-CLIP cohort). Here the same method was used as described above while using the withheld control cfDNA samples as the set $\mathcal{B}$.

(3) Variant allele frequency (VAF %): Variant allele frequency of the variant of interest.

(4) Germline depth: The probability of observing ≥2 supporting reads in the matched WBCs given the VAF of the variant in the cfDNA and positional depth of the variant in the WBCs.

(5) Mean barcode family size: Average barcode family size (e.g., the average number of PCR duplicates supporting each unique cfDNA molecule) of barcode-deduplicated cfDNA molecules supporting the variant of interest.

(6) Short fragment score 1: P-value calculated by performing Fisher's exact test to compare mutant and non-mutant read counts overlapping the position of the variant before and after in silico size selection for ctDNA enriched fragment sizes (<160 bp or 230-310 bp). The reference and non-reference counts were denoted before and after in silico size selection respectively by $$n_{ref.}, n_{alt.}, n_{ref.}^{S.S.} \text{ and } n_{alt.}^{S.S.}.$$

a contingency table was then created with these counts and the p-value of any co-association between base change status (ref. vs alt.) and cfDNA fragment size was calculated. The final feature is then defined as:

$$\begin{cases} -\log_{10} p^{Fisher}, & \text{if } \frac{n_{alt.}^{S.S.}}{n_{ref.}^{S.S.} + n_{alt.}^{S.S.}} > \frac{n_{alt\cdot}}{n_{ref\cdot} + n_{alt\cdot}}. \\ \log_{10} p^{Fisher}, & \text{else} \end{cases}$$

(7) Short fragment score 2: Each cfDNA molecule supporting a variant is assigned an enrichment value based on its fragment size. a fragment size likelihood ratio (FSLR), λ(s) for all fragment sizes, s∈[30,400] was first defined as:

$$\lambda(s) := \frac{Pr(l = s \mid \text{mutant})}{Pr(l = s \mid \text{wildtype})}$$

Using empirical data, these quantities were first estimated, and through a plug-in approach the FSLR was estimate as:

$$\lambda(s) \approx \frac{n_{l=s}^{mut} / n^{mut}}{n_{l}^{wt} / n^{wt}}$$

Where $$n_{l=s}^{mut}$$

denotes the number of fragments with length l=s and a tumor-adjudicated variant, and $$n_{l=s}^{mut}$$

denotes the number of fragments with length l=s with the wildtype allele in the mutated positions. In this definition, $n^{mut}$ and $n^{wt}$ denote the total number of fragments with the mutant and wild type allele (in the same positions as mutant fragments), respectively. Next, for a given variant, $v_i$ with supporting (wildtype and mutant) fragments $\{f_1, f_2, \ldots, f_m\}$ the corresponding fragment sizes $\{s_1, s_2, \ldots, s_m\}$ were found and then a score calculated as:

$$\log \prod_{i \in \{1, \ldots, m\}} \lambda(s_i)$$

(8) Transition/transversion: Binary variable denoting if the base substitution of the variant is a transition or transversion.

(9) Duplex support: Number of duplex cfDNA molecules supporting the variant of interest.

(10) Pass outlier cutoff: Binary variable denoting whether the VAF of the variant of interest is above a VAF threshold defined within each sample designed to identify putative low VAF outlier mutations.

(11) Mapping quality: The average mapping quality of reads supporting the variant of interest.

(12) Lung cancer hotspot: Binary feature denoting mutations in lung cancer driver genes with >20 observations in COSMIC (CosmicGenomeScreens v85) and canonical activating mutations in EGFR, KRAS, NRAS and BRAF.

(13) UMI error corrected: Average number of errors corrected in UIDs across all the cfDNA molecules supporting a variant.

(14) Phred quality: Average Phred quality score across all bases supporting the variant.

(15) Variant position in read: The average normalized position of the variant across all sequencing reads supporting the variant.

A model was trained in a leave-one-out cross validation framework to distinguish cfDNA mutations observed in patients from those observed in controls in which each variant $SNV_{i,j}$ consists of p features (described in the prior section, "SNV model features"). Nested within this model, a semi-supervised learning framework was utilized in which an elastic net logistic regression model was trained to distinguish tumor-adjudicated variants from non-adjudicated variants ('tumor-adjudicated model') in the subset of patients in the training fold with matched tumors. This model was then used to label variants from patients without matched tumor samples as depicted in Table 2.

TABLE 2

Labeling of variants from patients with or without matched tumor samples.

| Layer variant used in | Sample type | Has matched tumor? | Tumor adjudicated? | Self-training labels | Labeled by self-learning model? | Label in final SNV model | Weight in final SNV model |
|---|---|---|---|---|---|---|---|
| 0 | Patient | Yes | Yes | 1 | No | 1 | 1 |
| 1 | Patient | Yes | No | 0 | No | 0 | 1 |
| 2 | Patient | No | NA | NA | Yes | Labeled by self-learning model | $\frac{1}{1+\exp(-2*\lvert p - t^*\rvert)}$ |
| 3 | Control | NA | NA | NA | No | 0 | 1 |

Once labels are assigned, a full feature matrix, X, was created by combining all variants from patients and controls. The response vector, denoted by y, is a combination of "strong labels" (e.g., tumor-adjudicated), "intermediate labels" (e.g., variants from patients without tumors, labeled via the self-learning model) and "weak labels" (e.g., non-adjudicated variants in patients with matched tumors and variants in controls). In order to incorporate these soft-labels, samples were weighed as follows: "strong labels" have a label of 1 with a weight of 1, "intermediate labels" have their labels assigned from the self-training model (0 or 1) and their weight (between 0 and 1) determined by the confidence of the model in labeling them, and "weak labels" may have a label of 0 with a weight of 1. The SNV feature matrix and the corresponding labels and weights are then used within a $l_1$-regularized logistic regression (e.g., lasso with "binomial" family) with a cross-validation for regularization parameter. The regularization parameter corresponding to the minimum cross-validation is then used for the final model. The trained model was then used to score all the variants in the held-out fold (e.g., variants from a held-out subject). Importantly, a nested cross-validation was used to assure that no variants in the held-out sample are seen prior to supervised patient classification using the variant scores (described below).

Within the nested leave-one-out framework, after variant scores have been assigned to all the variants in the training and held out folds, "Patient SNV Featurization" was performed to summarize the variant scores in each sample as follows:

For each sample j a vector of scores was generated, one for each SNV, $s_j=s_{j01}, \ldots, s_{jn_j}$; where $n_j$ is a non-negative number indicating the total number of variants in the sample going through the classification scheme. a transformation to convert each sample vector to a set of 13 features was defined as: $f: s_j \rightarrow x_j \in R^p$ where p is the number of features that may be used for the patient classification. Since the dimension of the input vector varies from sample to sample (e.g., the number of SNVs observed in each sample differs), a set of summary statistics as the function $f$ was utilized. These features are summarized below:

$$|s_j \geq 0.7| \quad |s_j \geq 0.75| \quad |s_j \geq 0.8| \quad |s_j \geq 0.9| \quad |s_j \geq 0.95| \quad |s_j| \quad s_{j,(1)}$$

$$s_{j,(2)} \quad \bar{s}_J \quad |s_j < 0.25| \quad \overline{AF}_J \quad c_j^{C>A} \quad c_j^{C>T} \quad |SNV_{hotspot}|$$

where |•| denotes the cardinality of the set, $\bar{\cdot}$ denotes the average, $s_{j,(1)}$ denotes the largest order statistic and $s_{j,(2)}$ denotes the second largest order statistic. In cases with zero variants, 0 was used as the value for each summary statistic. In cases with one variant, 0 was used as the value for $s_{j,(2)}$. In addition to these summary statistics, three additional features enumerating variants were defined: (1) base change substitutions predominantly associated with the smoking mutational signature (Signature 4; C>A/G>T), (2) base change substitutions associated with the aging mutational signature (Signature 1; C>T/G>A), and (3) the patient level count of lung cancer hotspot mutations with these features denoted by $$c_j^{C>A}, c_j^{C>T}$$

and $|SNV_{hotspot}|$ respectively.

An elastic net (with α=0.5) was then used to score each individual using the 13 variant summary features. Elastic net 30 times was run with sample bootstrapping (e.g., bagging of training samples) and take the average score as the final score. In each run of elastic net, a CV-glmnet was performed to obtain the best regularization parameter. This model leads to a SNV-based patient classification score, denoted by $$S_i^{SNV}$$

for sample i.

CNV Model

For the copy number model, two annotation lists were used: (1) a set of uniformly distributed 5 MB windows across the genome, and (2) recurrently altered regions identified by running GISTIC2.0 on 1,017 TCGA NSCLC cases (e.g., "hotspot regions"). copy number alterations were then called in these regions as described with "Detection of genome-wide copy number variation from targeted sequencing" section and apply the following filters to remove background noise and constitutional or CH-derived copy number events (note that for Z-score-based filters we consider the directionality of the alteration):

I. Require the absolute value of the copy number Z-score was >2.58
II. Remove alterations observed in >20% of withheld controls cfDNA samples (n=42) with an absolute Z-score>2.58
III. Remove alterations observed in matched WBCs with a Z-score>2.58
IV. Require absolute difference of >0.5 between cfDNA and germline Z-scores
V. Require germline background p-value<0.05
VI. Require control background p-value<0.05
VII. Remove any alterations on chromosome 19

The number of 5 MB regions and GISTIC "hotspot" regions which pass these thresholds are used as features in the copy number model. In addition to these counts, a third feature was defined which captures whether there is enrichment for regions known to be recurrently copy number altered in NSCLC (e.g., "hotspots") as opposed to uniform bins. This feature is defined as the P-value signed by 10-fold enrichment of log-odds derived from a Fisher's exact test to compare the number of altered 5 MB bins (500 bins total) to the number of altered GISTIC bins (85 bins total). These three variables were used: (1) filtered 5 MB CNV count (2) filtered GISTIC CNV count and (3) Fisher's P-value, as features in a generalized linear model (e.g., "CNV model"). This model leads to a score denoted by $$S_i^{CNV}$$

for each sample i in the final Lung-CLIP model.

Integrated Lung-CLiP Classifier

Finally, the two models above (SNV and CNV models) were combined to build the Lung Cancer Likelihood in Plasma (Lung-CLiP) classification model that generates a likelihood that a given plasma sample contains lung cancer ctDNA. Here we use five variables derived from the SNV and CNV models where $$S_i^{SNV} \text{ and } S_i^{CNV}$$

denote the SNV− and CNV− based patient classification scores for sample i, abs(.) denotes the absolute value, |.| denotes the cardinality of the set, and each sample is encoded by:

$$x_i^{composite} = \left[S_i^{SNV}, S_i^{CNV}, \max\left(\text{abs}\left(S_i^{SNV}\right), \text{abs}\left(S_i^{CNV}\right)\right), \max\left(S_i^{SNV}, S_i^{CNV}\right), \left|S_i^{SNV\ Hotspot}\right|\right]$$

An ensemble classifier was then used to assign each individual a final Lung-CLiP score as follows. An ensemble classifier using five different classification rules was developed: 5-nearest neighbor (5NN), 3NN, naïve Bayes, logistic regression and decision tree. In addition to classification rules, sample bagging was also performed via bootstrapping the samples. Each classification rule is then penalized according to its variation in the bagging step. All the penalized scores were linearly combined for these classifiers.

Detection of Genome-Wide Copy Number Variation from Targeted Sequencing

To identify copy number variants (CNVs), the on- and off-target reads from CAPP-Seq were utilized. Briefly, each library in the CAPP-Seq workflow typically receives about 30 to 60 million paired-end reads. These reads are mapped to the human genome (build hg19, GRCh37), with about 60% to 80% of reads falling in the targeted genomic coordinates ("on-target reads"). The remaining about 20% to 40% of reads consist predominantly of reads that map to the remainder of the human genome ("off-target reads"). To combine the high-depth data in the targeted sequencing space with the low-pass data in the off-target space, each of these sets of reads were treated separately, followed by statistical integration.

To detect CNVs in the targeted sequencing space, a vector of normalized, position-level depths was generated as follows. Beginning from barcode-deduplicated BAM files, the following was performed: (1) generate a vector of depth at each position in the selector using 'bedtools genomcov'; for an about 355 kb selector, this results in a 355,000 by 1 vector; (2) normalize this vector to the median value; and (3) perform GC correction. GC correction was performed as follows: first, every position in the selector was assigned a GC-content value based on a 201-bp window surrounding the position in the genome. A LOESS fit of the depth was then performed by plotting depth vs GC-content; this LOESS-fit was then used to remove GC-bias. Following GC correction, each sample was (4) normalized to a median vector of depth derived from 12 withheld control cfDNA samples. Finally, to remove batch effects observed in each sequencing lane, (5) a LOESS fit of each sample in the sequencing lane was performed against the median depth of all remaining samples in the sequencing run. The log 2 of this value was then calculated; this value, the log 2 of the copy number ratio (L2CNR), reflected the normalized copy number state of each sample at each position of on-target space.

The on-target L2CNR vector is centered on zero, bounded by − and + infinity, with variance $\sigma^2$. To gain a statistical level of confidence of the copy-number alteration state of every position, there is a need to estimate $\sigma$. Given a new sample, with M on-target positions, that has an unknown CN profile, a vector is computed:

$$\begin{bmatrix} L2CNR_1 \\ L2CNR_2 \\ \vdots \\ L2CNR_{iM} \end{bmatrix} \sim \begin{bmatrix} N\left(\mu_1, \sigma_1\sigma_1^2\right) \\ N\left(\mu_2, \sigma_2\sigma_2^2\right) \\ \vdots \\ N\left(\mu_{iM}, \sigma_i\sigma_M^2\right) \end{bmatrix} \begin{bmatrix} L2CNR_1 \\ L2CNR_2 \\ \vdots \\ L2CNR_i \end{bmatrix} \sim \begin{bmatrix} N(\mu_1, \sigma_1) \\ N(\mu_2, \sigma_2) \\ \vdots \\ N(\mu_i, \sigma_i) \end{bmatrix}$$

where each position, $i \in \{1, \ldots, M\}$ has a L2CNR that can be described as being drawn from a normal distribution centered on $\mu_i$ (the true log 2 copy number-ratio) with standard deviation $\sigma_i$. It was assumed that all $\sigma_i$'s are equal, i.e., $\sigma_i=\sigma_j=\sigma$, $\forall i, j \in \{1, \ldots, M\}$. To estimate the sample-level standard deviation $\sigma$, it was assumed that in the subvector $[L2CNR_m, \ldots, L2CNR_{m+k}]$, $\mu_m=\mu_{m+1}= \ldots =\mu_{nm+k}$ for small values of k. That is, the true L2CNR for two positions will be the same across small regions in genomic space. Therefore, the standard deviation $\sigma$ across the subvector $[L2CNR_m, \ldots, L2CNR_{m+k}]$ represents an estimate of the sample-wide standard deviation. A subvector of k=5,000 continuous positions in selector-space was utilized to estimate the standard deviation; taking the median across 10,000 such subsamplings as the final estimate of standard deviation for a given sample. Finally, a position level z-score, zL2CNR, was obtained in each sample:

$$\begin{bmatrix} zL2CNR_1 \\ zL2CNR_2 \\ \vdots \\ zL2CNR_m \\ \vdots \\ zL2CNR_{m+k} \\ \vdots \\ zL2CNR_M \end{bmatrix} = \frac{1}{\sigma} \times \begin{bmatrix} L2CNR_1 \\ L2CNR_2 \\ \vdots \\ L2CNR_m \\ \vdots \\ L2CNR_{nm+k} \\ \vdots \\ L2CNR_{iM} \end{bmatrix} \begin{bmatrix} L2CNR_1 \\ L2CNR_2 \\ \vdots \\ L2CNR_m \\ \vdots \\ L2CNR_n \\ \vdots \\ L2CNR_i \end{bmatrix}$$

$zL2CNR_i$ therefore provides an estimate of the copy-number state of each position, centered on 0, with standard deviation 1, i.e., standard normal distribution. This production of z-scores allows samples to be comparable across different sequencing depths. A similar procedure allows a z-score to be assigned to regions of any size of on-target space.

To identify CNVs in the off-target space, beginning from samtools-deduplicated BAM files ('samtools rmdup'), the following was performed: (1) divide the genome into 100 kb windows; (2) count the number of off-target reads falling into each window and normalize for the total number of sequencing reads in the sample. Normalized read counts per window are then (3) corrected for GC-content by LOESS regression and normalized to the expected read count from a cohort of 12 withheld control cfDNA samples. (4) Windows containing the coordinates of our targeted sequencing panel or exhibiting high variance among a cohort of 12 withheld control cfDNA samples are then excluded. This vector of normalized read counts per window is expressed as a log 2 copy number ratio (L2CNR) relative to normal diploid control samples. Similar to the on-target CNV treatment, each 100 kb bin now contains a L2CNR value, centered on 0, bounded by − and + infinity, with variance 62. Here, each bin was treated similar to a position in the on-target sequencing space, and the sample-level variance was discovered by taking subsampled vectors of 100 contiguous bins across the genome (i.e., k=100) and taking the standard deviation. This subsampling was performed 10,000 times, with the median representing our estimate of the sample-wide variance. Dividing the 100 kb bin vector of L2CNR by this estimate of σ provided a bin-level zL2CNR, centered on 0 with standard deviation of 1.

To combine the estimates of copy-number state from on and off-target data, the genome was first binned into 5 MB regions. A z-score was then calculated for the copy number state from the on-target bases contained within that 5 MB region and the off-target 100 kb bins contained within that 5 MB region. These two z-score estimates were then combined via Stouffer's Method, providing a single, unified z-score for the copy number state of a given 5 MB region.

Copy Number State Adjustment for Tumor-Informed ctDNA Detection

When performing tumor-informed ctDNA detection, the plasma variant allele frequency (VAF) of 1) subclonal mutations and 2) mutations overlapping regions of the tumor with significant copy number alterations was adjusted. To determine the clonality of mutations identified in tumor samples, ABSOLUTE was used to estimate the fraction of tumor cells harboring each somatic mutation (i.e., cancer cell fraction, CCF). Mutations for which the upper bound of the CCF confidence interval was <0.95 were considered to be subclonal and the plasma VAF of these mutations was multiplied by 1/CCF (where CCF=the cancer cell fraction of the mutation).

In addition, the plasma VAF of mutations overlapping regions of the tumor was adjusted with significant copy number alterations. This adjustment was only performed if a tumor mutation was observed in the plasma and the mutation overlapped a copy number-altered region of the tumor with copy with an absolute value Z score>2.58 (i.e., theoretical 1% false positive rate for CNV detection) and absolute log 2 copy number ratio (L2CNR)>0.25 (details on these metrics are provided in the "Detection of genome-wide copy number variation from targeted sequencing"). The VAF of mutations falling in such regions were adjusted as follows:

I. The tumor purity of the samples was calculated as 2 times the mean VAF of all mutations falling in copy neutral regions. If no mutations existed in copy neutral regions, ABSOLUTE was used to estimate tumor purity as previously described[7] with genome-wide segmented copy number calls and the positions and VAFs of point mutations used as input.

II. The following was assumed:
   a. Mutations in deleted regions were not on the deleted allele (otherwise they would not be observed).
   b. Mutations in amplified regions were assumed to be on the amplified allele if 2 times the VAF of the mutation was greater than the tumor purity.
   c. Mutations in amplified regions were assumed to not be on the amplified allele if 2 times the VAF of the mutation was less than the tumor purity (if the WT allele is amplified).

III. The copy number state (CNS) of the copy number-altered allele in the tumor was then used to calculate an adjustment factor, which was used to adjust the VAF of the mutation observed in the plasma as follows:
   a. The CNS is defined as:

$$CNS = (2^{\wedge}L2CNR)^{*}2 - 1. \quad \text{i}$$

b. If a mutation falls in a deleted region in the tumor:
      i. adjustment factor=mutant VAF*CNS
   c. If a mutation falls in an amplified region in the tumor on the amplified allele:
      i. adjustment factor=mutant VAF/CNS
   d. If a mutation falls in an amplified region in the tumor on the non-amplified allele
      i. adjustment factor=mutant VAF*CNS Following this adjustment based on the copy number state of the tumor, the ctDNA allele fraction for each sample was calculated by averaging the allele fractions of all the tumor variants used for monitoring.

In Silico Simulation of the CAPP-Seq Molecular Biology Workflow

To optimize genome equivalent recovery from CAPP-Seq, an idealized simulation of the molecular biology workflow was developed, beginning from plasma cell-free DNA molecules and ending with sequencing reads. This model, based on stochastic binomial sampling, allowed simulation of different molecular biology conditions and to estimate the number of unique molecules observed by sequencing at each step. For the purposes of this model, a generic CAPP-Seq selector targeting a 200 kb portion of the human genome was considered. Assuming a total input mass of 32 ng of cfDNA drawn randomly from the human genome (estimated to be $3\times10^{9}$ bp in size of a haploid complement), and an average cfDNA molecule size of 170 bp, it was expect to have a total of:

$$32ng\ cfDNA * \frac{10^{-9}\text{g}}{ng} * \frac{1\text{ mol bp}}{650\text{ g}} * \frac{cfDNA\text{ molecule}}{170\text{ bp}} * \frac{6.02*10^{23}\text{ molecules}}{\text{mol}} * \frac{2*10^{5}\text{ on target bases}}{3*10^{9}\text{ bases in genome}}$$

In the in silico model, each of these cfDNA molecules was considered independently. Furthermore, each cfDNA molecule was assumed to have a top and bottom strand (i.e., 'Watson' and 'Crick' strand), which are considered independently. To account for the observation that certain molecules may not be recovered as duplexes (i.e., both Watson and Crick could not be recovered despite over-sequencing), a 30% single-stranded 'nick rate' was included in the model. The following operations are considered in the model, with the efficiencies shown:

| Step | Efficiency |
|---|---|
| ssDNA 'nick rate" | 0.3 |
| Adapter Ligation | 0.9 |
| Library Amplification (8 cycles) | 1.5 |
| Clean-up | 0.7 |
| Fraction of DNA into capture | 0.083-1 |
| Capture Efficiency | 0.075-0.75 |
| Library Amplification (15 cycles) | 1.8 |
| Clean-up | 0.7 |

Here, 'efficiency' was defined as the probability a molecule successfully makes it through the workflow step. For example, the efficiency of 0.8 for adapter ligation implies each individual molecule has an 80% chance of successfully having adapters ligated. For amplification operations, efficiency of 1.5 implies each round of PCR results in, on average, a 50% increase in DNA-therefore, each molecule has a 50% chance of amplifying at each cycle. Here, the efficiency of each operation was estimated from the prior knowledge of the CAPP-Seq workflow and expected concentrations of DNA. Notably, there was not a reliable estimate of efficiency of hybrid capture-therefore, a range of capture efficiencies were considered. 'Sequencing' is modeled by downsampling the pool of final molecules to a fixed number of molecules.

In this in silico model, each original DNA strand (e.g., each 'Watson' and 'Crick' strand) from an original duplex DNA molecule was considered independently. Through each operation of the workflow, the number of PCR duplicates of each original Watson and Crick strand of DNA is tracked, with amplification and downsampling performed by the MATLAB 'binornd' function for binomial sampling.

Multiple model simulations were performed, varying the amount of pre-capture library entering into capture from 8.3% to 100%. To determine the expected unique molecular depth and duplex depth from each model run, uniform coverage of the 170 bp molecules was assumed across the 200 kb selector. Therefore, the estimated unique molecular depth was calculated as:

$$\frac{\#\text{ of (Original Watsons OR Original Cricks)} * 170\text{ bp}}{200{,}000\text{ bp}}$$

And the duplex depth was estimated as:

$$\frac{\#\text{ of (Original Watsons AND Original Cricks)} * 170\text{ bp}}{200{,}000\text{ bp}}$$

Droplet Digital PCR

An orthogonal validation of 15 WBC+ cfDNA mutations observed in a subset of patients and controls was performed using droplet digital PCR (ddPCR). ddPCR was performed on a Bio-Rad QX200 instrument using reagents, primers, and probes obtained from Bio-Rad. Four private mutations were validated, as well as two recurrent hotspot mutations in DNMT3A and JAK2 that were observed in 11 cfDNA samples. It was found that 100% (15/15) of the mutations tested validated by ddPCR in both the cfDNA and WBC gDNA compartments and that VAFs quantified by CAPP-Seq and ddPCR were significantly correlated (FIG. 66A).

Statistical Data Analysis

Statistical analyses were performed in R (version 3.4.0 and 3.5.2) and MATLAB (R2018a) and GraphPadPrism7 (version 8.3.0). The Lung-CLiP classification framework employs the R packages glmnet, caret, ETC, pROC, survival, optparse and MASS. Statistical tests used throughout include: Wilcoxon rank-sum test (two-sided), paired t-test (two-sided), Fisher's Exact Test, Pearson correlation, Spearman correlation and Cox proportional hazards model. When assessing concordance by Pearson or Spearman correlation, statistical significance was assessed by an F-test. Survival probabilities were estimated using the Kaplan-Meier method and survival of groups of patients based on ctDNA levels were compared using the log-rank test. Multivariable analysis of clinical correlates of ctDNA levels was performed by logistic regression. Confidence intervals for sensitivity and AUC estimates were generated by 1,000 bootstrap re-samplings of the Lung-CLiP classification scores in the training and validation cohorts. A power analysis was performed to determine an appropriate size for the Lung-CLiP validation cohort. Assuming a specificity of 98% as determined in the training cohort, it was calculated that 48 controls would have 80% power to detect that the true specificity is >=90% (1 arm binomial test with one sided alpha=0.05). Statistical significance for tumor-informed ctDNA detection was determined with a Monte Carlo-based ctDNA detection index. Statistical significance of the smoking mutational signature contribution to select mutation sets was performed by permuting SNV labels.

TABLE 3

| NSCLC-focused CAPP-Seq selector summary. |
|---|
| ACAN |
| ACKR1 |
| ACTRT1 |
| ADAMTS12 |
| ADCY2 |
| AKT1 |
| ALK |
| AMER3 |
| ANK2 |
| ANLN |
| ARID1A[a] |
| ASB18 |
| ASTN1 |
| ASXL1[b] |
| B2M |
| BCHE |
| BMP1 |
| BRAF[a] |
| BRAT1 |
| BRIP1 |
| C6orf118 |
| CACNA1E |
| CBL[b] |
| CCDC129 |
| CCND1 |
| CD274 |
| CDH10 |
| CDH12 |
| CDH18 |
| CDH6 |
| CDH7 |
| CDH8 |
| CDH9 |
| CDKN2A[a] |
| CNTNAP2 |
| CNTNAP5 |
| COL11A1 |
| COX10 |
| CPS1 |
| CSMD3 |
| CTNND2 |
| CUL3[a] |
| CXCL16 |
| DCSTAMP |
| DLGAP2 |
| DNAH17 |
| DNMT3A[b] |
| DUSP27 |
| EGFR[a] |
| EGFR-AS1 |
| EPHA10 |
| EPHA3 |
| EPHA6 |
| ERBB2 |
| ERBB4 |
| ERICH3 |
| ESRRG |
| EYS |
| FAM135B |
| FAM71B |
| FAT3 |
| FBN3 |
| FBXL7 |
| FGD1 |
| FGFR1 |
| FOXG1 |
| FSHR |
| FUT9 |
| GABRB3 |
| GEMIN4 |
| GIMAP1-GIMAP5 |

TABLE 3-continued

| NSCLC-focused CAPP-Seq selector summary. |
|---|
| GLCCI1 |
| GLIPR1L2 |
| GNAS[b] |
| GNB1[b] |
| GPR112 |
| GPR139 |
| GPR158 |
| GRIA4 |
| GRID2 |
| GRID2IP |
| GRIN2A |
| GRIN2B |
| GRIN3A |
| GRM1 |
| GRM3 |
| GRM5 |
| GRM8 |
| HAP1 |
| HAPLN1 |
| HHIPL2 |
| HOXB7 |
| HRAS[a] |
| HS3ST4 |
| HTR1A |
| HTR1E |
| HTR5AOS |
| IGSF22 |
| IL26 |
| IL7R |
| INMT |
| IQUB |
| ITGB3 |
| JAK1 |
| JAK2[b] |
| KCNA4 |
| KCNB2 |
| KCNC2 |
| KCND2 |
| KCNH7 |
| KCNJ12 |
| KCNJ3 |
| KCNT1 |
| KCTD8 |
| KEAP1[a] |
| KIF2B |
| KIT |
| KLHL6 |
| KRAS[a] |
| KSR1 |
| LDB2 |
| LMX1A |
| LPHN3 |
| LPPR4 |
| LRFN2 |
| LRFN5 |
| LRP1B |
| LRRC17 |
| LRRC4C |
| LRRC66 |
| LRRC7 |
| LRRIQ3 |
| MAGEL2 |
| MC5R |
| MDM2 |
| MET[a] |
| METRNL |
| MIR4728 |
| MIR548I4 |
| MMP16 |
| MTUS2 |
| MYC |
| MYD88[b] |
| MYF5 |
| MYH3 |
| NAA38 |
| NAV3 |
| NCKAP5 |
| NF1[a] |

TABLE 3-continued

| NSCLC-focused CAPP-Seq selector summary. |
|---|
| NFE2L2[a] |
| NKX2-1 |
| NLRP10 |
| NLRP12 |
| NLRP3 |
| NLRP4 |
| NLRP5 |
| NLRP8 |
| NMUR2 |
| NOTCH1[a] |
| NPAP1 |
| NPY5R |
| NRAS |
| NRXN1 |
| NTRK3 |
| NUPL2 |
| ODF4 |
| OR1A2 |
| OTOP3 |
| PABPC5 |
| PAK7 |
| PCDH15 |
| PCDH17 |
| PDCD1LG2 |
| PDGFRA |
| PDGFRB |
| PDILT |
| PDYN |
| PDZRN3 |
| PEG3-AS1 |
| PIK3CA[a] |
| PIK3CG |
| PLCL1 |
| PODXL |
| POM121L12 |
| PPM1D[b] |
| PPP1R3A |
| PRIM2 |
| PTCHD4 |
| PTEN[a] |
| PTPRD |
| PTPRN2 |
| PXDNL |
| RADIL |
| RAF1 |
| RAI1 |
| RB1[a] |
| RIMS2 |
| RIT1[a] |
| RNF213 |
| RNF216 |
| RP1 |
| RXFP3 |
| SETBP1 |
| SF3B1[b] |
| SFTPA1 |
| SFTPB |
| SFTPC |
| SLC17A8 |
| SLC18A3 |
| SLC52A1 |
| SLC8A1 |
| SLFN11 |
| SLITRK2 |
| SLITRK3 |
| SLITRK4 |
| SORCS1 |
| SOX2 |
| SPHKAP |
| SPTA1 |
| SRSF2 |
| ST18 |
| ST6GAL2 |
| ST6GALNAC5 |
| STAT3[b] |
| STEAP2 |
| STEAP4 |
| STK11[a] |

TABLE 3-continued

| NSCLC-focused CAPP-Seq selector summary. |
|---|
| STK17A |
| TAC1 |
| TAS2R1 |
| TAS2R41 |
| TBRG4 |
| TBX22 |
| TERT |
| TET2[b] |
| THSD7B |
| TKTL2 |
| TLR4 |
| TMEM132D |
| TMEM200A |
| TNN |
| TP53[ab] |
| TP63 |
| TRHDE |
| TRIM58 |
| TRPS1 |
| TSHZ2 |
| U2AF1[a] |
| UFSP1 |
| USH2A |
| USP29 |
| VWDE |
| WBSCR28 |
| ZCCHC5 |
| ZFPM2 |
| ZIC1 |
| ZIC4 |
| ZIM2 |
| ZIM3 |
| ZNF138 |
| ZNF423 |
| ZNF521 |
| ZNF536 |
| ZNF80 |
| ZNF831 |
| ZPBP |

[a]Putative lung cancer driver genes identified by Bailey et al. Comprehensive Characterization of Cancer Driver Genes and Mutations. Cell 2018.
[b]Genes canonically associated with clonal hematopoiesis This table lists the 266 genes that were either partially or fully covered by the 355 kb CAPP-Seq selector used in this study.

TABLE 4

Lung CLiP scores for NSCLC patients and risk-matched controls in the training and validation cohorts.

| Cohort | Subject type | Age (years) | Sex | Histology | Stage (AJCC v7) | Smoker | Lung-CliP Score |
|---|---|---|---|---|---|---|---|
| training | NSCLC | 73 | F | Squamous cell carcinoma | IIA | yes | 0.7179 |
| training | NSCLC | 71 | F | Squamous cell carcinoma | IA | yes | 0.1218 |
| training | NSCLC | 73 | M | Squamous cell carcinoma | IIIA | yes | 0.9909 |
| training | NSCLC | 79 | M | Adenocarcinoma | IIB | yes | 0.7680 |
| training | NSCLC | 84 | M | Adenocarcinoma | IB | yes | 0.9656 |
| training | NSCLC | 73 | F | Adenocarcinoma | IA | yes | 0.8664 |
| training | NSCLC | 66 | M | Squamous cell carcinoma | IIB | yes | 0.9937 |
| training | NSCLC | 79 | M | Squamous cell carcinoma | IB | yes | 0.9670 |
| training | NSCLC | 77 | M | Adenocarcinoma | IA | yes | 0.7180 |
| training | NSCLC | 68 | M | Adenocarcinoma | IA | yes | 0.6898 |
| training | NSCLC | 58 | F | Adenocarcinoma | IIA | yes | 0.7922 |
| training | NSCLC | 72 | F | Adenocarcinoma | IB | yes | 0.5401 |
| training | NSCLC | 83 | F | Adenocarcinoma | IB | no | 0.7322 |
| training | NSCLC | 76 | M | Adenocarcinoma | IA | no | 0.4478 |
| training | NSCLC | 73 | M | Adenocarcinoma | IA | no | 0.9944 |
| training | NSCLC | 80 | F | Adenocarcinoma | IA | no | 0.9604 |
| training | NSCLC | 72 | M | Squamous cell carcinoma | IA | yes | 0.8991 |
| training | NSCLC | 65 | M | Adenocarcinoma | IA | yes | 0.5322 |
| training | NSCLC | 79 | M | Adenocarcinoma | IA | yes | 0.8874 |
| training | NSCLC | 77 | M | Adenocarcinoma | IB | yes | 0.5493 |
| training | NSCLC | 70 | M | Adenocarcinoma | IIA | yes | 0.2552 |
| training | NSCLC | 87 | M | Adenocarcinoma | IB | yes | 0.9733 |
| training | NSCLC | 70 | F | Squamous cell carcinoma | IB | yes | 0.9822 |
| training | NSCLC | 79 | F | Adenocarcinoma | IB | yes | 0.4446 |
| training | NSCLC | 77 | M | Adenocarcinoma | IB | yes | 0.4165 |
| training | NSCLC | 58 | M | Adenocarcinoma | IIA | no | 0.7439 |
| training | NSCLC | 68 | M | Squamous cell carcinoma | IB | yes | 0.9907 |
| training | NSCLC | 65 | M | Adenocarcinoma | IB | yes | 0.9593 |
| training | NSCLC | 68 | F | Adenocarcinoma | IIA | no | 0.6496 |
| training | NSCLC | 58 | M | Adenocarcinoma | IB | yes | 0.9333 |
| training | NSCLC | 68 | F | Adenocarcinoma | IIIA | yes | 0.7750 |
| training | NSCLC | 80 | M | Adenocarcinoma | IB | yes | 0.9798 |
| training | NSCLC | 72 | M | Adenocarcinoma | IB | yes | 0.9059 |
| training | NSCLC | 75 | F | Adenocarcinoma | IB | no | 0.9929 |
| training | NSCLC | 62 | F | Adenocarcinoma | IIB | no | 0.9483 |

TABLE 4-continued

Lung CLiP scores for NSCLC patients and risk-matched controls in the training and validation cohorts.

| Cohort | Subject type | Age (years) | Sex | Histology | Stage (AJCC v7) | Smoker | Lung-CliP Score |
|---|---|---|---|---|---|---|---|
| training | NSCLC | 53 | M | Adenocarcinoma | IB | no | 0.9945 |
| training | NSCLC | 80 | M | Squamous cell carcinoma | IA | yes | 0.7435 |
| training | NSCLC | 64 | F | Adenocarcinoma | IIIA | yes | 0.4353 |
| training | NSCLC | 68 | M | Squamous cell carcinoma | IIIA | yes | 0.9834 |
| training | NSCLC | 62 | F | NSCLC-NOS | IIB | yes | 0.9597 |
| training | NSCLC | 52 | M | Adenocarcinoma | IIIA | yes | 0.9912 |
| training | NSCLC | 74 | M | Squamous cell carcinoma | IA | yes | 0.3920 |
| training | NSCLC | 58 | M | Large cell carcinoma | IB | yes | 0.3453 |
| training | NSCLC | 42 | F | Adenocarcinoma | IIA | no | 0.9799 |
| training | NSCLC | 68 | F | Squamous cell carcinoma | IIB | yes | 0.9892 |
| training | NSCLC | 71 | F | Squamous cell carcinoma | IIA | yes | 0.9905 |
| training | NSCLC | 85 | M | Adenocarcinoma | IIB | yes | 0.3604 |
| training | NSCLC | 63 | F | Adenocarcinoma | IIIA | no | 0.9790 |
| training | NSCLC | 77 | M | Adenocarcinoma | IIB | yes | 0.9944 |
| training | NSCLC | 75 | M | Adenocarcinoma | IB | yes | 0.9868 |
| training | NSCLC | 61 | M | NSCLC-NOS | IA | yes | 0.9545 |
| training | NSCLC | 81 | M | Adenocarcinoma | IB | yes | 0.9951 |
| training | NSCLC | 86 | F | Adenocarcinoma | IB | yes | 0.9673 |
| training | NSCLC | 82 | F | Adenocarcinoma | IB | no | 0.1536 |
| training | NSCLC | 49 | M | Adenocarcinoma | IA | no | 0.9275 |
| training | NSCLC | 70 | F | Adenocarcinoma | IIA | yes | 0.9790 |
| training | NSCLC | 71 | M | Adenocarcinoma | IIB | yes | 0.9841 |
| training | NSCLC | 71 | M | Squamous cell carcinoma | IB | yes | 0.9631 |
| training | NSCLC | 65 | F | Adenocarcinoma | IB | no | 0.9935 |
| training | NSCLC | 68 | F | Adenocarcinoma | IB | no | 0.7904 |
| training | NSCLC | 73 | F | Squamous cell carcinoma | IB | yes | 0.9886 |
| training | NSCLC | 77 | M | Adenocarcinoma | IB | yes | 0.9953 |
| training | NSCLC | 64 | M | Adenocarcinoma | IB | yes | 0.9930 |
| training | NSCLC | 71 | F | Adenocarcinoma | IB | yes | 0.9943 |
| training | NSCLC | 75 | M | Adenocarcinoma | IIA | yes | 0.9903 |
| training | NSCLC | 79 | M | Adenocarcinoma | IA | yes | 0.6861 |
| training | NSCLC | 71 | M | Adenocarcinoma | IA | yes | 0.3082 |
| training | NSCLC | 59 | M | Squamous cell carcinoma | IA | yes | 0.3635 |
| training | NSCLC | 57 | F | Adenocarcinoma | IA | yes | 0.5033 |
| training | NSCLC | 58 | M | Adenocarcinoma | IA | yes | 0.5404 |
| training | NSCLC | 79 | F | Adenocarcinoma | IA | no | 0.3332 |
| training | NSCLC | 60 | F | NSCLC-NOS | IA | yes | 0.9853 |
| training | NSCLC | 57 | M | NSCLC-NOS | IIB | yes | 0.6693 |
| training | NSCLC | 68 | M | Adenocarcinoma | IIB | yes | 0.5447 |
| training | NSCLC | 67 | F | Adenocarcinoma | IIB | yes | 0.9892 |
| training | NSCLC | 53 | M | NSCLC-NOS | IIB | yes | 0.9944 |
| training | NSCLC | 47 | F | Adenocarcinoma | IIB | yes | 0.9964 |
| training | NSCLC | 64 | F | Large cell carcinoma | IIIA | yes | 0.9950 |
| training | NSCLC | 71 | M | Adenocarcinoma | IIB | yes | 0.8565 |
| training | NSCLC | 67 | M | NSCLC-NOS | IIB | yes | 0.9954 |
| training | NSCLC | 68 | M | Adenocarcinoma | IIIA | yes | 0.6086 |
| training | NSCLC | 70 | M | Adenocarcinoma | IIA | yes | 0.3820 |
| training | NSCLC | 75 | M | Squamous cell carcinoma | IIIA | yes | 0.9879 |
| training | NSCLC | 64 | F | Adenocarcinoma | IIIB | no | 0.6129 |
| training | NSCLC | 55 | M | Adenocarcinoma | IIIA | yes | 0.9932 |
| training | NSCLC | 67 | M | NSCLC-NOS | IIIB | yes | 0.9627 |
| training | NSCLC | 63 | M | Adenocarcinoma | IIIA | yes | 0.9947 |
| training | NSCLC | 60 | F | Squamous cell carcinoma | IIIA | yes | 0.9953 |
| training | NSCLC | 73 | M | Squamous cell carcinoma | IIA | yes | 0.2077 |
| training | NSCLC | 64 | F | Squamous cell carcinoma | IIB | yes | 0.9892 |
| training | NSCLC | 62 | F | Adenocarcinoma | IIB | no | 0.2240 |
| training | NSCLC | 82 | F | Adenocarcinoma | IIIB | no | 0.5940 |
| training | NSCLC | 65 | M | Adenocarcinoma | IIIA | yes | 0.9953 |
| training | NSCLC | 71 | M | Adenocarcinoma | IIIA | yes | 0.1079 |

TABLE 4-continued

Lung CLiP scores for NSCLC patients and risk-matched controls in the training and validation cohorts.

| Cohort | Subject type | Age (years) | Sex | Histology | Stage (AJCC v7) | Smoker | Lung-CliP Score |
|---|---|---|---|---|---|---|---|
| training | NSCLC | 61 | F | Large cell carcinoma | IIA | yes | 0.9892 |
| training | NSCLC | 55 | M | Adenocarcinoma | IIIA | yes | 0.9867 |
| training | NSCLC | 58 | F | Adenocarcinoma | IIB | yes | 0.9915 |
| training | NSCLC | 73 | M | Squamous cell carcinoma | IIB | yes | 0.9938 |
| training | NSCLC | 68 | M | Adenocarcinoma | IIIB | yes | 0.9938 |
| training | NSCLC | 63 | M | Squamous cell carcinoma | IIIA | yes | 0.9882 |
| training | NSCLC | 60 | M | Squamous cell carcinoma | IIIB | no | 0.9957 |
| training | NSCLC | 78 | F | Adenocarcinoma | IIIA | yes | 0.4455 |
| training | NSCLC | 73 | M | Adenocarcinoma | IIIB | yes | 0.9923 |
| training | NSCLC | 79 | F | Adenocarcinoma | IIIB | no | 0.9427 |
| training | control | 70 | M | — | — | yes | 0.1829 |
| training | control | 66 | F | — | — | yes | 0.9102 |
| training | control | 79 | M | — | — | yes | 0.1601 |
| training | control | 72 | F | — | — | yes | 0.2681 |
| training | control | 69 | M | — | — | yes | 0.2202 |
| training | control | 71 | F | — | — | yes | 0.3605 |
| training | control | 58 | F | — | — | yes | 0.6078 |
| training | control | 68 | M | — | — | yes | 0.3099 |
| training | control | 62 | F | — | — | yes | 0.3478 |
| training | control | 58 | M | — | — | yes | 0.1275 |
| training | control | 66 | M | — | — | yes | 0.7246 |
| training | control | 67 | F | — | — | yes | 0.3743 |
| training | control | 68 | M | — | — | yes | 0.2177 |
| training | control | 67 | M | — | — | yes | 0.2029 |
| training | control | 69 | M | — | — | yes | 0.2641 |
| training | control | 65 | F | — | — | yes | 0.3007 |
| training | control | 60 | F | — | — | yes | 0.2547 |
| training | control | 61 | F | — | — | yes | 0.6773 |
| training | control | 68 | M | — | — | yes | 0.1429 |
| training | control | 63 | M | — | — | yes | 0.1423 |
| training | control | 64 | M | — | — | yes | 0.1573 |
| training | control | 77 | M | — | — | yes | 0.5918 |
| training | control | 69 | F | — | — | yes | 0.3612 |
| training | control | 63 | F | — | — | yes | 0.1167 |
| training | control | 70 | M | — | — | yes | 0.3415 |
| training | control | 81 | F | — | — | yes | 0.3647 |
| training | control | 54 | M | — | — | yes | 0.3615 |
| training | control | 72 | F | — | — | yes | 0.9228 |
| training | control | 72 | M | — | — | yes | 0.2733 |
| training | control | 77 | M | — | — | yes | 0.3884 |
| training | control | 76 | F | — | — | yes | 0.5711 |
| training | control | 76 | M | — | — | yes | 0.4850 |
| training | control | 64 | F | — | — | yes | 0.1496 |
| training | control | 61 | F | — | — | yes | 0.3827 |
| training | control | 74 | M | — | — | yes | 0.2655 |
| training | control | 83 | M | — | — | yes | 0.8926 |
| training | control | 71 | F | — | — | yes | 0.1550 |
| training | control | 75 | M | — | — | yes | 0.1651 |
| training | control | 70 | M | — | — | yes | 0.8347 |
| training | control | 69 | M | — | — | yes | 0.2391 |
| training | control | 69 | F | — | — | yes | 0.0213 |
| training | control | 75 | M | — | — | yes | 0.2990 |
| training | control | 72 | M | — | — | yes | 0.9490 |
| training | control | 66 | M | — | — | yes | 0.7197 |
| training | control | 77 | M | — | — | yes | 0.9543 |
| training | control | 70 | F | — | — | yes | 0.8310 |
| training | control | 58 | M | — | — | yes | 0.7487 |
| training | control | 75 | M | — | — | yes | 0.8713 |
| training | control | 66 | M | — | — | yes | 0.6815 |
| training | control | 75 | F | — | — | yes | 0.1343 |
| training | control | 68 | M | — | — | yes | 0.3283 |
| training | control | 77 | M | — | — | yes | 0.2363 |
| training | control | 76 | M | — | — | yes | 0.9716 |
| training | control | 70 | F | — | — | yes | 0.1826 |
| training | control | 65 | M | — | — | yes | 0.5005 |
| training | control | 71 | M | — | — | yes | 0.8974 |
| validation | NSCLC | 67 | F | Adenocarcinoma | IA | yes | 0.9896 |
| validation | NSCLC | 72 | M | Adenocarcinoma | IA | yes | 0.8685 |
| validation | NSCLC | 52 | F | Adenocarcinoma | IIIB | yes | 0.9935 |

TABLE 4-continued

Lung CLiP scores for NSCLC patients and risk-matched controls in the training and validation cohorts.

| Cohort | Subject type | Age (years) | Sex | Histology | Stage (AJCC v7) | Smoker | Lung-CliP Score |
|---|---|---|---|---|---|---|---|
| validation | NSCLC | 54 | F | Adenocarcinoma | IA | yes | 0.9803 |
| validation | NSCLC | 74 | M | Adenocarcinoma | IIB | yes | 0.9898 |
| validation | NSCLC | 68 | M | Squamous cell carcinoma | IB | yes | 0.9947 |
| validation | NSCLC | 58 | M | Adenocarcinoma | IIIA | yes | 0.9943 |
| validation | NSCLC | 67 | M | Adenocarcinoma | IA | yes | 0.9875 |
| validation | NSCLC | 69 | F | Adenocarcinoma | IA | yes | 0.7669 |
| validation | NSCLC | 64 | F | Adenocarcinoma | IB | yes | 0.9911 |
| validation | NSCLC | 73 | F | Adenocarcinoma | IIB | yes | 0.9932 |
| validation | NSCLC | 74 | M | Adenocarcinoma | IA | yes | 0.9236 |
| validation | NSCLC | 72 | M | Squamous cell carcinoma | IB | yes | 0.4821 |
| validation | NSCLC | 69 | F | Adenocarcinoma | IA | yes | 0.2417 |
| validation | NSCLC | 79 | M | Adenocarcinoma | IIIA | yes | 0.8740 |
| validation | NSCLC | 74 | F | Adenocarcinoma | IIB | yes | 0.8280 |
| validation | NSCLC | 73 | M | Adenocarcinoma | IIB | yes | 0.3413 |
| validation | NSCLC | 70 | F | Adenocarcinoma | IIIB | yes | 0.9364 |
| validation | NSCLC | 75 | M | Squamous cell carcinoma | IIB | yes | 0.8972 |
| validation | NSCLC | 80 | M | Squamous cell carcinoma | IIB | yes | 0.9817 |
| validation | NSCLC | 79 | M | Adenocarcinoma | IA | yes | 0.9792 |
| validation | NSCLC | 53 | F | Adenocarcinoma | IB | yes | 0.9817 |
| validation | NSCLC | 56 | M | Adenocarcinoma | IA | yes | 0.2216 |
| validation | NSCLC | 68 | F | Squamous cell carcinoma | IB | yes | 0.8111 |
| validation | NSCLC | 52 | M | Adenocarcinoma | IA | yes | 0.6932 |
| validation | NSCLC | 75 | F | Adenocarcinoma | IA | yes | 0.4523 |
| validation | NSCLC | 69 | M | Adenocarcinoma | IA | yes | 0.2941 |
| validation | NSCLC | 74 | F | Adenocarcinoma | IA | yes | 0.9147 |
| validation | NSCLC | 72 | M | Squamous cell carcinoma | IA | yes | 0.3510 |
| validation | NSCLC | 54 | F | Squamous cell carcinoma | IIIB | yes | 0.9867 |
| validation | NSCLC | 52 | M | Adenocarcinoma | IB | yes | 0.0641 |
| validation | NSCLC | 73 | F | Adenocarcinoma | IA | yes | 0.6802 |
| validation | NSCLC | 65 | M | Adenocarcinoma | IB | yes | 0.7301 |
| validation | NSCLC | 61 | F | Adenocarcinoma | IA | yes | 0.5750 |
| validation | NSCLC | 76 | F | Squamous cell carcinoma | IA | yes | 0.7319 |
| validation | NSCLC | 83 | F | Adenocarcinoma | IA | yes | 0.8739 |
| validation | NSCLC | 64 | F | Adenocarcinoma | IIB | yes | 0.2511 |
| validation | NSCLC | 77 | M | Squamous cell carcinoma | IB | yes | 0.9652 |
| validation | NSCLC | 64 | F | Adenocarcinoma | IB | yes | 0.6819 |
| validation | NSCLC | 62 | F | Adenocarcinoma | IA | yes | 0.2256 |
| validation | NSCLC | 64 | M | Adenocarcinoma | IIB | yes | 0.6970 |
| validation | NSCLC | 69 | F | Adenocarcinoma | IA | yes | 0.2080 |
| validation | NSCLC | 77 | F | Squamous cell carcinoma | IB | yes | 0.9827 |
| validation | NSCLC | 75 | M | Adenocarcinoma | IA | yes | 0.2080 |
| validation | NSCLC | 72 | F | Adenocarcinoma | IA | yes | 0.8678 |
| validation | NSCLC | 57 | F | Adenocarcinoma | IIB | yes | 0.2362 |
| validation | control | 75 | M | — | — | yes | 0.6583 |
| validation | control | 64 | M | — | — | yes | 0.2602 |
| validation | control | 75 | M | — | — | yes | 0.5772 |
| validation | control | 60 | M | — | — | yes | 0.8097 |
| validation | control | 67 | F | — | — | yes | 0.8300 |
| validation | control | 63 | N | — | — | yes | 0.2358 |
| validation | control | 65 | F | — | — | yes | 0.5041 |
| validation | control | 62 | M | — | — | yes | 0.4063 |
| validation | control | 59 | F | — | — | yes | 0.8967 |
| validation | control | 61 | M | — | — | yes | 0.6287 |
| validation | control | 67 | F | — | — | yes | 0.3789 |
| validation | control | 66 | M | — | — | yes | 0.5077 |
| validation | control | 61 | F | — | — | yes | 0.4070 |
| validation | control | 66 | M | — | — | yes | 0.4900 |
| validation | control | 68 | F | — | — | yes | 0.7600 |
| validation | control | 62 | F | — | — | yes | 0.1964 |
| validation | control | 74 | F | — | — | yes | 0.6672 |
| validation | control | 59 | F | — | — | yes | 0.9133 |
| validation | control | 58 | M | — | — | yes | 0.2362 |
| validation | control | 78 | M | — | — | yes | 0.9551 |

TABLE 4-continued

Lung CLiP scores for NSCLC patients and risk-matched controls in the training and validation cohorts.

| Cohort | Subject type | Age (years) | Sex | Histology | Stage (AJCC v7) | Smoker | Lung-CLiP Score |
|---|---|---|---|---|---|---|---|
| validation | control | 55 | F | — | — | yes | 0.1902 |
| validation | control | 68 | F | — | — | yes | 0.3771 |
| validation | control | 64 | F | — | — | yes | 0.2515 |
| validation | control | 66 | F | — | — | yes | 0.1925 |
| validation | control | 61 | F | — | — | yes | 0.7880 |
| validation | control | 58 | M | — | — | yes | 0.1925 |
| validation | control | 76 | F | — | — | yes | 0.3882 |
| validation | control | 60 | M | — | — | yes | 0.1902 |
| validation | control | 73 | M | — | — | yes | 0.7542 |
| validation | control | 72 | F | — | — | yes | 0.7830 |
| validation | control | 62 | M | — | — | yes | 0.7509 |
| validation | control | 76 | M | — | — | yes | 0.2892 |
| validation | control | 78 | M | — | — | yes | 0.7487 |
| validation | control | 74 | M | — | — | yes | 0.9841 |
| validation | control | 73 | F | — | — | yes | 0.7811 |
| validation | control | 74 | M | — | — | yes | 0.2226 |
| validation | control | 61 | M | — | — | yes | 0.7948 |
| validation | control | 62 | M | — | — | yes | 0.3342 |
| validation | control | 74 | M | — | — | yes | 0.1902 |
| validation | control | 69 | M | — | — | yes | 0.7073 |
| validation | control | 70 | F | — | — | yes | 0.4028 |
| validation | control | 59 | F | — | — | yes | 0.3397 |
| validation | control | 69 | M | — | — | yes | 0.3932 |
| validation | control | 73 | M | — | — | yes | 0.2100 |
| validation | control | 64 | M | — | — | yes | 0.3030 |
| validation | control | 58 | F | — | — | yes | 0.1902 |
| validation | control | 72 | M | — | — | yes | 0.2417 |
| validation | control | 55 | M | — | — | yes | 0.1808 |

Example 2: StartUp Score: Analysis of Genomic Position of Sequencing Reads to Detect Circulating Tumor DNA Analysis of cell-free DNA (cfDNA) is an important technique in oncology, with applications for cancer detection, therapy monitoring, and mutational genotyping. Here, using targeted cfDNA sequencing data, it has been found that stereotyped differences in cfDNA fragment start and end genomic positions exist when comparing lung cancer patients and non-cancer controls. Accordingly, the start and end genomic positions of a cfDNA can be utilized to help diagnose lung cancer in an individual. For example, the start and end genomic positions of a set of cfDNA molecules of a biological sample of an individual can be used as a set of input features to be analyzed using a trained machine learning classifier to diagnose lung cancer in the individual.

Methods cfDNA was sequenced from lung cancer patients and non-cancer controls in training and validation cohorts described below via CAPP-Seq to high unique molecular depth, with depths of 23,570×/5,012× (nominal/unique) for cases and 19,534×/4,075× for risk-matched controls. Samples were sequenced and the sequencing data was processed as follows: Prior to sequencing, hybrid capture enrichment was performed using a custom 355 kb NSCLC-focused panel targeting 255 genes recurrently mutated in lung cancer and 11 genes canonically associated with clonal hematopoiesis. Sequencing reads were mapped to the human genome (hg19, GRCh37), followed by barcode-mediated PCR duplicate removal to gain an accurate count of the number of unique fragments at each genomic position. After de-deduplication, the number of fragments that start and end at each position in each sample was assessed across the training cases and controls, normalizing by the total number of fragments*1,000,000 (e.g., counts per million (CPM)). In other words, a set of quantitative measures of start CPM was determined by the number of fragments that start at each position in each sample across the training cases and controls, normalized by the total number of fragments*1,000,000. Similarly, a set of quantitative measures of end CPM was determined by the number of fragments that end at each position in each sample across the training cases and controls, normalized by the total number of fragments*1,000,000.

cfDNA sequencing data was first analyzed from a training cohort of 104 lung cancer patients and 56 risk-matched controls used to establish the Lung Cancer Likelihood in Plasma (Lung-CLiP) model described in Example 1. For each sample, the number of cfDNA fragments that start and the number that end at each genomic coordinate targeted for sequencing was assessed at base-pair resolution. Quantitative differences in the frequency of fragments with a given start or end position was then assessed (quantified as CPM, as described above) comparing lung cancer cases and risk-matched controls. Finally, after identifying genomic positions enriched for fragment start or fragment end positions in lung cancer patients, a classifier was built to distinguish the lung cancer patients from the risk-matched controls in the training cohort. The classifier was applied to two independent validation cohorts, the first comprising 46 lung cancer patients and 48 risk-matched controls (the same validation cohort considered in the Lung-CLiP study), as well as a $2^{nd}$ independent validation cohort (a new cohort not considered in the Lung-CLiP study) comprising 24 lung cancer patients and 54 low-risk controls (controls that are not risk-matched based on age and smoking history).

Results

A strikingly stereotyped nature of fragment start positions was observed throughout the sequencing panel (FIG. 67). Specific genomic positions were able to distinguish cases (e.g., lung cancer patients) from risk-matched controls, at single base-pair resolution. Three separate statistical tests were performed on the start position CPM at each position. First, a t-test was performed on the distribution of start CPMs between cases and controls. Second, the correlation of start CPMs was assessed to circulating tumor DNA (ctDNA) variant allele frequency, as assessed by tumor-informed SNVs in the subset of patients with tumor tissue available. Finally, the correlation of start CPMs to metabolic tumor volume (MTV) was assessed. The three p-values from these statistical tests were combined via Fisher's method. Positions with a nominally statistically significant P-value (i.e., <0.05) were then selected as being informative for separating cases from controls. In total, 8,192 such positions were identified across the sequencing results.

The set of quantitative measures of start counts per million (CPM) across all 8,192 informative positions were summed to create a 'StartUp Score' for a given sample, which may be used to classify or distinguish lung cancer patients from non-cancer controls. Importantly, StartUp Score correlated with biological measurements of disease burden, including ctDNA tumor allele fraction and metabolic tumor volume (FIG. 68). Therefore, StartUp score can be analyzed to determine ctDNA tumor allele fraction and/or metabolic tumor volume of a neoplasm (e.g., lung cancer).

The correlation between StartUp Score and Lung-CLiP was also assessed. Interestingly, while the StartUp Score was significantly correlated with Lung-CLiP scores in the training cohort, the correlation diminished in the validation set, indicating that fragment start positioning represent a biologically orthogonal feature to SNV and SCNAs with independent classification utility (FIG. 69).

The utility of StartUp Score for distinguishing lung cancer patients from non-cancer controls in three separate cohorts, including the training cohort and two independent validation cohorts, was assessed. StartUp Scores were higher in lung cancer patients than controls in each cohort tested (FIG. 70). Importantly, the performance of the StartUp Score for distinguishing lung cancer patients from controls was similar in the training and validation cohorts (AUC=0.82 in training, AUC=0.86 in validation set 1, 0.80 in validation set 2) (FIGS. 71 and 72).

DOCTRINE OF EQUIVALENTS

While the above description contains many specific embodiments, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method to prepare a DNA library for sequencing, the method comprising:

ligating onto a plurality of nucleic acid segments pairs of partial Y-adapters to flank each of the plurality of nucleic acid segments by a pair of partial Y-adapters, thereby producing a plurality of ligation products, wherein each of the plurality of nucleic acid segments is DNA, and wherein the plurality of nucleic acid segments is obtained or derived from a biological sample, wherein each of the pair of partial Y-adapters comprises an error-correcting unique identifier flanked by a 1 bp offset sequence and a 0-3 bp stagger sequence, and sequences for a primer to anneal in a grafting polymerase chain reaction, and wherein the pair of error-correcting unique identifiers on each of the plurality of nucleic acid segments collectively provides a unique identification of the nucleic acid segments against other nucleic acid segments in the plurality of nucleic acid segments; and grafting onto each of the plurality of ligation products a pair of error-correcting dual index sample barcodes to flank the ligation product by the error-correcting dual index sample barcodes, wherein the error-correcting dual index sample barcodes collectively provide a unique identification of the biological sample.

2. The method of claim 1, wherein the nucleic acid segment is complementary DNA (cDNA).

3. The method of claim 1, wherein the biological sample comprises cell-free DNA.

4. The method of claim 1, wherein the error-correcting dual index sample barcodes collectively provide the unique identification of the biological sample against other biological samples represented in the DNA library.

5. The method of claim 1, wherein the pair of error-correcting unique identifiers are each at least 3 bp in length.

6. The method of claim 5, wherein the error-correcting unique identifiers are each from 3 to 8 base pairs in length.

7. The method of claim 1, wherein the error-correcting unique identifiers are each 6 base pairs in length.

8. The method of claim 1, wherein the pair of error-correcting dual index sample barcodes each are 8 base pairs in length.

9. The method of claim 1, wherein the grafting comprises performing a polymerase chain reaction.

10. The method of claim 1, wherein the biological sample is a blood sample.

11. The method of claim 1, wherein the biological sample is a plasma sample.

12. The method of claim 1, wherein each of the pair of partial Y-adapters further comprises an overhang.

13. The method of claim 12, wherein the overhang comprises a T overhang.

14. The method of claim 1, further comprising after the ligating, performing a bead cleanup on the plurality of ligation products.

15. The method of claim 1, further comprising after the grafting, performing a sequencing reaction to generate a plurality of sequencing reads.

16. The method of claim 1, further comprising, before the ligating, performing an enrichment reaction on the plurality of nucleic acid segments.

17. The method of claim 16, wherein the enrichment reaction comprises use of a bait set to enrich for specific sequences of interest.

* * * * *